US007535860B2

(12) United States Patent
Park et al.

(10) Patent No.: US 7,535,860 B2
(45) Date of Patent: May 19, 2009

(54) APPARATUS AND METHOD FOR TRANSMITTING/RECEIVING PILOT SIGNAL IN COMMUNICATION SYSTEM USING OFDM SCHEME

(75) Inventors: Sung-Eun Park, Suwon-si (KR); Seung-Hoon Choi, Suwon-si (KR); Dong-Seek Park, Yongin-si (KR); Jae-Yoel Kim, Gunpo-si (KR); Sung-Ryul Yun, Suwon-si (KR); Sie-Joon Cho, Seongnam-si (KR); Jae-Weon Cho, Suwon-si (KR); Chi-Woo Lim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 606 days.

(21) Appl. No.: 11/073,455

(22) Filed: Mar. 7, 2005

(65) Prior Publication Data

US 2006/0007850 A1 Jan. 12, 2006

(30) Foreign Application Priority Data

Mar. 5, 2004 (KR) .................... 10-2004-0015199
Aug. 26, 2004 (KR) .................... 10-2004-0071045

(51) Int. Cl.
*H04B 7/00* (2006.01)
*H04J 9/00* (2006.01)

(52) U.S. Cl. ...................... 370/310; 370/204

(58) Field of Classification Search ......... 370/203–207, 370/342, 310
See application file for complete search history.

(56) References Cited

U.S. PATENT DOCUMENTS 6,181,714 B1 * 1/2001 Isaksson et al. ............. 370/491
6,618,352 B1 * 9/2003 Shirakata et al. ............ 370/203
2005/0123023 A1 * 6/2005 Smith et al. ................. 375/130

FOREIGN PATENT DOCUMENTS

| KR | 1020000042359 | 7/2000 |
| RU | 2186465 | 7/2002 |
| RU | 2208911 | 7/2003 |

* cited by examiner

*Primary Examiner*—George Eng
*Assistant Examiner*—Michael Faragalla
(74) *Attorney, Agent, or Firm*—The Farrell Law Firm, PC

(57) ABSTRACT

Disclosed is a method for transmitting a pilot symbol from base stations (BSs) to a subscriber station (SS) in a communication system which includes the base stations located adjacent to each other, the method includes the steps of transmitting BS-identifying sub-carriers which represent sequences for identifying the base stations in a frequency domain of the pilot symbol; and transmitting PAPR (Peak to Average Power Ratio) sub-carriers which represent sequences for reducing a PAPR of the pilot symbol together with the transmission of the BS-identifying sub-carriers in the frequency domain.

37 Claims, 11 Drawing Sheets

APPARATUS AND METHOD FOR TRANSMITTING/RECEIVING PILOT SIGNAL IN COMMUNICATION SYSTEM USING OFDM SCHEME

PRIORITY

This application claims priority to two applications entitled "Apparatus And Method For Transmitting/Receiving Pilot Signal In Communication System Using OFDM Scheme" filed in the Korean Industrial Property Office on Mar. 5, 2004 and assigned Serial No. 2004-15199, and on Aug. 26, 2004 and assigned Serial No. 2004-71045 the contents of each of which are hereby incorporated by reference.

BACKGROUND OF THE INVENTION

1. Field of the Invention

The present invention relates to a communication system using an Orthogonal Frequency Division Multiplexing (OFDM) scheme, and more particularly to an apparatus and a method for transmitting/receiving pilot signals for identifying base stations and sectors.

2. Description of the Related Art

In a 4$^{th}$ generation (4G) communication system, which is the next generation communication system, research is currently being conducted to provide users with services having various qualities of service ('QoS') and that support a high transmission speed. Currently, in the 4G communication system, research is currently being conducted to support high speed services while ensuring mobility and QoS in a wireless local area network ('LAN') and a metropolitan area network ('MAN') system.

As a scheme useful for high speed data transmission in wire or wireless channels, the OFDM scheme is now actively being developed. The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal sub-carriers before being transmitted.

In order to provide a wireless multimedia service at high speed and high quality, the 4G communication system requires a wideband spectrum resource. However, when the wideband spectrum resource is used, not only the influence of fading on the wireless transmission paths due to multi-path propagation becomes severe, but also the frequency selective fading has an influence on the transmission frequency bands. Therefore, for high speed wireless multimedia services, the OFDM scheme is now more frequently used than the Code Division Multiple Access (CDMA) scheme in the 4G communication system, since the OFDM scheme is more robust against the frequency selective fading and is thus more advantageous than the CDMA scheme.

Operations of a transmitter and a receiver in a communication system using the OFDM scheme (OFDM communication system) will be briefly discussed. The transmitter may be a base station (BS) and the receiver may be a subscriber station (SS).

In the transmitter of the OFDM communication system, input data is modulated into sub-carrier signals by a scrambler, an encoder and an interleaver. The transmitter provides a variety of variable data rates, which determines the coding rate, the interleaving size and the modulation scheme. Usually, the encoder uses coding rates such as ½, ¾, etc., and the interleaving size for preventing burst error is determined according to the Number of Coded Bits Per OFDM Symbol (NCBPS). As the modulation scheme, a QPSK (Quadrature Phase Shift Keying) scheme, an 8PSK (Phase Shift Keying) scheme, a 16QAM (Quadrature Amplitude Modulation) scheme, or a 64QAM (Quadrature Amplitude Modulation) scheme may be used according to the data rates.

A predetermined number of the modulated sub-carrier signals are added to a predetermined number of pilot sub-carrier signals, and an Inverse Fast Fourier Transform (IFFT) unit performs IFFT for the added signals, thereby generating an OFDM symbol. Guard intervals are then inserted into the OFDM symbol in order to eliminate the inter-symbol interference (ISI) in the multi-path channel environment, and the OFDM symbol containing the guard intervals is finally input to a Radio Frequency (RF) processor through a symbol waveform generator. The RF processor processes the input signal and transmits the processed signal over the air.

The receiver of the OFDM communication system corresponding to the transmitter as described above performs a reverse process to the process in the transmitter together with an additional synchronization step. First, frequency offset estimation and symbol offset estimation are performed in advance using a training symbol set for a received OFDM symbol. Then, a data symbol obtained by eliminating the guard intervals from the OFDM symbol is restored to a predetermined number of the sub-carrier signals containing a predetermined number of pilot sub-carriers added thereto by a Fast Fourier Transform (FTT) unit. Further, in order to overcome any path delay in an actual wireless channel, an equalizer estimates the channel condition for the received channel signal, thereby eliminating the signal distortion in the actual wireless channel from the received channel signal. The data channel-estimated by the equalizer is transformed into a bit stream which then passes through a de-interleaver. Thereafter, the bit stream passes through a decoder and a descrambler for error correction and is then output as final data.

In the OFDM communication system as described above, a transmitter (for example, a BS) transmits the pilot sub-carrier signals to a receiver (for example, an SS). The BS simultaneously transmits the data sub-carrier signals together with the pilot sub-carrier signals. The SS can perform synchronization acquisition, channel estimation and BS identification by receiving the pilot sub-carrier signals. That is, the pilot sub-carrier signal is a reference sub-carrier signal and serves as a training sequence, thereby enabling channel estimation between the transmitter and the receiver. Moreover, an SS can identify, by using the pilot sub-carrier signal, a BS to which the SS belongs. The locations for the pilot sub-carrier signals, are defined in advance by a protocol between the transmitter and the receiver. As a result, the pilot sub-carrier signals operate as reference signals.

A process in which an SS identifies by using the pilot sub-carrier signals, a BS to which the SS belongs will be described.

First, the BS transmits the pilot sub-carrier signals at a transmit power level greater than that for the data sub-carrier signals such that the pilot sub-carrier signals can reach the cell boundary with a particular pattern (specifically, pilot pattern). The reason why the BS transmits the pilot sub-carrier signals with a high transmit power such that the pilot sub-carrier signals can reach the cell boundary with a particular pilot pattern will be described.

First, the SS does not have any specific information identifying the BS to which the SS currently belongs when the SS enters a cell. In order to detect the BS to which the SS belongs, the SS must receive the pilot sub-carrier signals. Therefore, the BS transmits the pilot sub-carrier signals having a particular pilot pattern with a relatively high transmit power, in order to enable the SS to detect the BS to which the SS belongs as far away as at the cell edge.

The pilot pattern is a pattern generated by the pilot sub-carrier signals transmitted by the BS. That is, the pilot pattern is generated by the slope of the pilot sub-carrier signals and the start point at which the pilot sub-carrier signals begin to be transmitted. Therefore, the OFDM communication system must be designed such that each BS in the OFDM communication system has a specific pilot pattern for its identification. Further, a coherence bandwidth and a coherence time must be taken into account when generating the pilot pattern.

The coherence bandwidth is a maximum bandwidth based on an assumption that a channel is constant in a frequency domain. The coherence time is a maximum time based on an assumption that a channel is constant in a time domain. Therefore, it can be assumed that the channel is constant within the coherence bandwidth and the coherence time. As a result, the transmission of a single pilot sub-carrier signal within the coherence bandwidth and during the coherence time is sufficient for synchronization acquisition, channel estimation and BS identification, and can maximize the transmission of the data sub-carrier signals, thereby improving the performance of the entire system. It can be said that the coherence bandwidth is a maximum frequency interval within which the pilot sub-carrier signals are transmitted, and the coherence time is a maximum time interval within which the pilot channel signals are transmitted, that is, a maximum OFDM symbol time interval.

The number of the pilot patterns having different slopes and different start points must be equal to or greater than the number of BSs included in the OFDM communication system. In order to transmit the pilot sub-carrier signals in the time-frequency domain of the OFDM communication system, the coherence bandwidth and the coherence time must be taken into consideration as described above. When the coherence bandwidth and the coherence time is taken into consideration, there is a limitation in the number of the pilot patterns having different slopes and different start points. In contrast, when the pilot pattern is generated without considering the coherence bandwidth and the coherence time, pilot sub-carrier signals in pilot patterns representing different BSs get mixed up, so that it becomes impossible to identify the BSs by using the pilot patterns.

All of the slopes which can be generated by the pilot patterns will be discussed with reference to FIG. 1.

FIG. 1 is a graph illustrating all of the slopes which can be generated by the pilot patterns in a typical OFDM communication system.

Referring to FIG. 1, all of the slopes which can be generated by the pilot patterns and the number of the slopes (that is, the slopes according to the pilot sub-carrier signal transmission and the number of the slopes) are limited by the coherence bandwidth 100 and the coherence time 110. In FIG. 1, when the coherence bandwidth 100 is 6 and the coherence time 110 is 1, if the slope of the pilot pattern is an integer, six slopes from the slop s=0 (101) to the slope s=5 (106) can be generated as the slope of the pilot pattern. That is, under the conditions described above, the slope of the pilot pattern is one integer from among 0 to 5. The fact that six slopes of the pilot patterns can be generated implies that six BSs can be identified by using the pilot patterns in the OFDM communication system satisfying the conditions described above. A hatched circle 107 in FIG. 1 represents another pilot sub-carrier signal spaced with the coherence bandwidth 100 away from the first pilot sub-carrier signal.

SUMMARY OF THE INVENTION

As described above, the number of the pilot patterns used in order to identify BSs in the OFDM communication system is limited by the coherence bandwidth and the coherence time. Therefore, the limitation in the number of the pilot patterns which can be generated results in the limitation in the number of identifiable BSs in the OFDM communication system.

Further, when the pilot sub-carrier signals have the same phase, a Peak to Average Power Ratio (PAPR) may increase. When the PAPR is too high, the orthogonality between the pilot sub-carriers transmitted by the transmitter may collapse. Therefore, it is necessary to minimize the PAPR in designing the pilot sub-carrier signals.

Accordingly, the present invention has been made to solve at least the above-mentioned problems occurring in the prior art, and an object of the present invention is to provide an apparatus and a method for transmitting/receiving pilot signals for identifying base stations and sectors in an OFDM communication system.

It is another object of the present invention to provide an apparatus and a method for transmitting/receiving pilot signals in an OFDM communication system, which can minimize interference between the pilot signals.

It is another object of the present invention to provide an apparatus and a method for transmitting/receiving pilot signals in an OFDM communication system, in which pilot signals for identifying base stations are transmitted/received by at least one transmit antenna.

In order to accomplish this object, there is provided a method for transmitting reference signals in a communication system which includes a plurality of cells and has a frequency band divided into N sub-carrier bands, each of the cells having at least one sector and at least one transmit antenna, the reference signals identifying the cells and the sector, the method includes the steps of selecting a row of the Walsh Hadamard matrix corresponding to a cell identifier and repeating the selected row a predetermined number of times; repeating a predetermined number of times a Walsh code corresponding to a sector identifier from among Walsh codes set in advance; selecting a sequence corresponding to the cell identifier and the sector identifier from among sequences set in advance; interleaving the rows of the Walsh Hadamard matrix according to a predetermined interleaving scheme; generating the reference signal by concatenating the sequence with a signal obtained by performing exclusive OR (XOR) on each of the interleaved rows of the Walsh Hadamard matrix and the repeated Walsh codes; and transmitting the reference signal in a predetermined reference signal transmit interval.

In accordance with another aspect of the present invention, there is also provided a method for transmitting a pilot symbol from a plurality of base stations (BSs) to a subscriber station (SS) in a communication system which includes the base stations located adjacent to each other, the method includes the steps of transmitting BS-identifying sub-carriers which represent sequences for identifying the base stations in a frequency domain of the pilot symbol; and transmitting PAPR (Peak to Average Power Ratio) sub-carriers which represent sequences for reducing a PAPR of the pilot symbol together with the transmission of the BS-identifying sub-carriers in the frequency domain.

In accordance with another aspect of the present invention, there is also provided an apparatus for transmitting a pilot symbol from a plurality of base stations (BSs) to a subscriber station (SS) in a communication system which includes the base stations located adjacent to each other, the apparatus includes a transmitter for transmitting BS-identifying sub-carriers which represent sequences for identifying the base stations in a frequency domain of the pilot symbol, the transmitter transmitting PAPR (Peak to Average Power Ratio) sub-carriers which represent sequences for reducing a PAPR of the pilot symbol together with transmission of the BS-identifying sub-carriers in the frequency domain.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following-description, a detailed description of known functions and configurations incorporated herein will be omitted when it may make the subject matter of the present invention rather unclear.

The present invention provides an apparatus and a method for transmitting/receiving pilot signals for identifying base stations and sectors in an OFDM communication system. More specifically, the present invention provides an apparatus and a method for transmitting/receiving pilot signals, which can minimize the interference between the pilot signals while performing an identification of the base stations and the sectors.

Figure 1:
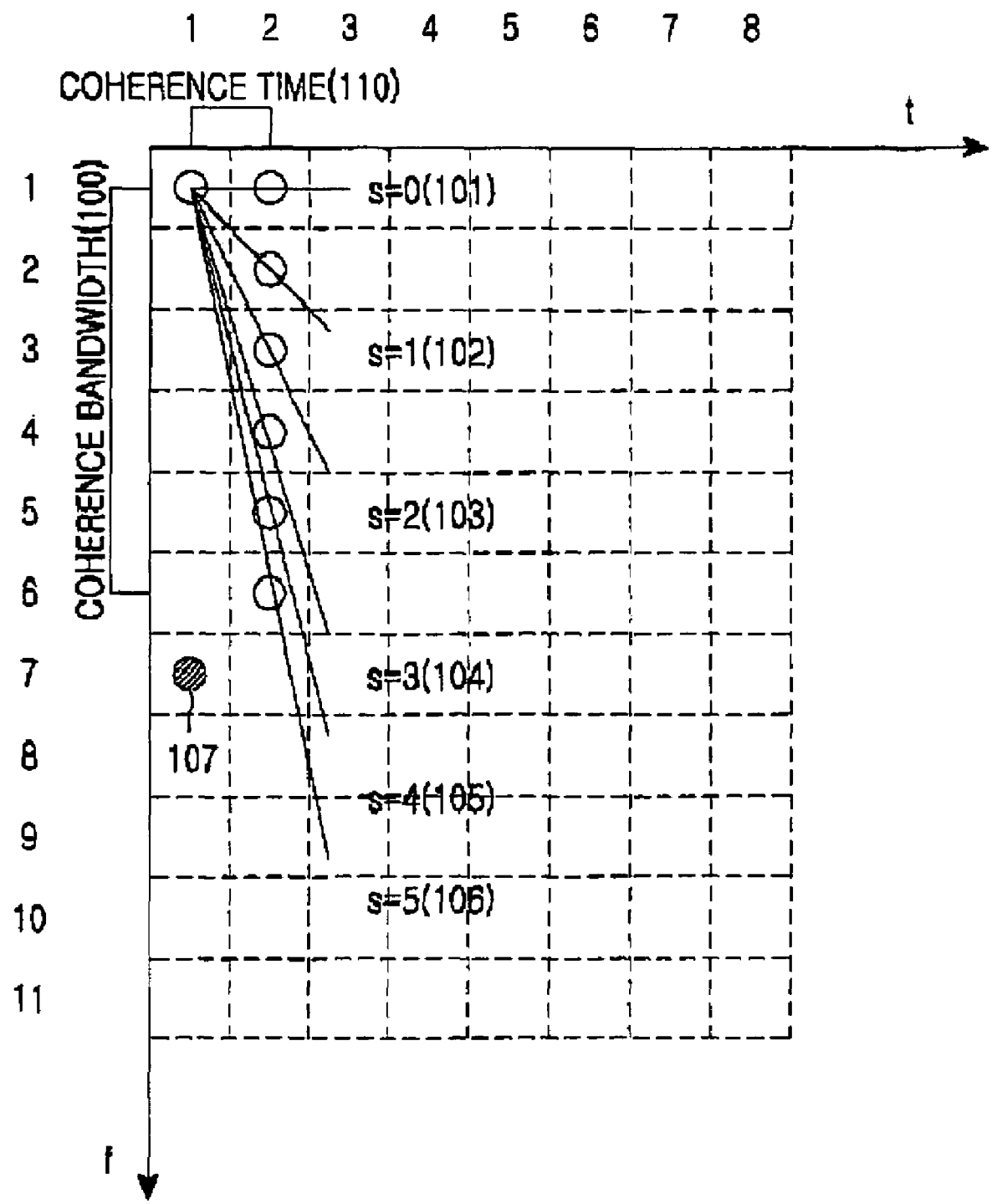
FIG. 1 is a graph illustrating all slopes which can be generated by the pilot patterns in a typical OFDM communication system.
Figure 2:
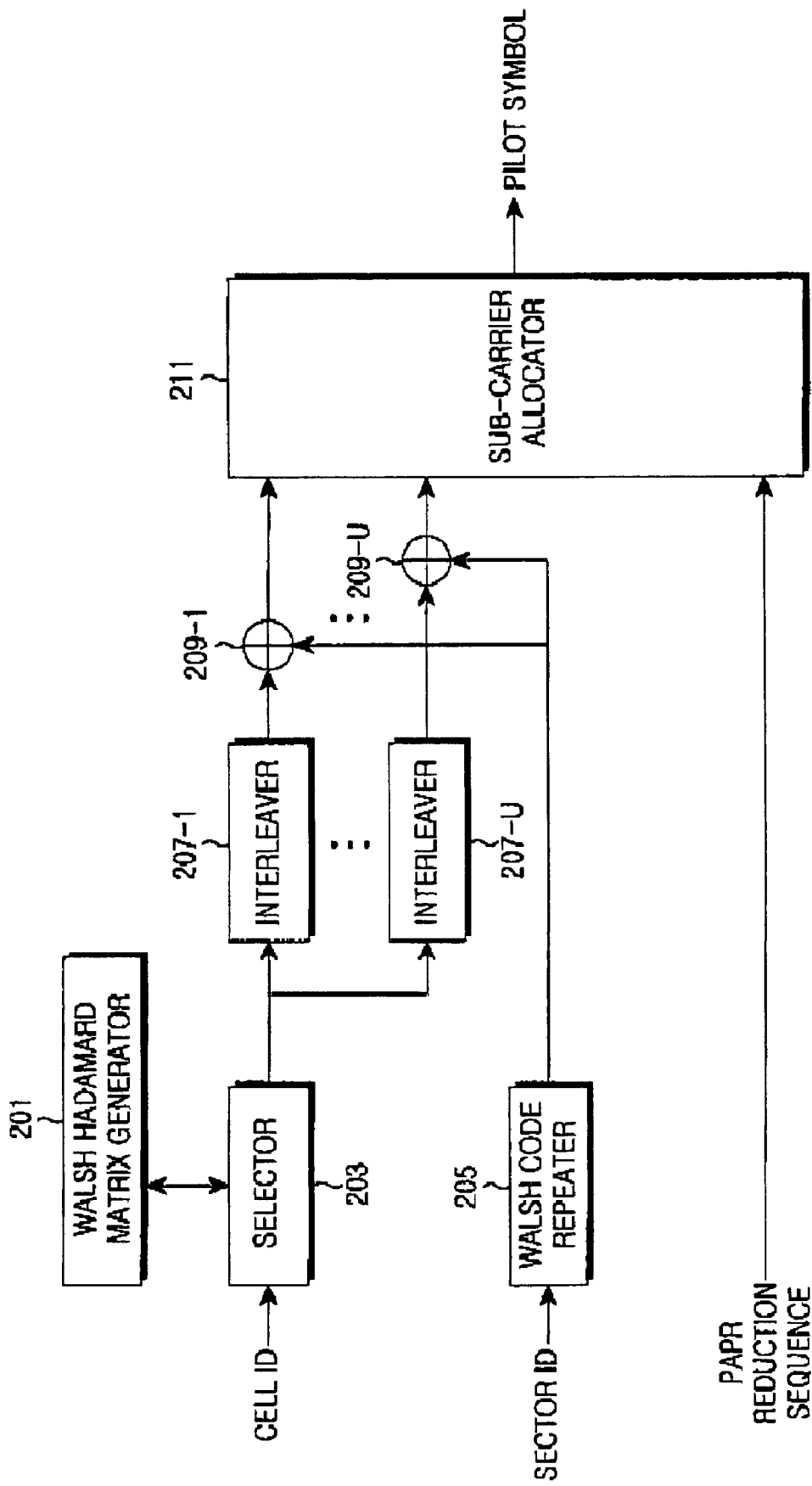
FIG. 2 is a block diagram illustrating an internal structure of a pilot generator of an OFDM communication system according to an embodiment of the present invention.

FIG. 2 is a block diagram illustrating an internal structure of a pilot generator of an OFDM communication system according to an embodiment of the present invention.

Referring to FIG. 2, the pilot generator includes a Walsh Hadamard matrix generator 201, a selector 203, a Walsh code repeater 205, interleavers 207-1, . . . , and 207-U, adders 209-1, . . . , and 209-U, and a sub-carrier allocator 211.

First, a cell identifier ('ID'), which is an ID for identifying a cell (i.e. a BS), is input to the selector 203, and the Walsh Hadamard matrix generator 201 generates a Walsh Hadamard matrix, each row of which includes Walsh codes. Upon receiving the cell ID, the selector 203 selects a row corresponding to the cell ID in the Walsh Hadamard matrix generated by the Walsh Hadamard matrix generator 201 and outputs the selected row to the interleavers 207-1, . . . , and 207-U. The selected row of the Walsh Hadamard matrix corresponding to the cell ID and that is output from the selector 203 may be used either once or multiple times. The repetition of the selected row of the Walsh Hadamard matrix corresponding to the cell ID is based on the length of the pilot symbol, and the number of times which the selected row of the Walsh Hadamard matrix corresponding to the cell ID is repeated corresponds to the length of the pilot symbol. In FIG. 2, it is assumed that the row of the Walsh Hadamard matrix corresponding to the cell ID is repeated U times.

The row of the Walsh Hadamard matrix corresponding to the cell ID and output from the selector 203 is input to the U number of interleavers 207-1, . . . , and 207-U. The interleavers 207-1, . . . , and 207-U receive the signal from the selector 203, interleave the signal according to an interleaving scheme set in advance, and output the interleaved signal to the adders 209-1, . . . , and 209-U, respectively. Here, the reason why the interleavers 207-1, . . . , and 207-U interleave the signal from the selector 203 according to the predetermined interleaving scheme is that each row of the Walsh Hadamard matrix includes a frequently repeated numerical sequence of a specific pattern, which yields a high PAPR. In other words, the PAPR of the pilot signal of the OFDM system is reduced by interleaving the elements of the row of the Walsh Hadamard matrix.

A sector ID, an ID for identifying a sector, is input to the Walsh code repeater 205. Upon receiving the sector ID, the Walsh code repeater 205 repeats a Walsh code corresponding to the sector ID a predetermined number of times and then outputs a signal including the repeated Walsh code to the adders 209-1, . . . , and 209-U. In the present embodiment, it is assumed that the pilot symbol of the OFDM communication system has a length of $N_p$, the Walsh Hadamard matrix has an $N_H^{th}$ order, and the Walsh code has a length of $N_w$. On this assumption, the Walsh code repeater 205 repeats $N_H/N_w$ times the Walsh code corresponding to the sector ID and outputs the signal including the repeated Walsh code to the adders 209-1, . . . , and 209-U. The length of the signal output from the Walsh code repeater 205 is equal to the length $N_H$ of the signal output from the interleavers 207-1, . . . , and 207-U. The adders 209-1, . . . , and 209-U perform an exclusive OR (XOR) operation on the signals output from the interleavers 207-1, . . . , and 207-U, and the signal output from the Walsh code repeater 205, and output the resultant signals to the sub-carrier allocator 211.

A PAPR reduction sequence is a sequence for reducing the PAPR of a pilot symbol in the OFDM communication system and has a length of $N_R$. It is assumed that the PAPR reduction sequence has been determined in advance and corresponds to the cell ID and the sector ID. The PAPR reduction sequence having a length of $N_R$ is input to the sub-carrier allocator 211. The sub-carrier allocator 211 allocates sub-carriers to the signals output from the adders 209-1, ..., and 209-U, and the PAPR sequence so that the signals from the adders and the PAPR sequence can be carried by the sub-carriers, and then outputs a pilot symbol. Here, the pilot symbol output from the sub-carrier allocator 211 has a length of $N_P$ ($N_P=U \cdot N_H+N_R$).

Figure 3:
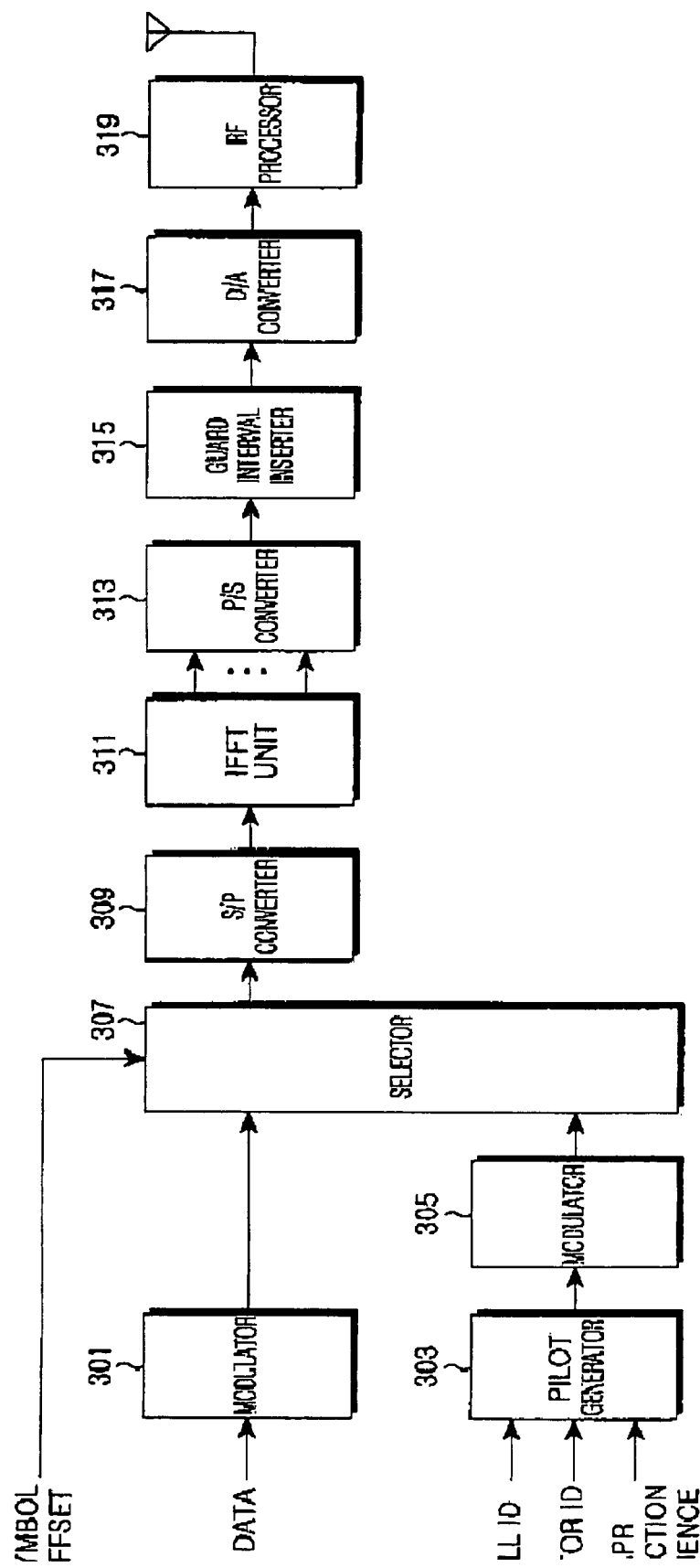
FIG. 3 is a block diagram illustrating an internal structure of a transmitter of an OFDM communication system according to an embodiment of the present invention.

FIG. 3 is a block diagram illustrating an internal structure of a transmitter of an OFDM communication system according to an embodiment of the present invention.

Referring to FIG. 3, the transmitter (which may be a BS) includes a first modulator 301, a pilot generator 303, a second modulator 305, a selector 307, a serial-to-parallel converter 309, an Inverse Fast Fourier Transform (IFFT) unit 311, a parallel-to-serial converter 313, a guard interval inserter 315, a digital-to-analog converter 317, and a Radio Frequency ('RF') processor 319.

When there is data to be transmitted (i.e., information data bits), the information data bits are input to the first modulator 301. The first modulator 301 generates a modulated symbol by modulating the input information data bits according to a predetermined modulation scheme and outputs the modulated symbol to the selector 307. Here, various schemes such as a QPSK (Quadrature Phase Shift Keying) scheme or a 16QAM (Quadrature Amplitude Modulation) scheme are available for the modulation scheme.

When it is necessary to transmit a pilot symbol, a cell ID and a sector ID of a cell sector to which the pilot symbol will be transmitted and a PAPR reduction sequence set in advance that correspond to the cell ID and the sector ID are input to the pilot generator 303. The pilot generator 303 generates a pilot symbol by using the input cell ID, sector ID, and PAPR reduction sequence and outputs the generated pilot symbol to the second modulator 305. Here, the pilot generator 303 has an internal structure as shown in FIG. 2. Upon receiving the signal output from the pilot generator 303, the second modulator 305 generates a modulated symbol by modulating the signal according to a predetermined modulation scheme and outputs the modulated symbol to the selector 307. Here, a BPSK (Binary Phase Shift Keying) scheme, etc., may be used as the modulation scheme.

In a data symbol transmission interval in which the transmitter must transmit a current data symbol, the selector 307 allows the signal from the first modulator 301 to be output to the serial-to-parallel converter 309. In contrast, in a pilot symbol transmission interval in which the transmitter must transmit a current pilot symbol, the selector 307 allows the signal from the second modulator 305 to be output to the serial-to-parallel converter 309. The serial-to-parallel converter 309 converts the serial modulation symbols output from the selector 307 into parallel symbols and outputs the parallel symbols to the IFFT unit 311. The IFFT unit 311 performs an N-point IFFT on the signal output from the serial-to-parallel converter 309 and then outputs the IFFT-processed signal to the parallel-to-serial converter 313.

The parallel-to-serial converter 313 converts the signals output from the IFFT unit 311 into a serial signal and outputs the serial signal to the guard interval inserter 315. The guard interval inserter 315 inserts guard intervals into the signal output from the parallel-to-serial converter 313 and then outputs a resultant signal to the digital-analog converter 317. The guard intervals are inserted in order to eliminate interference between an OFDM symbol transmitted during a previous OFDM symbol time and an OFDM symbol transmitted during a current OFDM symbol time. In inserting the guard intervals, a cyclic prefix method or a cyclic postfix method may be used. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol.

The digital-analog converter 317 converts the signal output from the guard interval inserter 315 into an analog signal and outputs the analog signal to the RF processor 319. Here, the RF processor 319 includes a filter and a front end unit, etc. The RF processor 319 processes the signal output from the digital-analog converter 317 and transmits the signal over the air through an antenna.

Figure 4:
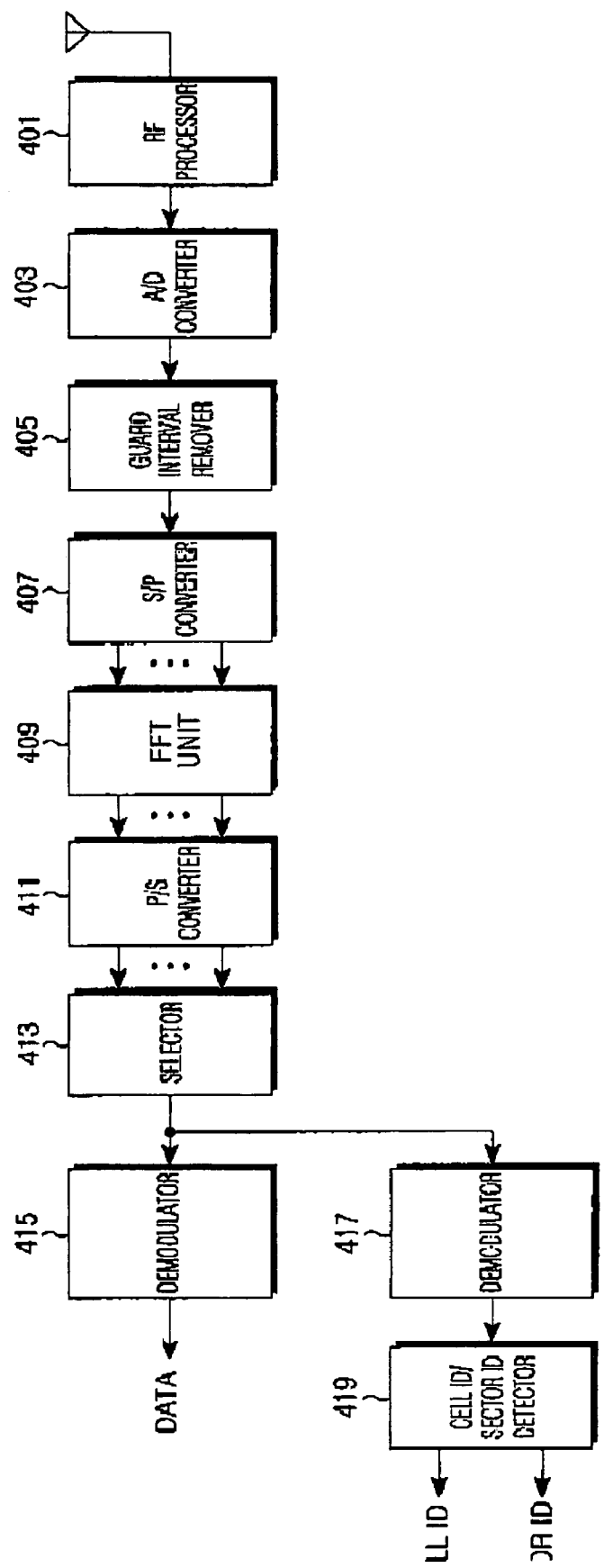
FIG. 4 is a block diagram illustrating an internal structure of a receiver of an OFDM communication system according to an embodiment of the present invention.

FIG. 4 is a block diagram illustrating an internal structure of a receiver of an OFDM communication system according to an embodiment of the present invention.

Referring to FIG. 4, the receiver (which may be a mobile subscriber station (MSS)) includes an RF processor 401, an analog-to-digital converter 403, a guard interval remover 405, a serial-to-parallel converter 407, a Fast Fourier Transform (FFT) unit 409, a parallel-to-serial converter 411, a selector 413, a first demodulator 415, a second demodulator 417, and a cell ID/sector ID detector 419.

A signal transmitted from the transmitter of the OFDM communication system together with noise added to the signal while the signal passes through a multipath channel is received via a receive antenna. The signal received through the receive antenna is input to the RF processor 401. The RF processor 401 down-converts the signal received through the reception signal into a signal having an intermediate frequency band and outputs the down-converted signal to the analog-to-digital converter 403. The analog-to-digital converter 403 converts the analog signal from the RF processor 401 into a digital signal and outputs the digital signal to the guard interval remover 405.

Upon receiving the digital signal from the analog-to-digital converter 403, the guard interval remover 405 removes the guard interval from the digital signal and outputs the signal to the serial-to-parallel converter 407. The serial-to-parallel converter 407 converts the serial signal into parallel signals and sends the parallel signals to the FFT unit 409. The FFT unit 409 performs an N-point FFT on the parallel signals output from the serial-to-parallel converter 407 and outputs the FFT-processed signals to the parallel-to-serial converter 411.

The parallel-to-serial converter 411 converts the parallel signals from the FFT unit 409 into a serial signal and sends the serial signal to the selector 413. In a data symbol reception interval in which the receiver must receive a current data symbol, the selector 413 allows the signal from the parallel-to-serial converter 411 to be sent to the first demodulator 415. In contrast, in a pilot symbol reception interval in which the receiver must receive a current pilot symbol, the selector 413 allows the signal from the parallel-to-serial converter 411 to be sent to the second demodulator 417. The first demodulator 415 demodulates the signal output from the selector 413 according to a demodulation scheme corresponding to the modulation scheme employed in the transmitter and outputs data (i.e. information data bits) restored through the demodulation.

Meanwhile, the second demodulator 417 demodulates the signal output from the selector 413 according to a demodulation scheme corresponding to the modulation scheme employed in the transmitter and outputs a pilot signal restored through the demodulation to the cell ID/sector ID detector 419. The cell ID/sector ID detector 419 receives the pilot signal from the demodulator 417 and detects a cell ID and a sector ID corresponding to the pilot signal. Here, the pilot signal is a signal generated that corresponds to the cell ID and the sector ID and are defined in advance by a protocol between the transmitter and the receiver.

Figure 5:
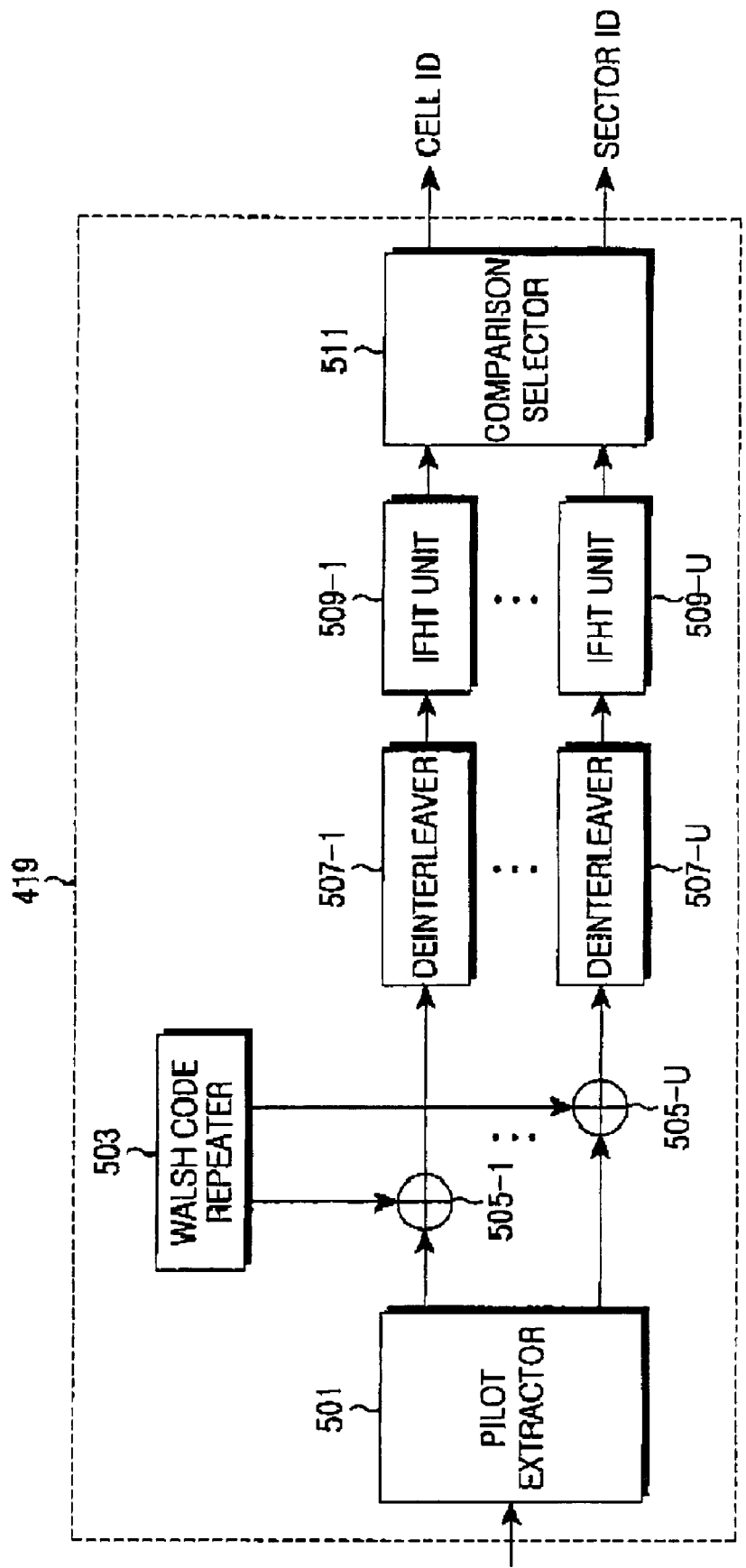
FIG. 5 is a block diagram illustrating an internal structure of the cell ID/sector ID detector of FIG. 4.

FIG. 5 is a block diagram illustrating an internal structure of the cell ID/sector ID detector 419 of FIG. 4.

Referring to FIG. 5, the cell ID/sector ID detector 419 includes a pilot extractor 501, a Walsh code repeater 503, U number of adders 505-1, . . . , and 505-U, U number of deinterleavers 507-1, . . . , and 507-U, U number of Inverse Fast Hadamard Transform (IFHT) units 509-1, . . . , and 509-U, and a comparison selector 511.

The signal output from the demodulator 417 of FIG. 4 is input to the pilot extractor 501. The pilot extractor 501 extracts a UNH number of symbols by eliminating the PAPR sequence from the signal output from the demodulator 417, divides the extracted symbols into a U number of symbols each having a length of NH, and outputs the divided symbols to the U number of adders 505-1, . . . , and 505-U. Further, the Walsh code repeater 503 repeatedly outputs Walsh codes corresponding to all of the sector IDs which can be identified by the receiver, sequentially selects one Walsh code from among the Walsh codes corresponding to all of the sector IDs, and repeatedly outputs the selected Walsh code to the U number of adders 505-1, . . . , and 505-U.

The U number of adders 505-1, . . . , and 505-U perform an exclusive OR (XOR) operation on the signals output from the pilot extractor 501 and the signals output from the Walsh code repeater 503 and send the XOR-operated signals to the U number of deinterleavers 507-1, . . . , and 507-U, respectively. The U number of deinterleavers 507-1, . . . , and 507-U deinterleave the signals output from the U adders 505-1, . . . , and 505-U according to the same interleaving scheme as that employed by the interleavers in the pilot generator of the transmitter (i.e. the U interleavers 207-1, . . . , and 207-U of FIG. 2) and output the deinterleaved signals to the U IFHT units 509-1, . . . , and 509-U, respectively. The U IFHT units 509-1, . . . , and 509-U receive the signals from the U deinterleavers 507-1, . . . , and 507-U, perform correlation (that is, perform an IFHT) for each row of the Walsh Hadamard matrix corresponding to all of the cell IDs which can be identified by the receiver and the Walsh codes corresponding to all of the sector IDs, and output the correlated signals to the comparison selector 511.

The comparison selector 511 receives the signals from the U IFHT units 509-1, . . . , and 509-U, selects a maximum correlation value from among the correlation values for each row of the Walsh Hadamard matrix corresponding to all of the cell IDs and the Walsh codes corresponding to all of the sector IDs, and outputs a cell ID and a sector ID corresponding to the selected maximum correlation value.

Figure 6:
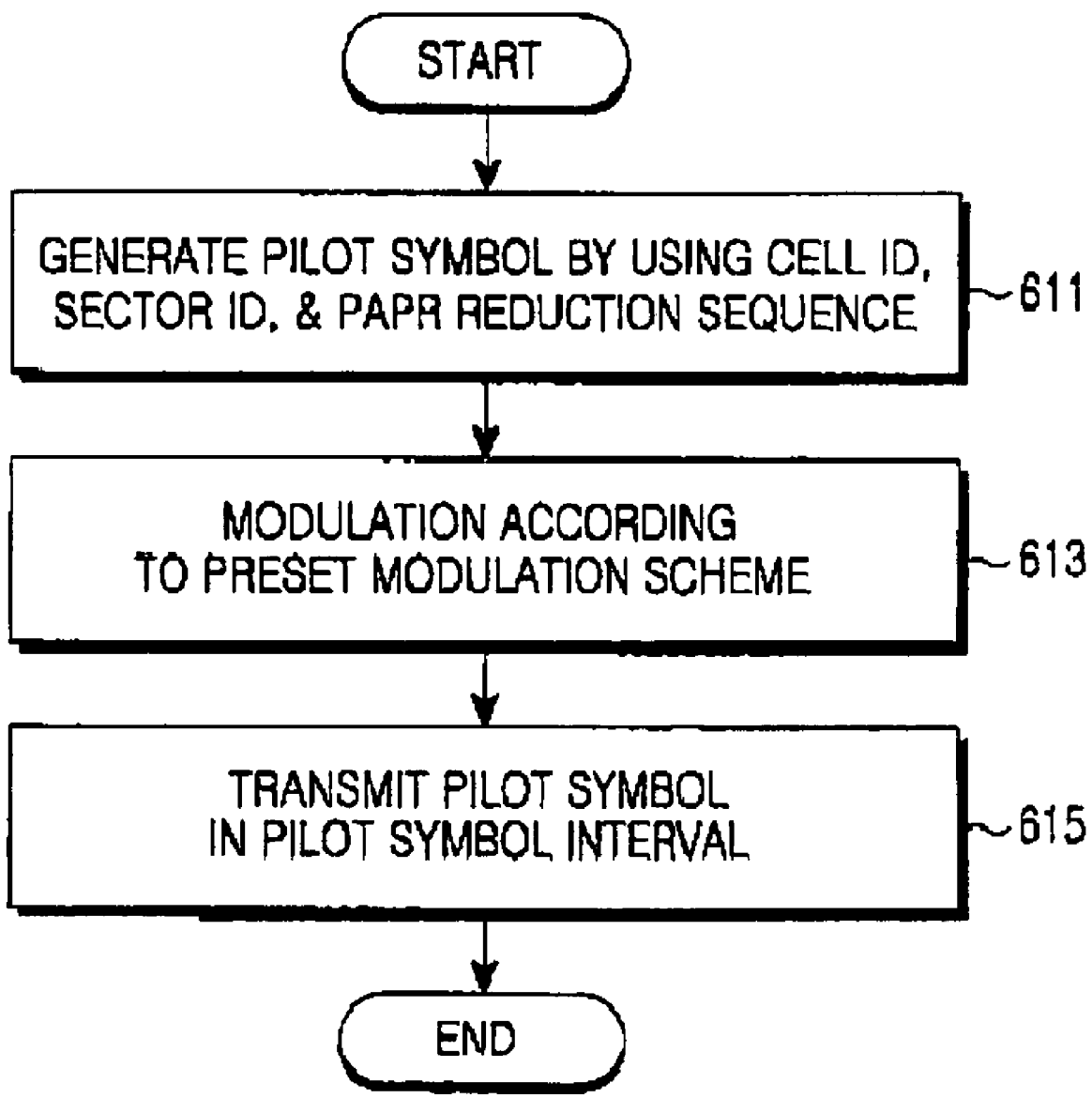
FIG. 6 is a flowchart of an operation process of a transmitter in an OFDM communication system according to an embodiment of the present invention.

FIG. 6 is a flowchart of an operation process of a transmitter in an OFDM communication system according to an embodiment of the present invention.

In the following description with reference to FIG. 6, only the transmission of the pilot signal by the transmitter will be discussed, and the transmission of the data signal will not be dealt with in detail since the latter has no direct relation to the present invention.

In step 611, the transmitter generates a pilot symbol by using a cell ID of the transmitter, a sector ID, and a PAPR reduction sequence. In step 613, the transmitter generates a modulated symbol by modulating the pilot symbol according to a preset modulation scheme such as a BPSK (Binary Phase Shift Keying) scheme. In step 615, the transmitter transmits the modulated pilot symbol in a pilot symbol interval and ends the process. Although not shown in FIG. 6, a frequency offset may be taken into consideration while transmitting the pilot symbol. That is, the location at which the pilot symbol begins may be set differently for each cell and each sector. Also, in a system using multiple transmit antennas, the pilot symbol may be transmitted by the transmit antennas which are set to have different frequency offsets.

Figure 7:
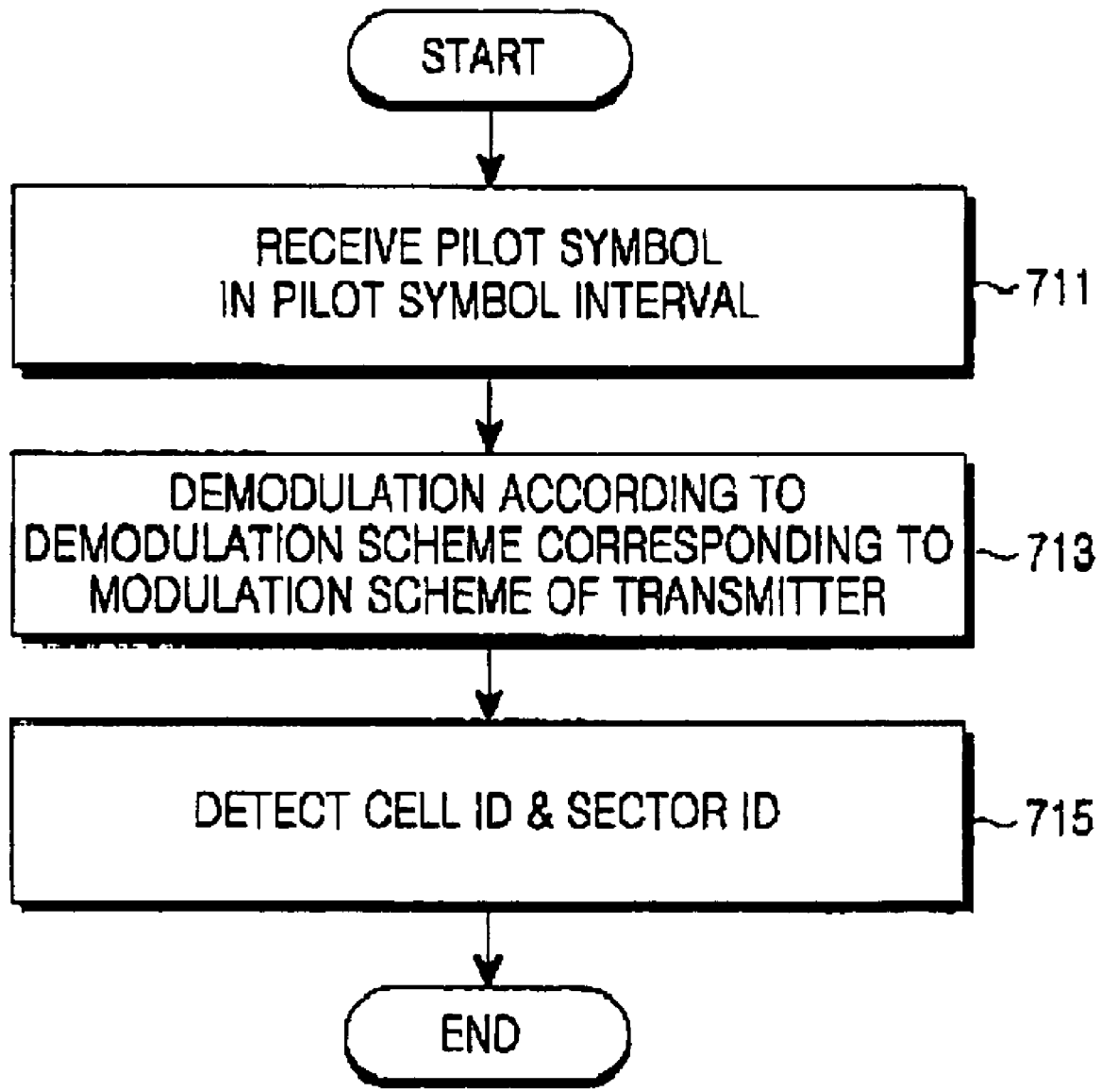
FIG. 7 is a flowchart of an operation process of a receiver in an OFDM communication system according to an embodiment of the present invention.

FIG. 7 is a flowchart of an operation process of a receiver in an OFDM communication system according to an embodiment of the present invention.

In the following description with reference to FIG. 7, only the reception of the pilot signal by the receiver will be discussed, and the reception of the data signal will not be dealt with in detail since the latter has no direct relation to the present invention.

In step 711, the receiver receives the pilot symbol in a pilot symbol interval. Although not shown in FIG. 7, when the transmitter has transmitted the pilot symbol while taking into consideration the frequency offset as described above in relation to FIG. 6, the receiver determines the signal reception location corresponding to the frequency offset before receiving the pilot symbol. In step 713, the receiver demodulates the pilot symbol according to a demodulation scheme corresponding to the modulation scheme employed by the transmitter. In step 715, the receiver performs correlation (that is, performs an IFHT) on the demodulated pilot symbol for each row of the Walsh Hadamard matrix corresponding to all of the cell IDs which can be identified by the receiver and the Walsh codes corresponding to all of the sector IDs, detects a cell ID and a sector ID having a maximum correlation value as the cell ID and the sector ID of the transmitter, and ends the process.

Figure 8:
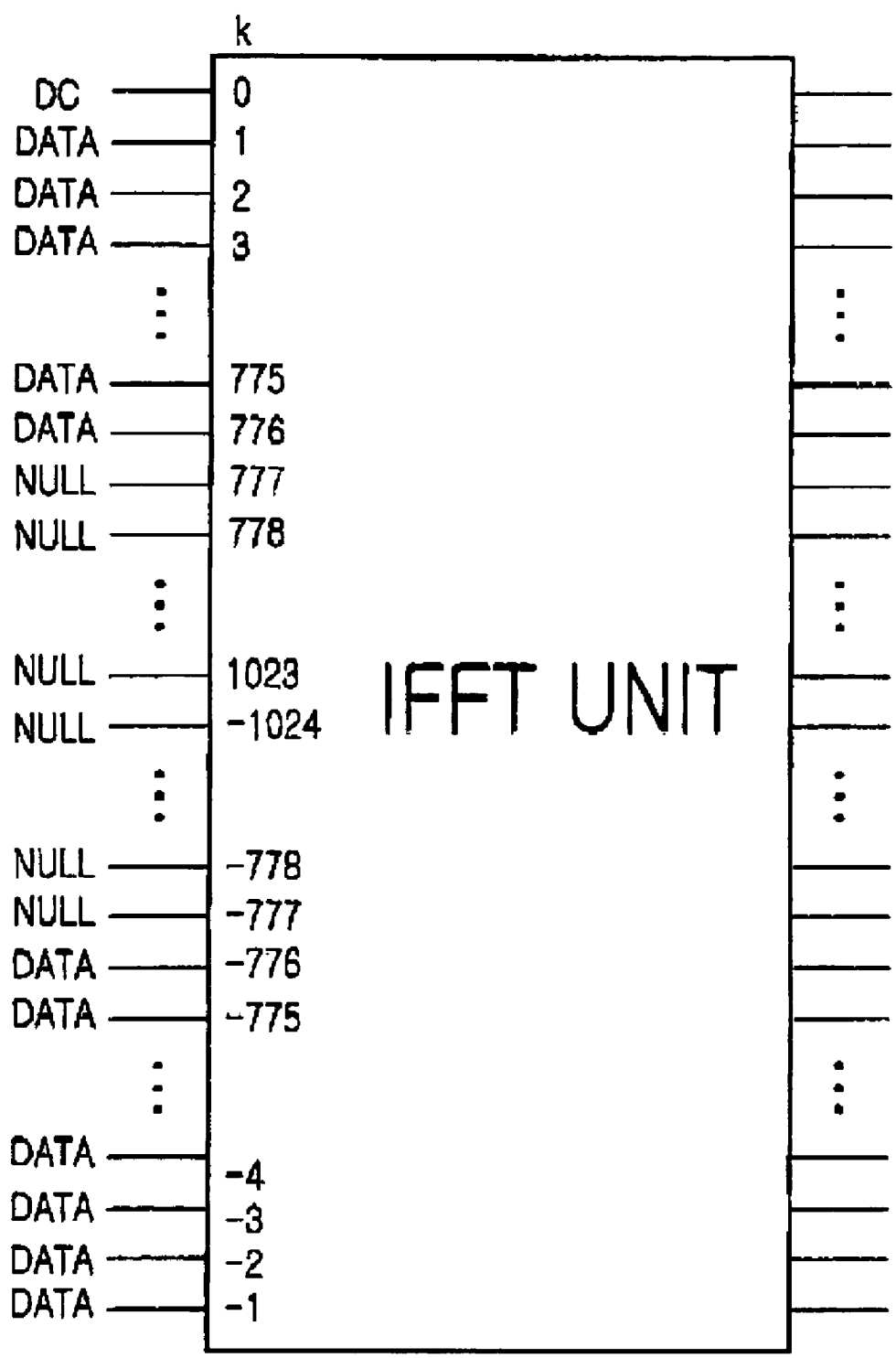
FIG. 8 is a schematic view for illustrating a mapping relation between sub-carriers and pilot symbols when an IFFT is perform in an OFDM communication system according to an embodiment of the present invention.

FIG. 8 is a schematic view for illustrating a mapping relation between sub-carriers and pilot symbols when an IFFT is perform in an OFDM communication system according to an embodiment of the present invention.

FIG. 8 is based on an assumption that the number of sub-carriers in the OFDM communication system is 2048 and the exact number of actually used sub-carriers from among the 2048 sub-carriers is 1552, in other words, 1552 sub-carriers including 776 sub-carriers from a sub-carrier of No. −776 to a sub-carrier of No. −1 and 776 sub-carriers from a sub-carrier of No. 1 to a sub-carrier of No. 776 are actually used from among the 2048 sub-carriers in the system. In FIG. 8, the number of each input port of the IFFT unit (that is, k) denotes an index of each sub-carrier.

The sub-carrier of No. 0 represents a reference point for the pilot symbols in the time domain, that is, a DC component in the time domain after the IFFT is performed. Therefore, a null data is inserted into the sub-carrier of No. 0. Further, the null data is also inserted into all other sub-carriers other than the 1552 actually used sub-carriers, that is, into the sub-carriers from the sub-carrier of No. −777 to the sub-carrier of No. −1024 and the sub-carriers from the sub-carrier of No. 777 to the sub-carrier of No. 1023. Here, the reason why the null data is inserted into the sub-carriers from the sub-carrier of No. −777 to the sub-carrier of No. −1024 and the sub-carriers from the sub-carrier of No. 777 to the sub-carrier of No. 1023 is that the sub-carriers from the sub-carrier of No. −777 to the sub-carrier of No. −1024 and the sub-carriers from the sub-carrier of No. 777 to the sub-carrier of No. 1023 correspond to guard bands for preventing interference with another system using a neighboring frequency band.

When a pilot symbol of the frequency domain are input to the IFFT unit, the IFFT unit performs an IFFT by mapping the input pilot symbol of the frequency domain to corresponding sub-carriers, thereby outputting a pilot symbol of the time domain.

Figure 9:
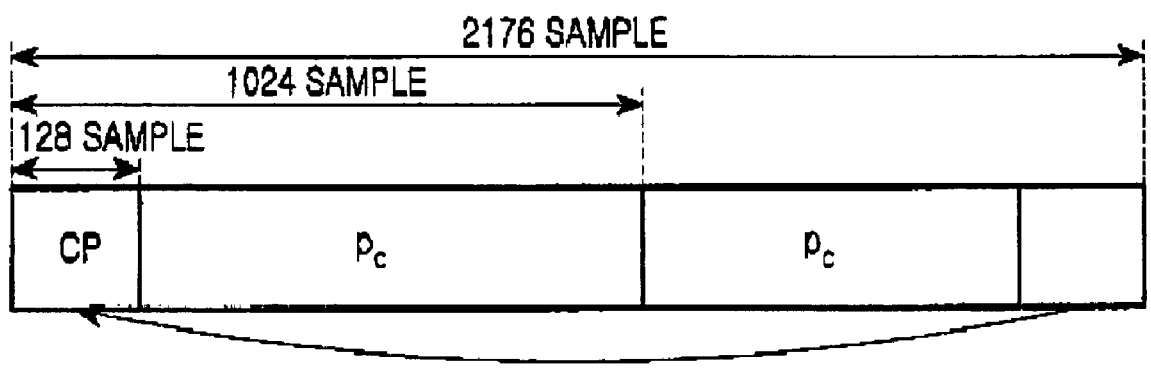
FIG. 9 illustrates a frame structure of a pilot symbol in the time domain of an OFDM communication system according to an embodiment of the present invention.

FIG. 9 illustrates a frame structure of a pilot symbol in the time domain of an OFDM communication system according to an embodiment of the present invention. Referring to FIG. 9, the pilot symbol includes twice repeated symbols each having the same length of $p_c$ (i.e., the same length of $N_{FFT}/2$) and a guard interval signal added to the front end of the twice repeated symbols. The guard interval signal is inserted according to the Cyclic Prefix (CP) scheme as described above taking into consideration the characteristics of the OFDM communication system. Here, $N_{FFT}$ denotes the number of points of the IFFT/FFT operation used in the OFDM communication system.

Figure 10:
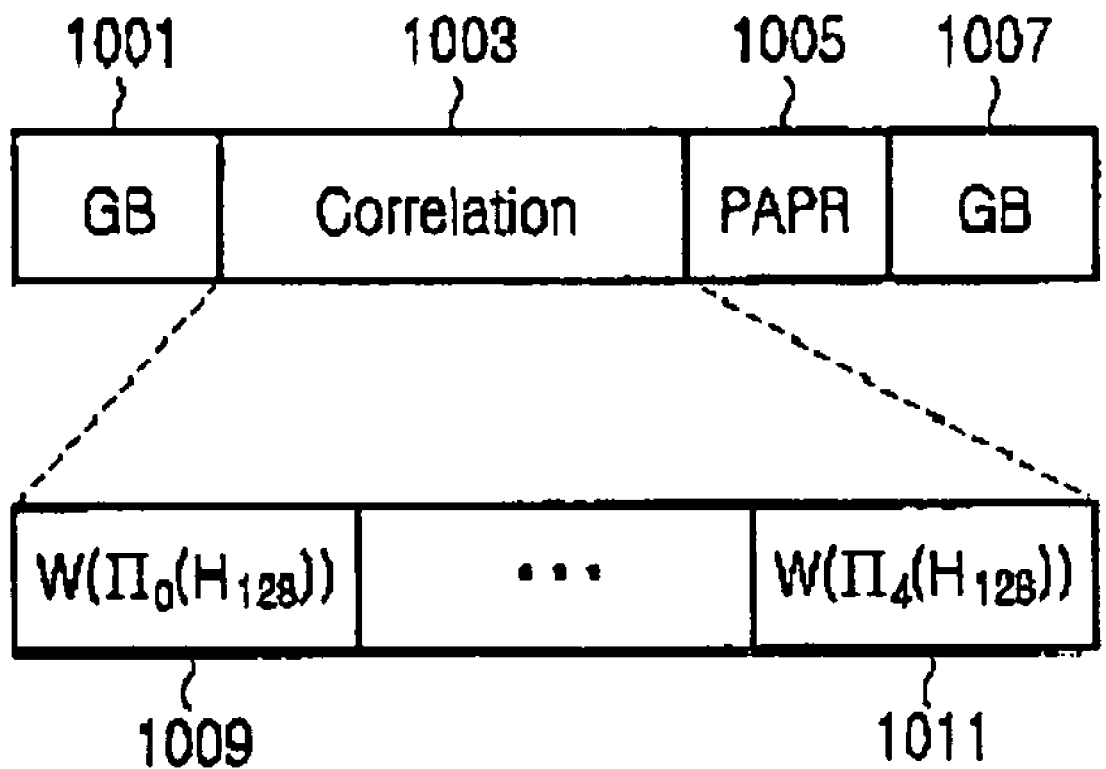
FIG. 10 illustrates a structure of a pilot symbol in the frequency domain of an OFDM communication system according to an embodiment of the present invention.

FIG. 10 illustrates a structure of a pilot symbol in the frequency domain of an OFDM communication system according to an embodiment of the present invention.

Referring to FIG. 10, the sub-carrier interval, except for the guard bands (i.e. guard intervals) 1001 and 1007, includes a correlation interval 1003 and a PAPR interval 1005. The correlation interval 1003 is comprised of sequences having large correlation values, and the PAPR interval 1005 is comprised of PAPR reduction sequences corresponding to the sequences in the correlation interval 1003. The calculation of the correlation values as described above with reference to FIG. 5 is performed only for the correlation interval 1003. In FIG. 10, $H_{128}$ denotes a $128^{th}$ order Walsh Hadamard matrix, and $\Pi_i(\bullet)$ denotes an interleaving scheme having a length of 128 by which columns of the $128^{th}$ order Walsh Hadamard matrix are interleaved. Further, $W(\bullet)$ denotes a Walsh code masking. The pilot symbol is generated by frequency domain sequences as expressed by Equation 1 below.

In Equation 2, $H_{128}(i,j)$ denotes an $(i,j)^{th}$ element of a $128^{th}$ order Walsh Hadamard matrix, wherein each of i and j has a value from among 0, 1, 2, . . . , and 127. Since all of the elements of the first row of the $128^{th}$ order Walsh Hadamard matrix are 1, the matrix is used from the second row. Further, in Equation 2, $$\Pi_{\lfloor \frac{m}{128} \rfloor}(l) \ (l = 0, 1, ..., 127)$$

represents an $$\lfloor \frac{m}{128} \rfloor \text{th}$$

interleaving scheme, wherein $$\lfloor \frac{m}{128} \rfloor$$

represents a maximum integer not greater than m/128. Here, the $$P_{ID_{cell},S}[k] = \begin{cases} \sqrt{2}\left(1 - 2q_{ID_{cell},S}[m]\right), & k = 2m - \frac{N_{used}}{2}, m = 0, 1, \ldots, \frac{N_{used}}{4} - 1 \\ \sqrt{2}\left(1 - 2q_{ID_{cell},S}[m-1]\right), & k = 2m - \frac{N_{used}}{2}, m = \frac{N_{used}}{4} + 1, \frac{N_{used}}{4} + 2, \ldots, \frac{N_{used}}{2} \\ 0, & \text{otherwise} \end{cases} \quad (1)$$

$$ID_{cell} \in \{0, 1, \cdots, 96\}, s \in \{0, 1, \cdots, 7\}, k \in \{-N_{FFT}/2, -N_{FFT}/2 + 1, \cdots, N_{FFT}2 - 1\}$$

In Equation 1, $ID_{cell}$ denotes a cell ID (i.e. ID of a BS), s denotes a sector ID, k denotes a sub-carrier index, $N_{used}$ denotes a number of sub-carriers in which null data is not inserted, and m denotes a running index of sequence $q_{ID_{cell},S}$. In the present embodiment, it is assumed that the pilot symbols of all of the BSs and sectors use the same frequency offset. According to the frequency domain sequence $P_{ID_{cell},S}[k]$ as shown in Equation 1, the values in the form as shown in Equation 1 are assigned only to sub-carriers having an even number of indices, and a value of 0 is unconditionally assigned to all sub-carriers having an odd number of indices. Therefore, when the IFFT operation has been performed, the same sequence is repeated twice in the time domain.

Further, in Equation 1, $\sqrt{2}$ is a weight value in order to enable the pilot symbol to have the same transmit power level as the transmit power level of the data symbol transmitted in an interval (i.e. data symbol interval) other than the pilot symbol interval. $q_{ID_{cell},S}[m]$ is defined by Equation 2 below.

$$\lfloor \frac{m}{128} \rfloor \text{th}$$

interleaving scheme implies an interleaving scheme employed by the $$\lfloor \frac{m}{128} \rfloor \text{th}$$

interleaver from among the U interleavers in the pilot generator of FIG. 2.

The above description with reference to FIG. 10 is describes the structure of the pilot symbol in the frequency $$q_{ID_{cell},S}[m] = \begin{cases} W^S_{m \bmod 8} \oplus H_{128}\left(ID_{cell} + 1, \Pi_{\lfloor \frac{m}{128} \rfloor}(m \bmod 128)\right), & m = 0, 1, \cdots, (128 \times 5 - 1) \\ \text{Table 2} & m = (128 \times 5), \cdots, N_{used}/2 - 1 \end{cases} \quad (2)$$

domain in an OFDM communication system according to an embodiment of the present invention. The internal structure of the U interleavers in the pilot generator of FIG. 2 will be described with reference to FIG. 11.

Figure 11:
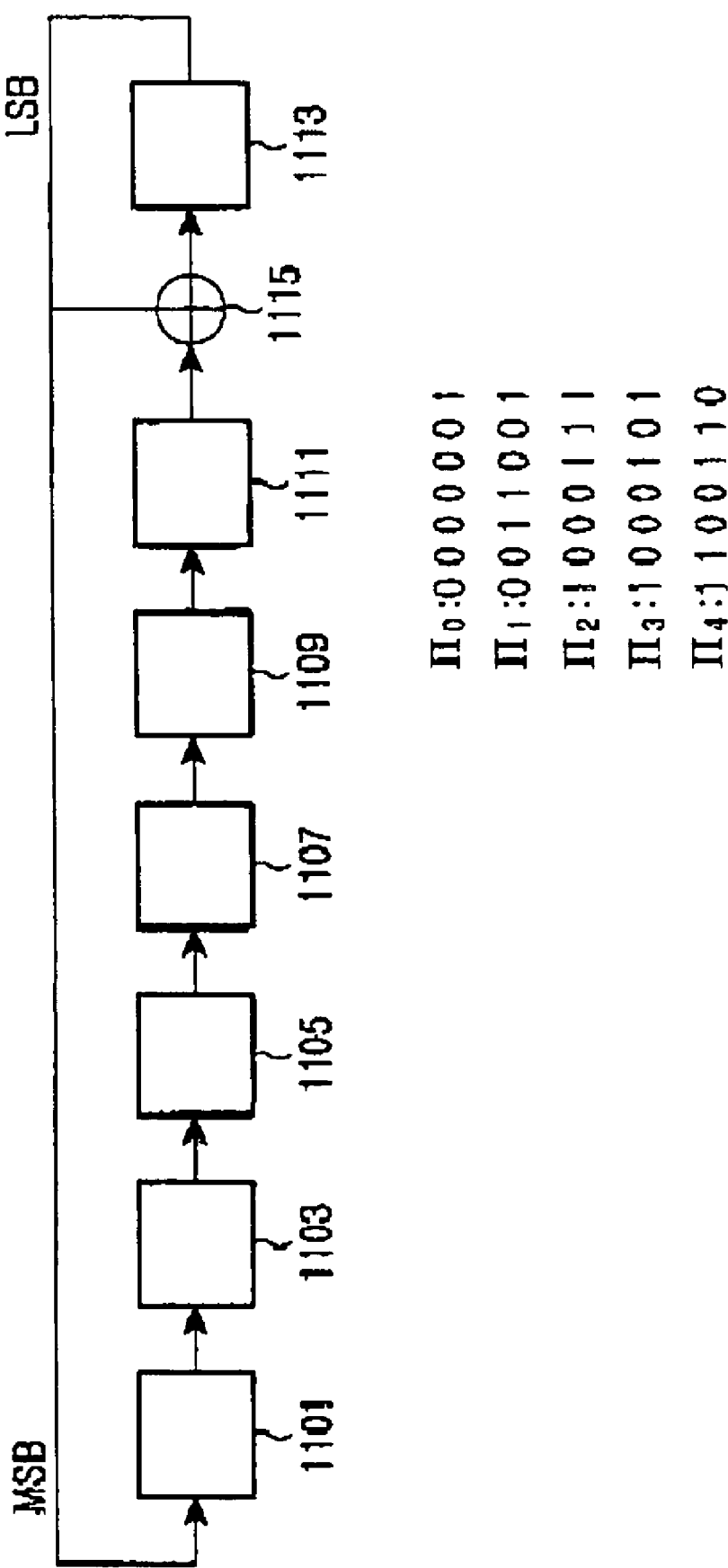
FIG. 11 illustrates an internal structure of an interleaver in the pilot generator of FIG. 2.

FIG. 11 illustrates an internal structure of an interleaver in the pilot generator of FIG. 2.

Referring to FIG. 11, the interleaver generates the interleaving scheme $$\prod_{\lfloor \frac{m}{128} \rfloor}(l)$$

of the $$\lfloor \frac{m}{128} \rfloor \text{th}$$

interleaver as described above with reference to FIG. 10 by converting the values of seven memories 1101, 1103, 1105, 1107, 1109, 1111, and 1113 of a Pseudo Noise (PN) sequence generator, which have been generated by a generator polynomial ($X^7+X+1$), into decimal numbers. The PN sequence generator has initial values as shown in FIG. 11 for each of the interleavers, and integers from 1 to 127 are written only once in each of the seven memories 1101, 1103, 1105, 1107, 1109, 1111, and 1113. In order to generate an interleaving scheme corresponding to an interleaver having a length of 128, $$\prod_{\lfloor \frac{m}{128} \rfloor}(127)$$

is set to 0

$$\left(\prod_{\lfloor \frac{m}{128} \rfloor}(127) = 0\right).$$

The interleaving scheme is as shown in Table 1 below.

TABLE 1

| | |
|---|---|
| $\Pi_0(l)$ | 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 0 |
| $\Pi_1(l)$ | 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 0 |
| $\Pi_2(l)$ | 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 0 |
| $\Pi_3(l)$ | 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 0 |
| $\Pi_4(l)$ | 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 0 |

According to the interleaving scheme $$\prod_{\lfloor \frac{m}{128} \rfloor}(l)$$

as shown in Table 1, the interleaving is achieved by arranging the 128 elements of a selected row of the 128$^{th}$ Walsh Hadamard matrix in the order as shown in Table 1. Here, the interleaving scheme $$\prod_{\lfloor \frac{m}{128} \rfloor}(l)$$

is a scheme of permuting the 128 elements of the frequency domain sequence $P_{ID_{cell,S}}[k]$ having a length of 128 in the order as shown in Table 1. Numbers in Table 1 denote indices of sub-carriers to which the 128 elements of the frequency domain sequence $P_{ID_{cell,S}}[k]$ are one-to-one mapped.

The value of $q_{ID_{cell,S}}[m]$, $m=(128\times 5), \ldots, N_{used}/2-1$ is determined as the PAPR reduction sequence minimizing the PAPR of the pilot symbol. Table 2 contains PAPR reduction sequences corresponding to the cell IDs and sector IDs and PAPRs of pilot symbols corresponding to the cell IDs and sector IDs.

TABLE 2

| Idcell | S | PAPR reduction sequence | PAPR(dB) |
|---|---|---|---|
| 0 | 0 | 1100011100010100100000110110010011110110101111001000101110111001110110111111100100111011100110100100111111100101111101111100100110111100 | 5.69 |
| 0 | 1 | 0110110101101010100011011000001010001110100011111001000100100010001010101000101101111110000100110010010010111100111101010111100110110 | 5.44 |
| 0 | 2 | 1111111100101010010000001111011000001111110010100011000011111100011010111111110001001010011011011010101111111100000100101101111011010 | 5.58 |
| 0 | 3 | 0100100001010100110010101011100011000011011010001101001100001100110010101000011000000100100100101000101010011001110001101101110111011101 | 5.43 |
| 0 | 4 | 1000011011000001100100101001010100111110001010111111011101000111011101101010001000000011100001111001010001011110101010111010000000110100010 | 5.46 |
| 0 | 5 | 0111110001111100011001001110101010000100011100010111010001100111111101101010100011110010101001000111100110110110010101110011111 | 5.63 |
| 0 | 6 | 1111100010110001010001011001001111010010010110000110010000010100101000110100101100110110100100011011111010010110111101010100000111110 | 5.51 |
| 0 | 7 | 0100001011001111010001100001001110000100101100111000001100011101111010001110001010000010011000000101010010111010101101111111100000010010000101101 | 5.43 |
| 1 | 0 | 1001101111101010110110101100110101010010101101011001000011001101100001100101011011110011100111001110001011001011010101011000001111100 | 5.81 |
| 1 | 1 | 1000011100100110101101101110111000011101001100101111010000101011001010001010010001110110101010001100110101011000110010111110110011010 | 5.43 |
| 1 | 2 | 0001010000010010110111101000011110110110101010000011101000110101001110110000100001100100001001101001110110001011011111010100000101000000 | 5.61 |
| 1 | 3 | 1101100111011010101100011011000000111001111100111110110101000111010001101011000011110001011010101010110111010100000111000010110011000 | 5.43 |
| 1 | 4 | 1011101100101101011111000011010100100000101110101100100100110010001111110101100111011010100010010011101011111111001011111111 | 5.46 |
| 1 | 5 | 0111001110110010010011001111000010100001101100001001000011101101011000101001010100010000001101110010001110101011001001010100 | 5.60 |
| 1 | 6 | 0000011010000010000111110101010111010001111010110001110110010101010000001000110000011100010110111111100111010000100010010101100000001 | 5.47 |
| 1 | 7 | 1001100110010010101010001000001111100110100001010010001000010100111110110111000100101111010000011111111100111101011100101000110000110 | 5.64 |

The method of transmitting/receiving pilot signals as described above may also be employed in an OFDM communication system using a Multiple Input Multiple Output (MIMO) scheme and requiring no sector differentiation. In such an OFDM communication system, since it is unnecessary to differentiate or identify sectors, a predetermined Walsh code (e.g. all 1 Walsh codes, all of which have a value of 1) may be used for all of the sectors, instead of the different Walsh codes corresponding to the different sector identifiers employed in the pilot transmission/reception method as described above.

Further, when a transmitter (e.g. a BS) of the OFDM communication system uses an $N_t$ number of transmit antennas, the pilot symbols transmitted through each of the $N_t$ transmit antennas can be expressed by Equation 3 below.

$$P_{ID_{cell},n}[k] = \begin{cases} 1 - 2q_{ID_{cell}}[m], & k = N_t m - \frac{N_{used}}{2} + n, m = 0, 1, \ldots, \frac{N_{used}}{N_t} - 1 \\ 0, & \text{otherwise} \end{cases} \quad (3)$$

$$ID_{cell} \in \{0, 1, \cdots, 126\}, n = 0, 1, \cdots, N_t, k \in \left\{ -\frac{N_{FFT}}{2}, -\frac{N_{FFT}}{2} + 1, \cdots, \frac{N_{FFT}}{2} - 1 \right\}$$

In Equation 3, n denotes a transmit antenna ID and k denotes a sub-carrier index. Further, $q_{ID_{cell}}[m]$ in Equation 3 can be expressed as Equation 4 below.

$$q_{ID_{cell}}[m] = \begin{cases} R\left(8 * \left\lfloor \frac{m}{9} \right\rfloor + m \bmod 9\right), & \text{where } m \bmod 9 = 0, 1, \cdots, 7 \\ T\left(\left\lfloor \frac{m}{9} \right\rfloor\right), & \text{where } m \bmod 9 = 8 \end{cases} \quad m = 0, 1, \cdots, \frac{N_{used}}{N_t} - 1 \quad (4)$$

In Equation 4, each of the sequences R(r) and T(k) is defined according to the number $N_t$ of transmit antennas and the number of points of the IFFT/FFT operation used in the OFDM communication system, so that the $q_{ID_{cell}}[m]$ is also defined according to the number $N_t$ of transmit antennas and the number of points of the IFFT/FFT operation used in the OFDM communication system.

The above-mentioned R(r), T(k), and $q_{ID_{cell}}[m]$ according to the number $N_t$ of transmit antennas and the number $N_{FFT}$ of points of the IFFT/FFT operation used in the OFDM communication system will be described.

When the number $N_t$ of transmit antennas is two and the number of the IFFT/FFT operation points used in the OFDM communication system is 2048 (i.e. $N_t=2$, $N_{FFT}=2048$), R(r) can be expressed by Equation 5 below and T(k) and $q_{ID_{cell}}[m]$ can be expressed by the hexadecimal numbers as shown in Table 3 and Tables 4a through 4f.

$$R(r) = H_{128}\left(ID_{cell}+1, \prod_{\lfloor \frac{r}{128} \rfloor}(r \bmod 128)\right),$$ (5)

$$r = 8*\left\lfloor \frac{m}{9} \right\rfloor + m \bmod 9 = 0, 1, \cdots, 767$$

TABLE 3

| ID cell | sequence | papr |
|---|---|---|
| 0 | E5F121DCFF4A0E63825399D3 | 5.92384 |
| 1 | D10BA3F1A15DDF9C4D819B45 | 6.28771 |
| 2 | 13310AB0491064CE7516898C | 5.88237 |
| 3 | E53C10EB0B1E830D7C2302A2 | 5.72241 |
| 4 | 37DBDBACCEDC976D1DE87D53 | 6.54265 |
| 5 | E43B8C8299E5B2B49798FA28 | 6.23106 |
| 6 | 52A78E348A46E8E84CF29D7B | 6.96087 |
| 7 | CA6B366D37E54A7EDF32A688 | 6.23321 |
| 8 | 3852A3F8B0E1E7FC41301F17 | 6.35304 |
| 9 | 271E4591888CBCD44B32B809 | 5.88167 |
| 10 | 1CB9181F0A47346785BC9464 | 6.5208 |
| 11 | 786E7023033922819D70233B | 6.16551 |
| 12 | D7E0A495CFE8CEC3D2AF4B5D | 5.99014 |
| 13 | 360ECD45D330B876A8F13462 | 6.43524 |
| 14 | C63BDDD2D536FF2416B7A424 | 6.01736 |
| 15 | 10A8B5DAB83CE78B3FCFC31D | 6.19619 |
| 16 | 6152A33C894DC0B62EEA0DDA | 6.13798 |
| 17 | 757A237D70ABD7AB1FFB04F0 | 5.95019 |
| 18 | BC0D0BEA01E586B664401CFC | 6.2348 |
| 19 | 8A5CD82D82B19593F8266E7E | 5.67582 |
| 20 | F44201B0903E55006BDFD5B0 | 6.78315 |
| 21 | 5F252E0EC94C7965A2B347F3 | 6.37986 |
| 22 | 6E376986A947B180015A0A9A | 6.24373 |
| 23 | 3669CAF711FC2129743CFFBA | 6.1472 |
| 24 | C1D8E53D16322CB3B1386B0E | 5.87095 |
| 25 | 9E1F780C45570E3A475F5A77 | 6.11801 |
| 26 | 32F36D066051FAE51512A8F3 | 6.27711 |
| 27 | 464AD0462512248F26313BC4 | 6.50894 |
| 28 | 03F93CDFCA5B9D3262FD2D25 | 6.12574 |
| 29 | 694CAFC989888FC1F358CA8F | 5.86597 |
| 30 | 8C9F1D8E186EAFEDF0D6F4DD | 6.17035 |
| 31 | C4E95F3E65B40D938946B132 | 5.84552 |
| 32 | 5891E3188FA53AE34576A803 | 5.85053 |
| 33 | 409FF8A9E7FCDA58D4A5241B | 6.10709 |
| 34 | 3C70E4E442FA01B79EE09FA5 | 6.20979 |
| 35 | 36817EE5B08B5B4B9CE88CBE | 5.77008 |
| 36 | BA78FAA5BDCC40837F5205DA | 6.31919 |
| 37 | A490E570CE08172BD82A3633 | 5.73775 |
| 38 | 8433E275E271D4EC11019463 | 5.78564 |
| 39 | F83B07F42EFAE5F1EA281A78 | 5.68333 |
| 40 | B9B93373373FFCB301EFCD77 | 5.79877 |
| 41 | 22B5A5AAC8B3756C6C4ADFE6 | 6.27794 |
| 42 | C6DFADA3233FF4EE17DE5E17 | 5.87103 |
| 43 | 70D09DC4F9121828C70B6064 | 5.76809 |
| 44 | F01F5956C24E2156253809D8 | 6.64621 |
| 45 | 8E157642C21545D6AFC4C9EE | 5.77721 |

TABLE 3-continued

| ID cell | sequence | papr |
|---|---|---|
| 46 | 391D93EF8012E5D2F8E2C299 | 6.87607 |
| 47 | EC1D207A7BA6C4852C105E34 | 6.09394 |
| 48 | 55858594CBAC6A7760D72623 | 6.0547 |
| 49 | FBB76DDCC08E8B0A89E8D35B | 6.30027 |
| 50 | 6394D6CFC5269D0B8DFCE4D6 | 5.71258 |
| 51 | F92EDE555781CC62F5C3FA42 | 6.26962 |
| 52 | E66B7E6E901C802D1725C31B | 6.98039 |
| 53 | 0BA101B2F3F78E672EFC0CC7 | 6.25099 |
| 54 | 26E1EC3E787F6092D1634683 | 6.54994 |
| 55 | 4767A25488E79F75E2F45FA1 | 6.25162 |
| 56 | 1A2FC69DC4DCAD0399DAF857 | 6.06972 |
| 57 | 53F2BFC63878B6C2C10C8A2C | 5.70754 |
| 58 | C20824E0B5348061E2A4C1CE | 6.05831 |
| 59 | 8F1B88288316B59939D490A9 | 6.002 |
| 60 | 3203E66C6406767186F8955A | 6.79504 |
| 61 | B335E583FD89A0A410876B81 | 6.17206 |
| 62 | C11D537E5E2992361F2CC44B | 6.06154 |
| 63 | F1E074FEB2CF55427C573C6F | 5.80776 |
| 64 | BC8C283A7CA014EC79837DD7 | 5.82436 |
| 65 | DF29647F465044A0BC7D2720 | 6.28397 |
| 66 | F29CCF3995F08458FA0F8908 | 5.89065 |
| 67 | 28F5D1FD67E98528DB28BB5D | 6.08206 |
| 68 | DC5908BB6B8E1B84ADF881A8 | 6.01325 |
| 69 | 0AF44605329EE32ACF75481B | 5.84218 |
| 70 | C7CEF13FD6FE89346FB543B2 | 6.33524 |
| 71 | 5D2B9D0E4306F96A65BAF4EB | 6.34218 |
| 72 | 0E2D2473C890413D9A9D8DB1 | 6.05022 |
| 73 | 7C082A7E84B366733C6E19D1 | 5.9351 |
| 74 | 85C50A024C78CC1B3AEF4C94 | 5.84302 |
| 75 | 298A3E89079EF4C27CC921A9 | 6.13354 |
| 76 | 825D06F901CE94D8168D8A46 | 6.00828 |
| 77 | 73DCC20AFF8C5837F539EE22 | 6.27564 |
| 78 | 553DD23CB093EFD7C544F013 | 5.88433 |
| 79 | 5EE648A514E40CF0E7ECE2A1 | 5.95859 |
| 80 | F7B98C7D1DD5CE51B6B678A3 | 6.54896 |
| 81 | 9B840FF5F78473E2F75B8E2D | 5.87521 |
| 82 | 8C99E9A614E8AC8C74566752 | 6.03187 |
| 83 | B7EC60A09ACD2CABB53DEDE9 | 5.95608 |
| 84 | 2900FBF0CC91DA813CDBEAD0 | 5.87135 |
| 85 | 949EF4015122026200DF05F1 | 6.11214 |
| 86 | F3AE5B267C36BF3877E4AC49 | 5.87287 |
| 87 | A4E43FBE54A0280D65419C99 | 6.0007 |
| 88 | F116946F21EF61D108AC2F42 | 6.94574 |
| 89 | 5B82DE3F0ADB20D788A045A6 | 6.13544 |
| 90 | AC639F8BDB63A8C4E4746E65 | 6.25857 |
| 91 | 70C588D838AB0FC61F8EABDA | 5.85846 |
| 92 | D6A8AD537E8258E745C1C476 | 5.82355 |
| 93 | 8A4F652DF088D93FC0073FD8 | 6.00051 |
| 94 | 450F92DF140D63380103F31B | 6.48422 |
| 95 | EAAF05F63641E7AFED3A5A79 | 5.90759 |
| 96 | 5F501203D217CF94BC44A6C1 | 6.5396 |
| 97 | 71F6C952D988BC8847E0BA88 | 6.09041 |
| 98 | BF472D6610532AE50CDF829A | 6.28286 |
| 99 | D15D9E8AECFE8C296D5802D6 | 6.22803 |
| 100 | D5AD5575149C76589FF8784A | 6.07452 |
| 101 | 7868B4788F33D2EA66C86BE2 | 5.83685 |
| 102 | B722E30271A97725EA79020A | 5.97044 |
| 103 | 30209E7F80F14A76FCB45DBF | 6.06914 |
| 104 | 6FA8FDC42599BDFDCEEFD828 | 5.99957 |
| 105 | 9CAF25C12BA260391958223B | 5.91873 |
| 106 | CD82CBA6EA27C514AA8F40A0 | 5.72081 |
| 107 | 96852F4F3B879A23F97D3DFA | 6.24847 |
| 108 | 236F33011BD7E277C5BC9561 | 5.84184 |
| 109 | 9B74FD2CA98D58E7B8EDD5DB | 6.1246 |
| 110 | 2DC51FEED52392D7174435E8 | 5.80747 |
| 111 | 8708EE1A78F79E3E14D30DD7 | 6.23013 |
| 112 | FCCD639AD5BA5B1451CBD600 | 5.96117 |
| 113 | 652492280DC624A59D2A3F82 | 6.32939 |
| 114 | B8D0EC8813E8453214C74501 | 5.99404 |
| 115 | 2AC9F5941B28ED1CF89F6F0A | 5.96885 |
| 116 | 64DB26CD230FABD4BA1A8412 | 6.58194 |
| 117 | C3E2EF9EDB75E639EDC84DEA | 6.07393 |
| 118 | 4BE5A9ADCB4B4C4758F4CEBD | 5.98986 |
| 119 | 3C72C151C36EA2757082442D | 6.02742 |

TABLE 3-continued

| ID cell | sequence | papr |
| --- | --- | --- |
| 120 | B482C15B86D52FC1106E2E60 | 5.91514 |
| 121 | F26820407553EDB43C57123C | 6.07394 |
| 122 | 1C045E9D66325157825D6967 | 6.10105 |
| 123 | 0E0F6D035E1AC7A1D76161A7 | 6.7399 |
| 124 | C1C20BF875BE9E94D1CAE3BA | 5.82982 |
| 125 | 527261E102F3FC3ABCE2C13C | 5.96992 |
| 126 | 8AFE184CD76A2756E5394350 | 6.76565 |

TABLE 4

| ID cell | sequence | papr |
| --- | --- | --- |
| 0 | FED4E77A4C67B6D891E1BE6BAD19E1418101EE4B0DF6AB22382DCB73A27C4870487FA930BDD6E4A715F95E6A4F8A0C480FE54E73A6C4C27C971A23CA870606FA535DE961B6D3664544F890C080F75267BA2C37DACC98E0BB2BCD438203DD599EE8B0DF6BB26382FCA73227C5 | 5.92384 |
| 1 | 03FD698EF4B0DB69B32342BC972A2BC2870533DD163BCD6648725F95E6C4F8B0C080FD55C6FB2DA90E13E2B8D19E1458103FDA9CED494785F94E744F8D0E090FF5265BB2CB7DACC8CD09F1418109FEA8CF74D8AF55A921C17C55C5860407FAAB39D363BD56E48705F15E684D | 6.28771 |
| 2 | FD298ED4B8D769B323C27C973A33C2830405DD161BCD664C705F94E6C4B8B0D080FB54647B2DC90E0BEAB8D09F1418101FDA94EB498C85796E7447850E080EF5A67B92C37DAECA8C897161A111F6ACCD75586F359931C17E5798868407DAA33DD161BDD6E48705E95E6C4D88 | 5.88237 |
| 3 | 07FAD33DC961BED5654705B96E744F8D0C08673A2C57BAD490E0BE2BCD49F1418901FEA98D769B122C2FC973A33C2830407FAD35DE948E8BB29CC897121A111F6A8CD7458EF759919A13E2A3120BFD519CE9319EEB624382FAAD8A0C080FE54673A6C67BAD892E0BE2B8D29C | 5.72241 |
| 4 | F92E346795060C0FF5A6BBD2C37DAEC88F0989F1618111FEA8CF7558EF35B921C97E559830A07F9529DE971BECB6A4784F9AEB4678504CF72586FB55951E17E539D13E2438243DD5DE6B324392FCAF3427C5864427EAAB39D160C90E4BF2BCD89F1419101FEA8CF7458AF759 | 6.54265 |
| 5 | 0487FAB32DD165BCD6644705F95E6C4B8B0D54E73A4C67BADC90E0BEAB8D09E1418103FC4B8DB69B323C2BC973A2BC68704077AD31DDC98E0BF2BCD09B1618109FAAACF7458EF558579A13C2930207FB539DE9319EDB6A4384F84F8A4C281FED4A77A4C67B2DA90E1BE2B8D0 | 6.23106 |
| 6 | FA535DC971B6D3664685F92E7447850E0A0DBAAC379ACC98E4BF2ACD09B1619101FEA8CCF6DB121C27CD71A33C2830605FA531DE97180BF2DCE88F1A18101EEACCF76586FB59911C1362C30203FD559CE8B1DEEB725382F8AF340C880FD5567BA6C57BAD494E2BF2BCD09F15 | 6.96087 |
| 7 | 0FF5665BA2CB79AEC88E0BF2BCC89F121A11CE7498EF75B125C37C571A53E2830A07F9511B6D3664785796E74578D0E0A0EF5267B92D1C17E559A13E2832203F5559EE9B1DEEB72434A7C506140FF6A73BD2633DB6D48709F35C1498103FCA94EF4B8CF6DB121C27CD71A13C | 6.23321 |
| 8 | F1218121FEACCB74586F35D911D176539B1020BF9539CE9319EEB724B86FAAF34A785060A6BB92E37DA6C88D0AF2DCE8AF0A14101DE9DEEB726382F4AF3627C5864427FAAB3DD160705F55C684F0A0C081FE54A77A5C67B2D890571A13C2930A07FB539D69319EDB624786F9 | 6.35304 |
| 9 | 0C080FF54673A6C77BAD490E0BF2BCD49F14FD29CED4A8D76DB123C2FC971A33C2830405DD961BCD664C705D94E6C4B890C088FF54645B921C37D579A53C2830A07F9539D69719ECF92E7447850E080FF5A63B92E37DA6C88F08D19E1438303FD298EE4B0DB69B223C2BC971 | 5.88167 |
| 10 | F25CA88F1A1C141DEA4CF725A6FB5D911C151362830213FD519CE8B15EAB52538AFCAF356040BF4A63BD2A37DA6C48F09F25C68CF2A1996E8B2DF6B326382ECA73627C4860447FA9BDD6A48705F15E684F8A8C082FF54E77A4C4929C17C579A13E2830203FD539CE931DECB4 | 6.5208 |
| 11 | 080FF5667BAAC379ACC90E4BF2ACD89F1618A94EF4B8DF65B121C27C571A33C2830207F9961BAD5644705B96E7447890E090FF5265B9921C17E569A13A2A3020BF9519CE9319ECB5AEB42785160C0FF4A73B52E37DB6C48B09F09E1418302FD298EF4B8D769B323C2FC973A1 | 6.16551 |
| 12 | F6DB521C37C575A33D28B0607FA531DA95184785B96E66478D0C080FF5265BB2C37DACC92BCD49D1418905FEA9CEF4D8EF65B921C17C50E0C0DF4A6BBD2E36DAECC8D0AF25CA8AF1EACCF74596F359931C17E539B12E2C34223DDD165BCD664C705F95E644F890D088FF5465 | 5.99014 |
| 13 | 0B729CE89F121C121EEA4CB74586FB5D931C9A93E283020BFD519DE931DECB624386F8AD50E0C0DF5A63B92E37DA6C88F0BF25CA88F0D599AEAB1DEEB324382F4AF3627C5064427C63BD96E4870DF15C684F8A4C281FE54A75A55B121C37D571A53C2830207FB529D6931BEC | 6.43524 |
| 14 | F5A67B92C375AECA8E0B729CE89F1A18121D74D8EF55B929C57C579A93E2831203F9539CEDB664585F92E74479506080FF5A63BD2E3417E579B13E2C34223FD519AEAB0DE6B724382745060417F2A73BD263BD96E49705F55E6918901FEA8CE74D8CF65B121C37C571A53C28 | 6.01736 |
| 15 | 1F6A8CD75586F359921C97A579A13E2830209DE931BEDB624784F9AEB46785160C0BF6A437DAACA8F0BF29CC88F1218121FEACCF745838AFCAF342745462417FAA339D263BD96E49684F0A2C181FED4E77A5C6FB4D891E17E6B928B0605FA531DA971BED3624585F9AE74479 | 6.19619 |
| 16 | E13E6BAD09E1418103FD29CED4B8D769B32073A23C6860407BAB33DD161BED764C745D948A8C080FE54E73A4C77B2DC90E0BEABCD09DFAD35DC961B6D3644685F92E7457850E0A0C2C379AEC88E8BF2BCC89F161A101FEA8CF746B322382ECAF3625C5868447DAB33DD163BC | 6.13798 |
| 17 | 1C17E579B1362C30213F5559EE9B1DEAB724AE3427A506040BF6A73B52E37DB6CC8F09F1F121C121FEA4CB74586FB59931C17E539B117FAA739D3633DD6E4970DF15E684F8A0C281A546BB4D991E17E6B9D19E5438303FD29AEDED3624584F92E7447850E0C0FF5A63B92C34 | 5.95019 |
| 18 | E2C30223FD599EE8B0DE6B324382FCAF3425407F2A53AD2E33DB6D48F0DF35C68CF0A2C04C772586EB55911C17E5B9D13E2430243DD5BDD6A48705F15E6A4E8A8C082FF54677A6C4E13E6BAD09E1458102FD29CED4A8D769B120AE342785160C0FF4A63BD2E37DB6CC8F09F0 | 6.2348 |
| 19 | 18901FCA8CEF498EF65B125C17D579A53C28FAD35DC971BED3644685792E74478D0E080DBAAC379ACC90E0BF2ACD89B1619101FAA8CDB6A4384F9AE346785160C0BF4A73B52A37D9F2DCE8AF1A1C101DEA4C7725A6EB55951E14A23C6870407FAD33DC961BED7654785F96E4 | 5.67582 |
| 20 | E6C4F8B0D080FF5466BA2C779ACC90E0BF281418101FCA94EB498DF6DB123C37C571A13C07FA931DD961BAD5644705B96E744F8D0E087458EF55B921C57C579A13A2830203F9519CB624786F8AEB427A5160C0FF4A73BD2E37D9E1BE6B8D19E1458103FDA98EF4B8D769B120 | 6.78315 |

TABLE 4-continued

| ID cell | sequence | papr |
|---|---|---|
| 21 | 1 | 6.37986 |
| 22 | E539D13E2438243FD4996E8B2DF6B3263A2D2745462407FAA339D363BD96C48705F55E68C181BEB4C 77A586DB5D911E15E4B9515E34133DD163BDD6648705F95E684D8A0C080FD547B2D890E0BE2B8D0 9F1418501FDA9CEB4B8C24382F8AE34A78526040FF2A53BD2E33DB6C | 6.24373 |
| 23 | 101FAAACF7458EF75A921C57E569A93A2831539DE951AEDB624784F9AE746795060C0FF52C379ACC9 8E0BB29CD89F161A111FEACCD7424382FAAE342785061407F2A73AD2E33D96D5C68CF2A1C101FE94 C772586FB5D991E15E43CA870607FAD55DE971BED3664785F92E744 | 6.1472 |
| 24 | EECB4DD6AB22382DCB73A27C4870487BA930BDD6E4A705F15E684F8A0C082FF54E77A4C591613E4B 9D11E54382037D29AEF4B0DB6BB0E644B8B0C088FF5466BAAC37BADC90E0BF2918901FEA9CE7498CF 75B121C37D579A13C287F2A73BD263BD96E49705F15C684F8A4C280 | 5.87095 |
| 25 | 13E2830213FD559EE8B15EAB52538AFCAF356040FF6A73BD2A35DA6C48B09F25CE8CF0A0EA4CF7458 6F35D911D176579913E2434223D633D96C4870DF55E684F0A0C281FED4A77A491617E4B8D11E54383 037D698EF4B8DF6BB1F92E7447950E080FF4A63BD2E37DA6CC8F09 | 6.11801 |
| 26 | ED3624785F92E3467850E0C0FF5A63B92E358E0BF2BCC89F1618111F6A8CD74586F75B90571A53E2830 203F9529D69719EDB624384F9A1C141FEB4CF725A6EB5D951E16E539D11E1D519AE8B1DE6B724392F 4AB3427C5060427CBAAC37BACC98E0BD2ACD89F1619101FAAACD | 6.27711 |
| 27 | 176579912E2434223ED519EE8B0DEEB3263834A7C5061407F2A53AD2637D96C4870DF35CA14101FEA 4C776586FB55911C17E539913E0AA339D362BD56E48705F95A684E8A8C482FDC67B2DA90E13E6BAD0 9E1418303FD298ED49B624386F9AEB427A5160C0FF4A63B52E35D8 | 6.50894 |
| 28 | E9319ECB624382FAAF34A7C526140FF2A539DA6C88F0BF2DCE88F0A1C141DEB4CF765A6D1C97E559A 13E2832203F5559CE9B1DEAB72568CF0A0C181FED4C77A546BB6D991613E6B88203FD698EE4B0DF6A B2A3C2FCB73A27C485F5263BB2C37DAEC88F0B729CE88F121C101D | 6.12574 |
| 29 | 1418503FCA9CEB498DF65B521C27CD75A13C07FA933DC969BED7654785F94E644F890C0967BA2C57 AADC90E0BF2BCD09D1418901FCA8EDB624584F9AE7467950E0C0DF4A63B92C350BF2DCE89F121812 1FEA4CF74596FB59911C73A27C4860487BAB32DD961BCD664C745F95 | 5.86597 |
| 30 | EACCB74586FB5D911C17E539913E2C34223DE9319ECB624B86F8AF34A78506040FF6A738DA6C88D0B F2DCA88F0A14141FEA4CF765A6C2FCAB3626C5864427FAAB3DD3D362BDD6E48714F8A4C281FE54A75A 4C6FBD6D891E13E6BAD030A07FB539D69719ECB6A4784F9AEB467851 | 6.17035 |
| 31 | 3FD559CE8B15EEB52438AFCAF3427C5060413B52E35DB6CC8F0BF35C688F2A1C181FEB4C6F35D931C 176579913E2C30223FD519EE8B0705F15C684F8A4C081FED4A75A5C67B2DA91D19E1418203FD298EF 4B0DF69B22342FCB7050E080FF5A63B92C37DA6C88F0BF25CA8AF0 | 5.84552 |
| 32 | C101FE94D77A586DB4D991A15E5B9511E141D599EEAB0DE6B326392F4AB3427C5860407C2DE33D96 C48F0DF35D68CF0A2C0817ED4C75B22382FCB73A23C6860487FAB32DD161BED59566C4D8A0C084F D55673A6C77BAD494E2BC13E2832203FD519CE8B15EAB524382F8AF35 | 5.85053 |
| 33 | 3C2870406FA531DC961BED3644785F96E745088FF5667BAAC379ACC98E0BF2ACD89B1419A9CEF4B8C F65B523C37CD75A33D28B0605F837DAEC88F0BF29CE88F121C101FEACCB74581C97E559B1362C3020 3FD519EE8B15EEB525966684F8A0C084FD54673A2C57BADC90E2BD | 6.10709 |
| 34 | C27C973A33CA870406FA535DE971B6D36444E6C4F8B0C080FF5466BAAC77BACC90E4BD281418501F CA98E4B8DF5C7CD71A33CF5263B92C375AAC88F0BF29CE89F121C121D58EF359931C97E579 A13E2C32203F5519CE8D6E48705F95E6C4F8B0C880FF54673A6C579 | 6.20979 |
| 35 | 382F8AF352745462407FAA339D2633D96C495C68CF2A1C181FEB4C77A5C6FB4D911E15E5E2C30223F D519AE8B0DEEB324382FCAB3625FE54E75A5C6FB2DA91E13E6B8D09E94183014B8DB69B323C2FC972 A2BC6870407FA931DCDAEC88D0AF2DCE88F0A1C101FEB4CF765A6C | 5.77008 |
| 36 | C6FB2DA91E1BE2BAD09E1458303FDA98ED48B2A3C2FCB73A23C6860487BAB32DD165BCD55F95A6A 4F8A8C480FF54E77A4C67BADC90E03C2870406FA531DC961BED3644685792E7450F75667BB2CB7DAE C98E0BF29CD897121A10996E8B0DE6B326382FCAF3625C5868407FA8 | 6.31919 |
| 37 | 3BD2A37DA6C48F09F25CE88F0A1C101BE94C6FB5D931C176579913E2434223FD519AE8B024B86F8AE 34A7C5260407F2A53AD2E33D96CB9511E1438203FD699EE4B0DF6AB2A382FC9868447DAB33DD161B CD6648725E95E684F881F6A8CF75586F75B921C17A579B136283221 | 5.73775 |
| 38 | C5860407EAA33DD162BD56A4A715F15A6A4D81FED4E76A546BB6D891617E6B9D11E5418199EECB2 DE6B3223A2ECA73627C5860407DA97BADC90E1BE2BCD09E1498503FCA9CEF498CC27C971A33C2830 407FA531DC961B6D364455CE88F0A1C101FE94C7725C6FB4D911A17E5 | 5.78564 |
| 39 | 30A07FB539DE9319ECB624386F9AEB427A51F5263B92C375AECA8F0BF2DCE89F121C101C7458AF75A 929C57E569A93E2A3120BF9539C6CC8F0BF25C68CF0A1C181FEB4D772586DB5E5B9D13E2438203FD4 996E8B2DE6BB22382C447890C090FF5267BA2C37DAEC98E8BB29CC | 5.68333 |
| 40 | CEF498EF75B921C17D579A13E2930A03F9511B6D3664785792E745F7850E0A0FF5263BB2DC90E0BF2BC D09F1619101FAAACF74D8EF759AEB467A5160C0FF4A63BD2A37DB6C48B0BF1A14101DEA4C772586F B5D951E16E5B9D13E107FAD31DC969BED5654705F96E74478D0E09 | 5.79877 |
| 41 | 335D163BCD6648725E95E684F8B0C084FD55C6FB2DA90E13E6B8D19E9418302FDA98EF48B2A3C2DC A73A23C4860487BAB33DD161BED52B4D49F15181O5FCA9CE74D8EF65B925C17C2830607FA539DE95 1AED3664584F9AE3467881FED4C77A5C6FB6D991E17E6B8D11E54380 | 6.27794 |
| 42 | CD89F1418101FEAACE74D8EF55B929C57E5528B0207FA539DE951BEDB624784F92E346790F75267BA2 C379AEC98E0BB2BCD89F161A11E9B1DEEB724386F8AE34A7C526040FF6A7386C48B09F35C68CF2A1C 181FE94D77A5C6FB4C27CD71A33CA870606FA531DC971B6D76645 | 5.87103 |
| 43 | 375AECA8F0B729CC88F1A1C101FEA4CB7458929C17C579A93E283120BFD519CE931DECB4F9AE74679 50E080DF5A63B92C37DA6C88F08E2430203FD599AE8B0DE6B326382FCAB34247FAA739D2633DD6E4 9705F15C684F8A0C281CE74D8EF65B121C17C571A53E2830207F950 | 5.76809 |
| 44 | C98E4BF2BCD09B1418101FAA8CF74D8EF7597C575A13D28B0205FB531DE951BED366478444F8D0C0 80F75267BA2C37DACC88E8BF2BCC203F9539CE9319ECB724386F8AF3427C52603B52A37DA6C48F09F 35C688F2A1C181BE94C8D769B122C2FC971A33CA870407FAD31DC94 | 6.64621 |
| 45 | 34A78506040FF6A73BAD2633D96C4870DF15DA14141FEB4C7765A6EB55951C16E539913E03FD559CE8 B15EAB724382F8AD35274546041A546FB4D891617E4B9D19E54183037D69AECB2A382FCA73A27C687 0487FA932DD165BCD40BF2DCC88F1A18101FEACCF76586FB5D931C | 5.77721 |
| 46 | CA73227C5868407DAB335D161BDD6E4C705D4F8A0C081FE54A77A5C6FB6DA90E1BE6BAD18283BD 498EE4B0DD6AB22382DCB73A23C68467BA6C77AAD494E0BF2BCD49D1518101FEA8F6DB523C37CD7 1A13C28B0607FA531DA971848F0DF15C684F0A2C081FE94C77A5C6BB4D9 | 6.87607 |

TABLE 4-continued

| ID cell | sequence | papr |
|---|---|---|
| 47 | 20BFD539CE9B1DECB624382F8AF34A7C5061A63B92E36DA6C88D0AF25CE8AF1A1C101FE8586F75B93 1C97A579B13E2832203F5559EE848F0DF15C684F4A0C081FE94C76A546FB4D9B9511E3428283FD498EE 4B0DD6BB22382DC87850E080FF5A67BB2C375AACA8F0B72DCC88 | 6.09394 |
| 48 | DE6B724392F4AF3427C5860407EAA33DD16148F09F15C684F4A0C181FE94C77A546FB4D8E5B9D11E2 438203FD599EE8B2DE6BB26382C8A0C482FE54E73A6C67B2DC92E1BE2BCD29DFD29CEF4A8D769B12 2C2FCD71A33C28706053B52A37DA6C48F0BF25C688F2A0C101BEB4D | 6.0547 |
| 49 | 23C2FCB73A2BC2870507FA933DD961BED7659566C4F8A0C884FD5567BA6C57BADC94E0BC9E945810 2FD298ED4A8DF69B122C2FCD73A00FF5265BA2CB79AEC98E0BB29CC89F121A1074D8AF55A929C17C 579A93E2A3020BF9519CBDD6E48715F15A6A4F8A0C480FF54E73A6C5 | 6.30027 |
| 50 | DD165BED6644705F95E6C4B890D080FF54647BADC90E1BE2BCD29E1498501FCA9CEF4B8D23C2FC97 2A23C68505077A933DC961BED764CD89B1419109FEA8CF7458AF55A929C17E5530A03F9529DE9719E DB6A4786F9AEB467850FED4E77A4C67B6D890E1BE6B8D19E1458300 | 5.71258 |
| 51 | 27C5462417FAA339D3633D96E4870DF55E68C181FE94D77A5C6FB4D911E15E5B9515E141D519EE8B1 DE6B726392FCAB3426C5060407DC6FB6D890E1BE6B8D09E1458302FD298EF4823C2FCB73A23C68505 07FAD31DC961BAD765F2DCE8AF1A1C101FEA4C776586EB55911E14 | 6.26962 |
| 52 | D991E17E4B9515E3428203FD698EECB0DF692F4AF3627C5864427EAA33DD362BDD6E4A7068CF0A0C 1817E94C76A546BB4D991E17E4B80487BA932DD161BCD6644705F94E6C4F890D673A2C57BAD494E2 BF2B4D09F1418105FCA9B1DEEB524382F8AF352745060417FAA33BD1 | 6.98039 |
| 53 | 24382F8AE34A78526140FF2A73AD2633D96DF25CA88F0A14101DEB4CF725A6FB55911E1413E2C3221 3F5519EE9B1DEEB725382FCAF3581FE94C76A5C6FB6D891617E6B8D11E54381EE4B0DF6AB2A3C2FCA 73A27C6870487FA930375AAC88E0BF2DCC88F1A1C101EEA4CF7659 | 6.25099 |
| 54 | DA6C88F0AF25CE8AF0A1C141FEA4C772586D1C97E579A13E2C3203F5519EE9B1DEEB724AE3467A51 60C0BF4A63B52E37DB6CC8F0BF1430243FD4996E8B0DE6BB22382FCA73227C4AAB3DD163BD56A48 715F15E6A4E8A0C082FD7458EF55A921C57E569A93A2830203F9539D | 6.54994 |
| 55 | 2F4AF3426C5064427FAA33DD362BD56E4A7168CF0A2C0817E94E76A546FB4D991617E4B8438203DD 499EE8B0DE6BB263A2ECA73627C554E73A4C77BADC92E1BE2BCD29F1418501FD8DF6DB322C27C973 A23CA870607FA535DC946C48F09F35CE8CF2A1C181BEB4C772586DB5 | 6.25162 |
| 56 | D11E1418303FD29AEE4B0DB6BB223C2FCB71868447DAA335D563BCD6E48705F95E6C4D89FED4E75A 4C67B6D890E1BE6B8D19E9458100969BAD7644785F94E7447890C080F75267B9C98E0BD2BCD89B141 9109FEA8CF74D8AF7582FCAF3627C5860407EAA33DD163BD56E4A71 | 6.06972 |
| 57 | 2C37DACC98E0BB2BCD89F161A111F6A8CF745B921C37D579A53E2930A07F9529D6971BEC85792E74 578D0A080EF5267BB2D37DAAC88C13E2832213F5559EE8B1DEEB524382F8AF3440FF6A53AD2633D96 D48709F15C68CF4A0C0A9CEB498CF6DB123C27C571A33C28B0605F8 | 5.70754 |
| 58 | D2E37D96C48709F35C684F0A0C081FE94C74B55911E16E539D11E2438243FD4996E8B0DC38AF8AF35 2745460417F2A33BD3633DD6C48D19E14182037D298EE4B0DF6BB22342BC9710487FAB32DD161BE D664C705F94E644F890CEACCF74586F359911D17E579912E2C34223C | 6.05831 |
| 59 | 2 | 6.002 |
| 60 | D6648725F956684F8A0C080FD54673A2C779E1BE6BAD09E1458302FD29CEF4A8DF6DB12073227C686 0407FA932DD161BCD6644745F9418105FEA9CE74D8EF65B125C37D571A13C29539DA951AED366478 4F9AE7467950E080DF4A5C6BB4D991617E4B9D11E5418303FD29AEC | 6.79504 |
| 61 | 2BCD09F1518101FEA9CE7498EF75B125C17D3CA870606FA535DC971BED3644685792E745088FF5667B AAC779ADC98E0BD2ACD89B14199DE931BECB624384F8AEB427A506040FF4A4DA6C88D0BF25CA88F 0A1C101DEA4C7765A6D2342FCB72A2BC2870507FA931DC101BAD565 | 6.17206 |
| 62 | D599EE8B0DE6B324392F4AB3427C5864407DD2637D96C48709F35C684F4A2C181FED4E74B55951C1 7E5B9D13E2430203FD499EE8B0DD5F95A684F8A0C082FE54673A6C77B2DC92E09E1418103FDA9CEF4 B8D769B322C2FCD71A060C0FF4A63B52E35DA6C48F09F25CE88F2A1 | 6.06154 |
| 63 | 7FAA73BD3633D96C4970DF55E684F0A0C0807725C6FB5D911E15E4B9D15E3438283FD698DEEB32639 2F4AB3626C5864407EAAB3DD361E13E6B8D19E1458103FD29CED4A8D769B320A23C6870507FAD31 DC961BED5654705F96E5A14101FEB4CF76586EB55951E16E5B9D13E1 | 5.80776 |
| 64 | 81FE94E77A5C6FB4D891E13E4B8D19E54180996E8B2DE6BB22382ECA73227C5868407FA8633DD6E49 70DF55C684F8A0C280FE54A75A42342BC973A23C6850407FAD33DC969BED564E644F8B0D088FB5467 BAAC379ACC90E0BF29E2434223FD599EE8B1DEEB724392F4AF3625 | 5.82436 |
| 65 | 7CD75A13D28B0607FB531DA971AEDB6245854478D0E080FF5665BA2C37DAEC98E8BF2BCD18105FC A8CE74D8EF65B125C17D571A13C28A63BD2C36DA6CC8D0AF2DCA8F0A14101DE86FB59931D17E5 79912E2434223FD599EE8B1644705F94E644F8B0D080FB5666BA2C379AC | 6.28397 |
| 66 | 8283FD699EE4B0DF6AB2A382DCB73A27C484AAB3DD162BDD6A4715F15A6A4F8A8C080FDA5C6BB 4D991617E4B9D19E54383037D298EC64C705D94E644F890C080FF5467BAAC379AC2BCD49F1518901F EA8CE7498CF65B925C37D27C5060407FAA339D3633D96C4870DF15C68 | 5.89065 |
| 67 | 7850A0A0EF5A63B92C37DAECA8F0B72DCC89109FEA8CF7458AF55B929C57E579A93E2831531DE971A ED3664785F9AE7467850E080DF56FB59911C176579913E2430223ED5099AE8B038AFCAD3527C5062417 F2A33BD263BD96C482BCD09F1518901FEA9CE74D8CF75B925C17D | 6.08206 |
| 68 | 868447DAB33DD561BCD664C705F95E684D89FE54A75A4C6FB2D890E1BE2BAD19E9418301EE4B4DF6 AB2A382FCB73A23C4860487FAB30AD490E0BF2BCD09F1518901FCA8CE74D8CF47CD71A33C28B0605 FB539DE971BEDB62458468CF0A0C0817E94C77A5C6BB6D891E13E4B8 | 6.01325 |
| 69 | 7B2D890E0BEAB8D29E1498503FDA94EF498C2342FC972A23C68704077A931DC961BED565956684F8B 0C080FF5467BA2C57BADC94E2BC28B0607FA531DA971BED3624784F9AE34678F5A67B92C37DAECA8 F0B72DCE89F121C101DEE4B4DD6AB2A382DCA73223C4870487BAB31 | 5.84218 |
| 70 | 85F96E5447850E0A0FF5A67B92C37DAECA8CCD89F1619101FAA8CF7458AF75B929C57E5528B0605FB 531DE971AEDB664785F9AE74678EACCB74586FB59911D176539B13E2434203CB15EEB72438AFCAF352 7C5062417F2A739D1AD494E0BE2B4D09F1518901FEA9CE7498EF4 | 6.33524 |
| 71 | 705F55C694F8A4C081FE54A77A4C6FB2DA91B9D11E1438283FD499EE4B0DD6AB2A3C2FC8C5064407 EAA339D363BD56A48705F15E6A4CFDA9CEF4B8DF69B123C27CD73A23CA830604961BED7644705F94 E744F890E090FF5267B8B5D951E17E539D11E2438243FD499EE8B2DD | 6.34218 |
| 72 | 8E0BB29CC89F161A101F6A8CF7458EF75991571A13E2830207F9529D6971BEDB624386F978D0E080EF5 A63B92C37DAAC88F0B729CC883F5559CE8B15EAB525382F8AF3527C546041D2E33D96D48F09F35C68 CF0A0C181FED4C75F6DB121C27CD75A13D28B0207FB531DA9519 | 6.05022 |

TABLE 4-continued

| ID cell | sequence | papr |
|---|---|---|
| 73 | 73227C6870487FA932DD161BCD664C705D948A0C082FE54E73A6C67B2DC92E1BEABCD29C03FD298EE4B0DF69B223C2BCB73A23C28705BA2C77BACC90E4BF2ACD09F1619101FAAACD5B121C37D579A53C2830207FB529DE971BEC705F15C694F8A0C081FED4E75A5C67B2D891 | 5.9351 |
| 74 | 8DF69B122C27CD71A33CA870406FA535DC95644705D94E6C4B8B0C080FB5466BA2C37BACBE2BCD09E1498501FCA94EF4B8DF6DB121C078D0E080EF5A67B92C375AAC88F0BF29CE891F6A8CF7558EF35B921C97E579A13E2C3221335D561BCD6E4C705E95E684D8B0C084FD54 | 5.84302 |
| 75 | 772586FB4D991A15E5B9D11E1428283BD698DE6B326392FCAF3626C5860407EAAB39D16148709F15C684F4A2C181FE94C77A5C6FB6D873A27C6870407FA932DD965BCD6644705F940C084FF5567BA6C57AADC94E0BE2BCD09D153F5519EE8B15EAB52538AF8AF3427C506041 | 6.13354 |
| 76 | 89F1218101F6A8CF74586F759931C97E559930203F9529D6971BECB6A4786F9AEB427851F5263B92C375AAC88F0BF2DCC88F1A1C121CB1DEAB525382FCAD3427C5460417FAA339D048709F15D684F4A2C081FE94C76A5C6FB4D97CD71A13C28B0207FA531DE951AED3664784 | 6.00828 |
| 77 | 7458EF75B921C17E579A93E283120BFD519CEDB664584F92E34678506080DF4A6BB92E348E8BF2BCD89F161A111FEA8CD7458EF759903427C506140FF2A53AD2633DB6D4870DF35DC181FEB4D7725C6DB5D911A17E5B9D11E141FAD35DE961BED7664685792E7447850A0A0C | 6.27564 |
| 78 | 8A0C480FF54677A4C77B2D892E1BEABCD09D03FD698EF4B0DB6BB22342BCB73A2BC6850433DD163BDD6648705E95E684D8B0C080FF55F6DB523C27CD75A33D28B0605FB531DE971985F96E5447850E080FF5267B92C375AEC88CB9D15E3438203BD498EE4B0DD6BB22382CF C9 | 5.88433 |
| 79 | 6040FF4A73BD2E37DA6CC8F0BF25C68CF2A0EA4CF74586FB59911C17E539B12E2434203DE9319ECB724386F8AE34A7C5260407F6A538D911A15E4B9D15E1428283FD699EE4B0DD68CAF3627C4860447FAB33DD563BCD6E4C705C89F161A101F6A8CF7458EF35B921C17A5599 | 5.95859 |
| 80 | 9E9458303FD29CEF4B8DF69B323C2FC971A10487BA932BD9670DC6644745F95E6C4F890D54673A4C77BADC90E1BEABCD09F1418501FD1BED7644685F96E7447850E080FF5263B92D8E8BB2BCD897161A101FEA8CF75586F75B90CA73627C5868407DAA33DD163BCD6648725D | 6.54896 |
| 81 | 63BD96C4970DF15E694F8A0C080FE54E75A4D911A15E4B9D15E3438283FD699EE4B4DD692FCAF3627C5064427FAAB39D162BD56E48709E14583D03FD298EF4B8DF6DB0B322C27C973A007FAD33DD961BED7654705F94E744F890E094CF72586EB5D951E16E539913E2438243DD5 | 5.87521 |
| 82 | 9DE9319ECB6A4784F8AEB42785160C0BF4A537DAECA8E0BF29CC89F1A18121EEA4CF7658921C17C579A13E283020BFD539CE9B19ECB45CE88F2A0C181FE94C77A586DB4D991E15E4430243FD5996ECB0DE6B326382FCA73627C40F75667BA2C37DAEC98E0BF29CD897121A10 | 6.03187 |
| 83 | 67BA2C77BAD494E2BF2BCD49F1418905FCA88D76DB322C27C971A23CA830606FA531DC9464C705D95E6C4B8B0C088FF5466BAAC779AD571A13E2830A07F9529DE931BECB6A4386F950E080FF5A63BD2C37DA6C88F0BF2DCE88F103FD69AEE4B8DF69B323C2FCB72A2BC28505 | 5.95608 |
| 84 | 996E8B2DE6BB22382FCA73225C4860407DA863BDD6E4970DF15E694F8A4C281FE54A75A4D991E15E4B9D15E1428283BD499EE4B0DD6995E6C4D8B0C880FF5467BA2C57AAD490E0BD1418103FDA9CEF498CF6DB521C37CD71A33D40FF6A73AD2E33DB6C48F0DF15D684F0A0C0 | 5.87135 |
| 85 | 64C705D95E644F890C088FB5467BAAC77BACBEABCD29F1418501FCA94EB498CF65B121C1A23C68505077A931DD961BAD7644705B96E4101FAA8CE7458AF75A921C57E569A13A2A309D69319ECB624384F8AEB46785160C0FF6A5C67B2D890E13E6B8D19E9458303FD298ED49 | 6.11214 |
| 86 | 9A93E2A31203F9539DE9B19EEB624B86FAAC5060C0DF5A6BB92E37DA6C88F0AF25CE8AF01F6ACCF7558EF759921C17A579B1362C3220D2E33DB6D48F0DF35D684F0A2C181FE94C74D911E17E5B9515E3438283FD698EE4B4DD6885F92E74478D0E080EF5267B92C37DAAC88D | 5.87287 |
| 87 | 6FB59931C176579912E2C34223ED519EE8B024382FAAF34A7C5261400FF2A73BD2E37DB6CF25CE88F1A14141DEA4CF725A6EB55911C14C5060427EAAB39D162BD56A48705F95E684DFE54E77A4C67B6D891E13E6B8D09E14181019DE9319EDB6A4784F8AEB42785160C0BF4A5 | 6.0007 |
| 88 | 91E17E6B9D11E14183037D298EF4B0DF6BB0CAF3225C5860447DAA335D563BCD6E4C725D4F0A0C280FE54A75A5C6FB6DA90E1BE6BAD1077AD33DC961BAD5654785F94E7447890C09BA2C379ACC98E0BD2ACD89B1618109FEA8CCDE6B326382FCAF3627C5064407EAA339D360 | 6.94574 |
| 89 | 6C48F09F35CE88F2A1C181BE94C772586FB417E579913E2C34223ED519AEAB1DEEB726393427850604 0FF2A73AD2E37D96D48F09F35D8203BD698EE4B0DD6AB2A3C2DCB73227C68533DD161BCD6E48705E95E684F8A0C080FD54586F759921C17E559B13E2832203F5559EE8 | 6.13544 |
| 90 | 929C17E569A93E2830203FD539CE9319EEB5F9AE3447950E0C0FF5A6BB92C36DAEC88F0989F1618111FEA4CF75586F75B921C17A579940FF2A73AD2E33D96C48F0DF15C684F4A0C077A5C6FB4D911E15E4B9515E3438203FD4981B6D7664685F96E7447850E0A0EF5267B92D | 6.25857 |
| 91 | 684F4A2C1817E94C76A5C6FB4D891617E4B9438203DD499EE8B0DE6BB26382FCAF3225C47F2A33BD363BD96C4870DF15E684F8A0C2814B0DB69B223C2FCB73A2BC68504077AD33DC644705D95E6C4F8B0D088FB5466BAAC77BAC17E539B12E2C30223FD599EE8B1DEEB32638 | 5.85846 |
| 92 | 969BED5654705F96E644F890E080FF5265B8ADC90E2BE2BCD49D1518105FCA9CE7498EF5C27CD73A33CA870606FAD31DC961B6D366448971618111FEA8CD7458EF75B921C17E5799203FD519CE931DECB724B86F8AE34278506154E77A4C67B2DC90E0BE2BCD29F1418503FC | 5.82355 |
| 93 | 6BB22382ECAF3227C4860447DAA33DD563BD705F55E684F0A4C081FE54A77A4C6FB6D891B9D15E3438203BD498EECB0DD6AB2A382DC80C884FD5567BA2C57BAD490E2BF2BCD49F15A9CEF498CF65B121C27C571A13C2830607F9D2633DB6D48F0DF35D68CF4A0C181FE94C74 | 6.00051 |
| 94 | 9566C4D8A0C084FD55673A2C57AADC94E2BD9E9418103FD298EF4A8DF6DB123C2FCD73A10407BA933DD165BCD6644705D94E6C4F890DCE74D8EF65B121C37D571A13E2930A03F950ED3624584F92E34479506080DF4A63B92E3591E17E6B9D11E14383037D298EF4B8DB6BB1 | 6.48422 |
| 95 | 40FF6A73AD2E33DB6C48F09F35C68CF4A2C14C772586EB55951C17E5B9D13E3430243FD4B15EAB725382FCAF342745460407F2A339D191E17E6B8D11E5438303FD29AEE4B8DF6BB173A27C6860487FA933DD161BED764C705F94F121C101FEACCB76586F35D931D17E539911 | 5.90759 |
| 96 | BE2BCD09F1498503FDA94EF498DF65B121C0A23C28505077A933DC961BAD5644705B96E50C884FD5 5673A2C77AAD490E0BF2B4D49F15539DE951AEDB664785F9AE344795060C0DF437DAACA8F0BF2DCC88F121C101EEA4CF7458B2A382FCA73227C6860487FA932DD161BCD5 | 6.5396 |
| 97 | 430243FD5996E8B0DF6BB263A2FCA73627C47FAA739D263BD96C49705F55C694F0A0C28077A5C6DB5D991A15E5B9D11E1428283BD498D6E48725F95E6C4D8A0C880FD5467BA2C578BE2BCD09E1418503FDA9CEF4B8CF65B121C034A78526140FF2A73AD2E33D96C48F09F15C | 6.09041 |

TABLE 4-continued

| ID cell | sequence | papr |
|---|---|---|
| 98 | BDD6A4A715F95E6A4F8A0C480FE54677A6C591613E6B8D19E54183037D69AEE4B0DF6BB0CA73225C5860407DAA335D561BDD6648725D1418103FCA9CEB4B8CF6DB523C27C575A13DFA531DC961BED7644685F96E54578D0E0A0D77A586DB4D911A17E4B9D11E1438283BD698 | 6.28286 |
| 99 | 4785F94E7447890C090F75665BB2CB7DACC92BCD09D1518905FEA8CEF498CF65B921C37C3CA870606FAD35DC961BED7664785F96E7441FEA8CD7458EF759921C17A579A13E283021E931DEEB624B86F8AF3427C506140FF2A5387B2D890E0BE2B8D29E1498501FDA94EF4B8C | 6.22803 |
| 100 | B9D15E1438203FD499EECB0DF6AB2A3C2DC9C5064407FAA33DD163BD56E4A715F15E684D817E94C77A546FB4D891E13E4B9D19E54180DD165BED7644745F94E644F890D088FB5464ADC90E0BF2BCD49F1518905FEA9CEF498CF4382FCAF3527C5060407F2A739D263BD96E48 | 6.07452 |
| 101 | 4478D0E090FF5265BA2C37DAEC88E8BB29CC18901FEA9CE74D8CF65B125C37D579A13C28FAD31DC961BED7664785792E7457850A0A0D58EF759931C17A579A13E2C32203FD519EE824386FAAE3427C526040FF6A53AD2E33D96CBE2BCD29E1498103FDA9CEF4B8CF65B123C0 | 5.83685 |
| 102 | BAAC37BADC90E4BF2BCD09B1618101FAAACCF6DB523C27C571A33D2830205FA531DA97184705F96E7447890C090FF5267BA2CB79ACC99A13E2A31203FD539DE9319EEB624386F8AD60C0FF6A63BD2A37DA6C48F0BF35CE88F0A1FD298ED4A8D769B322C27C971A23CA830604 | 5.97044 |
| 103 | 4F0A0C281FE54A75A4C67B2DA90E13E2B8D08283BD499EECB4DF6AB223C2FCB73A27C685AAB39D162BD56A48705F95E6A4F8A0C080FD8D76DB122C2FC973A23C2870607FA535DE944785F96E744F8D0C080FF5267BB2C37DACC8E539D11E3438243DD599EE8B2DF6BB263A2D | 6.06914 |
| 104 | B15EEB72438AFCAF3527C5062407FAA339D06CC8F0BF35CE8CF0A1C181FE94C7725C6DB4176539B12E2434203FD599AE8B1DEEB324394F8A0C281FED4E75A5C6FB6DA91E1BE6B8D103FD698EE4B8DF6BB223C2FCB72A2BC68705A6BBD2C37DAEC88D0AF25CA8AF0A1C101DE8 | 5.99957 |
| 105 | 4CF72586FB5D951C16E5B9913E2438243FD5B15EAB724382FCAD3527FCAD3527C5460407F2A339D16C48B0BF25CE88F2A1C181BEB4C772586FB4CA73627C4860407DAA335D163BDD6E48705D8A0C080FF54E73A4C77B2DC90E1BEAB8D09C203F9539CE9319EEB624382FAAF34A785261 | 5.91873 |
| 106 | B2A3C2DCA73A27C4870487BA932DD161BED45F95E684E8A8C082FF54E73A6C67B2DC92E0D19E5438203FD29AEE4B0DB6BB22342FCB71088FF5466BA2C779ADC90E0BD2BCD09F1418CEF498EF65B921C37C579A13C2830A07FB51633DD6C48705F15C684F8A0C280FE54A75A4 | 5.72081 |
| 107 | 48F09F15D684F4A2C081FE94C76A546FB4D9E539913E2438243FD5996ECB0DE6BB263A2D274506241 7FAA33BD363BD96C48705F55E6903FD298EF4B8DB6BB22342BCB72A23C28705DD965BED764C705D95E644F8B0D088FF54656F359931D17E579913E2C34223FD599AEAB0 | 6.24847 |
| 108 | B624386F8AE3427A516040FF6A63BD2E37D90B729CE89F1218121FEA4CB74586F359911D9A13A28312 0BF9539DE9B1DECB724386FAADC181FEB4C772586FB4D911E17E5B9515E34199EECB0DE6B326382FCAF3227C5868447DA82CB79ACC98E0BF29CD897161A101F6A8CD75 | 5.84184 |
| 109 | 4B8DB69B323C2BCB73A23C68705077AD31DCD6E4C725F95E6C4D8B0C080FF5467BA6C578E1BE2BAD09E9418103FDA98ED4A8DF6DB1214478D0C090FF5265BA2CB7DACB09E8BF2BCD109FAAACF74D8AF55A929C57E569A93E2831AAB3DD163BD56E48715F95E684F8A8C082FD | 6.1246 |
| 110 | B55911E16E5B9D11E3438243DD4996ECB0DD382F8AD3527C5462417FAA73BD263BDD6E485CE88CF0A1C101FE94D772586FB4D911A17E5868407DAB335D163BCD6E4C705F9566C4F8954673A4C77B2DC92E1BE2BCD09E1418501FCE9319EEB724386F8AF34A7C526040FF2A538 | 5.80747 |
| 111 | 5F95A684E8A0C482FF54673A4C67BAD890E0D19E5438203FD69AEE4B0DB69B323C2BCB70860447FAB33DD161BCD6E4C725F9566C4F89A9CEB498DF6DB523C27C571A33D28B0607F81B6D3644785796E54478D0E080FF5263BB2DD911A15E4B9D15E1438283FD499EE4B4DF69 | 6.23013 |
| 112 | A1C141FEB4C76586EB5D951C16E5B9D11E13F5559EE8B15EAB72538AF8AD3527C5062403BD2E35DB6C48F09F35CE88F2A1C181BEB4C6B326382FCAF3227C5860407DAB335D561BC5F15E684F8A0C080FF54E77A4C67BAD892E19A93E2831203FD539CE9319ECB624382F8AC | 5.96117 |
| 113 | 5C68CF2A0C101FE94D772586FB4D911E15E4E2C30203FD519AEAB0DE6B326382FCAB3424407F2A53AD2E37D96D48F0DF15C684F4A2C0EE4B0DF6AB223C2DCA73A23C6860407FA931D6E48705F95E6C4D8B0C080FF5467BA2C7781C17A579B13E2C32213FD519CE8B15EAB724 | 6.32939 |
| 114 | A2BC2870507FA931DC969BED5654705B94E40C884FF5467BA6C57AADC90E0BE2BCD09D14FD298ED4B8D769B323C2FCD73A23CA8304042C37DACC88E0BF29CD897121A111F6A8CF74921C17C579A13E283020BFD519CE931DEEB55F15E684E8A0C480FF54673A4C67B2D890E1 | 5.99404 |
| 115 | 586F35B921C97A579A13E2C30203FD519CE9B6A4786F9AE346785160C0BF4A73B52E35D80B729CC89F1A18121FEA4CB76586FB59911C27C5462407FAA739D3633D96C4970DF55C6881FED4E77A5C6BB4D891E13E4B9D19E54381531DE971AEDB664785F92E3447850E080FF4 | 5.96885 |
| 116 | A63BD2E36DA6CC8D0AF2DCE88F1A1C101FE9586F35B921C17E579A13E2C30203FD559CE9B624386F8AE3427A516040BF4A63BD2E37D9E5B9913E2438203FD599EECB0DF6B326382CC5860427FAAB39D362BD56A48715F95A6A4C109FAA8CE7458EF55A921C17C579A13A2A30 | 6.58194 |
| 117 | 5B925C17C571A13E2930A07FB529D6931BEC85F96E74478D0E0A0FF5A63B92D37DAECA8CCD89F1419109FAAACF7458EF75B921C57C5560C0FF6A63B52E37DA6C48B0BF35CE88F0A14CF765A6EB5D951C17E5B9D11E2438203DD4961BED5644785F94E744F8D0E080FF5267B8 | 6.07393 |
| 118 | A546FB4D891E13E6B9D19E54382037D698ED6BB223A2ECAF3225C5868407FAA33DD561BD70DF55C684F8A0C281FE54E75A4C6FB2DA91A23C6850407FAD31DC961BED5644705F96E5080FF5467BAAC379ACC98E4BF2BCD09F1418D599EE8B0DEEB726382FCAB3627C5864407D | 5.98986 |
| 119 | 5 | 6.02742 |
| 120 | AEB427A516040FF4A63BD2A35DA6C48B0BF0F1A1C101EEA4CB74596F35D911D17E539B1120BF9519CE931DEEB624B86F8AF3427C5061772586FB4D991E17E5B9D15E1428203BD4996B322382FCA73225C4860447FAA33DD563BC8E0BB2BCC89F161A101F6ACCF74586F35990 | 5.91514 |
| 121 | 539DE971BED3624784F92E7467850E080DF42C379AEC88E0BB29CC8971618101F6A8CD745B125C37D571A53C2930207F9539D6931BEDF2DCE8AF0A1C141DEB4CF725A6FB55951C14E2430223FD599EE8B0DE6B724392F4AF3625080FB5467BA2C37BACC90E0BF2BCD89F1418 | 6.07394 |
| 122 | AD490E0BF2BCD49D1418101FCA8CE74D8CF4C27CD71A33CA870606FAD31DC971BED76445E644F8B0C080FF5666BA2C37BADC90E0BF2830207F9539D69319EDB624784F9AE3467A51A6BB92C36DA6C88F0AF25CE88F1A1C141DE94B0DF6BB223C2BC973A23C68704077AD33DD | 6.10105 |
| 123 | 571A13C2830A07FB529D69319ECB6A4786F97850E0A0EF5A67B92D375AAC88E0B729CE89101FEA8CF74D8EF75A921C17C579A93A2A303BD2E35DA6C48F0BF35CE88F2A0C101BE94DB5D951C17E539D13E3430243FD4996E8B0DD4705F96E6447890C090FF5267BA2C37DAEC9 | 6.7399 |

TABLE 4-continued

| ID cell | sequence | papr |
|---|---|---|
| 124 | A9CEF498CF65B121C37CD75A13C2830207F8961BAD5644785B96E744F8D0E090FF5265B8AD494E2BF 2B4D49D1518901FEA9CEF4D8EF4F9AE3447950E0C0FF4A6BB92C37DA6CC8D08F1A1C101FEA4CB745 96FB5D911C17E539B100487FAB32DD161BED764C705F95E6C4B8B0C | 5.82982 |
| 125 | 54677A4C77B2D892E0BE2BCD29F1418103FC4B0DF6BB22342BC973A2BC68704077A931DDD6648705 E956684F8A0C884FF55673A2C7797CD75A33D28B0605FA531DA971BEDB62478478D0A0A0FF5A67B9 2C37DAECA8E0B729CE888283FD498EE4B0DD6BB22382FCB73A27C484 | 5.96992 |
| 126 | AAB39D162BDD6A4A705F95E6A4F8A8C482FCA546BB4D991E13E4B8D11E5418203FD698EC6BB26382 FCA73627C5860447FAA33DD163BCBE2B8D29E1418503FDA94EF498DF65B523C03CA870606FA535DC 971B6D3664785F92E545C101FE94C772586FB5D911E15E5B9511E140 | 6.76565 |

When the number $N_t$ of the transmit antennas is two and the number of the IFFT/FFT operation points used in the OFDM communication system is 1024 (i.e. $N_t=2$, $N_{FFT}=1024$), R(r) can be expressed by Equation 6 below and T(k) and $q_{ID_{cell}}[m]$ can be expressed by the hexadecimal numbers as shown in Table 5 and Tables 6a through 6d.

$$R(r) = H_{128}\left(ID_{cell} + 1, \prod_{\lfloor \frac{r}{128} \rfloor}(r \bmod 128)\right), \quad (6)$$

$$r = 8 * \left\lfloor \frac{m}{9} \right\rfloor + m \bmod 9 = 0, 1, \cdots, 383$$

TABLE 5

| ID cell | sequence | papr |
|---|---|---|
| 0 | C9A1F9FB33E2 | 5.73908 |
| 1 | C615462A8D6E | 5.69178 |
| 2 | D8400C1E2B47 | 5.67259 |
| 3 | DBCF1478431C | 5.91286 |
| 4 | CC93B30C0EB9 | 5.55863 |
| 5 | C6F3D332B053 | 5.3082 |
| 6 | 9BA4E419EBB5 | 5.5186 |
| 7 | 48FD85CD7E76 | 6.11686 |
| 8 | E992B4493831 | 5.69693 |
| 9 | 4E1401A862B5 | 5.92235 |
| 10 | 9D3239BF5543 | 5.50286 |
| 11 | 2B8584BFB3D8 | 5.19875 |
| 12 | AB42706F96A0 | 5.44334 |
| 13 | 9DB123495FB7 | 5.63328 |
| 14 | A6EFBCB2865D | 6.0094 |
| 15 | 709300E57360 | 5.73209 |
| 16 | 6E2122FC796F | 5.82368 |
| 17 | 7F01F8B4454F | 5.47779 |
| 18 | CDF8525E2FF7 | 5.33406 |
| 19 | 0AC1FA2585A5 | 6.24242 |
| 20 | 46843DFB1135 | 5.65053 |
| 21 | 8B411A6D7235 | 5.524 |
| 22 | 096A3287FE74 | 5.65888 |
| 23 | E26CD654FF1A | 5.89291 |
| 24 | D955EFF989FE | 5.90035 |
| 25 | 882566402741 | 5.62867 |
| 26 | 9FCD0AB3FCF8 | 5.79711 |
| 27 | 8E477A39DA36 | 5.45249 |
| 28 | 83740061371F | 5.42528 |
| 29 | 179FBF270668 | 5.59438 |
| 30 | 0B4738E24AE1 | 6.26907 |
| 31 | 9BD23A217294 | 5.83321 |
| 32 | E783A99153C7 | 5.57411 |
| 33 | 60690386D94B | 5.56542 |
| 34 | EEB11CF6A279 | 5.61602 |
| 35 | 17737FC0364B | 5.46925 |
| 36 | DBA832CB29FF | 5.46318 |
| 37 | 841030AA2B58 | 5.66141 |
| 38 | 573AE8A1189A | 6.49919 |
| 39 | 26EF1E523190 | 5.45727 |
| 40 | 45F27228B846 | 6.37869 |
| 41 | D26C39A8D803 | 5.63232 |
| 42 | 4514BB4432A6 | 5.74245 |
| 43 | 13CBBBDD1888 | 5.25927 |
| 44 | 34B0D91482A7 | 5.43386 |
| 45 | 0DB3ECE942B0 | 5.40054 |
| 46 | A4D876BF7C4E | 5.45618 |
| 47 | 7D492A0F5B39 | 6.40321 |
| 48 | C82DA6102B09 | 5.31582 |
| 49 | F68C09C7D629 | 5.1445 |
| 50 | 4D6C3B62D026 | 6.44183 |
| 51 | EBD13D02E539 | 5.35096 |
| 52 | 760432EDBC5B | 5.42816 |
| 53 | 022040211B53 | 5.58372 |
| 54 | 2663067DE01D | 5.50621 |
| 55 | C0776A8DD057 | 5.29609 |
| 56 | 96117C9722E1 | 5.61786 |
| 57 | 204C31E521C4 | 5.27659 |
| 58 | C8C12F23551B | 5.70925 |
| 59 | 1217E2F687C1 | 5.51497 |
| 60 | DBF86CB15B3B | 5.57367 |
| 61 | BCC4EC437886 | 5.94074 |
| 62 | AA2734F33EF9 | 5.71983 |
| 63 | CBA739A84A4D | 5.96463 |
| 64 | E12166CA6DF5 | 5.64715 |
| 65 | DE42128CD418 | 5.16399 |
| 66 | F90F21A0B95F | 5.52101 |
| 67 | DCC08885C1D0 | 5.34739 |
| 68 | 152AFEFAA90D | 5.34108 |
| 69 | CB30CE0D8CD2 | 5.89277 |
| 70 | 849C1C0DA6A3 | 5.64765 |
| 71 | B8177804D737 | 5.78193 |
| 72 | 693BE40CEE81 | 5.6998 |
| 73 | 632921AF950C | 6.29239 |
| 74 | C4D296ABB9B0 | 5.55821 |
| 75 | 08DCE8EE0E46 | 5.61434 |
| 76 | 616A6B8637F3 | 5.29314 |
| 77 | DB69C2C67E5F | 5.67251 |
| 78 | B7922C4D47E0 | 5.54227 |
| 79 | 5A4273474A62 | 5.41366 |
| 80 | 50082E465126 | 5.57391 |
| 81 | 2E3844099ABD | 5.27701 |
| 82 | F8EFB7F0CE2F | 5.76264 |
| 83 | 64B7E857C964 | 5.89799 |
| 84 | 5B4DDAF2A8D1 | 6.02566 |
| 85 | B639EE82C328 | 5.71509 |
| 86 | 6414C0DB128C | 6.26365 |
| 87 | 08FEAB4846B9 | 5.5487 |
| 88 | 7E160C4BA0F0 | 5.7677 |
| 89 | 5CCA9AF7C373 | 5.61368 |
| 90 | 21B3DF421DE7 | 5.43398 |
| 91 | 9323DD2F2771 | 5.2348 |
| 92 | A26015CF1514 | 5.78478 |
| 93 | 8220CF898D60 | 5.43634 |
| 94 | 8CCEC410F8A6 | 5.33904 |
| 95 | 4FFDECD6D0E0 | 5.50659 |
| 96 | 42D052099826 | 5.68271 |
| 97 | 8785DFDA586A | 5.2863 |
| 98 | 68DDF31B930F | 5.65759 |
| 99 | F0539BCDAACB | 5.6598 |
| 100 | 372C0613FE2C | 5.21517 |
| 101 | 37402B2A80A9 | 6.29655 |

TABLE 5-continued

| ID cell | sequence | papr |
|---|---|---|
| 102 | 523AE3212125 | 5.41681 |
| 103 | 02EDF46F9694 | 5.47569 |
| 104 | E64CC083190E | 5.71759 |
| 105 | 65DE3871D0D1 | 5.80455 |
| 106 | 7808E3E5FE8E | 5.88159 |
| 107 | 070004E13E81 | 5.79589 |
| 108 | 1CE29934CF8D | 5.33859 |
| 109 | 52B8A394BDBC | 5.9872 |
| 110 | 1A13C7DB3016 | 5.31546 |
| 111 | CE75430244B7 | 5.40294 |
| 112 | DD89BD52F023 | 5.81172 |
| 113 | 6B98276F9841 | 5.59191 |
| 114 | 6610C6E6E48A | 5.56389 |

TABLE 5-continued

| ID cell | sequence | papr |
|---|---|---|
| 115 | D753E680DA0C | 5.15097 |
| 116 | 2C4F3846B73B | 5.61595 |
| 117 | 2CF0C114CDE6 | 5.32662 |
| 118 | 402321DA1EE8 | 5.54017 |
| 119 | 9B1C5FA285FF | 5.46826 |
| 120 | 89CCD4198A39 | 5.81874 |
| 121 | 8CCC9E1070AA | 5.47071 |
| 122 | A6F8618DABA3 | 6.12696 |
| 123 | 068DC6397B4C | 5.86346 |
| 124 | 860C87D27677 | 5.84626 |
| 125 | B28A7B2A0082 | 6.26524 |
| 126 | 1F2FB417DDEB | 6.103 |

TABLE 6

| ID cell | sequence | papr |
|---|---|---|
| 0 | FED4E75A4C6FB2D891E1BE2BAD09E1418101EECB4DF6BB2A382DCB73A27C6870487BAB31BD56A4A715F15A6A4F8A8C482FE54673A6C4 | 5.73908 |
| 1 | 03FD698EE4B0DF6BB22342BC973A23C68505335D561BCD664C725E956684F8A0C880FF54C6FB2D890E1BE6B8D19E1458302FDA9CEF48 | 5.69178 |
| 2 | FDA9CED4B8DF69B122C27CD71A23C2830404DD161BCD664C745D94E644B890D088FF56647B2D892E0BEAB8D29F1418501FCA94EF4B8D | 5.67259 |
| 3 | 07FAD31DD969BAD7654785F94E644F8D0E09673A2C57BAD494E0BE2B4D49F1518901FCA88D76DB122C27C973A33C2830407FAD35DC94 | 5.91286 |
| 4 | F9AE7447850E0C0DF4A6BB92C37DA6C88F0989F121A111F6A8CF75586F359921C97E559830203F9529DE971BECB6A4386F9AEB427851 | 5.55863 |
| 5 | 0487FA932DD165BED664C745F95E644B8B0D54E77A4C77B2D892E1BE2B8D29F1418103FC4B8DB6BB32342BC972A23C68505077A933DD | 5.3082 |
| 6 | FAD31DC971BED3664785F92E7447850E080CBAAC77BACC90E4BD2ACD09B1419109FAA8CDF6DB523C27CD71A33D28B0207FB531DE9519 | 5.5186 |
| 7 | 0F75665BA2CB79ACC88E8BF2BCD89F161811CEF498CF65B125C17D579A53C2830A07F9511B6D7664785F96E7447850E0A0FF5267BB2C | 6.11686 |
| 8 | F1A1C121EEACCB74596FB59911D176539B1020BF9539DE931DECB624386F8AE34A785061A63B92E37DAEC88D0AF25CA8AF1A14101DE9 | 5.69693 |
| 9 | 0C084FD5467BA6C77AAD490E0BF2B4D49D14FD298ED4A8D769B123C2FC973A23CA830404DD165BED6644705F94E6C4B8B0D080FF5465 | 5.92235 |
| 10 | F2DCA88F1A1C141DEB4C7725A6FB55911E141362832213FD519CE9B1DEAB72538AFCAF356040FF4A73B52E35DB6C48F09F25C688F2A1 | 5.50286 |
| 11 | 080FB5666BAAC37BADC98E0BD2ACD09F1419A9CEB498CF65B521C27CD71A33D28B0607F9969BAD7654705B96E744F8D0C090FF5265B8 | 5.19875 |
| 12 | F6DB123C27CD71A33D2830605FA531DA97184705F96E7447890C080F75667BA2CB7DAEC92BCD09D1518105FEA8CEF498EF65B121C17C | 5.44334 |
| 13 | 0BF29CC89F1A1C101FEACCB76596F359911D9A13A2A30203F9539DE931DECB624B82F8AD5060C0DF5A6BBD2E37DAEC88F0BF25CE8AF1 | 5.63328 |
| 14 | F5A63BB2C375AECA8E0BF2DCE88F1A1C121D74D8AF75B929C57C569A93A2A31203F9539CEDB624584F92E746785060C0DF5A6BBD2C35 | 6.0094 |
| 15 | 1F6ACCF75586F359921C97A559B1362832219D69319ECB624384F8AEB467A506040FF4A5375AECA8F0B729CE89F121C121EEA4CB7458 | 5.73209 |
| 16 | E13E6BAD09E9458302FD298EF4A8D769B12173223C6860407BAB32DD965BED764C745D948A0C482FF54E73A4C77B2DC92E0BEABCD29D | 5.82368 |
| 17 | 1C17E579B13E2C32213F5519CE8B15EAB525AEB467A5160C0BF4A63BD2A37DB6C48F09F0F121C101EEA4CF74596F35D911C17E579B11 | 5.47779 |
| 18 | E2C34203ED599EE8B1DEEB726392FCAB3424407F6A53BD2633DB6C4870DF15D68CF4A2C04C7725A6EB5D951E17E5B9D13E3430243FD5 | 5.33406 |
| 19 | 18101FCA8CEF498EF65B925C17C571A13C29FAD35DE971BED3664685792E7447850E080DBAAC379ACC90E4BD2BCD89B1618101FEA8CD | 6.24242 |
| 20 | E644F890C080FF5666BAAC379ACC90E4BD281418103FDA9CEF498DF6DB523C37CD71A33D077A931DD961BAD5654705B96E74478D0C09 | 5.65053 |
| 21 | 1BED3644685F92E7457850E080EF5263B92DC90E0BD2BCD89B1618101FEAACE74D8EF5597C575A33D2830207FA531DA971BED3664585 | 5.524 |
| 22 | E539911E2438203DD5996ECB2DE6BB223A2C2745062417F2A33BD263BD96C48705F55E69C181FEB4D77A5C6FB4D911E17E5B9515E140 | 5.65888 |
| 23 | 109FEAACE7458AF75A921C57E569A93E2830539DE951BED3664784F92E744795060C0DF42CB7DAEC98E8BF2BCD8971218111FEA8CF74 | 5.89291 |
| 24 | EECB4DD6BB2A382DCB73227C4870407FA931BDD6E4A705F95E6A4F8A8C482FF54E73A4C591E13E4B8D19E1418303FD69AEF4B8DF6BB0 | 5.90035 |
| 25 | 13E2830203FD519CE8B15EAB724382FCAD356040FF6A63B52E37DA6C48F09F25C688F0A0EA4CB76586F35D931D176579912E2430203D | 5.62867 |
| 26 | EDB624585F9AE7467950E0C0DF4A6BBD2C358E0BB29CC89F121A101FEA8CF75586F35B91579A53E2930A07F9529DE971BEDB6A4384F8 | 5.79711 |
| 27 | 17E539912E2C34223ED519EE8B0DE6B726393427C526140FF2A73AD2633DB6D48F09F15DA1C141DEB4CF725A6EB55911E17E539D13E0 | 5.45249 |

TABLE 6-continued

| ID cell | sequence | papr |
|---|---|---|
| 28 | E9B19ECB624382FAAF3427C5261407F6A538DA6C88D0AF25CA88F0A14141FEA4C77258 6D1C17A579B1362C32213F5519CE9B1DEEB725 | 5.42528 |
| 29 | 1418101FDA94EF4B8DF6DB121C37CD75A33D07FA933DD969BED7654705B96E64478D 0E09673A2C57AAD494E2BE2B4D49F1418901FCA8 | 5.59438 |
| 30 | EA4CB74586FB59931D176579912E2434223DE9319EEB724B82F8AE34A7C5260407F2A73 8DA6CC8D0AF2DCA8AF0A1C141FEA4C772586D | 6.26907 |
| 31 | 3FD519CE9B1DEAB72538AFCAD352745062403B52A37DB6CC8B0BF25C688F2A0C101BE 94D6F35D931D176539B12E2C30203FD519EE8B0 | 5.83321 |
| 32 | C181FEB4C7725C6FB5D991A15E4B9511E341D599AEAB0DEEB324392FCAB3427C506040 7DD2637D96D48709F35D68CF4A0C0817ED4E75 | 5.57411 |
| 33 | 3C2870606FA531DC961B6D7664685F92E545080FB5466BA2C37BADC98E0BD2ACD09F1 618A9CEF498DF6DB121C37C575A13C28B0207F9 | 5.56542 |
| 34 | C2FCD73A23CA870606FAD31DE971B6D36445E644B890D088FF5466BAAC77BADC90E4 BF281498103FCA94EB4B8CF65B523C37CD71A13D | 5.61602 |
| 35 | 382F8AD352745462417F2A73BD3633D96E495C68CF2A1C1181FEB4D77A5C6DB4D911A1 5E4E2430223FD519EEAB0DE6B724382FCAB3625 | 5.46925 |
| 36 | C6FB6D891E1BE2BAD19E9418302FDA98ED48B22382FCB73223C6860487FA932DD961B ED55F15A6A4E8A8C080FF54E77A6C77BADC92E1 | 5.46318 |
| 37 | 3BD2A35DA6C48F09F25C688F0A1C101BE94C6F359931D176539912E2C30223ED599AEA B024382FAAE34A785261407F6A53BD2E33D96C | 5.66141 |
| 38 | C5064407FAA33DD363BD56A4A715F95A6A4C81FED4E76A5C6BB4D891E13E6B8D11E14 181996E8B0DF6BB22382ECAF3225C5868407FA8 | 6.49919 |
| 39 | 30203FB529D6971BECB6A4786F8AEB467A51F5263B92D37DAECA8E0B72DCC89F121812 1C7458AF75B921C17C579A93A2831203F9519C | 5.45727 |
| 40 | CE74D8CF65B125C17D579A53E2930203FB501B6D7664785792E7447850A0A0EF5A63B9 2CC98E0BF2BCD89B1418101FEA8CE7458EF758 | 6.37869 |
| 41 | 33DD561BDD6648725E9566C4F8A0C884FD54C67B2DA91E1BE2B8D19E9418302FDA98E D48B2A3C2DCB73A23C4860407BA932DD161BED5 | 5.63232 |
| 42 | CD09F1418101FEA8CF7458AF55B921C57C5428B0207FB539DA971BED3664584F92E7447 80F75267BB2C379AEC88E8BB2BCC897161A10 | 5.74245 |
| 43 | 375AAC88F0B729CE89F1A1C101EEACCB7659929C17E579A93A2A3120BFD519DE9B1DE CB5F92E3447950E080DF4A6BB92C36DAEC88D08 | 5.25927 |
| 44 | C90E0BF2BCD09F1418109FAAACF7458AF5587CD75A13D28B0205FB531DA951BED3664 58444F890C080F75267BA2CB79AEC88E0BF2BCD | 5.43386 |
| 45 | 34278506040FF6A53BD2E33DB6D48709F35DA1C141FEA4CF76586EB5D951E16E5B9911 E13F5559CE8B15EAB72438AF8AF35274506040 | 5.40054 |
| 46 | CAF3227C4860447DAA33DD561BDD6E48705C4F0A4C281FE54E77A4C6FB2DA91E1BE6B AD18203FD699EECB4DD6AB223C2DCA73A27C684 | 5.45618 |
| 47 | 203FD539DE9B1DECB724386F8AE34A785061A63B92E36DAEC88F0AF25CA88F0A1C141F E9586F759931C97A579B1362832213FD519CE9 | 6.40321 |
| 48 | DEEB724382FCAB3426C5060427EAAB3DD16148F09F35C684F4A2C0817E94C77A546BB4 D8E539913E2438203FD5996E8B0DE6BB22382D | 5.31582 |
| 49 | 23C2FCB73A23C6870407FA931DC969BED564956684D8A0C880FD5567BA6C57AAD494E 2BD9E9458103FD29CEF4A8D769B322C2FC971A1 | 5.1445 |
| 50 | DD165BCD664C745D95E644F8B0C088FF54647B2D892E1BEAB8D29F1418503FCA94EB4 B8C23C2FC973A23C28504077A933DC961BED764 | 6.44183 |
| 51 | 27C5462407FAA33BD363BDD6C49705F15C69C101BEB4D77A5C6DB5D911A15E4B9511 E340D599EEAB0DE6B724392F4AB3627C5860407D | 5.35096 |
| 52 | D911E17E5B9515E3428203BD498EE4B4DD682F4AB3627C5060427EAAB3DD362BDD6E4 87168CF0A2C181FED4C76A546FB4D991E13E6B9 | 5.42816 |
| 53 | 24382F8AE342785260407F2A7AD2633D96CF25CE88F0A14101DEA4C7725A6EB55911C 151362830213FD519EE9B15EEB525382F8AF35 | 5.58372 |
| 54 | DA6C88F0AF25CE8AF0A14141FEA4C7725A6D1C17A559A1362C32203F5559EE9B1DEEB5 25AEB467A506040BF4A63B52A35DB6CC8F09F1 | 5.50621 |
| 55 | 2FCAF3426C5060407EAA33DD363BD56E4A71684F4A2C081FE94E76A5C6BB4D891E17E4 B9438243DD5996E8B0DE6B326382FCA73627C5 | 5.29609 |
| 56 | D19E14183037D69AEE4B0DB69B32342BC971860447FAB33DD561BCD6E48705F9566C4 F89FE54A77A4C67B2DA90E1BE6BAD09E1418101 | 5.61786 |
| 57 | 2C379AEC88E0BB29CC8971618101FEACCD745B121C37D571A13C2930A07FB529D6971 9ED85792E7447850A080FF5A67B92C375AEC88C | 5.27659 |
| 58 | D2E37D96C48F09F15C68CF4A0C0817E94C75B55911E16E5B9D13E3430203FD4996E8B2 DD382FCAD352745460417F2A339D363BD96E49 | 5.70925 |
| 59 | 2 | 5.51497 |
| 60 | D6E4C705F95E684F8B0C884FF5567BA2C578E13E6BAD09E9458102FDA98EF4B8D769B12 173227C4870487BAB33DD161BED764C705F95 | 5.57367 |
| 61 | 2BCD09F1518905FCA8CEF4D8CF65B125C17C3CA870606FAD35DC961B6D7644685792E 745080FF5667BAAC379ACC98E0BD2ACD09F1618 | 5.94074 |
| 62 | D599AEAB0DEEB326382F4AB3626C5064427DD2633DB6D4870DF15C68CF4A2C1817E94 E75B55911E17E5B9D13E2438243FD599EE8B0DD | 5.71983 |
| 63 | 7FAA739D263BD96E4970DF15E684F0A4C281772586FB5D991A15E5B9D11E3428283BD4 98DE6B724382FCAB3626C5064407EAAB3DD161 | 5.96463 |
| 64 | 81FED4E76A546BB4D991613E6B8D11E14181996ECB2DE6B3263A2ECAF3625C4868407F A8633DD6E4870DF55C694F8A4C281FE54E75A5 | 5.64715 |
| 65 | 7CD75A13D28B0607FA531DE951AED3624784447890C090F75267BA2CB79ACC88E8BF2 9CC18905FCA9CE74D8CF65B121C17D579A13C28 | 5.16399 |
| 66 | 8283FD699EECB0DD6BB22382DCA73A27C685AA339D362BD56A48715F95A6A4E8A0C0 80FCA5C6BB6D991E13E4B9D11E5418303FD69AED | 5.52101 |

TABLE 6-continued

| ID cell | sequence | papr |
|---|---|---|
| 67 | 78D0E080FF5A67B92C37DAEC88E0B729CC88109FAA8CE74D8AF55A929C17C569A13E28 31539DE951AED3624585F9AE74479506080DF4 | 5.34739 |
| 68 | 860407DAB335D561BDD6648725E95E684F88FED4E77A5C6FB6DA90E1BE6BAD19E9418 300EECB0DF6AB2A382DCB73223C4860487FA931 | 5.34108 |
| 69 | 7BADC90E0BEAB8D29F1418103FDA94EB498C23C2FC972A2BC68704077A931DC969BED 56595E684D8A0C884FD5467BA6C57BAD490E2BC | 5.89277 |
| 70 | 85F92E5447850E080EF5A63B92D37DAEC88CCD09B1419109FEA8CE7458AF55A929C57C 5528B0207FA531DE971AEDB624784F92E34679 | 5.64765 |
| 71 | 70DF15E694F8A0C080FE54A75A5C67B6DA91B9515E3438283BD498EE4B0DD6AB223C2 DC8C5864407FAA33DD363BD56A4A715F15E6A4D | 5.78193 |
| 72 | 8E0BF2BCC89F1218111F6A8CF7558EF35B91579A53E2830207F9529D69319ECB6A4784F8 78D0E0A0EF5A67BB2C37DAAC88E0B729CC89 | 5.6998 |
| 73 | 73227C6860407BAB33DD161BED664C705D958A0C082FE54673A4C77BAD892E0BEABC D29D03FD298EF4B0DF69B32342BC972A2BC68504 | 6.29239 |
| 74 | 8DF6DB122C27CD71A23CA870407FA531DE9464C705D95E644F8B0C088FB5666BAAC37 BADBEAB8D29F1498101FDA9CEB4B8DF65B121C0 | 5.55821 |
| 75 | 772586DB4D991A15E4B9D15E1438283FD498DEEB726382FCAB3426C5864427EAAB3DD 36048709F15C68CF4A2C0817ED4C76A546FB6D8 | 5.61434 |
| 76 | 897161A101F6A8CD75586F75B921C97A579830207FB529DE931BEDB6A4384F8AE3467A 50F5263BB2D375AECA8F0BF2DCE89F1218121D | 5.29314 |
| 77 | 74D8EF55B929C17E579A13E2A3020BF9519DEDB664584F92E3467850E0C0DF4A63BD2E 348E0BF2BCD89F161A101F6ACCD7558EF75B91 | 5.67251 |
| 78 | 8A8C082FF54677A6C77BAD890E1BE2B8D29C037D29AEE4B8DF69B22342FC972A2BC68 505335D561BCD664C725F95E6C4F8A0C080FD54 | 5.54227 |
| 79 | 6040FF4A73BD2A37DA6C48F09F25C688F2A0EA4CF76596F359931D176579912E2434223 DE931DECB624B82FAAE3427C5260407F2A738 | 5.41366 |
| 80 | 9E1458103FD298ED4A8D769B122C2FC971A00407BAB32DD965BED6644745D94E644F8 B0C54677A4C77B2D890E1BE2B8D29E1418503FC | 5.57391 |
| 81 | 633D96E4870DF55E684F0A0C281FED4A75A4D911E15E4B9515E1428203BD498EECB0DD 692FCAB3427C5860427EAAB39D363BDD6E4871 | 5.27701 |
| 82 | 9DE971BEDB6A4384F8AEB467A5060C0FF6A537DAACA8F0B72DCE89F1A1C121FEA4CB7 458929C57C569A93E2A30203F9539CE9B1DEEB5 | 5.76264 |
| 83 | 673A6C77AAD494E0BE2BCD09F1518105FEA98DF6DB322C2FC971A23C2870407FA535D E9564C745D94E6C4B890D080FF5666BA2C779AC | 5.89799 |
| 84 | 996ECB0DF6BB223A2FCA73625C4868447DA963BDD6C4970DF15E684F8A4C281FE54A7 7A4D991A17E4B9D11E1428283FD499EE4B0DD69 | 6.02566 |
| 85 | 64C705F95E644F8B0C080FB5667BAAC379ADBEABCD29E1498503FCA9CEB498CF65B123 C0A2BC68504077A933DD961BAD7644785B94E4 | 5.71509 |
| 86 | 9A13E2A30203FD519CE9319ECB724386F8AC50E0C0DF4A63B92C36DAECC8D0BF2DCA8 AF11F6A8CD75586F35B921C97A559A13E2C3020 | 6.26365 |
| 87 | 6F359911C17E539912E2C34223FD599EEAB024B82FAAE34A785261407F6A53AD2E33D96 CF25CE88F0A14141FEA4CF725A6FB5D911C15 | 5.5487 |
| 88 | 91617E6B9D19E54382037D298EF4B0DF6BB0CA73225C4868447DAA335D561BCD6E487 25D4F8A0C280FE54A75A4C6FB6DA91E13E2B8D0 | 5.7677 |
| 89 | 6C48F09F35CE8CF0A0C181FE94C77A586FB417E539913E2C30223ED599EEAB1DE6B7263 934A7C5060407F2A73BD2637DB6D48709F35D | 5.61368 |
| 90 | 921C17E569A13A283120BF9539DE9319EEB5F9AE7447950E0C0FF5A63BD2C36DA6C88F0 88971218111FEACCD7558EF75B921C17E5799 | 5.43398 |
| 91 | 68CF0A0C1817E94E77A546BB6D891613E6B9438243DD599EEBC0DF6B3223A2ECAF3627 C57F2A33BD2633DD6E49705F55E694F0A0C081 | 5.2348 |
| 92 | 969BAD7644705B96E64478D0E080F75265B8AD490E0BF2B4D49D1518905FCA8CEF4D8E F5C27C971A33C2870407FA531DC971B6D76444 | 5.78478 |
| 93 | 6BB22382ECA73227C4860407FAA335D161BC70DF55C684F8A4C281FED4A75A4C6FB2D 891B9D11E1428283FD499EE4B4DF6AB22382DC8 | 5.43634 |
| 94 | 95E684D8A0C884FD5467BA6C57AADC94E2BC9E9458102FD29CED4A8D769B123C27C9 71A00487FAB33DD961BCD664C705F94E644F8B0C | 5.33904 |
| 95 | 407F6A53AD2E37DB6D48F0DF35D68CF4A0C14CF765A6EB5D951C16E5B9D11E3430243 FD4B1DEEB525382F8AD3427C5462407F2A339D0 | 5.50659 |
| 96 | BE2BCD09E1418103FCA9CEF498DF65B121C0A23C68505077A933DC961BAD5644785B9 4E50C880FD5567BA2C57AAD490E2BE2B4D49F14 | 5.68271 |
| 97 | 438203DD4996ECB2DF6BB22382ECA73625C57FAA739D363BDD6E4970DF55C694F8A0 C2807725C6DB5D991A15E4B9515E3428283BD698 | 5.2863 |
| 98 | BD56E4A705F95A684E8A8C480FF54E77A4C591E17E6B9D11E14383037D298EF4B8DB6B B1CAF3225C5860407FAB335D161BCD6E4C725D | 5.65759 |
| 99 | 4785F96E7447890C080F75665BB2C379AEC92BCD09D1518901FEA9CEF4D8CF65B925C1 7D3CA830606FAD31DE961BED7644685F92E745 | 5.6598 |
| 100 | B9511E3438203FD699EE4B0DF6AB2A3C2DC8C5060407EAA33DD362BD56A48715F15A6 A4D81FED4E77A5C6FB6D891613E6B8D19E54180 | 5.21517 |
| 101 | 447890E090F75667BB2C37DACC88E0BB29CC18101FEA8CEF498EF75B121C37C579A13E2 8FAD31DC961B6D3644685F92E74478D0A080D | 6.29655 |
| 102 | BA2C779ADC90E0BF2ACD09B1619109FAAACCF6DB523C27C571A33D2830207FA531DA 95194705B96E6447890C090F75267BA2C37DACC9 | 5.41681 |
| 103 | 4F0A0C080FE54A77A4C6FB6DA90E1BE6B8D18283FD699EE4B4DD6AB223C2FCA73A27C 685AAB39D163BD56E4A705F95A684F8A0C480FC | 5.47569 |
| 104 | B1DEEB724382FCAF342745460407FAA739D06CC8F09F25C688F0A0C181BE94C772586FB 5176539913E2C30203FD519AE8B0DEEB72638 | 5.71759 |

TABLE 6-continued

| ID cell | sequence | papr |
|---|---|---|
| 105 | 4C7765A6EB55951C17E5B9D11E3438243FD4B15EAB72538AF8AD342745462417F2A339 D16CC8F09F35C688F0A0C181FE94D772586DB5 | 5.80455 |
| 106 | B223C2FCB73A23C4860407BA932DD961BCD45F95E6A4E8A0C082FF54E77A6C67B2DC9 0E1D19E5438303FD69AEE4B8DB69B223C2FCB70 | 5.88159 |
| 107 | 48709F15C684F4A2C1817E94C76A546BB4D8E539911E2430243DD499EECB2DE6B32238 2D2745062417FAA73BD263BD96C48705F15C69 | 5.79589 |
| 108 | B624384F9AEB46785060C0FF6A63B52A37D80BF29CC89F1A18101FEA4CB76596F35D911 C9A93E283020BFD539DE9B19ECB624B86F8AD | 5.33859 |
| 109 | 4B0DF69B32342BCB72A2BC2870507FA931DCD6E48725E956684F8B0C880FD55673A6C5 78E1BE2BAD19E9458103FDA98EF4B8DF6DB120 | 5.9872 |
| 110 | B55911C17E5B9913E2430203DD5996E8B2DD38AFCAD342745462417FAA739D363BD96 E495C688F2A1C101BE94C772586DB5D911E17E4 | 5.31546 |
| 111 | 5F95E684E8A8C482FE54677A6C77B2DC90E1D11E54182037D29AEF4B0DB69B22342BCB 70860447DAA335D561BCD6E48725F9566C4F89 | 5.40294 |
| 112 | A1C141DEB4CF76586FB5D911C16E5B9911E13FD519EE9B1DEEB525382FCAD352745062 403BD2E37DB6C48B09F25C688F2A0C101BEB4D | 5.81172 |
| 113 | 5C68CF2A0C181BEB4D77A586DB5D991A15E4E2430223ED519EEAB1DE6B726382FCAF36 2540FF2A53BD2E33D96C4870DF15C684F0A0C1 | 5.59191 |
| 114 | A23C68704077AD33DC961BAD5654705B94E40C884FD54673A6C77AADC94E2BE2B4D4 9F14FDA9CEF4A8D76DB122C2FC971A23CA830604 | 5.56389 |
| 115 | 58EF759931C17E579B1362C30213F5519EE9B6A4786F8AE3467A5060C0BF4A63B52A35D 80BF2DCC89F1A18121EEA4CB74586FB5D911C | 5.15097 |
| 116 | A63B92E36DAECC8D0AF25CE88F0A1C141FE9586F35B931C97A559A1362C30203F5559EE 8B6A4386F9AE3467A516040BF6A73BD2A37D9 | 5.61595 |
| 117 | 5B121C37C579A53C2830A07FB539D69319EC85F96E5447850A080FF5263B92D375AEC88 CCD89F1418109FEA8CF74D8EF75A921C57E54 | 5.32662 |
| 118 | A546FB4D891613E4B8D11E14382037D29AED6B3223A2ECA73225C5868447DAB33DD16 3BC705F15C694F8A4C280FED4E77A4C6FB2D890 | 5.54017 |
| 119 | 50E080DF5A6BB92E37DA6C88D0BF2DCE88F01F6ACCD7558EF75B931C97A579A136283 2209DE9319ECB624784F9AEB467A5160C0FF6A5 | 5.46826 |
| 120 | AEB42785060C0BF4A73BD2E35DA6CC8F09F0F1A1C101FEA4CF74586F359911D17E5399 1120BF9519CE9B19EEB624382FAAF34A785061 | 5.81874 |
| 121 | 539DA951AEDB664584F9AE7447850E0C0DF42CB79ACC98E8BF2BCC8971218111F6A8C D745B125C37D571A13C2830A03FB529DE931BEC | 5.47071 |
| 122 | ADC90E2BE2B4D49F1418905FEA9CEF498CF4C27CD73A23C2830407FAD31DC961BED76 445E6C4B8B0C088FB5667BAAC37BACC90E0BF29 | 6.12696 |
| 123 | 571A13C2830207FB529DE9319ECB6A4784F978D0E080EF5267BB2C375AACA8F0BF29CC 89101FEAACF74D8AF75B921C57C569A93E2830 | 5.86346 |
| 124 | A9CEB498CF65B523C27C571A13C28B0605F8969BAD5644705F96E744F8D0C090F75267 B8AD494E2BF2B4D49F1418105FEA9CE74D8EF5 | 5.84626 |
| 125 | 54E73A6C77B2D892E0BEAB8D09E1498103FC4B0DF6BB323C2BCB73A23C2870407FA933 DCD6648705E956684D8A0C880FD54673A2C778 | 6.26524 |
| 126 | AA339D163BDD6E4A715F15A6A4E8A8C482FDA5C6BB6D991617E4B8D11E14183037D6 9AED6BB26382FCAF3625C5868447FAA33DD163BD | 6.103 |

When the number $N_t$ of the transmit antennas is two and the number of the IFFT/FFT operation points used in the OFDM communication system is 512 (i.e. $N_t=2$, $N_{FFT}=512$), R(r) can be expressed by Equation 7 and T(k) and $q_{ID_{cell}}[m]$ can be expressed by the hexadecimal numbers as shown in Table 7 and Tables 8a and 8b.

$$R(r) = H_{128}\left(ID_{cell} + 1, \prod_{\lfloor \frac{r}{128} \rfloor}(r \mod 128)\right), \quad (7)$$

$$r = 8 * \left\lfloor \frac{m}{9} \right\rfloor + m \mod 9 = 0, 1, \cdots, 191$$

TABLE 7

| ID cell | sequence | papr |
|---|---|---|
| 0 | C88B5B | 4.67601 |
| 1 | 4B943B | 5.01945 |
| 2 | 26A2CA | 4.9099 |
| 3 | ABF43A | 4.9298 |
| 4 | F653DD | 5.58288 |
| 5 | 686FD8 | 5.08845 |
| 6 | 0D2D4F | 5.49959 |
| 7 | E4BEB2 | 5.03402 |

TABLE 7-continued

| ID cell | sequence | papr |
|---|---|---|
| 8 | C68129 | 5.41883 |
| 9 | 6C86BB | 5.41345 |
| 10 | 0211D9 | 5.25745 |
| 11 | 4A0178 | 4.60192 |
| 12 | 71E762 | 5.20474 |
| 13 | 3EBA79 | 5.1286 |
| 14 | 8CF2B6 | 4.94086 |
| 15 | F052BB | 4.73214 |
| 16 | 36BF3C | 5.22147 |
| 17 | 56684C | 5.74529 |
| 18 | 654D89 | 5.24514 |
| 19 | 2781F3 | 4.89117 |
| 20 | 46876A | 4.62728 |
| 21 | CE53D0 | 4.94685 |
| 22 | 523974 | 4.87706 |
| 23 | 4A0453 | 5.02621 |
| 24 | 47F9ED | 5.91721 |
| 25 | BB2C96 | 4.83723 |
| 26 | 48B142 | 5.21914 |
| 27 | FFDA6B | 5.52578 |
| 28 | 8F8DC4 | 4.95493 |
| 29 | 1A1037 | 5.06145 |
| 30 | 50F345 | 5.39428 |
| 31 | 9C2ABE | 5.15445 |

TABLE 7-continued

| ID cell | sequence | papr |
|---|---|---|
| 32 | 97191F | 4.88407 |
| 33 | 61FCD0 | 5.82153 |
| 34 | 6F8969 | 6.25241 |
| 35 | 156F56 | 5.42931 |
| 36 | BC8D17 | 5.08773 |
| 37 | F3092A | 5.05832 |
| 38 | A41DBD | 4.75378 |
| 39 | 6EA1E4 | 4.83662 |
| 40 | 6A29F7 | 5.19888 |
| 41 | 462826 | 4.79626 |
| 42 | 5FB555 | 4.97374 |
| 43 | F3D2C6 | 4.93286 |
| 44 | 0BFE87 | 5.03341 |
| 45 | 92AA64 | 4.93443 |
| 46 | A5D580 | 5.18021 |
| 47 | 6D6DFD | 4.94058 |
| 48 | 6A578D | 5.58274 |
| 49 | 967EE4 | 5.18235 |
| 50 | CE4755 | 6.35302 |
| 51 | 2D6ECE | 5.92368 |
| 52 | 6BA1CF | 6.12984 |
| 53 | 019E02 | 6.09087 |
| 54 | A06B8B | 4.90168 |
| 55 | 9CBA18 | 5.48837 |
| 56 | 05FD60 | 5.16162 |
| 57 | FC2322 | 4.95813 |
| 58 | F0898A | 5.74311 |
| 59 | F22469 | 5.32756 |
| 60 | 57673A | 6.33084 |
| 61 | 1A38DB | 5.56632 |
| 62 | A69433 | 4.90576 |
| 63 | 9B80BB | 4.82736 |
| 64 | 6B75F8 | 4.66086 |
| 65 | DF32CD | 5.28631 |
| 66 | D1F692 | 4.86675 |
| 67 | E6FCC8 | 5.65351 |
| 68 | 08DF3D | 4.79648 |
| 69 | 39CFC0 | 4.95539 |
| 70 | EC8BAD | 5.95318 |
| 71 | 16B9AC | 5.12127 |
| 72 | 6E6D24 | 5.88171 |
| 73 | B2027C | 5.22276 |
| 74 | E05272 | 5.72503 |
| 75 | 859C89 | 5.65769 |
| 76 | 6624DD | 4.98579 |
| 77 | F2D404 | 5.27575 |
| 78 | 8B81D9 | 5.26581 |
| 79 | 5C69D7 | 4.97194 |
| 80 | 645838 | 5.86814 |
| 81 | 8DEFA5 | 4.94176 |
| 82 | 22059A | 5.76969 |
| 83 | 70A052 | 5.26498 |
| 84 | 50E6D6 | 5.65313 |
| 85 | B286FB | 5.2203 |
| 86 | 36016D | 5.00459 |
| 87 | 98D31F | 4.85287 |
| 88 | 6A87B3 | 4.80097 |
| 89 | 958B99 | 5.40979 |
| 90 | 8AB689 | 4.89558 |
| 91 | 570A5C | 4.75712 |
| 92 | 47A9A6 | 5.42678 |
| 93 | 4B2F30 | 5.47629 |
| 94 | 0D6033 | 5.36666 |
| 95 | 3F7DAA | 4.73588 |
| 96 | E64518 | 5.68267 |
| 97 | F94B7D | 4.92173 |
| 98 | 78D213 | 5.38737 |
| 99 | 9EDE1D | 5.05499 |
| 100 | 8E3B36 | 5.76876 |
| 101 | 74AF80 | 5.10266 |
| 102 | CC8769 | 4.89204 |
| 103 | 265829 | 5.3906 |
| 104 | 7CF001 | 5.44668 |
| 105 | B5D0CE | 5.14106 |
| 106 | 43277F | 5.24521 |
| 107 | 015C21 | 4.93279 |
| 108 | A4AB8B | 5.01596 |
| 109 | B3A938 | 5.15091 |
| 110 | 3333D3 | 4.78207 |
| 111 | AFA03D | 5.52105 |
| 112 | 88F995 | 5.11364 |
| 113 | E1668B | 5.77986 |
| 114 | 660486 | 5.54529 |
| 115 | 950A62 | 5.40358 |
| 116 | 8C5ADE | 4.8725 |
| 117 | E5A8B8 | 4.92944 |
| 118 | B829A5 | 6.05407 |
| 119 | F307EB | 5.82622 |
| 120 | B17886 | 5.21061 |
| 121 | D84D1D | 4.76129 |
| 122 | EF6206 | 5.37892 |
| 123 | 4DBF2A | 5.23858 |
| 124 | 99AE0A | 5.42723 |
| 125 | B72333 | 5.34308 |
| 126 | 39157D | 5.3781 |

TABLE 8

| ID cell | sequence | papr |
|---|---|---|
| 0 | FED4E75A4C6FB2D890E1BE2B8D09E9418301EE4B4DD6BB2A382FCB | 4.67601 |
| 1 | 037D698EE4B8DB6BB323C2BC973A23C68504335D163BDD6E48725F | 5.01945 |
| 2 | FD298EF4A8D76DB322C2FC973A23C2830604DD965BCD664C705F94 | 4.9099 |
| 3 | 07FA933DC969BAD7654785F96E74478D0C08673A2C77BADC90E2BE | 4.9298 |
| 4 | F9AE746795060C0FF4A63BD2C37DA6C88F0989F1618111FEACCD75 | 5.58288 |
| 5 | 0407FAB32DD961BCD6644745F94E6C4F8B0D54E77A4C77BAD892E1 | 5.08845 |
| 6 | FA531DC961BED7644785792E74478D0E080DBA2C779ACC98E4BF2B | 5.49959 |
| 7 | 0FF5667BA2C37DACC88E8BB2BCD89F161A10CEF498EF75B121C37C | 5.03402 |
| 8 | F1A1C101EEA4CF76586FB59911C176539911203F9539CE9B19ECB7 | 5.41883 |
| 9 | 0C084FF5467BA6C57AADC90E0BE2B4D49F14FDA98EF4B8DF69B323 | 5.41345 |
| 10 | F25CA88F0A14101FEA4C772586FB55911C1513E2C30213FD519CE9 | 5.25745 |
| 11 | 080FF5466BAAC37BACC90E0BD2ACD09B1419A94EF4B8DF6DB121C2 | 4.60192 |
| 12 | F65B523C37C571A13D28B0607FA531DE97194705F96E6447890E08 | 5.20474 |
| 13 | 0B729CE89F1A1C121EEACCB76596FB59931C9A13E2A3120BF9519D | 5.1286 |
| 14 | F5A63B92C37DAEC88E0BF2DCE89F1218121C74D8AF75B921C57E56 | 4.94086 |
| 15 | 1FEACCF75586F359921C17E559B1362832209DE931BEDB6A4386F9 | 4.73214 |
| 16 | E13E2BAD19E1458302FDA98EF4B8DF6DB32173223C6870487FA932 | 5.22147 |
| 17 | 1C17E559B1362C32203F5559EE8B1DEAB524AE346785060C0FF4A6 | 5.74529 |
| 18 | E2434223ED519EE8B1DE6B724382FCAF342540FF2A53AD2E33D96D | 5.24514 |
| 19 | 18101FEA8CE74D8EF75B921C17C571A13C29FAD35DE971B6D36647 | 4.89117 |
| 20 | E644F890C080FF5666BAAC379ACC90E4BF291418503FCA9CEB4B8C | 4.62728 |

TABLE 8-continued

| ID cell | sequence | papr |
| --- | --- | --- |
| 21 | 1BED7644685F96E7447850E080FF5263BB2DC98E4BD2BCD09B1418 | 4.94685 |
| 22 | E539D11E3430203FD4996E8B2DF6BB22382D2745462417F2A739D2 | 4.87706 |
| 23 | 101FEA8CE74D8AF75A921C17C569A13E2830531DE951BED3624785 | 5.02621 |
| 24 | EE4B4DD6AB223C2FCB73A27C6870487BA931BDD6E4A705F95E684F | 5.91721 |
| 25 | 13E2832213FD519EE9B15EAB72438AFCAD3460C0BF4A73B52E37DA | 4.83723 |
| 26 | ED3664584F9AE3447850E080FF5A63B92C358E0BF29CC897121A10 | 5.21914 |
| 27 | 17E579B13E2C34223FD599EE8B1DEEB326383427C526040FF2A73B | 5.52578 |
| 28 | E9B19ECB624B86FAAF34A78506040FF6A539DAECC8D0AF25CE88F0 | 4.95493 |
| 29 | 1418101FDA9CEB4B8CF65B121C37C571A13C077A933DD961BED765 | 5.06145 |
| 30 | EA4CF74596F359911C17E579B13E2430223DE931DECB624386F8AF | 5.39428 |
| 31 | 3FD519CE9B1DEEB524382F8AF3427C5062403BD2A37DB6CC8F0BF2 | 5.15445 |
| 32 | C181BE94D7725C6FB5D911A15E5B9D11E141D519AE8B1DEEB72639 | 4.88407 |
| 33 | 3C2870606FA531DC971BED7664785F96E544088FF5467BA2C379AC | 5.82153 |
| 34 | C27CD73A23CA870607FAD31DC961BED36445E644F8B0C088FB5467 | 6.25241 |
| 35 | 382F8AD352745460417F2A73BD263BDD6E495C68CF0A1C101FEB4C | 5.42931 |
| 36 | C6FB2DA91E1BE6B8D09E9418102FDA9CED49B22382DCB73227C687 | 5.08773 |
| 37 | 3BD2E37DB6C48B0BF35C688F0A0C181BE94D6F359931C17E539B12 | 5.05832 |
| 38 | C5860427EAA33DD162BD56A48715F95E684D81FE94E77A5C6FB4D9 | 4.75378 |
| 39 | 30207FB529DE971BECB6A4386F8AE3427851F5A67BB2C375AEC88E | 4.83662 |
| 40 | CE74D8EF65B921C37C571A13E2830A03F9511BED7664785796E745 | 5.19888 |
| 41 | 335D561BCD664C725E956684F8A0C880FD54C67B2DA90E13E6BAD0 | 4.79626 |
| 42 | CD09F1419109FEAACF74D8AF75B921C57C552830605FB531DE951B | 4.97374 |
| 43 | 37DAECA8F0B729CE89F1A1C101FEA4CB7658929C57C569A13E2A30 | 4.93286 |
| 44 | C90E0BD2ACD89B1619109FEAACF74D8EF7587CD71A13C2830607FB | 5.03341 |
| 45 | 34A785061407F2A73AD2E33DB6C48F09F35CA14141FEA4C776586E | 4.93443 |
| 46 | CAF3227C4860447DAB33DD561BDD664C705D4F8A0C080FE54A75A4 | 5.18021 |
| 47 | 203FD539CE9B1DECB724386FAAE34A7C5061A6BBD2E37DAECC8D0B | 4.94058 |
| 48 | D | 5.58274 |
| 49 | 23C2BC973A23C68704077AD33DD969BED76495E6C4F8A0C084FD54 | 5.18235 |
| 50 | DD965BCD664C745F94E644F890C080FF56657B2DC90E1BE2BCD09F | 6.35302 |
| 51 | 2745062407FAA739D3633DD6E4870DF55E68C181FE94C77A5C6FB4 | 5.92368 |
| 52 | D911E17E4B9D11E3438283BD698EE4B0DD692FCAF3426C5864427F | 6.12984 |
| 53 | 24382F8AE34278506140FF2A53BD2E37DB6CF25CA88F0A14101FEA | 6.09087 |
| 54 | DAEC88F0AF25CA88F0A14141FEA4CF725A6D1C97A559A13E283221 | 4.90168 |
| 55 | 2FCAB3427C5864407EAAB39D363BDD6A4A70684F0A0C181FE94C76 | 5.48837 |
| 56 | D11E14182037D698EF4B8DF6BB323C2FC971860447FAA335D161BC | 5.16162 |
| 57 | 2CB7DAEC98E8BF29CC897121A101F6A8CF755B121C37C571A13E28 | 4.95813 |
| 58 | D2E37DB6D48709F15C68CF0A0C081FE94C75B5D911C16E5B9913E2 | 5.74311 |
| 59 | 28B0607FB531DA971AED3624784F92E744780F75667BA2CB79ACC9 | 5.32756 |
| 60 | D664C705F9566C4F8B0C084FF54673A6C779E13E2BAD19E9418302 | 6.33084 |
| 61 | 2B4D09D1518901FEA8CE7498EF75B921C17C3CA870407FAD31DE97 | 5.56632 |
| 62 | D599AEAB0DE6B726382FCAB3427C5064407CD2633DB6D48709F35D | 4.90576 |
| 63 | 7FAA339D363BD96E4970DF15C684F0A0C08077A586FB5D991A17E5 | 4.82736 |
| 64 | 817ED4E76A5C6BB6D991617E6B9D11E5418199EECB2DF6BB22382E | 4.66086 |
| 65 | 7CD75A13D28B0607FB531DA971BED362478444F8D0C080FF5665BB | 5.28631 |
| 66 | 8283FD499EE4B0DD6BB2A3C2FCB73227C684AAB39D163BD56A4A70 | 4.86675 |
| 67 | 78D0E0A0EF5267B2C37DAECA8F0BF2DCC588109FEA8CE74D8AF55A | 5.65351 |
| 68 | 860407DAA33DD161BCD6E4C705F95E6C4F89FE54A77A5C6FB6D891 | 4.79648 |
| 69 | 7B2D892E1BEAB8D09F1498501FCA9CEF4B8D23C2FC972A23C28504 | 4.95539 |
| 70 | 85F96E74478D0E080EF5A63B92C37DAACA8DCD89B1618109FEA8CF | 5.95318 |
| 71 | 705F15C694F0A4C280FED4A77A5C6FB2D891B9D11E3428283FD498 | 5.12127 |
| 72 | 8E0BF2BCC89F161A101F6ACCF7458EF75991571A13E2830207F952 | 5.88171 |
| 73 | 73A23C6870407BAB32DD161BCD6644705F948A0C482FF54E77A4C6 | 5.22276 |
| 74 | 8DF6DB322C27C971A23C2870407FA531DE94644745F95E644B8B0C | 5.72503 |
| 75 | 77A586DB4D911E15E5B9D11E1438283FD498DEEB324382FCAB3427 | 5.65769 |
| 76 | 897161A101F6ACCF74586F35B921C17E559830A07F9539DE9719ED | 4.98579 |
| 77 | 74D8EF75B921C17E569A93E2831203FD519CED3624584F92E74478 | 5.27575 |
| 78 | 8A8C080FE54E73A6C77BAD890E0BE2BD09D03FD698EF4B8DB69B3 | 5.26581 |
| 79 | 6040FF4A73BD2E35DA6C48F0BF25CE88F0A1EACCF74596F35D931D | 4.97194 |
| 80 | 9E1458302FD29CED4A8D76DB123C2FC971A00407BAB33DD961BCD6 | 5.86814 |
| 81 | 63BD96C4870DF55C694F8A4C280FED4E77A5D991A17E4B9515E143 | 4.94176 |
| 82 | 9D6931BECB624386F8AE34278506040FF4A537DAAC88F0BF29CE88 | 5.76969 |
| 83 | 673A6C77BAD490E0BE2BCD09F1418101FCA88D76DB123C27C973A2 | 5.26498 |
| 84 | 996ECB0DF6B322382ECAF3627C4860447FA863BDD6C49705F55E68 | 5.65313 |
| 85 | 64C705F95E644B8B0C088FB5466BA2C77BACBEABCD29F1498103FD | 5.2203 |
| 86 | 9A13A2A31203FD539CE9319ECB624382F8AD5060C0FF4A6BBD2C37 | 5.00459 |
| 87 | 6FB59911D17E539912E2C34203FD519AEAB124382F8AF34A7C5261 | 4.85287 |
| 88 | 91617E6B8D19E1438203FD298EE4B0DF6BB1CAF3227C5860407FAB | 4.80097 |
| 89 | 6CC8B09F35C68CF0A1C181BE94C77A586FB517E539913E2C30203F | 5.40979 |
| 90 | 929C17C569A93A2A3020BF9539DE931DEEB4F9AE3447850E080DF5 | 4.89558 |
| 91 | 684F4A0C1817ED4E77A546BB4D891E13E6B8430243DD599EECB0DE | 4.75712 |
| 92 | 961BED5644705F96E744F890E080FF5265B9ADC90E2BE2B4D49F14 | 5.42678 |
| 93 | 6B326382ECAF3227C5860407FAA33DD563BD705F15E694F0A0C080 | 5.47629 |
| 94 | 956684D8A0C884FD55673A6C77AAD490E0BC9E1418303FD298EF4B | 5.36666 |
| 95 | 407F2A73BD2E37DB6D4870DF35D68CF4A0C14CF725A6EB5D911E16 | 4.73588 |
| 96 | BEABCD29E1418503FCA94EF498CF65B521C1A23C2850507FA931DC | 5.68267 |
| 97 | 438243FD599EE8B0DF6B326382ECAF3227C57F2A73BD363BDD6C49 | 4.92173 |

TABLE 8-continued

| ID cell | sequence | papr |
|---|---|---|
| 98 | BD56E4A715F95A684E8A8C480FF54673A6C491613E4B9D11E14383 | 5.38737 |
| 99 | 4785B94E744F8D0E080FF5665BB2CB7DAEC82B4D09D1518905FCA9 | 5.05499 |
| 100 | B9D11E1428283FD698EE4B0DF6BB2A382FC9C5060427FAA33DD362 | 5.76876 |
| 101 | 4478D0E090F75665BA2CB79AEC88E8BF2BCD18901FCA8CE7498CF6 | 5.10266 |
| 102 | BAAC779ACC98E4BD2ACD89B1418101FEAACDF65B523C27CD71A13D | 4.89204 |
| 103 | 4F0A0C280FE54E77A4C67B6D891E1BE2B8D08203BD698EECB0DD6B | 5.3906 |
| 104 | B15EEB72538AFCAD3427C5462417F2A339D06C48B09F25C688F0A1 | 5.44668 |
| 105 | 4CF725A6FB55951C17E5B9D11E3430203DD4B1DEEB52438AFCAF34 | 5.14106 |
| 106 | B223C2DCA73223C6870407BAB32DD165BED55F15E6A4F8A8C482FF | 5.24521 |
| 107 | 48709F15C684F0A0C1817ED4C77A5C6FB4D8E539913E2430203DD5 | 4.93279 |
| 108 | B6A4386F8AE346785060C0BF6A63BD2A37D90BF29CC88F1A18121F | 5.01596 |
| 109 | 4B8DB6BB32342BCB73A2BC2870407FA931DDD6648725F95E684D8A | 5.15091 |
| 110 | B55911E17E539913E3430203FD5996E8B2DD38AFCAD35274506241 | 4.78207 |
| 111 | 5F95A6A4E8A8C482FF54E73A6C67B2D890E0D11E1438303FD698EF | 5.52105 |
| 112 | A1C101DEA4CF72586EB5D951E17E5B9911E13FD519CE9B15EEB525 | 5.11364 |
| 113 | 5CE8CF2A0C101BE94D7725C6FB4D911E17E4E2C30203ED599AEAB1 | 5.77986 |
| 114 | A23C68704077AD33DC961BAD5644705F94E40C880FD54673A6C77A | 5.54529 |
| 115 | 58EF359931C17E559B1362830203FD519EE8B624786F8AE3427A50 | 5.40358 |
| 116 | A6BB92C36DAECC8D0AF25CE88F1A1C101FE858EF759931C97E579A | 4.8725 |
| 117 | 5B925C37C571A53C2930A03FB529DE9319EC85F92E74578D0A080E | 4.92944 |
| 118 | A5C6BB6D991E13E4B8D11E1438203FD298ED6BB223A2ECA73625C5 | 6.05407 |
| 119 | 50E0C0FF5A63B92E37DA6C88D0AF25CE8AF11FEACCF7458EF35B93 | 5.82622 |
| 120 | AEB427A516040BF4A73B52E37DB6CC8B09F0F1A18101EEA4CF7658 | 5.21061 |
| 121 | 539DE951BEDB624584F92E7447850E0C0DF52C379ACC98E8BF29CD | 4.76129 |
| 122 | ADC94E2BE2BCD49F1518105FEA8CE7498EF4C27C971A23C2870606 | 5.37892 |
| 123 | 571A53C2830A07F9539DE931BEDB6A4786F97850A0A0EF5A63BB2C | 5.23858 |
| 124 | A9CEB498DF6DB121C37CD71A33C28B0607F8961BAD5644785B9E6 | 5.42723 |
| 125 | 54E73A6C77B2DC92E1BE2B8D29E1418103FD4B0DB6BB32342BCB73 | 5.34308 |
| 126 | AA339D363BDD6A48715F15A684F8A0C480FDA546FB6D991E17E4B9 | 5.3781 |

When the number $N_t$ of the transmit antennas is three and the number of the IFFT/FFT operation points used in the OFDM communication system is 2048 (i.e. $N_t$=3, $N_{FFT}$=2048), R(r) can be expressed by Equation 8 and T(k) and $q_{ID_{cell}}[m]$ can be expressed by the hexadecimal numbers as shown in Table 9 and Tables 10a through 10d.

$$R(r) = H_{128}\left(ID_{cell} + 1, \prod_{\lfloor \frac{r}{128} \rfloor} (r \bmod 128)\right), \quad (8)$$

$$r = 8 * \left\lfloor \frac{m}{9} \right\rfloor + m \bmod 9 = 0, 1, \cdots, 511$$

TABLE 9

| ID cell | sequence | papr |
|---|---|---|
| 0 | EBB5219015A2CF69 | 5.60481 |
| 1 | E7577012119C2F4F | 5.8025 |
| 2 | 94641A95D3892C4C | 5.39292 |
| 3 | 5605C4FD0295FA2D | 5.70729 |
| 4 | 888E813B80653270 | 6.10319 |
| 5 | 0B89E336263C9B47 | 5.67799 |
| 6 | D02AEC72AA4281DE | 5.95384 |
| 7 | 840A86AB95735147 | 6.34571 |
| 8 | 70DDEEADB853EFD3 | 6.15491 |
| 9 | 2A30262668215D10 | 5.36612 |
| 10 | 3946313945569C2D | 5.64591 |
| 11 | F3A1D436C3335470 | 5.41957 |
| 12 | 06F12B55575C91BC | 6.05684 |
| 13 | 5D1F19936F14DCAD | 5.84532 |
| 14 | 04071D77D7F9A845 | 5.61247 |
| 15 | 497BB95882E4EEAB | 5.6825 |
| 16 | 6412AB106D4D9A28 | 5.92933 |
| 17 | 7DF8E9AFE6C144FB | 5.60962 |
| 18 | 57E378362038C702 | 6.34889 |
| 19 | 3062CAC92903466F | 5.58868 |
| 20 | 0830B23AD7B527D0 | 5.59669 |
| 21 | 27D31A5FF122C9AF | 5.68495 |
| 22 | 3F8D7282F8A55AA0 | 5.89226 |

TABLE 9-continued

| ID cell | sequence | papr |
|---|---|---|
| 23 | 0577DCD47B2A9880 | 5.69177 |
| 24 | 494535D2183E1926 | 5.7183 |
| 25 | DD67204C7744C1BE | 5.63368 |
| 26 | 8B25DD9FD8299E13 | 5.84895 |
| 27 | BC975163654F3B50 | 5.75655 |
| 28 | 93514684AE5B2963 | 5.55524 |
| 29 | 609EE16E059C8767 | 6.46135 |
| 30 | 1085286A62ABABBB | 6.03684 |
| 31 | E8461C82A2EDE3C2 | 6.03297 |
| 32 | F10C200C0A9E51A3 | 5.72795 |
| 33 | 4C34030B53AB1008 | 5.95601 |
| 34 | E0D676AC906B414C | 5.84918 |
| 35 | 33EFF510D0879101 | 6.29841 |
| 36 | 0AAA2E53DFD976A1 | 5.69201 |
| 37 | AE20E9552F8ACBB9 | 6.11009 |
| 38 | 091A43A3363B0B54 | 5.5762 |
| 39 | 1F3F86733D83B67F | 5.34036 |
| 40 | EDDD4EC6D2ED0CA2 | 5.74128 |
| 41 | 2D68F8549B535245 | 6.00089 |
| 42 | E | 5.51124 |
| 43 | 33D3A9D1BB823ECF | 5.61324 |
| 44 | 36F8E824FB016379 | 5.53523 |
| 45 | 02AFFAEFB723B2A4 | 5.6231 |
| 46 | 801426AEF9A6A5B9 | 5.78793 |
| 47 | 35DBBBFE4BD3BAFD | 5.80191 |
| 48 | B81F330CB835F8D5 | 5.83396 |
| 49 | ABB0820EB58B1C1F | 5.61285 |
| 50 | 3A6BA5A0FA06E5F2 | 6.11278 |
| 51 | 42EF0C2E4EB95EC4 | 6.02193 |
| 52 | 85D4C32BEA88C3EE | 5.48754 |
| 53 | 5AA332E1BF1BCAC9 | 5.64628 |
| 54 | 16E626D3EC6652FB | 5.71122 |
| 55 | CBE6AA0BCE5FAA02 | 5.57369 |
| 56 | B65B0A53D4E9992A | 5.65488 |
| 57 | 00DAB2CCA5D49E63 | 5.57148 |
| 58 | 85748563C4F0A429 | 5.6702 |
| 59 | 98BA0BF6BBBD3361 | 5.84405 |
| 60 | 8F797CAB40B4D574 | 6.05648 |
| 61 | AECECD569D866D16 | 6.04214 |

TABLE 9-continued

| ID cell | sequence | papr |
|---|---|---|
| 62 | E74C6A661AABFBF9 | 5.67473 |
| 63 | AFBF1FF4E46B7EF3 | 5.79021 |
| 64 | E8BC2F963DC3B2B2 | 5.75122 |
| 65 | FF647D9DCB1C197B | 5.6339 |
| 66 | E13FDE868A0B285A | 5.68188 |
| 67 | FDB2D14DAD31C90C | 5.71447 |
| 68 | 88FDEEE45D696402 | 5.38298 |
| 69 | CBF0781E4924FF3C | 5.62064 |
| 70 | CC89609F74991315 | 5.88678 |
| 71 | B577961BE45EA101 | 6.06286 |
| 72 | 05AB8E2E7E815CDA | 5.79215 |
| 73 | 776AB333EBD0D162 | 6.00548 |
| 74 | 910E866EDC218A13 | 5.96018 |
| 75 | 495C54826C00A631 | 5.74533 |
| 76 | 014D2CBF069404A3 | 5.49484 |
| 77 | 07C190874A47EE57 | 5.62467 |
| 78 | 995EEF2F3F93BFB7 | 5.68453 |
| 79 | 7DC995D53F521A15 | 5.85155 |
| 80 | 2A0042A7ADEDE1FF | 5.90403 |
| 81 | 7EE84B4717C738B6 | 5.28346 |
| 82 | F8052186C6213917 | 5.93926 |
| 83 | 935FE55981908464 | 6.02626 |
| 84 | 69694DB3D2430639 | 6.14314 |
| 85 | 03C3974B6E111058 | 6.10257 |
| 86 | E1959F9D35447BAC | 5.64685 |
| 87 | 933549D2096A322F | 5.89711 |
| 88 | F13CEADB80EED2AD | 6.30465 |
| 89 | 7B98C279EB0A4646 | 6.06922 |
| 90 | 39A9BAE248C76E99 | 5.62153 |
| 91 | C23060852F7114C0 | 5.67005 |
| 92 | 80CC9CEE7A780885 | 5.53147 |
| 93 | C714F7AF79A08A7E | 5.76285 |
| 94 | 84C665021AEFA304 | 5.78511 |

TABLE 9-continued

| ID cell | sequence | papr |
|---|---|---|
| 95 | 04D180B450A1AC42 | 5.4789 |
| 96 | 7F037D18D5E976C2 | 5.73751 |
| 97 | F9B1FE82309652AC | 5.86339 |
| 98 | 7E6678BC9E8741B9 | 6.23575 |
| 99 | F93C8F1B7E2ACF4E | 5.90959 |
| 100 | 558A22F54AD95EDD | 5.69264 |
| 101 | FB63DFF5745D862D | 5.87696 |
| 102 | 525BE5F24FBE4B35 | 5.75721 |
| 103 | 107FD75A05526625 | 5.65658 |
| 104 | B4CAF64A0A876CE9 | 5.8741 |
| 105 | 013830891D01203F | 5.65109 |
| 106 | 2AABE5C3E581F43E | 5.5524 |
| 107 | 07B814E82987B246 | 5.96707 |
| 108 | 0D585FA19DA3EF6F | 5.70668 |
| 109 | 11A8416C59B13AC7 | 5.89308 |
| 110 | 3AA7C3E1D8173A06 | 5.68576 |
| 111 | E52CFF8D410728B1 | 5.74131 |
| 112 | FF4FBAC747F1B6A1 | 5.75276 |
| 113 | 939EE73168ED4C82 | 5.677 |
| 114 | F2D9CA26BBD7E0B4 | 5.84899 |
| 115 | 1017CD88943EB8CB | 5.58448 |
| 116 | 1048528B06C62235 | 5.68438 |
| 117 | 05C2D808853DE26D | 5.51423 |
| 118 | EC83A9206C61798A | 5.99338 |
| 119 | D8C59BA2C56F312A | 5.6595 |
| 120 | B11A7330D4688023 | 5.81244 |
| 121 | BE74B49A67943688 | 5.63205 |
| 122 | FA432B05366B8852 | 5.76478 |
| 123 | 81BDFB717AEFA474 | 6.03504 |
| 124 | D9E20071558716DA | 5.72503 |
| 125 | BD2ED0EB96F3FCD5 | 5.96824 |
| 126 | C3D51B62C949FCCE | 5.63674 |

TABLE 10

| ID cell | sequence | papr |
|---|---|---|
| 0 | FED4E77A4C6FB2DA91E1BE2BAD19E1458101EE4B0DF6AB22382DCB73A23C4870407BA930BD56A48715F15 E684F8A8C082FE54673A6C4C2FCD71A23CA870607FA535DE961BED36445 | 5.60481 |
| 1 | 03FD69AEE4B0DF6BB32342FC973A23C68705335D563BDD6648705E956684D8B0C080FF54C67B2D891E13E 2B8D19E9418103FDA9CED484705B96E644F8D0E090F75665BA2CB7DAEC9 | 5.8025 |
| 2 | FDA98ED4B8D76DB122C27CD73A23C2870404DD161BCD764C705F94E6C4B890D080FF54657BADC90E1BE 2B8D29F1498101FCA9CEB498D85792E74478D0E080EF5267B92C37DAEC88C | 5.39292 |
| 3 | 077AD31DD961BED7644705B94E64478D0C0967BA6C57AAD494E0BE2BCD49F1518905FCA98D769B122C2 7C973A23CA830407FA535DC958E8BF2BCD89F121A101F6A8CF7458EF75991 | 5.70729 |
| 4 | F9AE3447850E080DF4A6BB92C36DAECC8F0889F1218101F6A8CD75586F35B931C97A579930A03F9529D693 19ECB624786F8AE34678514C7725A6FB55911E16E539D13E3430203DD4 | 6.10319 |
| 5 | 0407BA932DD961BED764C705D94E6C4B890D54E77A6C67B2D892E1BE2B8D29F1418503FC4B0DB6BB2234 2FCB72A23C2870507FAD31DCC98E0BD2BCD89B1619101FEA8CE7458EF759 | 5.67799 |
| 6 | FAD35DC971B6D3644685792E74478D0A0A0CBAAC77BACC98E8BD2ACD09F1619101FAAACCF6DB123C27 CD71A33C2830605FA531DA97180BF29CC88F1218101FEACCF74596FB5D931C | 5.95384 |
| 7 | 0FF5265BA2C37DACC88E0BB29CC89F121A10CEF498CF65B125C37C579A13E2830A03FB511BED3644785796 E5457850E0A0FF5263BB2D1C17E559B1362830213F5559CE8B15EEB725 | 6.34571 |
| 8 | F121C121FEA4CB74586FB5D911D17E57991120BFD539CE9B1DEEB624B82FAAE34A7C5061A6BB92E37DAEC 88D0AF25CE88F1A14101FE9DEEB726382FCAF3627C5864407FAA339D361 | 6.15491 |
| 9 | 0C080FF5467BA2C77AAD490E2BF2B4D09D14FD298EF4A8D76DB322C27C973A23C2870604DD165BED664 C705D94E644B8B0C080FB54655B125C17D579A53C2930203F9539D69319EC | 5.36612 |
| 10 | F25CA8AF1A1C101DEB4C776586EB55951E141362832213F5519CE9B15EAB72538AF8AD356040FF4A63B52E 35DB6C48F09F35C68CF2A099EE8B0DF6BB26382ECA73227C4868447DA9 | 5.64591 |
| 11 | 088FF5667BA2C37BADC98E0BF2ACD09B1419A9CEF498DF65B521C27C571A33D2830607F8969BED5644705 B96E7447890E090F75267B9921C57C579A13E2830203FD539DE9319ECB4 | 5.41957 |
| 12 | F65B121C27C575A33C28B0607FB531DA95194705B96E644F890E090F75665BB2C37DACC92B4D49D151810 5FEA9CE74D8CF75B925C17C50E080DF5A63B92C37DAEC88F0BF2DCE88F0 | 6.05684 |
| 13 | 0B72DCC89F1A1C101FEA4CB74596FB5D931D9A13A283120BF9519DE9B19ECB724382FAAD5060C0FF4A6B BD2E37DA6C88D0BF25CE88F0D599EE8B1DEEB724382FCAB3626C5864407D | 5.84532 |
| 14 | F5263B92C375AEC88E0B729CC88F121C121D7458AF55B929C57C579A13E2A31203FD539DEDB664585F92E 7467950E0C0FF5A6BB92C3517E539B12E2C30203ED519EE8B0DE6B72439 | 5.61247 |
| 15 | 1F6ACCD7458EF359931C17E579B13E2832219DE931BEDB6A4384F9AE346785160C0BF4A437DAAC88E0B72 9CE88F1A1C121EEA4CF745838AFCAF3427C5462407FAA33BD263BD96E49 | 5.6825 |
| 16 | E13E6BAD09E1458102FD298ED4B8D769B32073A23C6860487BAB33DD161BCD7644705D948A0C482FE54E 77A4C77B2DC90E0BEABCD09DFAD31DC971BED3664685792E74478D0A080C | 5.92933 |
| 17 | 1C17E579B13E2C30213FD559EE9B1DEAB524AEB467A5060C0BF4A73BD2A37DA6CC8F0BF1F1A1C121EEA4C F76586FB5D911C1765399117F2A739D2633DD6C4870DF55E694F8A0C281 | 5.60962 |

TABLE 10-continued

| ID cell | sequence | papr |
|---|---|---|
| 18 | E2434203FD519EEAB1DEEB726382F4AB3625407F6A73BD2E33D96C48709F35D684F4A2C04C7725A6EB5591 1C16E539913E3438203DD4BDD6E48705F15E6A4F8A0C080FE54673A6C4 | 6.34889 |
| 19 | 18101FEA9CE7498CF65B125C37C571A13E28FAD35DC961BED3664685F96E54478D0A080DBA2C37BACC98E 0BD2BCD09B1418101FAAACDB624784F8AE3467A506040FF6A63BD2E37D9 | 5.58868 |
| 20 | E644B890C088FB5466BA2C37BADC90E0BD281498103FDA94EB4B8CF65B123C37CD71A33C07FAD31DD96 1BED7654785B96E74478D0C097458AF75A921C57E579A93E2831203F9519C | 5.59669 |
| 21 | 1B6D3664685796E74578D0E080FF5263BB2DC90E0BD2BCD89B1618101FEA8CF74D8EF7597CD75A33D2830 205FB531DA971AED3624784F1A1C101EEACCB74596FB59931C17E579B11 | 5.68495 |
| 22 | E539913E3438243FD599EE8B0DE6BB26382D2745462417F2A33BD263BD96C48705F15E68C181FEB4D77A58 6DB4D991A17E4B9515E141335D561BDD6E48725E95E684F8A0C080FD54 | 5.89226 |
| 23 | 101FAA8CE7458EF55B921C57E579A13E2A31539DE951BEDB664584F9AE744795060C0DF42C37DAEC98E8BB 2BCD897121A101FEA8CF7424B82F8AF34A78506040FF2A53AD2633D96C | 5.69177 |
| 24 | EE4B4DD6ABJ2A382DCB73227C4860407FA931BD56A4A715F15E684F8A8C480FF54673A6C491613E4B9D19E 14182037D29AEF4B8DF6BB0E644B890D088FB5467BA2C37BACC90E4BF28 | 5.7183 |
| 25 | 13E2C30213FD559CE9B15EEB724382FCAF356040BF6A63B52A35DA6C48F09F25CE8CF0A0EA4CF76596F35D 931D176579912E2434203C63BDD6C48705F15C694F8A0C281FED4E77A4 | 5.63368 |
| 26 | EDB624584F9AE34679506080FF4A63BD2C358E8BF29CD89F1618111FEA8CD7558EF75B91579A53C2930A03 F9529D6931BECB6A4384F9A1C101DEB4CF765A6EB55911C17E539913E1 | 5.84895 |
| 27 | 17E539B13E2C34203ED599AE8B1DE6B726393427C5061407F2A53BD2637DB6C48709F35DA14141FEA4C77 6586FB55951C16E5B9D13E1AA339D363BDD6A4A715F15E684F8A0C080FC | 5.75655 |
| 28 | E9B19ECB724382FAAF3427C5061407F2A539DA6CC8D0AF25CE8F0A1C101DEA4C776586C1C97A579A13E2 C32203F5559CE9B1DEAB725684F0A2C081FE94C77A546FB6D891613E6B9 | 5.55524 |
| 29 | 1418503FCA94EB498CF6DB121C37CD75A33C07FAD33DC961BAD5654705F96E644F8D0E08673A2C57AAD4 94E0BF2BCD09D1518905FCA8EDB624584F92E746795060C0FF4A63BD2E35 | 6.46135 |
| 30 | EA4CB74596F359911C17E539912E2434203DE9319EEB624B82F8AE3427C526040FF2A738DA6CC8F0AF25CA8 AF0A1C101FEA4CF725A6D2FCAB3626C5860427FAAB39D363BDD6A4A71 | 6.03684 |
| 31 | 3FD559EE8B1DEAB524382FCAD342745462403B52A35DB6CC8F09F25CE88F0A0C101BEB4C6FB59931C1765 39B12E2C34223ED599EE8B170DF55E684F0A0C281FED4E75A4C67B2DA90 | 6.03297 |
| 32 | C181FEB4D772586DB5D911A15E4B9D15E140D519AEAB0DE6B324382F4AB3426C5864407CD2633D96C48F 09F35C68CF0A0C181FED4E74B223C2DCB73223C4870487BAB32DD161BED5 | 5.72795 |
| 33 | 3C2870406FAD35DC961B6D3664785796E544080FB5466BA2C37BADC90E0BD2ACD89B1619A94EF498DF65 B123C37CD71A33C28B0207F9375AAC88F0B729CC88F1218101EEACCB7458 | 5.95601 |
| 34 | C2FCD73A23C2830406FAD35DC971B6D76644E644F8B0D080FF5666BAAC37BACC98E4BD281498101FDA94 EB498CF65B523C27CD71A33DF5267B92C375AAC88F0B72DCC88F1A1C101C | 5.84918 |
| 35 | 382F8AF352745062417FAA73BD263BDD6E495CE8CF2A1C101FE94D772586DB5D911A15E4E2C34203FD519 AE8B0DEEB324382F4AF3625FED4A75A5C67B2D891E13E2B8D09E1418101 | 6.29841 |
| 36 | C67B2D890E1BE2BAD09E9418302FDA98EF48B22382FCA73A27C6860407FA933DD161BED55F95E684F8A8C 482FF54E77A4C77BAD890E13C2870607FA535DE961BED3664685792E545 | 5.69201 |
| 37 | 3BD2A37DA6CC8F0BF25C688F2A0C101BE94C6FB5D931C17E539913E2434203FD519EE8B124382FAAE34A7 C526140FF2A53AD2E33DB6CB9D15E1428283BD699EECB0DF6BB2A382DC9 | 6.11009 |
| 38 | C5060407EAAB39D163BD56A48715F95A6A4C817ED4C76A546BB6D991E13E6B8D11E14381996E8B2DF6B32 63A2ECA73227C5868407FA97B2D890E0BEAB8D29F1418501FDA94EF498C | 5.5762 |
| 39 | 30203F9539DE971BEDB624386F9AEB467A51F5A63B92C375ACE88F0B72DCE89F1218121D7458AF75B929C5 7C579A93A2A31203F9539D6CC8B0BF35C68CF2A0C101FEB4D77A5C6FB5 | 5.34036 |
| 40 | CEF4D8EF65B925C17D579A53C2930A07F9511B6D7644685F96E74478D0E080EF5267BB2CC98E4BD2BCD09 B1618109FEAACE74D8EF559AE342785060C0FF4A63BD2A37DA6C48B0BF0 | 5.74128 |
| 41 | 335D163BCD6E4C705F9566C4F8A0C880FD54C6FB6DA91E1BE2B8D09E1458103FD29CED48B2A382DCB73A 23C6870407FA933DD161BED52B4D49D1518101FEA8CE74D8CF65B125C17D | 6.00089 |
| 42 | CD89F1618101FEAACE74D8AF75A929C57E542830605FB539DA951AED3664585F9AE746780F75267BB2CB79 ACC98E8BB29CC897161810E9B19EEB624B82F8AF3427C5260407F2A538 | 5.51124 |
| 43 | 375AACA8F0B729CE89F1A1C101FEA4CB7659929C17E569A93A283120BFD519DE9319ECB5F9AE3467950E08 0FF5A6BB92C36DA6C88F08E2430223FD599EEAB0DEEB724382FCAF3625 | 5.61324 |
| 44 | C90E0BF2BCD09F1618109FEAACF74D8AF5587CD75A33C28B0205FA531DA971AED366458444F8D0E090FF5 267BB2C379ACC88E0BB29CD203FD539CE9319EEB724386FAAF34A785061 | 5.53523 |
| 45 | 342785060407F2A73AD2E33DB6C48F0DF35DA1C141FEB4CF725A6EB5D951E16E5B9D13E13FD519EE9B15EE B725382F8AF34274506241A5C6BB6D991613E6B8D19E14382D3D698EC | 5.6231 |
| 46 | CAF3225C4860407DAA335D161BDD664C705C4F0A0C280FE54E77A4C6FB2DA90E1BE6BAD08283FD699EEC B0DD6BB2A382FCA73227C68467BA2C77AAD494E0BF2BCD09F1518901FCA9 | 5.78793 |
| 47 | 203F9539DE931DECB724B86F8AF34A785261A6BB92E37DAEC88F0BF2DCE8AF1A1C141FE8586F759921C97A 579E13E2C30213F5519EE948F09F35D68CF0A2C081FED4E77A5C6FB4D9 | 5.80191 |
| 48 | DEEB326392FCAB3426C5060407FAAB3DD36148709F35D684F0A2C1817E94C76A5C6FB4D8E5B9913E34382 03DD4996E8B2DF6B326382D8A8C482FF54E73A4C67BADC90E1BE2BCD09D | 5.83396 |
| 49 | 23C2BCB72A2BC2870507FA933DD961BAD56495E684D8A0C080FF54673A2C57AADC94E2BC9E9418303FD2 9CED4B8DF69B122C2FC973A10F75265BB2CB7DACC88E0BB29CD89F161A11 | 5.61285 |
| 50 | DD161BED764C705F94E644F8B0C088FB56657BAD892E0BE2B890F2A498103FCA94EB498C23C2FCB73A2BC 28704077A931DC961BED764CD89F1618101FEA8CF74D8EF75B921C17E54 | 6.11278 |
| 51 | 2745460407F2A33BD263BDD6E4870DF55E69C101BE94C77A5C6DB4D911A17E4B9D15E340D519EE8B0DEE B726382FCAB3627C5860407DC67B6D891E1BE6BAD09E9458102FD29CED48 | 6.02193 |
| 52 | D991A15E4B9515E1438283FD499EE4B4DD682FCAF3426C5060427FAA339D362BDD6A4A7168CF4A2C081F E94E76A5C6B4D891E13E4B80487FA932DD161BED764C745F94E6C4F8B0C | 5.48754 |
| 53 | 24386F8AF34A78526040FF2A73AD2633DB6DF25CA8AF1A14101FEA4CF765A6EB55911C1513E2832213FD55 9EE9B15EAB52538AF8AF3581FED4C76A5C6BB6D891E17E4B8D19E14181 | 5.64628 |
| 54 | DA6C88D0BF25CE8AF0A1C141FEA4C7765A6C1C17A579A1362C32203FD559CE9B15EAB725AEB467A5060C 0FF4A63B52E37DA6C48F0BF0430243DD5996E8B2DE6BB263A2FCAF3227C5 | 5.71122 |
| 55 | 2FCAF3426C5860427FAAB3DD362BD56E4A7068CF0A2C081FE94E76A546BB4D891E13E6B9438243DD499EE CB2DE6B326382FCAF3627C554E73A6C67BAD892E0BE2B8D09E1418103FC | 5.57369 |

TABLE 10-continued

| ID cell | sequence | papr |
|---|---|---|
| 56 | D19E14383037D69AEE4B0DF69B323C2BCB71860407DAA33DD163BCD664C705F956684F89FED4E75A5C67B6D890E1BE6BAD09E9418101969BAD5654785B94E7447890E080FF5267B8 | 5.65488 |
| 57 | 2C379ACC88E0BB29CC89F1618111FEA8CF745B921C37D571A13E2830A07F9529DE9719EC85F92E7447850E080FF5A67B92D375AEC88C13E2830213FD559EE8B15EEB724382F8AF35 | 5.57148 |
| 58 | D2E33D96C4870DF15D684F4A2C1817ED4C74B5D911C16E539D11E3430243FD4996E8B2DD38AFCAD342745460407FAA73BD3633D96C48D19E14382037D698EE4B0DB6BB223C2BC971 | 5.6702 |
| 59 | 28B0205FB539DA951AEDB624785F9AE346780F75265BA2CB79AEC98E8BF2BCD897161A10CEF498EF75B921C37D579A13E2930A07F951DA6C88F0BF25CA8AF1A14141FEA4C772586D | 5.84405 |
| 60 | D6E48705E95E6C4F8B0C084FF5567BA2C579E13E6BAD19E9458102FDA98EF4A8DF69B32173227C4860407BA932DD961BED7644745D9418905FCA9CE74D8CF75B125C37D571A53C28 | 6.05648 |
| 61 | 2BCD09F1418905FEA8CEF4D8CF65B925C37C3CA870406FAD35DC971B6D7644785796E744088FB5467BAAC779ADC98E0BD2ACD09F16189D6971BECB6A4784F9AE34278516040FF6A4 | 6.04214 |
| 62 | D599EEAB0DE6B726392F4AF3426C5864407CD2637DB6C48F09F35C684F4A2C0817ED4E74B55911C17E5B9913E2438203FD499EE8B2DD5F95E6A4F8A8C082FF54E77A6C77BAD890E1 | 5.67473 |
| 63 | 7FAA33BD263BDD6E4970DF15E694F8A4C281772586DB5D991E17E5B9D15E3438203FD498DEEB726382F4AF3426C5064427EAAB39D361E13E6BAD19E9458302FDA9CEF4B8D769B321 | 5.79021 |
| 64 | 81FED4E76A5C6BB4D891E13E6B9D19E54180996E8B2DE6BB263A2FCAF3225C5860447FA8633D96E4970DF55C694F8A4C080FE54A77A523C2BCB73A23C2870407FA933DD961BAD764 | 5.75122 |
| 65 | 7CD75A33D28B0607FB531DE971AED36645844478D0E090FF5665BB2CB79ACC98E8BF29CD18905FCA8CEF498EF75B121C17D579A53C28A63B92C37DAEC88D0BF25CE8AF1A1C101FE9 | 5.6339 |
| 66 | 8283FD698EE4B0DD6BB22382FCB73A27C685AAB3DD163BDD6E4A705F95A684E8A0C482FCA5C6BB4D891E13E6B8D11E1418203FD29AED644705F94E6C4B890C080FF5467BAAC37BAC | 5.68188 |
| 67 | 78D0E0A0FF5A67B92D37DAACA8F0B729CE88109FEA8CF7458AF55B921C57C569A93E2831539DA971AEDB664585F92E34679506080DF56FB5D911C17E539913E2430203ED599EE8B0 | 5.71447 |
| 68 | 868407DAA33DD161BCD6E4C725F95E6C4D89FED4E77A4C6FB6DA90E1BE6BAD09E1458100EE4B4DD6BB2A3C2DCB73227C6860487BA931AD494E2BE2B4D49D1418101FCA8CE7498EF4 | 5.38298 |
| 69 | 7BADC90E0BEAB8D29F1498503FDA94EB498C2342FCB73A2BC28504077A931DD969BED7649566C4D8A0C880FD55673A2C77AAD494E0BC28B0607FB539DE971BED3624785F9AE74478 | 5.62064 |
| 70 | 85F96E54478D0E080EF5A63B92C37DAAC88DCD09F1618101FAA8CE74D8AF55B929C57E552830607FB531DE951AEDB624585F9AE34479EA4CB74596F359931D176539913E2434203D | 5.88678 |
| 71 | 70DF15E694F0A4C081FE54E77A5C67B6DA91B9D11E1438203FD698EE4B0DD6BB2A382FC9C5864427EAA33DD162BD56E48715F95E6A4CFDA98EF4A8D769B123C27C971A23C2830405 | 6.06286 |
| 72 | 8E0BB29CC8971618111FEA8CF7458EF35B91579A13C2830A07FB529D6931BECB6A4786F87850E0A0FF5A67BB2C37DAAC88E0B729CC893F5559CE9B1DEEB52438AFCAD3527C506240 | 5.79215 |
| 73 | 73227C6870407FAB33DD165BED664C705F948A8C082FF54673A6C77B2D892E1BE2B8D29C03FD69AEE4B8DB6BB323C2FC973A23C28504BAAC779ADC90E0BD2BCD09F1618101FAAACC | 6.00548 |
| 74 | 8DF69B123C27C971A33C2830406FAD35DE9464C705D94E644F8B0C080FF5666BAAC77BACBEABCD09F1498501FCA94EB4B8CF65B121C178D0A080EF5A63BB2C375AAC88F0B729CE89 | 5.96018 |
| 75 | 7725C6DB4D991A15E5B9515E1438283FD498DE6B724392F4AF3426C5860407EAA339D3604870DF35C68CF4A0C0817E94C76A546BB4D873A23C6860407FAB32DD161BED7644705D95 | 5.74533 |
| 76 | 8971218101F6A8CD75586F6759921C97E559930203FB529DE9719ECB6A4386F9AEB467A51F5263B92C375AECA8E0BF29CC89F121C101CB15EAB524382FCAD3427C5062407F2A33BD1 | 5.49484 |
| 77 | 7458AF55A921C57E579A93E28302039F5519DEDB624585F92E3447850E080DF4A63BD2E358E0BF29CC89F121A101F6ACCD74586F75B9134A7C526040FF6A73AD2637D96C4870DF35D | 5.62467 |
| 78 | 8A8C080FF54E73A4C77B2DC90E1BEABCD29C03FD69AEE4B8DF6BB32342BCB72A2BC68705335D163BDD6E4C725F95E684D8B0C080FF55F6DB123C37CD75A33D28B0207FB531DE9719 | 5.68453 |
| 79 | 6040F6A73BD2E35DB6CC8F09F25CE88F0A1EACCB74596F35D911D17E579913E2434203DE9319EEB724B86FAAF3427C5061407F2A738D911A15E5B9D11E3428203BD499EE4B4DD69 | 5.85155 |
| 80 | 9E1418302FDA98EF4A8D769B122C27C971A00407FA932DD161BED664C705F94E644F8B0D54E73A6C67BADC90E1BEABCD29E1498501FD1BED7664685792E54578D0E0A0FF5A67BB2D | 5.90403 |
| 81 | 633DD6E4970DF55E684F8A4C280FED4A75A4D911E15E4B9D11E3438203FD498EE4B4DF692F4AB3427C5064427FAAB3DD162BD56E4A719E1418303FDA98ED4A8DF69B323C27CD73A0 | 5.28346 |
| 82 | 9DE971BEDB6A4384F8AE34278506040FF4A5375AACA8E0B729CC89F1A18101EEA4CF7658929C57C569A13E2A30203F9539CE9319ECB55C688F2A1C181BE94D772586DB5D911E17E5 | 5.93926 |
| 83 | 67BA2C57BAD490E2BF2B4D49D1518905FEA98DF6DB322C27CD71A33C2870407FAD31DC9564C705D94E644B890D088FB5467BA2C379AC579A13C2830207F9529D6971BECB624784F8 | 6.02626 |
| 84 | 996ECB2DE6BB22382FCA73627C4868407DA9633DD6C4870DF55C694F8A0C281FE54A77A5D991E15E5B9511E3428203FD498EE4B0DF69956684D8A0C084FF54673A2C77BADC90E0BD | 6.14314 |
| 85 | 644705D94E644B8B0D088FF5466BA2C37BADBEAB8D09F1418503FDA94EF498CF6DB123C1A23C6870407FAD33DC961BAD5654705B94E5101FAA8CF7458AF55A921C57C579A93A2830 | 6.10257 |
| 86 | 9A93E2A30203F9519DE9B19ECB724386F8AD50E080DF5A6BBD2E37DAEC88D0BF2DCE88F11F6A8CF75586F759931C17E559A1362C3020D2637DB6D48F09F35D68CF0A2C081FED4C74 | 5.64685 |
| 87 | 6FB59911D176539B13E2430223FD519EE8B124386F8AE34A78506140FF6A53BD2633DB6CF25CA88F0A1C101DEB4C7765A6EB5D911E14C5060427FAA339D362BD56A4A705F95E6A4D | 5.89711 |
| 88 | 91E17E6B9D11E14183037D29AEF4B8DF69B0CAF3627C4868407FAA33DD561BDD6E48725D4F8A0C080FE54A75A4C6FB6DA90E1BE6BAD007FAD31DD961BAD7644785B96E644F8D0C09 | 6.30465 |
| 89 | 6C48F0BF35CE88F2A1C181BE94D77A586DB417E579912E2430223ED519EEAB1DEEB3243934A7C526040FF2A73BD2633D96C48F09F35C8203FD498EE4B4DF6AB223C2DCA73227C684 | 6.06922 |
| 90 | 921C17E579A93A283120BF9539CE9B19ECB5F9AE3467950E080FF4A6BBD2E36DA6C88F088971618101FEA8CD7458EF759921C17E5799407F6A73AD2E37DB6C48F09F15D68CF0A0C1 | 5.62153 |
| 91 | 68CF4A0C0817E94E76A546BB6D991613E4B8430243FD4996E8B0DE6BB22382ECA73625C57F2A33BD263BDD6E49705F55E694F0A0C0814B0DB69B32342FC972A2BC68504077A931DC | 5.67005 |
| 92 | 969BAD5644705B94E644F8D0C080FF5665B8ADC90E0BF2BCD49D1418905FEA8CEF4D8EF4C27CD73A33CA830606FA535DE971BED364448971218101FEA8CD7458EF359921C17E5599 | 5.53147 |
| 93 | 6BB26382ECA73627C5860407DAB335D561BC70DF55E694F0A4C281FED4A77A4C6FB6DA91B9515E3438283BD499EECB0DF6AB22382DC80C880FD5467BA2C77AAD494E2BF2BCD49F14 | 5.76285 |

TABLE 10-continued

| ID cell | sequence | papr |
|---|---|---|
| 94 | 95E684D8A0C084FD5467BA6C57AAD494E2BC9E1458302FD29CED4B8D769B122C27C973A00407BA933DD961BED664C745F94E6C4F8B0DCEF498EF65B121C37D571A13C2830207F950 | 5.78511 |
| 95 | 407F2A53AD2637D96C48F0DF15D684F0A0C14CF72586EB55911C16E5B9913E3430243DD4B15EEB525382F8AD3427C5062407F2A339D191E13E36B8D19E54182037D698EE4B0DB6BB0 | 5.4789 |
| 96 | BE2BCD29F1498503FDA94EB498CF65B123C1A23C6870507FAD31DD961BAD5654785B94E40C884FD55673A6C57BADC94E2BE2BCD09D15531DE971BED3664784F9AE74478506080FF4 | 5.73751 |
| 97 | 438243FD599EE8B0DF6BB223A2FCA73225C57FAA73BD363BDD6E4870DF15C684F0A0C280772586FB5D911A15E4B9D11E1438203FD698D664C705F956684F8A0C880FF5467BA6C578 | 5.86339 |
| 98 | BD56E4A715F95E6A4E8A0C482FE54677A6C491617E6B9D19E1418203FD29AEF4B8DF69B0CAF3225C5868447FAA33DD161BCD664C725D1418501FCA94EB498DF6DB123C37CD71A13D | 6.23575 |
| 99 | 4785F96E744F890C090F75267BB2CB7DACC82BCD09D1418905FEA9CE7498CF75B921C37D3C2870607FAD35DE961B6D3664685F92E7441FEACCD7458EF75B931C17E559A13E2C3220 | 5.90959 |
| 100 | B9515E1438203FD499EECB0DD6AB2A382FC8C5060427EAA339D362BDD6E4A715F15E684D817ED4C76A5C6BB6D891E17E4B9D19E14181DD165BCD764C745F94E6C4F890D088FF5465 | 5.69264 |
| 101 | 44F8D0E090FF5267BB2C37DAEC88E0BB2BCD18905FCA9CEF4D8EF75B925C37D571A53C29FA535DE971B6D7644685796E54578D0E080D58EF359921C17E579A1362832203FD559CE9 | 5.87696 |
| 102 | BA2C779ADC90E0BF2ACD09F1419109FAAACDF6DB523C27C575A13D28B0607FB531DA97184705F94E644F8D0E090FF5267BB2CB7DAEC89A13E283020BF9539DE9319EEB724386F8AD | 5.75721 |
| 103 | 4F0A0C081FE54A75A4C67B6DA91E1BE6BAD18283FD499EE4B4DF6BB223C2DCB73A23C684AA339D162BD56E48715F15E684F8A0C082FC8D76DB322C27CD73A23C2830606FA535DC95 | 5.65658 |
| 104 | B1DEAB725382FCAD3427C5460407FAA33BD06CC8F0BF35C68CF2A0C101FE94C77A586FB4176539912E2C30223ED599AE8B0DE6B726394F0A4C6FB6DA90E1BE2B8D1 | 5.8741 |
| 105 | 4C772586EB55911C17E539913E3438203DD4B15EAB725382F8AD3427C5060407FAA339D16C48B09F35CE8CF0A1C101BE94C772586DB5CA73227C4860407DAA335D163BDD6E4C725D | 5.65109 |
| 106 | B22382FCA73A23C6860487BAB32DD961BED55F95E6A4E8A0C480FF54E77A4C67B2D892E1D19E54382037D698EF4B8DB69B22342BC971088FF5667BA2C779ACC90E0BF2BCD89F1618 | 5.5524 |
| 107 | 48709F15C684F4A2C181FE94E77A5C6BB4D8E539911E3430243DD499EECB2DE6BB22382C2745062407FAA339D363BD96C48705F55E6903FD29AEF4B0DB6BB22342FC972A23C68704 | 5.96707 |
| 108 | B624384F8AEB4678516040FF4A73BD2A35D80B72DCC89F1A1C121FEACCB76586F359911D9A93A283120BFD519DE9B19EEB624382FAADC181FEB4C77A5C6FB5D911E17E4B9D15E341 | 5.70668 |
| 109 | 4B0DB69B32342BC973A2BC2870407FA931DCD664C705E956684D8B0C084FF5467BA6C578E13E6B8D19E9418103FDA98EF4B8D769B121447890E090FF5267BA2CB7DACC88E0BF2BCD | 5.89308 |
| 110 | B55911E17E5B9913E2438203FD4996ECB2DD38AFCAD342745062417FAA73BD2633D96C495CE8CF0A1C181BE94C772586DB5D911E17E5860407FAB33DD163BCD6648705E9566C4F88 | 5.68576 |
| 111 | 5F95E6A4E8A0C480FF54673A6C67BADC90E0D19E5438303FD69AEF4B8DB69B223C2FC971860447DAA335D161BDD6648705E9566C4F89A94EB4B8CF6DB121C27CD71A33D2830205F9 | 5.74131 |
| 112 | A | 5.75276 |
| 113 | 5CE88F0A1C101BEB4D77A586DB5D991E17E4E2C34223ED519EEAB1DE6B326392F4AB3425407F6A73AD2E33D96C48F0DF35C68CF4A0C1EE4B4DD6AB2A3C2DCA73A23C4860407BAB30 | 5.677 |
| 114 | A2BC68705077A933DC969BED5654785B94E50C884FD5467BA2C77AAD490E2BE2B4D49F14FDA98EF4B8DF69B323C2FCD71A33C28706052CB7DAEC88E0BB29CC89F121A111F6ACCD74 | 5.84899 |
| 115 | 586F359931C17A559A1362830213F5559EE9B6A4784F8AEB46785160C0BF4A63BD2A35D80BF29CC89F121C101EEA4CB76596FB5D931C27C5062417FAA339D263BDD6C4870DF15E69 | 5.58448 |
| 116 | A63B92C37DA6C88D0AF25CE88F0A1C101DE8586F759931C17A579A13E2830203FD519EE9B624384F8AE3467A5060C0FF4A63B52E37D8E539913E2430203FD4996E8B2DF6B326382D | 5.68438 |
| 117 | 5B121C17C571A53C2930A07F9529D6931BEC85F96E54578D0A080EF5263B92C37DAAC88CCD89B1418101FEA8CF7458AF75B929C57C5560C0FF6A63B52A37DA6C48F0BF75CE8CF0A1 | 5.51423 |
| 118 | A5C6FB6D891E17E4B8D19E14182037D29AED6BB223A2ECAF3225C5860407FAA335D161BC705F55E684F8A4C080FE54E77A4C67B2D891A23C6870507FA931DD969BAD5644785B96E4 | 5.99338 |
| 119 | 50E0C0DF5A6BB92C36DAECC8D0AF25CE88F11FEA8CD7558EF35B931C97A579A1362832209DE9719ECB624784F9AE3467A5060C0FF6A5B55911E17E539911E3430203FD499EEB2DC | 5.6595 |
| 120 | AEB427A516040BF4A73B52A35DB6CC8B0BF0F121C121FEA4CB76596F359931D17653991020BFD519DE931DECB624386FAAE34A78506077A586DB4D911A15E4B9511E3428203BD699 | 5.81244 |
| 121 | 539DA971BEDB664784F92E746795060C0DF42CB79AEC98E0BF29CC89F1218111FEA8CF745B125C37C571A53E2930A03F9539D69719ECF25CA8AF1A14141FEA4CF72586DB5D911C14 | 5.63205 |
| 122 | ADC94E2BF2BCD09F1418105FCA8CE7498EF5C27C973A23CA830607FA531DC961B6D76445E644B8B0D080FF5666BA2C77BACC98E0BF2930A03F9529DE9319ECB624784F9AE3427A50 | 5.76478 |
| 123 | 579A13C2830203F9539DE931BEDB6A4784F978D0E0A0FF5A63BB2D375AECA8F0B729CC89101FEAACF74D8AF75A929C57E569A93E2A313BD2A37DA6C48F09F25C68CF2A1C101FE94C | 6.03504 |
| 124 | A9CEF498DF6DB121C37CD75A33C2830207F8961BAD5644705B94E64478D0E090F75265B9AD494E0BF2B4D49D1518901FCA8CE74D8EF5F92E344795060C0FF4A6BBD2C37DAEC88F08 | 5.72503 |
| 125 | 54E73A6C77BADC90E1BE2B8D29E1498503FC4B8DF69B32342BC972A2BC6870407FA933DDD6E48705F9566C4F8A0C884FF55673A2C7797CD75A33D28B0605FA539DE951BED3664585 | 5.96824 |
| 126 | AAB3DD162BD56A4A715F95E684F8A0C480FDA546BB4D991E13E6B9D11E54382037D29AEC6BB26382ECAF3225C5860447DAA33DD161BDBEABCD29F1498501FCA9CEF498CF6DB523C0 | 5.63674 |

When the number $N_t$ of the transmit antennas is three and the number of the IFFT/FFT operation points used in the OFDM communication system is 1024 (i.e. $N_t=3$, $N_{FFT}=1024$), R(r) can be expressed by Equation 9 and T(k) and $q_{ID_{cell}}[m]$ can be expressed by the hexadecimal numbers as shown in Table 11 and Tables 12a and 12b.

$$R(r) = H_{128}\left(ID_{cell} + 1, \prod_{\lfloor \frac{r}{128} \rfloor}(r \bmod 128)\right), \quad (9)$$

$$r = 8*\left\lfloor \frac{m}{9} \right\rfloor + m \bmod 9 = 0, 1, \cdots, 255$$

TABLE 11

| ID cell | sequence | papr |
|---|---|---|
| 0 | CB8FEAC7 | 5.15583 |
| 1 | 06F43328 | 5.62342 |
| 2 | AFED6295 | 6.22365 |
| 3 | 3E322540 | 5.26289 |
| 4 | D2593855 | 5.19138 |
| 5 | FA1F55C8 | 5.05749 |
| 6 | 0D610CCC | 5.57522 |
| 7 | 38373635 | 5.01025 |
| 8 | C7B4744C | 5.01551 |
| 9 | 6C90FCBB | 5.20449 |
| 10 | 8122195F | 5.04695 |
| 11 | 0AA54C3F | 4.66825 |
| 12 | 94520024 | 4.84099 |
| 13 | 281008C9 | 5.29972 |
| 14 | 1C4B2890 | 5.25349 |
| 15 | 905AEC6F | 4.84371 |
| 16 | BD30B2CD | 5.44488 |
| 17 | 69E8C548 | 5.37924 |
| 18 | E6CA997C | 4.68891 |
| 19 | 26A6D0C0 | 4.93526 |
| 20 | 628666E5 | 4.4603 |
| 21 | EE5304A7 | 4.97386 |
| 22 | 48CB3622 | 5.08221 |
| 23 | DFA0D85E | 5.00963 |
| 24 | 0B906505 | 5.36358 |
| 25 | 392C146F | 4.93658 |
| 26 | 6AB8723D | 5.64086 |
| 27 | D2034CC0 | 5.28929 |
| 28 | 9BD1CBA9 | 5.17126 |
| 29 | B4D7CB69 | 5.56246 |
| 30 | A9ED8CD3 | 5.289 |
| 31 | 7F0397C9 | 5.49132 |
| 32 | 1782D4F5 | 4.90867 |
| 33 | 41C19746 | 5.29604 |
| 34 | 6F63CFD4 | 6.46788 |
| 35 | C7D92076 | 5.21648 |
| 36 | 3A995F69 | 5.28823 |
| 37 | BD19FAC6 | 5.25253 |
| 38 | 345AEECD | 5.28582 |
| 39 | 2F2F9452 | 4.68278 |
| 40 | 2D186366 | 5.15683 |
| 41 | 342FF0D6 | 5.12173 |
| 42 | 449E81E3 | 4.86028 |
| 43 | 85D9863D | 4.80846 |
| 44 | 32B7E693 | 4.66558 |
| 45 | 3F09AA6E | 5.26735 |
| 46 | 8087F514 | 5.12159 |
| 47 | 7CA91C83 | 5.28859 |
| 48 | 2EE7B95F | 5.27919 |
| 49 | 72D518D7 | 5.17632 |
| 50 | B22A330D | 6.8988 |
| 51 | 2A84826E | 5.28768 |
| 52 | 6A786C7F | 5.83993 |
| 53 | 04020217 | 6.1875 |
| 54 | 64E34E15 | 5.03925 |
| 55 | E2CA18D3 | 5.30496 |
| 56 | 37AC5222 | 5.2167 |
| 57 | 7011A0E9 | 4.86805 |
| 58 | 90841BE9 | 5.32789 |
| 59 | B2C87A9D | 6.12947 |

TABLE 11-continued

| ID cell | sequence | papr |
|---|---|---|
| 60 | F56D3C21 | 6.3528 |
| 61 | 9DC9D0A2 | 5.47964 |
| 62 | B2853B2F | 5.22007 |
| 63 | BBC475D3 | 5.53568 |
| 64 | AE4A4E9B | 5.59729 |
| 65 | 9933A60C | 5.25657 |
| 66 | F1978F10 | 4.7959 |
| 67 | 6C1DCD04 | 5.10028 |
| 68 | 2515AE3B | 5.04345 |
| 69 | 0874401E | 4.67421 |
| 70 | AC11ED65 | 5.9294 |
| 71 | 96211791 | 5.1407 |
| 72 | 69AFE10C | 5.64556 |
| 73 | B3D51D76 | 5.29334 |
| 74 | 8113FF9E | 5.09747 |
| 75 | 1D9EFBDD | 5.18707 |
| 76 | 234549EE | 4.78454 |
| 77 | 927475FD | 5.39462 |
| 78 | B1404944 | 4.95295 |
| 79 | 552815A4 | 6.2202 |
| 80 | 470610E6 | 5.62302 |
| 81 | 7EEF9D4B | 4.88997 |
| 82 | 68645A2C | 6.07151 |
| 83 | 4435E7A5 | 5.63064 |
| 84 | C8E58BB3 | 6.80605 |
| 85 | 948EFBB2 | 5.57596 |
| 86 | C1917FF7 | 5.48329 |
| 87 | 6C9AE67E | 4.93469 |
| 88 | 44BFEAC7 | 5.54454 |
| 89 | 565B8F5E | 5.89093 |
| 90 | A8F39A23 | 4.67016 |
| 91 | 269FE877 | 4.88909 |
| 92 | 13EAF0DF | 4.91822 |
| 93 | 624FDBA7 | 4.997 |
| 94 | 9CF725BA | 5.13808 |
| 95 | D0FDA9AC | 5.03832 |
| 96 | F8806BAD | 5.15283 |
| 97 | AD29F883 | 4.95856 |
| 98 | CCB14BB9 | 4.83304 |
| 99 | FE9E4FBA | 5.31628 |
| 100 | 1A345FA7 | 5.13454 |
| 101 | E12EF826 | 5.34722 |
| 102 | DC6A6A85 | 5.07414 |
| 103 | 2E7DDFA4 | 5.20743 |
| 104 | 6D79E1F4 | 5.22863 |
| 105 | 4FDCB0E0 | 5.22455 |
| 106 | 53076335 | 5.35733 |
| 107 | 025C0A04 | 5.74473 |
| 108 | 24190046 | 4.48846 |
| 109 | 733AE2B4 | 5.30588 |
| 110 | 29A991FE | 4.82382 |
| 111 | D5E8E325 | 5.23798 |
| 112 | F94B8091 | 4.77719 |
| 113 | 09EB2797 | 5.51662 |
| 114 | 538A66AA | 5.86963 |
| 115 | D49EFACF | 4.88564 |
| 116 | 2E5E8F59 | 5.24587 |
| 117 | D2250855 | 5.11869 |
| 118 | 50031D89 | 5.26554 |
| 119 | D3FC03A0 | 5.03861 |
| 120 | 9148DD11 | 5.15572 |
| 121 | FC0DD67A | 5.1763 |
| 122 | B3620135 | 4.73865 |
| 123 | 9B9DD357 | 5.48933 |
| 124 | BFCBF0BE | 5.34988 |
| 125 | 371AB31A | 5.35378 |
| 126 | 38101882 | 5.49554 |

TABLE 12

| ID cell | sequence | papr |
|---|---|---|
| 0 | FED4E75A4C6FB2DA91E1BE2B8D09E9458301EECB4DF6AB2A382FCA73A27C4860407FAB31 | 5.15583 |
| 1 | 037D298EE4B0DF6BB223C2FCB73A23C68504335D163BDD6648725F956684F8A0C880FD54 | 5.62342 |
| 2 | FDA98EF4A8DF6DB323C2FCD73A23CA870405DD165BED6644705F94E6C4B890D080FF5465 | 6.22365 |
| 3 | 077A933DD969BED7644705B96E7447890E08673A2C77AAD494E0BF2B4D49D1418101FCA8 | 5.26289 |
| 4 | F9AE74479506080FF4A63BD2C37DAEC88D09897121A111FEA8CD74586F759931C17E5599 | 5.19138 |
| 5 | 0487FAB33DD961BED6644705D95E6C4F8B0D54677A4C77B2DC90E1BEABCD09E1498101FC | 5.05749 |
| 6 | FA531DC961BED7644785796E7447850A080DBA2C379ACC98E4BD2ACD89F1418109FEA8CC | 5.57522 |
| 7 | 0F75267BB2CB79ACC88E0BB2BCD897161A11CE7498EF75B125C37C571A13E2930207F951 | 5.01025 |
| 8 | F1A1C101EEA4CF76596FB59931D176579910203FD539DE931DECB624386F8AE34A7C5060 | 5.01551 |
| 9 | 0C084FF5467BA6C57AADC90E0BF2B4D09D14FDA9CEF4B8DF6DB122C2FC973A33CA830605 | 5.20449 |
| 10 | F2DCA88F0A14101DEB4C7725A6EB55911E141362830213FD519CE9B15EEB52538AFCAF35 | 5.04695 |
| 11 | 080FB5466BAAC37BACC98E0BF2ACD09F1419A94EF498C6FDB521C27C571A33D28B0607F9 | 4.66825 |
| 12 | F6DB121C37C575A13C2830605FB531DA97184705B94E6447890C080F75267BA2C37DACC8 | 4.84099 |
| 13 | 0B729CE88F1A18101EEA4CB74596F359911C9A13A283020BF9519CE9B1DECB624B82F8AD | 5.29972 |
| 14 | F5263B92D37DAEC88E0B72DCC88F1A18121D7458AF75A929C17C569A93A2831203F9519C | 5.25349 |
| 15 | 1FEA8CD75586F359921C17E559B13E2832209DE971BECB6A4784F8AE3467A5060C0FF6A5 | 4.84371 |
| 16 | E1BE2BAD19E9458103FD298EF4B8D769B12073A23C6870407BAB32DD965BCD664C745D95 | 5.44488 |
| 17 | 1C17E579A13E2830213FD559EE8B1DEAB524AEB4678506040FF4A73B52E35DA6CC8B09F0 | 5.37924 |
| 18 | E2C34223ED519EEAB0DEEB724382FCAB362440FF2A53BD2E33D96D4870DF35D68CF4A0C0 | 4.68891 |
| 19 | 18101FEA8CE74D8EF65B921C37C571A53E28FAD35DC971B6D3644685F96E5447850A080C | 4.93526 |
| 20 | E644F8B0C080FB5666BAAC379ACC90E4BF281418503FCA94EF4B8CF6DB523C27C575A13D | 4.4603 |
| 21 | 1BED7664685F96E7447850E080FF5263BB2DC90E0BD2ACD09F1418109FAAACE7458EF759 | 4.97386 |
| 22 | E539D11E2438203DD499EECB0DE6BB223A2D2745062417F2A73BD2633D96E48705F15E68 | 5.08221 |
| 23 | 109FEA8CF74D8EF75B929C17E569A13A2830539DE951BEDB624584F92E7447950E0C0FF4 | 5.00963 |
| 24 | EE4B0DD6AB2A382FCB73A23C4870407BA930BD56E4A705F15E684F8A0C080FE54677A4C5 | 5.36358 |
| 25 | 1362832213FD519CE9B15EAB72438AFCAD346040BF4A73B52E35DA6C48F0BF25CE8CF2A1 | 4.93658 |
| 26 | E | 6.64086 |
| 27 | 17E579913E2430223ED519AE8B0DE6B326393427C506040FF6A53AD2E37D96C48709F15C | 5.28929 |
| 28 | E9B19ECB724B82FAAF34A7C5061407F2A539DAECC8D0AF2DCA8AF1A1C101FEA4CF72586D | 5.17126 |
| 29 | 1498103FDA94EF498CF6DB521C37C575A33D07FAD31DC969BAD7654705F96E644F890C09 | 5.56246 |
| 30 | EACCB76586FB59911D17E579B1E2EC34203DE9B19ECB624B86F8AE34A7C5061407F2A739 | 5.289 |
| 31 | 3F5559EE9B1DEEB725382F8AD342745062413BD2A35DB6C48F0BF35CE8CF0A0C181BE94D | 5.49132 |
| 32 | C101BE94D7725C6FB5D991A15E4B9511E340D599EE8B1DE6B724382FCAF3627C5064407D | 4.90867 |
| 33 | 3C2870406FA531DC971BED7644685792E545088FB5467BA2C77BADC90E4BD2ACD09F1618 | 5.29604 |
| 34 | C27CD73A23CA870607FA535DE961B6D36645E6C4F890C088FF5267BAAC779ACC90E4BD28 | 6.46788 |
| 35 | 38AFCAD342745462417FAA739D363BD96C495C688F2A0C101BE94C7725C6FB5D911E17E4 | 5.21648 |
| 36 | C67B2DA91E1BE2BAD09E9418103FDA98ED49B223C2DCB73A27C6870407FAB32DD961BCD5 | 5.28823 |
| 37 | 3BD2A37DB6CC8F09F35C688F0A1C181BE94D6FB5D931D17E539B12E2C34203ED519EEAB0 | 5.25253 |
| 38 | C5060427FAA33DD162BD56E48715F95A6A4C81FED4E76A5C6FB891E17E4B8D19E54181 | 5.28582 |
| 39 | 30203FB529DE971BEDB624386F8AEB467A51F5A63B92D375AEC88E0B72DCC89F1218121C | 4.68278 |
| 40 | CE7498EF65B925C17D571A13C2930A03F9501B6D7664685792E7457850E0A0EF5267BB2C | 5.15683 |
| 41 | 335D163BDD664C705E956684F8A0C884FF55C6FB6DA91E13E2B8D09E9458103FD29CEF48 | 5.12173 |
| 42 | CD09F1418101FEA8CE74D8AF55B929C57E5428B0205FA531DA951BEDB664784F92E34679 | 4.86028 |
| 43 | 37DAAC88E0B72DCC89F1A1C101FEACCB7459929C17C569A13E2A30203F9539DE9B1DECB5 | 4.80846 |
| 44 | C90E0BF2BCD09B1618109FAAACF7458EF7597CD75A33C2830607FA539DA951BED3624785 | 4.66558 |
| 45 | 34278526140FF6A73BD2633D96C48F09F15DA1C101FEA4CF725A6EB55951E16E5B9D13E0 | 5.26735 |
| 46 | CAF3225C4860407DAA33DD161BCD664C725D4F8A4C281FE54E75A5C6FB2D891E13E6B8D0 | 5.12159 |
| 47 | 203FD539DE9B1DECB624B82FAAE34A785061A63B92C37DAECC8D0AF2DCA88F0A14101FE9 | 5.28859 |
| 48 | DE6B326382FCAF3626C5864427EAA33DD36148F09F35D68CF0A0C1817ED4C77A5C6FB6D9 | 5.27919 |
| 49 | 2342FCB73A23C2870407FAD31DD961BED565956684D8B0C880FD5467BA6C57BAD494E2BD | 5.17632 |
| 50 | DD961BED7644705F94E644B8B0C088FB56647B2D892E1BE2BD29F1418101FCA9CEF498D | 6.8988 |
| 51 | 2745062407FAA33BD2633BD96C48705F55C68C181BE94C772586FB4D911E17E4BD9D15E340 | 5.28768 |
| 52 | D911E17E4B9D11E3428203FD699EECB0DD682F4AF3626C5864407EAA33DD363BDD6E4A71 | 5.83993 |
| 53 | 24382F8AE3427C5060407F2A53AD2633DB6CF25CA88F0A14101FEA4C772586FB55951E15 | 6.1875 |
| 54 | DA6CC8F0AF25CE88F0A1C141FEA4C7725A6D1C17E559A13E2C32203F5519CE9B15EEB525 | 5.03925 |
| 55 | 2FCAF3626C5060427EAAB3DD162BDD6A4A70684F0A0C181FE94C76A5C6FB4D991613E6B9 | 5.30496 |
| 56 | D11E14383037D69AEF4B8DB6BB223C2FC970860447DAB335D163BCD6648725E956684F88 | 5.2167 |
| 57 | 2C37DAEC98E0BB29C8971218111F6A8CD755B921C37C571A13C2830A07FB529DE9319ED | 4.86805 |
| 58 | D2E33D96D48709F15C68CF0A0C0817ED4C74B55911C17E5B9913E3438243FD499EE8B0DD | 5.32789 |
| 59 | 28B0207FB531DA971AEDB664584F9AE344780F75667BB2DC88E88E8BB29CD89F161811 | 6.12947 |
| 60 | D6E4C725F9566C4D8B0C084FF5467BA6C579E13E2BAD19E9458102FD298EF4A8D769B121 | 6.3528 |
| 61 | 2BCD09D1518905FCA9CEF4D8CF65B921C17D3CA870407FA531DC961BED3664685792E744 | 5.47964 |
| 62 | D599AEAB1DE6B326382FCAB3426C5064407DD2633DB6D48F09F35D684F0A2C081FED4E75 | 5.22007 |
| 63 | 7FAA33BD363BD96E4970DF55C684F0A4C0807725C6FB5D911E15E5B9D15E1438203BD699 | 5.53568 |
| 64 | 81FE94E76A5C6FB6D891617E4B8D19E14380996ECB0DE6BB263A2ECAF3225C5868407FA9 | 5.59729 |
| 65 | 7CD71A13C28B0205FB531DA971BED362478544F890E080F75667BA2C379ACC88E8BF29CC | 5.25657 |
| 66 | 8283FD699EE4B0DD6BB2A382DCB73227C685AAB39D162BDD6E4A715F15A684F8A0C080FC | 4.7959 |
| 67 | 7850E0A0EF55A67B92C375AAC88F0BF2DCC89109FEA8CE74D8EF55B921C17C569A13E2830 | 5.10028 |
| 68 | 860407FAA335D561BDD6648705F9566C4D89FED4A77A4C6FB6DA90E13E2BAD19E9418301 | 5.04345 |
| 69 | 7B2D890E0BEAB8D09E1418503FDA94EF498C2342FC972A23C28504077A931DD969BED764 | 4.67421 |
| 70 | 85F92E74478D0E080EF5263B92D375AACC88DCD89F1618109FEA8CF7458EF75A921C57C55 | 5.9294 |
| 71 | 70DF15C694F0A4C280FE54A77A4C67B2D891B9511E1438203FD699EECB0DE6BB22382DC9 | 5.1407 |
| 72 | 8E0BF2BCC89F1218111FEA8CF7458EF75B91579A53E2830203F9539D69319ECB6A4784F8 | 5.64556 |
| 73 | 73A23C6870407BAB33DD965BCD7644745D958A0C080FF54E77A4C77B2DC92E1BE2BCD29C | 5.29334 |
| 74 | 8DF69B122C27C971A33C2830407FA531DE9564C745F95E6C4F8B0D088FB5467BAAC77BAC | 5.09747 |
| 75 | 772586DB5D991E15E5B9D11E1438283FD698DEEB726392FCAB3627C5864407FAAB3DD161 | 5.18707 |
| 76 | 897121A101F6A8CF75586F759921C17E559930207F9529DE9319EDB6A4786F8AEB467A50 | 4.78454 |

TABLE 12-continued

| ID cell | sequence | papr |
|---|---|---|
| 77 | 74D8AF55B921C17E569A13E2A31203FD519CED3664785F92E7447950E0C0FF5A6BBD2C35 | 5.39462 |
| 78 | 8A8C082FF54673A4C77B2DC90E0BE2B8D09C037D698EE4B8DB69B32342FC972A23C68504 | 4.95295 |
| 79 | 6040FF4A73B52E35DB6C48B0BF25CE88F0A0EA4CB74596F35D911D17E539B12E2434203C | 6.2202 |
| 80 | 9E1458102FD29CEF4B8D769B122C27CD73A00407BA933DD161BCD664C745F94E644F8B0C | 5.62302 |
| 81 | 633DD6E4970DF55E684F8A4C280FED4E77A5D991A15E5B9D15E1438203FD498EECB0DF69 | 4.88997 |
| 82 | 9D6971BECB6A4384F8AE3467A506040FF4A4375AEC88F0BF29CE88F1218121EEACCF7458 | 6.07151 |
| 83 | 673A6C57AAD494E0BE2B4D09F1518105FCA98DF6DB322C27CD73A33CA830606FA535DC95 | 5.63064 |
| 84 | 99EECB0DE6BB22382ECAF3627C4860447DA963BD96C4870DF15E694F8A0C281FE54A77A5 | 6.80605 |
| 85 | 64C705D95E644F890C088FB5466BAAC77BACBEABCD29F1498103FDA9CEB4B8DF65B123C0 | 5.57596 |
| 86 | 9A93E2830203F9519DE9B19ECB724382F8AD5060C0FF5A6BBD2E37DAECC8F0BF25CE8AF1 | 5.48329 |
| 87 | 6F35D931C17E579912E2C30203FD599AEAB024B86FAAE3427C5260407F6A73BD2E37DB6C | 4.93469 |
| 88 | 91617E4B8D11E5418203FD29AEF4B8DF6BB1CAF3627C4868407FAA33DD561BCD664C725D | 5.54454 |
| 89 | 6C48F09F35C68CF2A0C101FE94D77A586FB517E539912E2C34223FD519EE8B1DEEB72638 | 5.89093 |
| 90 | 929C17E569A93A283020BFD539DE9319EEB5F9AE34479050E080FF4A63B92E36DA6C88F09 | 4.67016 |
| 91 | 684F0A2C0817ED4E76A5C6BB4D991E17E6B9438243FD499EE8B0DE6B3263A2FCA73627C5 | 4.88909 |
| 92 | 961BAD5654705B96E744F8D0E080FF5267B8ADC94E2BF2B4D09D1418905FCA9CEF4D8EF5 | 4.91822 |
| 93 | 6B3263A2ECA73227C4860447DAA33DD563BD70DF55C694F8A0C281FED4A77A4C67B6DA91 | 4.997 |
| 94 | 95E684D8B0C884FD5467BA6C77BAD494E2BD9E1418302FD29CED4B8DF69B323C2FC973A0 | 5.13808 |
| 95 | 40FF6A53BD2633D96C48F0DF35D68CF4A0C14CF725A6EB5D911C17E5B9913E2438243DD4 | 5.03832 |
| 96 | BEABCD29F1498101FCA9CEB498CF65B121C0A23C6870407FA933DD969BAD7644785F94E5 | 5.15283 |
| 97 | 438203FD499EECB0DF6B3223A2ECAF3225C57FAA73BD363BD96C4870DF15C684F0A0C281 | 4.95856 |
| 98 | BDD6E48705F95E684E8A8C082FF54673A4C591617E4B8D19E1438303FD29AEF4B8DB69B1 | 4.83304 |
| 99 | 4785F96E744F8D0E080FF5265BB2CB7DAEC82B4D49D1418905FEA9CEF498EF75B921C37C | 5.31628 |
| 100 | B9511E1438283BD698EE4B0DF6BB223C2DC8C5064407FAAB3DD363BDD6A4A705F15E6A4D | 5.13454 |
| 101 | 44F8D0E080F75265BB2C379AEC88E8BF2BCC18905FEA9CEF498CF65B121C37C571A53E28 | 5.34722 |
| 102 | BAAC779ADC98E4BD2ACD09F1618109FAAACCF65B523C27CD71A33C28B0205FA531DE9519 | 5.07414 |
| 103 | 4F0A0C280FED4E77A4C67B6DA91E1BE6B8D18283FD499EECB4DF6BB2A382FCA73227C484 | 5.20743 |
| 104 | B15EEB72438AFCAD352745462417FAA339D16CC8F0BF25C688F0A1C181FEB4D7725C6DB4 | 5.22863 |
| 105 | 4C776586EB5D951E17E5B9D11E3438243DD4B1DEAB725382F8AD3427C5462407F2A339D0 | 5.22455 |
| 106 | B223C2DCB73223C6870407BA932DD165BED55F15E6A4E8A0C082FF54673A6C77B2DC90E1 | 5.35733 |
| 107 | 48709F15C684F0A2C0817ED4C77A5C6FB4D8E539911E2438203FD4996E8B0DE6B326382C | 5.74473 |
| 108 | B624386F8AE34678506040BF4A73BD2A35D90B729CC88F1218101EEA4CF74586F35D931C | 4.48846 |
| 109 | 4B0DF6BB32342BCB73A23C2870507FA933DCD6E4C725E956684F8A0C880FF55673A6C578 | 5.30588 |
| 110 | B55911E16E5B9911E3438203FD499EE8B0DD38AF8AD352745060417FAA73BD363BDD6E48 | 4.82382 |
| 111 | 5F95E684F8A0C480FF54E77A6C67BAD890E0D19E54382037D29AEF4B0DB6BB22342FC971 | 5.23798 |
| 112 | A1C141FEB4CF72586FB55951C16E5B9913E13FD519CE8B15EAB52438AF8AD35274506041 | 4.77719 |
| 113 | 5C688F0A0C181BE94D77A5C6FB4D991A17E5E2430223ED519EEAB1DEEB324392F4AF3625 | 5.51662 |
| 114 | A23C68505077A933DD969BAD5644785B96E40C084FF54673A6C77AADC90E2BE2BCD09F14 | 5.86963 |
| 115 | 58EF759931C17E559A13E2830213FD559EE8B6A4786F9ABB2CBAF3A5060C0FF4A63BD2E37D9 | 4.88564 |
| 116 | A63B92E36DAECC8F0AF25CE88F1A1C141FE858EF359921C97E579B1362C30213FD519CE9 | 5.24587 |
| 117 | 5B925C17D571A13E2830203FB529D69719ED85792E54478D0A080EF5267B92D375AEC88D | 5.11869 |
| 118 | A546FB4D991613E4B8D11E14182037D29AED6B322382FCAF3625C5868407DAA33DD161BD | 5.26554 |
| 119 | 50E0C0DF5A63B92E37DAECC8F0BF2DCE88F01F6A8CD74586F35B931C97A579A136283020 | 5.03861 |
| 120 | AEB4278516040BF4A73B52E35DA6CC8B09F0F1A1C101FEACCF74596F359911D176539911 | 5.15572 |
| 121 | 539DE971BEDB664584F92E3447850E0C0DF52C7BDACC98E0BF2BCC897161A111FEA8CF74 | 5.1763 |
| 122 | ADC90E2BF2B4D09F1518105FEA8CE7498EF4C27C971A23C2830407FA531DE971B6D76445 | 4.73865 |
| 123 | 579A13C2930A03FB539DE9319EDB6A4784F978D0E080FF5263BD275AEC88F0B72DCE89 | 5.48933 |
| 124 | A9CEB4B8DF6DB523C37CD75A13C28B0207F9969BED7654705B94E644F890E090FF5667B8 | 5.34988 |
| 125 | 54673A6C77B2DC92E1BE2B8D09F1498103FC4B8DB6BB32342BCB73A23C2850507FA933DC | 5.35378 |
| 126 | AA339D363BDD6A48705F15A684F8A0C080FCA546BB4D991E13E4B8D19E14182037D29AEC | 5.49554 |

When the number $N_t$ of the transmit antennas is three and the number of the IFFT/FFT operation points used in the OFDM communication system is 512 (i.e. $N_t=3$, $N_{FFT}=512$), R(r) can be expressed by Equation 10 and T(k) and $q_{ID_{cell}}[m]$ can be expressed by the hexadecimal numbers as shown in Table 13 and Tables 14a and 14b.

$$R(r) = H_{128}\left(ID_{cell} + 1, \prod_{\lfloor \frac{r}{128} \rfloor}(r \bmod 128)\right), \quad (10)$$

$$r = 8 * \left\lfloor \frac{m}{9} \right\rfloor + m \bmod 9 = 0, 1, \cdots, 127$$

TABLE 13

| ID cell | sequence | papr |
|---|---|---|
| 0 | 2197 | 4.19373 |
| 1 | 0D7A | 4.52301 |

TABLE 13-continued

| ID cell | sequence | papr |
|---|---|---|
| 2 | AF7B | 4.60134 |
| 3 | 8D7D | 4.43697 |
| 4 | 5659 | 4.45478 |
| 5 | 786B | 4.44368 |
| 6 | 58E5 | 4.71563 |
| 7 | B43C | 4.95923 |
| 8 | E01B | 4.62147 |
| 9 | AFBE | 4.86292 |
| 10 | 5B33 | 4.48154 |
| 11 | 6326 | 4.65913 |
| 12 | B0FE | 4.47246 |
| 13 | 7D50 | 4.57845 |
| 14 | 1EF6 | 4.17626 |
| 15 | 8264 | 4.64049 |
| 16 | 33D9 | 4.55088 |
| 17 | 6C9F | 4.52818 |
| 18 | A76F | 4.39514 |
| 19 | 7A2A | 5.06253 |

TABLE 13-continued

| ID cell | sequence | papr |
|---|---|---|
| 20 | 0488 | 4.70612 |
| 21 | C25A | 4.70319 |
| 22 | 5779 | 4.44569 |
| 23 | 5F30 | 4.76144 |
| 24 | 47D5 | 4.72732 |
| 25 | 89AF | 4.66002 |
| 26 | E2A7 | 4.37136 |
| 27 | F14E | 4.40459 |
| 28 | A963 | 4.44538 |
| 29 | 17B6 | 3.73691 |
| 30 | 20BD | 4.62356 |
| 31 | 9F2B | 4.70725 |
| 32 | A71A | 5.22983 |
| 33 | FCDD | 5.40854 |
| 34 | F309 | 4.48828 |
| 35 | 2260 | 4.97653 |
| 36 | 985D | 4.3215 |
| 37 | BF8D | 4.80015 |
| 38 | 6345 | 4.47419 |
| 39 | EE35 | 4.72718 |
| 40 | C2C8 | 4.33645 |
| 41 | 8DCA | 4.72911 |
| 42 | 65EB | 4.67972 |
| 43 | 5BD6 | 4.45284 |
| 44 | 3657 | 4.20409 |
| 45 | 8A40 | 4.61712 |
| 46 | F79D | 4.56916 |
| 47 | 346D | 4.60012 |
| 48 | 6015 | 4.76798 |
| 49 | 9696 | 6.17153 |
| 50 | EAE1 | 4.52968 |
| 51 | 162E | 4.36476 |
| 52 | 4A4B | 5.8336 |
| 53 | 0493 | 4.53168 |
| 54 | ADA1 | 4.63721 |
| 55 | C51E | 4.59395 |
| 56 | 8B63 | 5.42257 |
| 57 | 5508 | 4.3453 |
| 58 | 8887 | 4.54333 |
| 59 | FE8D | 3.99562 |
| 60 | 9F63 | 4.19506 |
| 61 | 00BA | 4.50001 |
| 62 | E7D1 | 4.41194 |
| 63 | 43B9 | 4.23605 |
| 64 | CB61 | 4.69086 |
| 65 | 72DD | 4.38892 |
| 66 | C7A7 | 4.69706 |
| 67 | 7F9D | 5.03396 |
| 68 | 2AED | 4.30871 |
| 69 | E134 | 4.65157 |
| 70 | AD8D | 5.89058 |
| 71 | 5065 | 4.48793 |
| 72 | 3AA7 | 4.3173 |
| 73 | F642 | 4.75911 |
| 74 | C521 | 4.71632 |
| 75 | 2D84 | 4.87128 |
| 76 | A335 | 4.33797 |
| 77 | FC46 | 4.83393 |
| 78 | 0907 | 4.70575 |
| 79 | D71A | 4.6364 |
| 80 | C174 | 5.21763 |
| 81 | 2583 | 4.36862 |
| 82 | F65F | 4.64336 |
| 83 | 7CA0 | 4.89679 |
| 84 | EDA5 | 4.86511 |
| 85 | 9445 | 3.88229 |
| 86 | 4860 | 4.76487 |
| 87 | E905 | 4.24911 |
| 88 | 5966 | 5.02129 |
| 89 | FCA6 | 4.52957 |
| 90 | 1465 | 4.22799 |

TABLE 13-continued

| ID cell | sequence | papr |
|---|---|---|
| 91 | 0572 | 4.58851 |
| 92 | 23EB | 4.65141 |
| 93 | 9B0B | 3.93818 |
| 94 | 467C | 4.71579 |
| 95 | 5BC9 | 4.39535 |
| 96 | AECA | 4.6301 |
| 97 | AF75 | 4.54999 |
| 98 | E589 | 4.65198 |
| 99 | 72A0 | 5.45701 |
| 100 | B70A | 4.59467 |
| 101 | 2B4E | 4.1115 |
| 102 | 8B35 | 4.76813 |
| 103 | 6841 | 4.41251 |
| 104 | 6290 | 4.75626 |
| 105 | 7A62 | 4.43697 |
| 106 | 6550 | 4.23136 |
| 107 | 11D8 | 4.49253 |
| 108 | 0C67 | 4.14239 |
| 109 | 6741 | 4.90459 |
| 110 | F128 | 4.7665 |
| 111 | 9167 | 4.61706 |
| 112 | B2C1 | 4.80371 |
| 113 | EDB3 | 4.27782 |
| 114 | 4A74 | 4.58645 |
| 115 | 1085 | 4.17758 |
| 116 | 1BD8 | 4.4536 |
| 117 | 64E8 | 4.18647 |
| 118 | 7538 | 5.1831 |
| 119 | FB16 | 4.33093 |
| 120 | C5FB | 4.43481 |
| 121 | 5C8C | 4.34469 |
| 122 | EB32 | 4.3743 |
| 123 | 1531 | 4.46991 |
| 124 | 792F | 4.39589 |
| 125 | 8461 | 4.42202 |
| 126 | B8D0 | 4.53339 |

TABLE 14

| ID cell | sequence | papr |
|---|---|---|
| 0 | FE54A77A4C67B2D891E1BE2B8D19E1458301 | 4.19373 |
| 1 | 037D298EE4B8DF69B32342FCB73A2BC28704 | 4.52301 |
| 2 | FDA98EF4A8DF6DB323C27CD73A33CA830605 | 4.60134 |
| 3 | 07FA931DC969BED5654705F96E744F8D0C09 | 4.43697 |
| 4 | F92E744795060C0FF4A63BD2C37DAEC88D09 | 4.45478 |
| 5 | 0407FAB33DD961BCD6644745F94E6C4B8B0D | 4.44368 |
| 6 | FA535DC971BED3644685F96E7447850E080D | 4.71563 |
| 7 | 0FF5267BB2C37DACC88E0BB2BCD89F161810 | 4.95923 |
| 8 | F1A1C121EEA4CB74586F359911D17E539B11 | 4.62147 |
| 9 | 0C880FF5467BA6C77BADC90E2BF2BCD49F14 | 4.86292 |
| 10 | F25CE88F1A1C101FEB4C7725A6FB55911E15 | 4.48154 |
| 11 | 080FF5666BA2C37BADC90E0BF2ACD09F1618 | 4.65913 |
| 12 | F6DB123C37C571A13C28B0607FB539DE9718 | 4.47246 |
| 13 | 0B72DCE89F1A1C101FEA4CF74596F359911C | 4.57845 |
| 14 | F5263B92D37DAECA8E0BF2DCE89F121C121C | 4.17626 |
| 15 | 1FEA8CD74586F35B921C17E579A1362C3020 | 4.64049 |
| 16 | E13E2BAD19E1418303FDA9CED4B8DF69B121 | 4.55088 |
| 17 | 1C17E579A13E2C30203FD519CE9B1DEEB725 | 4.52818 |
| 18 | E2C30223ED519EEAB1DE6B726382FCAF3625 | 4.39514 |
| 19 | 18105FEA9CEF498EF65B121C37C579A13E28 | 5.06253 |
| 20 | E644B890C080FF5466BAAC379ACC98E0BD28 | 4.70612 |
| 21 | 1BED7644685792E7447850E080FF5A63BB2C | 4.70319 |
| 22 | E539D11E3430243FD5996ECB2DF6BB22382D | 4.44569 |
| 23 | 101FEA4CF74D8EF75B921C17E579A13A2830 | 4.76144 |
| 24 | EE4B4DD6AB223C2FCB73A27C4870407FA931 | 4.72732 |
| 25 | 13E2830203FD519CE9B1DEAB72438AFCAF35 | 4.66002 |
| 26 | EDB664784F92E3467850E080FF4A63BD2E35 | 4.37136 |
| 27 | 17E579B13E2430203FD519EE8B0DEEB72638 | 4.40459 |
| 28 | E9B19EEB624B82F8AF3427C5260407F2A739 | 4.44538 |

TABLE 14-continued

| ID cell | sequence | papr |
|---|---|---|
| 29 | 1418101FDA94EF4B8DF6DB123C37C575A33C | 3.73691 |
| 30 | EA4CB76586F359911C17E539B13E2C34203D | 4.62356 |
| 31 | 3FD519CE9B1DEEB725382F8AF3427C506241 | 4.70725 |
| 32 | C181BEB4C7725C6FB5D911A15E5B9D11E340 | 5.22983 |
| 33 | 3CA870607FAD35DC961BED7644785F96E545 | 5.40854 |
| 34 | C2FCD73A33C2830607FA531DC961BED36445 | 4.48828 |
| 35 | 382F8AF342745062407F2A73BD2633D96C48 | 4.97653 |
| 36 | C6FB2D891E1BE2B8D09E1458103FDA9CED49 | 4.3215 |
| 37 | 3BD2A37DB6CC8F0BF35CE88F0A0C181FE94D | 4.80015 |
| 38 | C5064427EAA339D363BD56E48705F15E684D | 4.47419 |
| 39 | 30A07FB529DE971BECB624386F9AE3467851 | 4.72718 |
| 40 | CEF4D8CF65B121C37C579A53C2830A03F950 | 4.33645 |
| 41 | 33DD161BCD6E4C705F95E6C4D8A0C880FF54 | 4.72911 |
| 42 | CD09F1618101FEA8CF74D8EF75A929C17E55 | 4.67972 |
| 43 | 375AEC88F0BF29CE89F1A1C101FEA4CF7658 | 4.45284 |
| 44 | C90E0BF2BCD09F1618101FEA8CF7458EF759 | 4.20409 |
| 45 | 34A78506040FF2A73AD2637D96C48709F15C | 4.61712 |
| 46 | CAF3627C5860447FAB33DD161BDD6E4C705D | 4.56916 |
| 47 | 203F9539DE931DECB624386FAAE34A7C5061 | 4.60012 |
| 48 | DE6B726382F4AB3426C5060407FAA33DD161 | 4.76798 |
| 49 | 23C2BC973A23C6870407FA931DD961BED764 | 6.17153 |
| 50 | DD965BED664C705F94E6C4F8B0C080FB5465 | 4.52968 |
| 51 | 2745060417F2A73BD2633D96E4870DF55E68 | 4.36476 |
| 52 | D911E15E4B9D11E3428203FD498EECB0DF69 | 5.8336 |
| 53 | 24382F8AE3427C506040FF2A53BD2633DB6D | 4.53168 |
| 54 | DAEC88F0AF2DCE88F1A1C101FEA4C772586D | 4.63721 |
| 55 | 2FCAF3426C5064407FAA339D163BDD6E4A70 | 4.59395 |
| 56 | D19E1418203FD29AEF4B0DF6BB22342BCB71 | 5.42257 |
| 57 | 2C37DACC98E0BF29CD8971218101FEA8CD74 | 4.3453 |
| 58 | D2E33D96C48F09F15C68CF0A0C0817ED4E75 | 4.54333 |
| 59 | 28B0607FB539DE971AEDB624584F9AE74479 | 3.99562 |
| 60 | D6E48705F95E6C4F8B0C084FF54673A2C779 | 4.19506 |
| 61 | 2B4D09D1418101FCA8CEF498EF75B921C37C | 4.50001 |
| 62 | D599EEAB0DE6B726392FCAF3427C5060407D | 4.41194 |
| 63 | 7F2A739D2633D96E4970DF15E694F8A0C081 | 4.23605 |
| 64 | 81FED4C76A5C6BB6D991617E6B8D11E14181 | 4.69086 |
| 65 | 7C575A33D2830207FA539DE951BEDB664585 | 4.38892 |
| 66 | 8283FD498EE4B4DF6BB2A382FCA73227C685 | 4.69706 |
| 67 | 7850E0A0FF5A67BB2D37DAAC88F0BF2DCC89 | 5.03396 |
| 68 | 860407FAA33DD163BCD6E4C725E95E6C4D89 | 4.30871 |
| 69 | 7BADC92E0BE2B8D09F1418103FDA94EF498C | 4.65157 |
| 70 | 85F92E74478D0E080FF5A63B92C37DAEC88D | 5.89058 |
| 71 | 705F55C694F0A0C080FE54E77A4C67B6D891 | 4.48793 |
| 72 | 8E0BB2BCD89F121A101FEA8CF74586F75B91 | 4.3173 |
| 73 | 73A27C6870407FAB32DD165BCD6644705F94 | 4.75911 |
| 74 | 8DF6DB122C27CD71A33C2830606FA531DC95 | 4.71632 |
| 75 | 772586FB4D991E15E5B9D11E1428203FD498 | 4.87128 |
| 76 | 89F121A101F6A8CF75586F35B931C17E5599 | 4.33797 |
| 77 | 74D8EF75B929C57C569A13E2830203FD539C | 4.83393 |
| 78 | 8A0C080FE54E73A4C77B2D890E0BE2BCD29D | 4.70575 |
| 79 | 60C0FF4A73B52E37DB6C48B09F35CE88F2A0 | 4.6364 |
| 80 | 9E9458102FD298ED4B8D76DB323C27CD71A0 | 5.21763 |
| 81 | 633D96E48705F55C694F8A0C080FE54A77A5 | 4.36862 |
| 82 | 9DE971BEDB624786F8AE346785160C0FF6A5 | 4.64336 |
| 83 | 673A6C77BADC94E0BE2BCD09F1418101FCA8 | 4.89679 |
| 84 | 99EECB2DE6BB26382FCAF3227C4860447DA9 | 4.86511 |
| 85 | 64C705D95E644F890C080FF5466BA2C779AD | 3.88229 |
| 86 | 9A13E283020BF9519CE931DEEB624382F8AC | 4.76487 |
| 87 | 6FB5D931C17E539913E2430203ED519EE8B1 | 4.24911 |
| 88 | 91617E4B9D19E14183037D69AEE4B0DF6BB0 | 5.02129 |
| 89 | 6CC8F0BF35CE8CF0A0C181BEB4C7725C6FB4 | 4.52957 |
| 90 | 921C17C579A13E2830203FD539CE931DECB5 | 4.22799 |
| 91 | 684F0A0C0817ED4C77A546FB6D991613E6B8 | 4.58851 |
| 92 | 961BAD7644705B96E744F8D0E080FF5267B9 | 4.65141 |
| 93 | 6BB22382FCAF3227C5860407DAA33DD163BD | 3.93818 |
| 94 | 9566C4D8A0C084FF54673A6C77BADC94E0BC | 4.71579 |
| 95 | 407F6A53BD2E33DB6D48F0DF15C68CF0A0C1 | 4.39535 |
| 96 | BEAB8D29E1498503FCA9CEF498CF6DB123C0 | 4.6301 |
| 97 | 438203FD499EECB2DF6B3263A2FCA73625C5 | 4.54999 |
| 98 | BDD6E4A705F15E684F8A8C080FE54E73A4C5 | 4.65198 |
| 99 | 4705F96E7447890E080FF5267BA2C379ACC8 | 5.45701 |
| 100 | B9D11E3438203FD699EE4B0DD6AB2A382FC8 | 4.59467 |
| 101 | 447890E080FF5267BB2C37DACC88E8BF2BCC | 4.1115 |
| 102 | BAAC379ACC98E0BF2BCD09B1619101FEA8CD | 4.76813 |
| 103 | 4F0A4C280FED4A75A4C67B6D890E13E2B8D1 | 4.41251 |
| 104 | B15EEB724382F8AF3427C5060417F2A339D0 | 4.75626 |
| 105 | 4C7765A6FB5D911E16E539D13E2430203FD4 | 4.43697 |
| 106 | B223C2FCA73227C4870407FA933DD161BCD4 | 4.23136 |
| 107 | 48709F15D684F0A0C181FED4C77A5C6BB4D8 | 4.49253 |
| 108 | B624384F8AEB4678506040FF6A63B52E37D9 | 4.14239 |
| 109 | 4B0DF6BB22342FCB73A23C68504077A931DD | 4.90459 |
| 110 | B5D951E17E539911E3430203FD499EE8B0DC | 4.7665 |
| 111 | 5F95A684F8A0C080FF54677A6C67B2DC92E1 | 4.61706 |
| 112 | A1C101FEB4C7725A6EB5D951C16E539911E1 | 4.80371 |
| 113 | 5CE8CF2A0C181FE94D77A586FB5D911A17E5 | 4.27782 |
| 114 | A23C6850407FA933DC961BED7654705F94E4 | 4.58645 |
| 115 | 586F359931C17A559A13E2830203F5559CE9 | 4.17758 |
| 116 | A63B92C37DAEC88F0BF2DCE88F1A1C101DE8 | 4.4536 |
| 117 | 5B125C37C571A53C2830A07FB529DE9319EC | 4.18647 |
| 118 | A546FB6D991617E4B9D11E1438303FD298EC | 5.1831 |
| 119 | 50E0C0FF5A6BB92E37DA6C88D0BF25CE8AF0 | 4.33093 |
| 120 | AEB4678506040FF4A73BD2E37DB6CC8B0BF1 | 4.43481 |
| 121 | 531DE951BEDB664584F9AE3447850E0C0DF4 | 4.34469 |
| 122 | ADC94E2BE2BCD09F1518101FEA9CE7498EF4 | 4.3743 |
| 123 | 571A13C2930207F9539D6931BEDB624384F9 | 4.46991 |
| 124 | A94EF4B8DF6DB121C37C571A33C28B0607F9 | 4.39589 |
| 125 | 54E73A4C67B2DC90E0BE2BCD29E1418101FD | 4.42202 |
| 126 | AAB39D363BDD6A48705F95E684F8A0C080FC | 4.53339 |

As understood from the above description, the present invention provides a solution for transmitting/receiving pilot signals, which can identify cell IDs and sector IDs by using a Walsh Hadamard matrix and a Walsh code in an OFDM communication system, thereby increasing the number of identifiable cell IDs and sector IDs in the OFDM communication system. Further, the present invention provides a solution capable of transmitting/receiving pilot signals by using a PAPR reduction sequence as well as the Walsh Hadamard matrix and the Walsh code, thereby reducing the PAPR of the pilot signal. Also, the present invention provides a solution for transmitting/receiving pilot signals, which can identify the transmit antennas and the cell IDs by using a Walsh Hadamard matrix and a Walsh code in an OFDM communication system requiring no sector identification, thereby increasing the number of identifiable cell IDs and identifiable transmit antennas IDs in the OFDM communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting a pilot symbol from a base station (BS) to a subscriber station (SS) in a communication system, the method comprising the steps of:
   transmitting a first set of sub-carriers being mapped to a first sequence based on an identifier of the base station in a frequency domain of the pilot symbol; and
   transmitting a second set of sub-carriers being mapped to a second sequence for reducing a PAPR (Peak to Average Power Ratio) of the pilot symbol together with the transmission of the first set of sub-carriers in the frequency domain;
   wherein the first sequence based on the identifier of the base station is generated by using a Walsh Hadamard matrix each row of which includes Walsh codes, a specific row of the Walsh Hadamard matrix corresponds to an identifier of a specific base station and is interleaved according to a predetermined interleaving scheme, an interleaved signal is mapped to predetermined sub-carriers to form the first set of sub-carriers, when the first set of sub-carriers are transmitted; and wherein the first sequence based on the identifier of the base station is defined by $$R(r) = H_{128}\left(ID_{cell} + 1, \prod_{\lfloor \frac{r}{128} \rfloor}(r \bmod 128)\right);$$

$$r = 8\left\lfloor \frac{m}{9} \right\rfloor + m \bmod 9 = 0, 1, \ldots, N_r - 1,$$

where $H_{128}$ denotes a $128^{th}$ order Walsh Hadamard matrix and $\Pi_i(\bullet)$ denotes interleaving of a column of the $128^{th}$ order Walsh Hadamard matrix $H_{128}$.

2. The method as claimed in claim 1, wherein the interleaving scheme is one of the following:

| | |
|---|---|
| $\Pi_0(l)$ | 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 0 |
| $\Pi_1(l)$ | 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 0 |
| $\Pi_2(l)$ | 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 0 |
| $\Pi_3(l)$ | 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 0 |
| $\Pi_4(l)$ | 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 0 | in which l has values from 0 to 127.

3. The method as claimed in claim 1, wherein the Walsh codes are all 1 Walsh codes all of which have a value of 1 in a communication system in which sector identification is unnecessary.

4. The method as claimed in claim 1, wherein the second sequence for reducing a PAPR of the pilot symbol is determined in advance and corresponds to an identifier of a specific base station.

5. A method for transmitting a pilot symbol from a base station (BS) to a subscriber station (SS) in a communication system, the method comprising the steps of:

transmitting a first set of sub-carriers being mapped to a first sequence based on an identifier of the base station in a frequency domain of the pilot symbol; and transmitting a second set of sub-carriers being mapped to a second sequence for reducing a PAPR (Peak to Average Power Ratio) of the pilot symbol together with the transmission of the first set of sub-carriers in the frequency domain;

wherein the pilot symbol including the first set of sub-carriers and the second set of sub-carriers is defined by $$P_{ID_{cell},n}[k] =$$

$$\begin{cases} 1 - 2q_{ID_{cell}}[m], & k = N_t m - \frac{N_{used}}{2} + n, m = 0, 1, \ldots, \frac{N_{used}}{N_t} - 1, \\ 0, & \text{otherwise} \end{cases}$$

-continued $$ID_{cell} \in \{0, 1, \cdots, 126\}, n = 0, 1, \cdots, N_t,$$

$$k \in \left\{-\frac{N_{FFT}}{2}, -\frac{N_{FFT}}{2} + 1, \cdots, \frac{N_{FFT}}{2} - 1\right\}$$

where $P_{ID_{cell,n}}[k]$ denotes pilot symbol, $ID_{cell}$ denotes a base station identifier, n denotes a transmit antenna identifier, m denotes a running index of sequence $q_{ID_{cell,S}}$, k denotes a sub-carrier index, and $N_{used}$ denotes a number of sub-carriers in which null data is not inserted.

6. The method as claimed in claim 5, wherein said $q_{ID_{cell}}[m]$ has a value defined by $$q_{ID_{cell}}[m] = \begin{cases} R\left(8*\left\lfloor\frac{m}{9}\right\rfloor + m \bmod 9\right), \text{ where } m \bmod 9 = 0, 1, \cdots, 7 \\ T\left(\left\lfloor\frac{m}{9}\right\rfloor\right), \text{ where } m \bmod 9 = 8 \end{cases} \quad m = 0, 1, \cdots, \frac{N_{used}}{N_t} - 1$$

7. The method as claimed in claim 6, when a number $N_t$ of the transmit antennas is two and a number $N_{FFT}$ of Inverse Fast Fourier Transform (IFFT) operation points used in the communication system is 2048, $$R\left(8*\left\lfloor\frac{m}{9}\right\rfloor + m \bmod 9\right)$$

has a value defined by $$R(r) = H_{128}\left(ID_{cell} + 1, \prod_{\left\lfloor\frac{r}{128}\right\rfloor}(r \bmod 128)\right),$$

$$r = 8*\left\lfloor\frac{m}{9}\right\rfloor + m \bmod 9 = 0, 1, \cdots, 767, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | E5F121DCFF4A0E63825399D3 | 5.92384 |
| 1 | D10BA3F1A15DDF9C4D819B45 | 6.28771 |
| 2 | 13310AB0491064CE7516898C | 5.88237 |
| 3 | E53C10EB0B1E830D7C2302A2 | 5.72241 |
| 4 | 37DBDBACCEDC976D1DE87D53 | 6.54265 |
| 5 | E43B8C8299E5B2B49798FA28 | 6.23106 |
| 6 | 52A78E348A46E8E84CF29D7B | 6.96087 |
| 7 | CA6B366D37E54A7EDF32A688 | 6.23321 |
| 8 | 3852A3F8B0E1E7FC41301F17 | 6.35304 |
| 9 | 271E4591888CBCD44B32B809 | 5.88167 |
| 10 | 1CB9181F0A47346785BC9464 | 6.5208 |
| 11 | 786E7023033922819D70233B | 6.16551 |
| 12 | D7E0A495CFE8CEC3D2AF4B5D | 5.99014 |
| 13 | 360ECD45D330B876A8F13462 | 6.43524 |
| 14 | C63BDDD2D536FF2416B7A424 | 6.01736 |
| 15 | 10A8B5DAB83CE78B3FCFC31D | 6.19619 |
| 16 | 6152A33C894DC0B62EEA0DDA | 6.13798 |
| 17 | 757A237D70ABD7AB1FFB04F0 | 5.95019 |
| 18 | BC0D0BEA01E586B664401CFC | 6.2348 |
| 19 | 8A5CD82D82B19593F8266E7E | 5.67582 |
| 20 | F44201B0903E55006BDFD5B0 | 6.78315 |
| 21 | 5F252E0EC94C7965A2B347F3 | 6.37986 |
| 22 | 6E376986A947B180015A0A9A | 6.24373 |
| 23 | 3669CAF711FC2129743CFFBA | 6.1472 |
| 24 | C1D8E53D16322CB3B1386B0E | 5.87095 |
| 25 | 9E1F780C45570E3A475F5A77 | 6.11801 |
| 26 | 32F36D066051FAE51512A8F3 | 6.27711 |
| 27 | 464AD0462512248F26313BC4 | 6.50894 |
| 28 | 03F93CDFCA5B9D3262FD2D25 | 6.12574 |
| 29 | 694CAFC989888FC1F358CA8F | 5.86597 |
| 30 | 8C9F1D8E186EAFEDF0D6F4DD | 6.17035 |
| 31 | C4E95F3E65B40D938946B132 | 5.84552 |
| 32 | 5891E3188FA53A8E34576A803 | 5.85053 |
| 33 | 409FF8A9E7FCDA58D4A5241B | 6.10709 |
| 34 | 3C70E4E442FA01B79EE09FA5 | 6.20979 |
| 35 | 36817EE5B08B5B4B9CE88CBE | 5.77008 |
| 36 | BA78FAA5BDCC40837F5205DA | 6.31919 |
| 37 | A490E570CE08172BD82A3633 | 5.73775 |
| 38 | 8433E275E271D4EC11019463 | 5.78564 |
| 39 | F83B07F42EFAE5F1EA281A78 | 5.68333 |
| 40 | B9B93373373FFCB301EFCD77 | 5.79877 |
| 41 | 22B5A5AAC8B3756C6C4ADFE6 | 6.27794 |

-continued

| ID cell | sequence | papr |
|---|---|---|
| 42 | C6DFADA3233FF4EE17DE5E17 | 5.87103 |
| 43 | 70D09DC4F9121828C70B6064 | 5.76809 |
| 44 | F01F5956C24E2156253809D8 | 6.64621 |
| 45 | 8E157642C21545D6AFC4C9EE | 5.77721 |
| 46 | 391D93EF8012E5D2F8E2C299 | 6.87607 |
| 47 | EC1D207A7BA6C4852C105E34 | 6.09394 |
| 48 | 55858594CBAC6A7760D72623 | 6.0547 |
| 49 | FBB76DDCC08E8B0A89E8D35B | 6.30027 |
| 50 | 6394D6CFC5269D0B8DFCE4D6 | 5.71258 |
| 51 | F92EDE555781CC62F5C3FA42 | 6.26962 |
| 52 | E66B7E6E901C802D1725C31B | 6.98039 |
| 53 | 0BA101B2F3F78E672EFC0CC7 | 6.25099 |
| 54 | 26E1EC3E787F6092D1634683 | 6.54994 |
| 55 | 4767A25488E79F75E2F45FA1 | 6.25162 |
| 56 | 1A2FC69DC4DCAD0399DAF857 | 6.06972 |
| 57 | 53F2BFC63878B6C2C10C8A2C | 5.70754 |
| 58 | C20824E0B5348061E2A4C1CE | 6.05831 |
| 59 | 8F1B88288316B59939D490A9 | 6.002 |
| 60 | 3203E66C6406767186F8955A | 6.79504 |
| 61 | B335E583FD89A0A410876B81 | 6.17206 |
| 62 | C11D537E5E2992361F2CC44B | 6.06154 |
| 63 | F1E074FEB2CF55427C573C6F | 5.80776 |
| 64 | BC8C283A7CA014EC79837DD7 | 5.82436 |
| 65 | DF29647F465044A0BC7D2720 | 6.28397 |
| 66 | F29CCF3995F08458FA0F8908 | 5.89065 |
| 67 | 28F5D1FD67E98528DB28BB5D | 6.08206 |
| 68 | DC5908BB6B8E1B84ADF881A8 | 6.01325 |
| 69 | 0AF44605329EE32ACF75481B | 5.84218 |
| 70 | C7CEF13FD6FE89346FB543B2 | 6.33524 |
| 71 | 5D289D0E4306F96AA65BAF4EB | 6.34218 |
| 72 | 0E2D2473C890413D9A9D8DB1 | 6.05022 |
| 73 | 7C082A7E84B366733C6E19D1 | 5.9351 |
| 74 | 85C50A024C78CC1B3AEF4C94 | 5.84302 |
| 75 | 298A3E89079EF4C27CC921A9 | 6.13354 |
| 76 | 825D06F901CE94D8168D8A46 | 6.00828 |
| 77 | 73DCC20AFF8C5837F539EE22 | 6.27564 |
| 78 | 553DD23CB093EFD7C544F013 | 5.88433 |
| 79 | 5EE648A514E40CF0E7ECE2A1 | 5.95859 |
| 80 | F7B98C7D1DD5CE51B6B678A3 | 6.54896 |
| 81 | 9B840FF5F78473E2F75B8E2D | 5.87521 |
| 82 | 8C99E9A614E8AC8C74566752 | 6.03187 |
| 83 | B7EC60A09ACD2CABB53DEDE9 | 5.95608 |
| 84 | 2900FBF0CC91DA813CDBEAD0 | 5.87135 |
| 85 | 949EF4015122026200DF05F1 | 6.11214 |
| 86 | F3AE5B267C36BF3877E4AC49 | 5.87287 |
| 87 | A4E43FBE54A0280D65419C99 | 6.0007 |
| 88 | F116946F21EF61D108AC2F42 | 6.94574 |
| 89 | 5B82DE3F0ADB20D788A045A6 | 6.13544 |
| 90 | AC639F8BDB63A8C4E4746E65 | 6.25857 |
| 91 | 70C588D838AB0FC61F8EABDA | 5.85846 |
| 92 | D6A8AD537E8258E745C1C476 | 5.82355 |
| 93 | 8A4F652DF088D93FC0073FD8 | 6.00051 |
| 94 | 450F92DF140D63380103F31B | 6.48422 |
| 95 | EAAF05F63641E7AFED3A5A79 | 5.90759 |
| 96 | 5F501203D217CF94BC44A6C1 | 6.5396 |
| 97 | 71F6C952D988BC8847E0BA88 | 6.09041 |
| 98 | BF472D6610532AE50CDF829A | 6.28286 |
| 99 | D15D9E8AECFE8C296D5802D6 | 6.22803 |
| 100 | D5AD5575149C76589FF8784A | 6.07452 |
| 101 | 7868B4788F33D2EA66C86BE2 | 5.83685 |
| 102 | B722E30271A97725EA79020A | 5.97044 |
| 103 | 30209E7F80F14A76FCB45DBF | 6.06914 |
| 104 | 6FA8FDC42599BDFDCEEFD828 | 5.99957 |
| 105 | 9CAF25C12BA260391958223B | 5.91873 |
| 106 | CD82CBA6EA27C514AA8F40A0 | 5.72081 |
| 107 | 96852F4F3B879A23F97D3DFA | 6.24847 |
| 108 | 236F33011BD7E277C5BC9561 | 5.84184 |

-continued

| ID cell | sequence | papr |
| --- | --- | --- |
| 109 | 9B74FD2CA98D58E7B8EDD5DB | 6.1246 |
| 110 | 2DC51FEED52392D7174435E8 | 5.80747 |
| 111 | 8708EE1A78F79E3E14D30DD7 | 6.23013 |
| 112 | FCCD639AD5BA5B1451CBD600 | 5.96117 |
| 113 | 652492280DC624A59D2A3F82 | 6.32939 |
| 114 | B8D0EC8813E8453214C74501 | 5.99404 |
| 115 | 2AC9F5941B28ED1CF89F6F0A | 5.96885 |
| 116 | 64DB26CD230FABD4BA1A8412 | 6.58194 |
| 117 | C3E2EF9EDB75E639EDC84DEA | 6.07393 |
| 118 | 4BE5A9ADCB4B4C4758F4CEBD | 5.98986 |
| 119 | 3C72C151C36EA2757082442D | 6.02742 |
| 120 | B482C15B86D52FC1106E2E60 | 5.91514 |
| 121 | F26820407553EDB43C57123C | 6.07394 |
| 122 | 1C045E9D66325157825D6967 | 6.10105 |
| 123 | 0E0F6D035E1AC7A1D76161A7 | 6.7399 |
| 124 | C1C20BF875BE9E94D1CAE3BA | 5.82982 |
| 125 | 527261E102F3FC3ABCE2C13C | 5.96992 |
| 126 | 8AFE184CD76A2756E5394350 | 6.76565. |

8. The method as claimed in claim 6, when a number $N_t$ of the transmit antennas is two and a number $N_{FFT}$ of IFFT operation points used in the communication system is 1024, $$R\left(8*\left\lfloor\frac{m}{9}\right\rfloor + m\bmod 9\right)$$

has a value defined by $$R(r) = H_{128}\left(ID_{cell}+1, \prod_{\lfloor\frac{r}{128}\rfloor}(r\bmod 128)\right),$$

$$r = 8*\left\lfloor\frac{m}{9}\right\rfloor + m\bmod 9 = 0, 1, \cdots, 383, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
| --- | --- | --- |
| 0 | C9A1F9FB33E2 | 5.73908 |
| 1 | C615462A8D6E | 5.69178 |
| 2 | D8400C1E2B47 | 5.67259 |
| 3 | DBCF1478431C | 5.91286 |
| 4 | CC93B30C0EB9 | 5.55863 |
| 5 | C6F3D332B053 | 5.3082 |
| 6 | 9BA4E419EBB5 | 5.5186 |
| 7 | 48FD85CD7E76 | 6.11686 |
| 8 | E992B4493831 | 5.69693 |
| 9 | 4E1401A862B5 | 5.92235 |
| 10 | 9D3239BF5543 | 5.50286 |
| 11 | 2B8584BFB3D8 | 5.19875 |
| 12 | AB42706F96A0 | 5.44334 |
| 13 | 9DB123495FB7 | 5.63328 |
| 14 | A6EFBCB2865D | 6.0094 |
| 15 | 709300E57360 | 5.73209 |
| 16 | 6E2122FC796F | 5.82368 |
| 17 | 7F01F8B4454F | 5.47779 |
| 18 | CDF8525E2FF7 | 5.33406 |
| 19 | 0AC1FA2585A5 | 6.24242 |
| 20 | 46843DFB1135 | 5.65053 |
| 21 | 8B411A6D7235 | 5.524 |
| 22 | 096A3287FE74 | 5.65888 |
| 23 | E26CD654FF1A | 5.89291 |
| 24 | D955EFF989FE | 5.90035 |
| 25 | 882566402741 | 5.62867 |
| 26 | 9FCD0AB3FCF8 | 5.79711 |
| 27 | 8E477A39DA36 | 5.45249 |
| 28 | 83740061371F | 5.42528 |
| 29 | 179FBF270668 | 5.59438 |
| 30 | 0B4738E24AE1 | 6.26907 |
| 31 | 9BD23A217294 | 5.83321 |
| 32 | E783A99153C7 | 5.57411 |
| 33 | 60690386D94B | 5.56542 |
| 34 | EEB11CF6A279 | 5.61602 |
| 35 | 17737FC0364B | 5.46925 |
| 36 | DBA832CB29FF | 5.46318 |
| 37 | 841030AA2B58 | 5.66141 |
| 38 | 573AE8A1189A | 6.49919 |
| 39 | 26EF1E523190 | 5.45727 |
| 40 | 45F27228B846 | 6.37869 |
| 41 | D26C39A8D803 | 5.63232 |
| 42 | 4514BB4432A6 | 5.74245 |
| 43 | 13CBBBDD1888 | 5.25927 |
| 44 | 34B0D91482A7 | 5.43386 |
| 45 | 0DB3ECE942B0 | 5.40054 |
| 46 | A4D876BF7C4E | 5.45618 |
| 47 | 7D492A0F5B39 | 6.40321 |
| 48 | C82DA6102B09 | 5.31582 |
| 49 | F68C09C7D629 | 5.1445 |
| 50 | 4D6C3B62D026 | 6.44183 |
| 51 | EBD13D02E539 | 5.35096 |
| 52 | 760432EDBC5B | 5.42816 |
| 53 | 022040211B53 | 5.58372 |
| 54 | 2663067DE01D | 5.50621 |
| 55 | C0776A8DD057 | 5.29609 |
| 56 | 96117C9722E1 | 5.61786 |
| 57 | 204C31E521C4 | 5.27659 |
| 58 | C8C12F23551B | 5.70925 |
| 59 | 1217E2F687C1 | 5.51497 |
| 60 | DBF86CB15B3B | 5.57367 |
| 61 | BCC4EC437886 | 5.94074 |
| 62 | AA2734F33EF9 | 5.71983 |
| 63 | CBA739A84A4D | 5.96463 |
| 64 | E12166CA6DF5 | 5.64715 |
| 65 | DE42128CD418 | 5.16399 |
| 66 | F90F21A0B95F | 5.52101 |
| 67 | DCC08885C1D0 | 5.34739 |
| 68 | 152AFEFAA90D | 5.34108 |
| 69 | CB30CE0D8CD2 | 5.89277 |
| 70 | 849C1C0DA6A3 | 5.64765 |
| 71 | B8177804D737 | 5.78193 |
| 72 | 693BE40CEE81 | 5.6998 |
| 73 | 632921AF950C | 6.29239 |
| 74 | C4D296ABB9B0 | 5.55821 |
| 75 | 08DCE8EE0E46 | 5.61434 |
| 76 | 616A6B8637F3 | 5.29314 |
| 77 | DB69C2C67E5F | 5.67251 |
| 78 | B7922C4D47E0 | 5.54227 |
| 79 | 5A4273474A62 | 5.41366 |
| 80 | 50082E465126 | 5.57391 |
| 81 | 2E3844099ABD | 5.27701 |
| 82 | F8EFB7F0CE2F | 5.76264 |
| 83 | 64B7E857C964 | 5.89799 |
| 84 | 5B4DDAF2A8D1 | 6.02566 |
| 85 | B639EE82C328 | 5.71509 |
| 86 | 6414C0DB128C | 6.26365 |
| 87 | 08FEAB4846B9 | 5.5487 |
| 88 | 7E160C4BA0F0 | 5.7677 |
| 89 | 5CCA9AF7C373 | 5.61368 |
| 90 | 21B3DF421DE7 | 5.43398 |
| 91 | 9323DD2F2771 | 5.2348 |
| 92 | A26015CF1514 | 5.78478 |
| 93 | 8220CF898D60 | 5.43634 |
| 94 | 8CCEC410F8A6 | 5.33904 |
| 95 | 4FFDECD6D0E0 | 5.50659 |
| 96 | 42D052099826 | 5.68271 |
| 97 | 8785DFDA586A | 5.2863 |
| 98 | 68DDF31B930F | 5.65759 |
| 99 | F0539BCDAACB | 5.6598 |
| 100 | 372C0613FE2C | 5.21517 |
| 101 | 37402B2A80A9 | 6.29655 |
| 102 | 523AE3212125 | 5.41681 |
| 103 | 02EDF46F9694 | 5.47569 |
| 104 | E64CC083190E | 5.71759 |

-continued

| ID cell | sequence | papr |
|---|---|---|
| 105 | 65DE3871D0D1 | 5.80455 |
| 106 | 7808E3E5FE8E | 5.88159 |
| 107 | 070004E13E81 | 5.79589 |
| 108 | 1CE29934CF8D | 5.33859 |
| 109 | 52B8A394BDBC | 5.9872 |
| 110 | 1A13C7DB3016 | 5.31546 |
| 111 | CE75430244B7 | 5.40294 |
| 112 | DD89BD52F023 | 5.81172 |
| 113 | 6B98276F9841 | 5.59191 |
| 114 | 6610C6E6E48A | 5.56389 |
| 115 | D753E680DA0C | 5.15097 |
| 116 | 2C4F3846B73B | 5.61595 |
| 117 | 2CF0C114CDE6 | 5.32662 |
| 118 | 402321DA1EE8 | 5.54017 |
| 119 | 9B1C5FA285FF | 5.46826 |
| 120 | 89CCD4198A39 | 5.81874 |
| 121 | 8CCC9E1070AA | 5.47071 |
| 122 | A6F8618DABA3 | 6.12696 |
| 123 | 068DC6397B4C | 5.86346 |
| 124 | 860C87D27677 | 5.84626 |
| 125 | B28A7B2A0082 | 6.26524 |
| 126 | 1F2FB417DDEB | 6.103. |

9. The method as claimed in claim 6, when a number $N_t$ of the transmit antennas is two and a number $N_{FFT}$ of IFFT operation points used in the communication system is 512, $$R\left(8*\left\lfloor\frac{m}{9}\right\rfloor + m \bmod 9\right)$$

has a value defined by $$R(r) = H_{128}\left(ID_{cell} + 1, \prod_{\left\lfloor\frac{r}{128}\right\rfloor}(r \bmod 128)\right),$$

$$r = 8*\left\lfloor\frac{m}{9}\right\rfloor + m \bmod 9 = 0, 1, \cdots, 191, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | C88B5B | 4.67601 |
| 1 | 4B943B | 5.01945 |
| 2 | 26A2CA | 4.9099 |
| 3 | ABF43A | 4.9298 |
| 4 | F653DD | 5.58288 |
| 5 | 686FDB | 5.08845 |
| 6 | 0D2D4F | 5.49959 |
| 7 | E4BEB2 | 5.03402 |
| 8 | C68129 | 5.41883 |
| 9 | 6C86BB | 5.41345 |
| 10 | 0211D9 | 5.25745 |
| 11 | 4A0178 | 4.60192 |
| 12 | 71E762 | 5.20474 |
| 13 | 3EBA79 | 5.1286 |
| 14 | 8CF2B6 | 4.94086 |
| 15 | F052BB | 4.73214 |
| 16 | 36BF3C | 5.22147 |
| 17 | 56684C | 5.74529 |
| 18 | 654D89 | 5.24514 |
| 19 | 2781F3 | 4.89117 |
| 20 | 46876A | 4.62728 |
| 21 | CE53D0 | 4.94685 |
| 22 | 523974 | 4.87706 |
| 23 | 4A0453 | 5.02621 |
| 24 | 47F9ED | 5.91721 |
| 25 | BB2C96 | 4.83723 |
| 26 | 48B142 | 5.21914 |
| 27 | FFDA6B | 5.52578 |
| 28 | 8F8DC4 | 4.95493 |
| 29 | 1A1037 | 5.06145 |
| 30 | 50F345 | 5.39428 |
| 31 | 9C2ABE | 5.15445 |
| 32 | 97191F | 4.88407 |
| 33 | 61FCD0 | 5.82153 |
| 34 | 6F8969 | 6.25241 |
| 35 | 156F56 | 5.42931 |
| 36 | BC8D17 | 5.08773 |
| 37 | F3092A | 5.05832 |
| 38 | A41DBD | 4.75378 |
| 39 | 6EA1E4 | 4.83662 |
| 40 | 6A29F7 | 5.19888 |
| 41 | 462826 | 4.79626 |
| 42 | 5FB555 | 4.97374 |
| 43 | F3D2C6 | 4.93286 |
| 44 | 0BFE87 | 5.03341 |
| 45 | 92AA64 | 4.93443 |
| 46 | A5D580 | 5.18021 |
| 47 | 6D6DFD | 4.94058 |
| 48 | 6A578D | 5.58274 |
| 49 | 967EE4 | 5.18235 |
| 50 | CE4755 | 6.35302 |
| 51 | 2D6ECE | 5.92368 |
| 52 | 6BA1CF | 6.12984 |
| 53 | 019E02 | 6.09087 |
| 54 | A06B8B | 4.90168 |
| 55 | 9CBA18 | 5.48837 |
| 56 | 05FD60 | 5.16162 |
| 57 | FC2322 | 4.95813 |
| 58 | F0898A | 5.74311 |
| 59 | F22469 | 5.32756 |
| 60 | 57673A | 6.33084 |
| 61 | 1A38DB | 5.56632 |
| 62 | A69433 | 4.90576 |
| 63 | 9B80BB | 4.82736 |
| 64 | 6B75F8 | 4.66086 |
| 65 | DF32CD | 5.28631 |
| 66 | D1F692 | 4.86675 |
| 67 | E6FCC8 | 5.65351 |
| 68 | 08DF3D | 4.79648 |
| 69 | 39CFC0 | 4.95539 |
| 70 | EC8BAD | 5.95318 |
| 71 | 16B9AC | 5.12127 |
| 72 | 6E6D24 | 5.88171 |
| 73 | B2027C | 5.22276 |
| 74 | E05272 | 5.72503 |
| 75 | 859C89 | 5.65769 |
| 76 | 6624DD | 4.98579 |
| 77 | F2D404 | 5.27575 |
| 78 | 8B81D9 | 5.26581 |
| 79 | 5C69D7 | 4.97194 |
| 80 | 645838 | 5.86814 |
| 81 | 8DEFA5 | 4.94176 |
| 82 | 22059A | 5.76969 |
| 83 | 70A052 | 5.26498 |
| 84 | 50E6D6 | 5.65313 |
| 85 | B286FB | 5.2203 |
| 86 | 36016D | 5.00459 |
| 87 | 98D31F | 4.85287 |
| 88 | 6A87B3 | 4.80097 |
| 89 | 958B99 | 5.40979 |
| 90 | 8AB689 | 4.89558 |
| 91 | 570A5C | 4.75712 |
| 92 | 47A9A6 | 5.42678 |
| 93 | 4B2F30 | 5.47629 |
| 94 | 0D6033 | 5.36666 |
| 95 | 3F7DAA | 4.73588 |
| 96 | E64518 | 5.68267 |
| 97 | F94B7D | 4.92173 |
| 98 | 78D213 | 5.38737 |
| 99 | 9EDE1D | 5.05499 |
| 100 | 8E3B36 | 5.76876 |

-continued

| ID cell | sequence | papr |
|---|---|---|
| 101 | 74AF80 | 5.10266 |
| 102 | CC8769 | 4.89204 |
| 103 | 265829 | 5.3906 |
| 104 | 7CF001 | 5.44668 |
| 105 | B5D0CE | 5.14106 |
| 106 | 43277F | 5.24521 |
| 107 | 015C21 | 4.93279 |
| 108 | A4AB8B | 5.01596 |
| 109 | B3A938 | 5.15091 |
| 110 | 3333D3 | 4.78207 |
| 111 | AFA03D | 5.52105 |
| 112 | 88F995 | 5.11364 |
| 113 | E1668B | 5.77986 |
| 114 | 660486 | 5.54529 |
| 115 | 950A62 | 5.40358 |
| 116 | 8C5ADE | 4.8725 |
| 117 | E5A8B8 | 4.92944 |
| 118 | B829A5 | 6.05407 |
| 119 | F307EB | 5.82622 |
| 120 | B17886 | 5.21061 |
| 121 | D84D1D | 4.76129 |
| 122 | EF6206 | 5.37892 |
| 123 | 4DBF2A | 5.23858 |
| 124 | 99AE0A | 5.42723 |
| 125 | B72333 | 5.34308 |
| 126 | 39157D | 5.3781. |

10. The method as claimed in claim 6, when a number $N_t$ of the transmit antennas is three and a number $N_{FFT}$ of IFFT operation points used in the communication system is 2048, $$R\left(8*\left\lfloor\frac{m}{9}\right\rfloor + m\bmod 9\right)$$

has a value defined by $$R(r) = H_{128}\left(ID_{cell}+1, \prod_{\left\lfloor\frac{r}{128}\right\rfloor}(r\bmod 128)\right),$$

$$r = 8*\left\lfloor\frac{m}{9}\right\rfloor + m\bmod 9 = 0, 1, \cdots, 511, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | EBB5219015A2CF69 | 5.60481 |
| 1 | E7577012119C2F4F | 5.8025 |
| 2 | 94641A95D3892C4C | 5.39292 |
| 3 | 5605C4FD0295FA2D | 5.70729 |
| 4 | 888E813B80653270 | 6.10319 |
| 5 | 0B89E336263C9B47 | 5.67799 |
| 6 | D02AEC72AA4281DE | 5.95384 |
| 7 | 840A86AB95735147 | 6.34571 |
| 8 | 70DDEEADB853EFD3 | 6.15491 |
| 9 | 2A30262668215D10 | 5.36612 |
| 10 | 3946313945569C2D | 5.64591 |
| 11 | F3A1D436C3335470 | 5.41957 |
| 12 | 06F12B55575C91BC | 6.05684 |
| 13 | 5D1F19936F14DCAD | 5.84532 |
| 14 | 04071D77D7F9A845 | 5.61247 |
| 15 | 497BB95882E4EEAB | 5.6825 |
| 16 | 6412AB106D4D9A28 | 5.92933 |
| 17 | 7DF8E9AFE6C144FB | 5.60962 |
| 18 | 57E378362038C702 | 6.34889 |
| 19 | 3062CAC92903466F | 5.58868 |
| 20 | 0830B23AD7B527D0 | 5.59669 |
| 21 | 27D31A5FF122C9AF | 5.68495 |
| 22 | 3F8D7282F8A55AA0 | 5.89226 |
| 23 | 0577DCD47B2A9880 | 5.69177 |
| 24 | 494535D2183E1926 | 5.7183 |
| 25 | DD67204C7744C1BE | 5.63368 |
| 26 | 8B25DD9FD8299E13 | 5.84895 |
| 27 | BC975163654F3B50 | 5.75655 |
| 28 | 93514684AE5B2963 | 5.55524 |
| 29 | 609EE16E059C8767 | 6.46135 |
| 30 | 1085286A62ABABBB | 6.03684 |
| 31 | E8461C82A2EDE3C2 | 6.03297 |
| 32 | F10C200C0A9E51A3 | 5.72795 |
| 33 | 4C34030B53AB1008 | 5.95601 |
| 34 | E0D676AC906B414C | 5.84918 |
| 35 | 33EFF510D0879101 | 6.29841 |
| 36 | 0AAA2E53DFD976A1 | 5.69201 |
| 37 | AE20E9552F8ACBB9 | 6.11009 |
| 38 | 091A43A3363B0B54 | 5.5762 |
| 39 | 1F3F86733DB3B67F | 5.34036 |
| 40 | EDDD4EC6D2ED0CA2 | 5.74128 |
| 41 | 2D68F8549B535245 | 6.00089 |
| 42 | E | 5.51124 |
| 43 | 33D3A9D1BB823ECF | 5.61324 |
| 44 | 36F8E824FB016379 | 5.53523 |
| 45 | 02AFFAEFB723B2A4 | 5.6231 |
| 46 | 801426AEF9A6A5B9 | 5.78793 |
| 47 | 35DBBBFE4BD3BAFD | 5.80191 |
| 48 | B81F330CB835F8D5 | 5.83396 |
| 49 | ABB0820EB58B1C1F | 5.61285 |
| 50 | 3A6BA5A0FA06E5F2 | 6.11278 |
| 51 | 42EF0C2E4EB95EC4 | 6.02193 |
| 52 | 85D4C32BEA88C3EE | 5.48754 |
| 53 | 5AA332E1BF1BCAC9 | 5.64628 |
| 54 | 16E626D3EC6652FB | 5.71122 |
| 55 | CBE6AA0BCE5FAA02 | 5.57369 |
| 56 | B65B0A53D4E9992A | 5.65488 |
| 57 | 00DAB2CCA5D49E63 | 5.57148 |
| 58 | 85748563C4F0A429 | 5.6702 |
| 59 | 98BA0BF6BBBD3361 | 5.84405 |
| 60 | 8F797CAB40B4D574 | 6.05648 |
| 61 | AECECD569D866D16 | 6.04214 |
| 62 | E74C6A661AABFBF9 | 5.67473 |
| 63 | AFBF1FF4E46B7EF3 | 5.79021 |
| 64 | E8BC2F963DC3B2B2 | 5.75122 |
| 65 | FF647D9DCB1C197B | 5.6339 |
| 66 | E13FDE868A0B285A | 5.68188 |
| 67 | FDB2D14DAD31C90C | 5.71447 |
| 68 | 88FDEEEE45D696402 | 5.38298 |
| 69 | CBF0781E4924FF3C | 5.62064 |
| 70 | CC89609F74991315 | 5.88678 |
| 71 | B577961BE45EA101 | 6.06286 |
| 72 | 05AB8E2E7E815CDA | 5.79215 |
| 73 | 776AB333EBD0D162 | 6.00548 |
| 74 | 910E866EDC218A13 | 5.96018 |
| 75 | 495C54826C00A631 | 5.74533 |
| 76 | 014D2CBF069404A3 | 5.49484 |
| 77 | 07C190874A47EE57 | 5.62467 |
| 78 | 995EEF2F3F93BFB7 | 5.68453 |
| 79 | 7DC995D53F521A15 | 5.85155 |
| 80 | 2A0042A7ADEDE1FF | 5.90403 |
| 81 | 7EE84B4717C738B6 | 5.28346 |
| 82 | F8052186C6213917 | 5.93926 |
| 83 | 935FE55981908464 | 6.02626 |
| 84 | 69694DB3D2430639 | 6.14314 |
| 85 | 03C3974B6E111058 | 6.10257 |
| 86 | E1959F9D35447BAC | 5.64685 |
| 87 | 933549D2096A322F | 5.89711 |
| 88 | F13CEADB80EED2AD | 6.30465 |
| 89 | 7B98C279EB0A4646 | 6.06922 |
| 90 | 39A9BAE248C76E99 | 5.62153 |
| 91 | C23060852F7114C0 | 5.67005 |
| 92 | 80CC9CEE7A780885 | 5.53147 |
| 93 | C714F7AF79A08A7E | 5.76285 |
| 94 | 84C665021AEFA304 | 5.78511 |
| 95 | 04D180B450A1AC42 | 5.4789 |
| 96 | 7F037D18D5E976C2 | 5.73751 |

-continued

| ID cell | sequence | papr |
|---|---|---|
| 97 | F9B1FE82309652AC | 5.86339 |
| 98 | 7E6678BC9E8741B9 | 6.23575 |
| 99 | F93C8F1B7E2ACF4E | 5.90959 |
| 100 | 558A22F54AD95EDD | 5.69264 |
| 101 | FB63DFF5745D862D | 5.87696 |
| 102 | 525BE5F24FBE4B35 | 5.75721 |
| 103 | 107FD75A05526625 | 5.65658 |
| 104 | B4CAF64A0A876CE9 | 5.8741 |
| 105 | 013830891D01203F | 5.65109 |
| 106 | 2AABE5C3E581F43E | 5.5524 |
| 107 | 07B814E82987B246 | 5.96707 |
| 108 | 0D585FA19DA3EF6F | 5.70668 |
| 109 | 11A8416C59B13AC7 | 5.89308 |
| 110 | 3AA7C3E1D8173A06 | 5.68576 |
| 111 | E52CFF8D410728B1 | 5.74131 |
| 112 | FF4FBAC747F1B6A1 | 5.75276 |
| 113 | 939EE73168ED4C82 | 5.677 |
| 114 | F2D9CA26BBD7E0B4 | 5.84899 |
| 115 | 1017CD88943EB8CB | 5.58448 |
| 116 | 1048528B06C62235 | 5.68438 |
| 117 | 05C2D808853DE26D | 5.51423 |
| 118 | EC83A9206C61798A | 5.99338 |
| 119 | D8C59BA2C56F312A | 5.6595 |
| 120 | B11A7330D4688023 | 5.81244 |
| 121 | BE74B49A67943688 | 5.63205 |
| 122 | FA432B05366B8852 | 5.76478 |
| 123 | 81BDFB717AEFA474 | 6.03504 |
| 124 | D9E20071558716DA | 5.72503 |
| 125 | BD2ED0EB96F3FCD5 | 5.96824 |
| 126 | C3D51B62C949FCCE | 5.63674. |

11. The method as claimed in claim 6, when a number $N_t$ of the transmit antennas is three and a number $N_{FFT}$ of IFFT operation points used in the communication system is 1024, $$R\left(8*\left\lfloor\frac{m}{9}\right\rfloor + m \bmod 9\right)$$

has a value defined by $$R(r) = H_{128}\left(ID_{cell} + 1, \prod_{\lfloor\frac{r}{128}\rfloor}(r \bmod 128)\right),$$

$$r = 8*\left\lfloor\frac{m}{9}\right\rfloor + m \bmod 9 = 0, 1, \cdots, 255, \text{ and said } T\left(\left\lfloor\frac{m}{9}\right\rfloor\right)$$

and $q_{ID_{cell}}[\text{in}]$ have values defined by hexadecimal numbers as shown in

| ID cell | sequence | papr |
|---|---|---|
| 0 | CB8FEAC7 | 5.15583 |
| 1 | 06F43328 | 5.62342 |
| 2 | AFED6295 | 6.22365 |
| 3 | 3E322540 | 5.26289 |
| 4 | D2593855 | 5.19138 |
| 5 | FA1F55C8 | 5.05749 |
| 6 | 0D610CCC | 5.57522 |
| 7 | 38373635 | 5.01025 |
| 8 | C7B4744C | 5.01551 |
| 9 | 6C90FCBB | 5.20449 |
| 10 | 8122195F | 5.04695 |
| 11 | 0AA54C3F | 4.66825 |
| 12 | 94520024 | 4.84099 |
| 13 | 281008C9 | 5.29972 |
| 14 | 1C4B2890 | 5.25349 |
| 15 | 905AEC6F | 4.84371 |
| 16 | BD30B2CD | 5.44488 |
| 17 | 69E8C548 | 5.37924 |
| 18 | E6CA997C | 4.68891 |
| 19 | 26A6D0C0 | 4.93526 |
| 20 | 628666E5 | 4.4603 |
| 21 | EE5304A7 | 4.97386 |
| 22 | 48CB3622 | 5.08221 |
| 23 | DFA0D85E | 5.00963 |
| 24 | 0B906505 | 5.36358 |
| 25 | 392C146F | 4.93658 |
| 26 | 6AB8723D | 5.64086 |
| 27 | D2034CC0 | 5.28929 |
| 28 | 9BD1CBA9 | 5.17126 |
| 29 | B4D7CB69 | 5.56246 |
| 30 | A9ED8CD3 | 5.289 |
| 31 | 7F0397C9 | 5.49132 |
| 32 | 1782D4F5 | 4.90867 |
| 33 | 41C19746 | 5.29604 |
| 34 | 6F63CFD4 | 6.46788 |
| 35 | C7D92076 | 5.21648 |
| 36 | 3A995F69 | 5.28823 |
| 37 | BD19FAC6 | 5.25253 |
| 38 | 345AEECD | 5.28582 |
| 39 | 2F2F9452 | 4.68278 |
| 40 | 2D186366 | 5.15683 |
| 41 | 342FF0D6 | 5.12173 |
| 42 | 449E81E3 | 4.86028 |
| 43 | 85D9863D | 4.80846 |
| 44 | 32B7E693 | 4.66558 |
| 45 | 3F09AA6E | 5.26735 |
| 46 | 8087F514 | 5.12159 |
| 47 | 7CA91C83 | 5.28859 |
| 48 | 2EE7B95F | 5.27919 |
| 49 | 72D518D7 | 5.17632 |
| 50 | B22A330D | 6.8988 |
| 51 | 2A84826E | 5.28768 |
| 52 | 6A786C7F | 5.83993 |
| 53 | 04020217 | 6.1875 |
| 54 | 64E34E15 | 5.03925 |
| 55 | E2CA18D3 | 5.30496 |
| 56 | 37AC5222 | 5.2167 |
| 57 | 7011A0E9 | 4.86805 |
| 58 | 90841BE9 | 5.32789 |
| 59 | B2C87A9D | 6.12947 |
| 60 | F56D3C21 | 6.3528 |
| 61 | 9DC9D0A2 | 5.47964 |
| 62 | B2853B2F | 5.22007 |
| 63 | BBC475D3 | 5.53568 |
| 64 | AE4A4E9B | 5.59729 |
| 65 | 9933A60C | 5.25657 |
| 66 | F1978F10 | 4.7959 |
| 67 | 6C1DCD04 | 5.10028 |
| 68 | 2515AE3B | 5.04345 |
| 69 | 0874401E | 4.67421 |
| 70 | AC11ED65 | 5.9294 |
| 71 | 96211791 | 5.1407 |
| 72 | 69AFE10C | 5.64556 |
| 73 | B3D51D76 | 5.29334 |
| 74 | 8113FF9E | 5.09747 |
| 75 | 1D9EFBDD | 5.18707 |
| 76 | 234549EE | 4.78454 |
| 77 | 927475FD | 5.39462 |
| 78 | B1404944 | 4.95295 |
| 79 | 552815A4 | 6.2202 |
| 80 | 470610E6 | 5.62302 |
| 81 | 7EEF9D4B | 4.88997 |
| 82 | 68645A2C | 6.07151 |
| 83 | 4435E7A5 | 5.63064 |
| 84 | C8E58BB3 | 6.80605 |
| 85 | 948EFBB2 | 5.57596 |
| 86 | C1917FF7 | 5.48329 |
| 87 | 6C9AE67E | 4.93469 |
| 88 | 44BFEAC7 | 5.54454 |
| 89 | 565B8F5E | 5.89093 |
| 90 | A8F39A23 | 4.67016 |
| 91 | 269FE877 | 4.88909 |
| 92 | 13EAF0DF | 4.91822 |

-continued

| ID cell | sequence | papr |
|---|---|---|
| 93 | 624FDBA7 | 4.997 |
| 94 | 9CF725BA | 5.13808 |
| 95 | D0FDA9AC | 5.03832 |
| 96 | F8806BAD | 5.15283 |
| 97 | AD29F883 | 4.95856 |
| 98 | CCB14BB9 | 4.83304 |
| 99 | FE9E4FBA | 5.31628 |
| 100 | 1A345FA7 | 5.13454 |
| 101 | E12EF826 | 5.34722 |
| 102 | DC6A6A85 | 5.07414 |
| 103 | 2E7DDFA4 | 5.20743 |
| 104 | 6D79E1F4 | 5.22863 |
| 105 | 4FDCB0E0 | 5.22455 |
| 106 | 53076335 | 5.35733 |
| 107 | 025C0A04 | 5.74473 |
| 108 | 24190046 | 4.48846 |
| 109 | 733AE2B4 | 5.30588 |
| 110 | 29A991FE | 4.82382 |
| 111 | D5E8E325 | 5.23798 |
| 112 | F94B0091 | 4.77719 |
| 113 | 09EB2797 | 5.51662 |
| 114 | 538A66AA | 5.86963 |
| 115 | D49EFACF | 4.88564 |
| 116 | 2E5E8F59 | 5.24587 |
| 117 | D2250855 | 5.11869 |
| 118 | 50031D89 | 5.26554 |
| 119 | D3FC03A0 | 5.03861 |
| 120 | 9148DD11 | 5.15572 |
| 121 | FC0DD67A | 5.1763 |
| 122 | B3620135 | 4.73865 |
| 123 | 9B9DD357 | 5.48933 |
| 124 | BFCBF0BE | 5.34988 |
| 125 | 371AB31A | 5.35378 |
| 126 | 38101882 | 5.49554. |

12. The method as claimed in claim 6, when a number $N_t$ of the transmit antennas is three and a number $N_{FFT}$ of IFFT operation points used in the communication system is 512, $$R\!\left(8*\left\lfloor\frac{m}{9}\right\rfloor + m\ \text{mod}\,9\right)$$

has a value defined by $$R(r) = H_{128}\!\left(ID_{cell}+1,\ \prod_{\left\lfloor\frac{r}{128}\right\rfloor}(r\ \text{mod}\,128)\right),$$

$$r = 8*\left\lfloor\frac{m}{9}\right\rfloor + m\ \text{mod}\,9 = 0,\ 1,\ \cdots,\ 127,\ \text{and said}\ T\!\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | 2197 | 4.19373 |
| 1 | 0D7A | 4.52301 |
| 2 | AF7B | 4.60134 |
| 3 | 8D7D | 4.43697 |
| 4 | 5659 | 4.45478 |
| 5 | 786B | 4.44368 |
| 6 | 58E5 | 4.71563 |
| 7 | B43C | 4.95923 |
| 8 | E01B | 4.62147 |
| 9 | AFBE | 4.86292 |
| 10 | 5B33 | 4.48154 |
| 11 | 6326 | 4.65913 |
| 12 | B0FE | 4.47246 |
| 13 | 7D50 | 4.57845 |
| 14 | 1EF6 | 4.17626 |
| 15 | 8264 | 4.64049 |
| 16 | 33D9 | 4.55088 |
| 17 | 6C9F | 4.52818 |
| 18 | A76F | 4.39514 |
| 19 | 7A2A | 5.06253 |
| 20 | 0488 | 4.70612 |
| 21 | C25A | 4.70319 |
| 22 | 5779 | 4.44569 |
| 23 | 5F30 | 4.76144 |
| 24 | 47D5 | 4.72732 |
| 25 | 89AF | 4.66002 |
| 26 | E2A7 | 4.37136 |
| 27 | F14E | 4.40459 |
| 28 | A963 | 4.44538 |
| 29 | 17B6 | 3.73691 |
| 30 | 20BD | 4.62356 |
| 31 | 9F2B | 4.70725 |
| 32 | A71A | 5.22983 |
| 33 | FCDD | 5.40854 |
| 34 | F309 | 4.48828 |
| 35 | 2260 | 4.97653 |
| 36 | 985D | 4.3215 |
| 37 | BF8D | 4.80015 |
| 38 | 6345 | 4.47419 |
| 39 | EE35 | 4.72718 |
| 40 | C2C8 | 4.33645 |
| 41 | 8DCA | 4.72911 |
| 42 | 65EB | 4.67972 |
| 43 | 5BD6 | 4.45284 |
| 44 | 3657 | 4.20409 |
| 45 | 8A40 | 4.61712 |
| 46 | F79D | 4.56916 |
| 47 | 346D | 4.60012 |
| 48 | 6015 | 4.76798 |
| 49 | 9696 | 6.17153 |
| 50 | EAE1 | 4.52968 |
| 51 | 162E | 4.36476 |
| 52 | 4A4B | 5.8336 |
| 53 | 0493 | 4.53168 |
| 54 | ADA1 | 4.63721 |
| 55 | C51E | 4.59395 |
| 56 | 8B63 | 5.42257 |
| 57 | 5508 | 4.3453 |
| 58 | 8887 | 4.54333 |
| 59 | FE8D | 3.99562 |
| 60 | 9F63 | 4.19506 |
| 61 | 00BA | 4.50001 |
| 62 | E7D1 | 4.41194 |
| 63 | 43B9 | 4.23605 |
| 64 | CB61 | 4.69086 |
| 65 | 72DD | 4.38892 |
| 66 | C7A7 | 4.69706 |
| 67 | 7F9D | 5.03396 |
| 68 | 2AED | 4.30871 |
| 69 | E134 | 4.65157 |
| 70 | AD8D | 5.89058 |
| 71 | 5065 | 4.48793 |
| 72 | 3AA7 | 4.3173 |
| 73 | F642 | 4.75911 |
| 74 | C521 | 4.71632 |
| 75 | 2D84 | 4.87128 |
| 76 | A335 | 4.33797 |
| 77 | FC46 | 4.83393 |
| 78 | 0907 | 4.70575 |
| 79 | D71A | 4.6364 |
| 80 | C174 | 5.21763 |
| 81 | 2583 | 4.36862 |
| 82 | F65F | 4.64336 |
| 83 | 7CA0 | 4.89679 |
| 84 | EDA5 | 4.86511 |
| 85 | 9445 | 3.88229 |
| 86 | 4860 | 4.76487 |
| 87 | E905 | 4.24911 |
| 88 | 5966 | 5.02129 |

-continued

| ID cell | sequence | papr |
| --- | --- | --- |
| 89 | FCA6 | 4.52957 |
| 90 | 1465 | 4.22799 |
| 91 | 0572 | 4.58851 |
| 92 | 23EB | 4.65141 |
| 93 | 9B0B | 3.93818 |
| 94 | 467C | 4.71579 |
| 95 | 5BC9 | 4.39535 |
| 96 | AECA | 4.6301 |
| 97 | AF75 | 4.54999 |
| 98 | E589 | 4.65198 |
| 99 | 72A0 | 5.45701 |
| 100 | B70A | 4.59467 |
| 101 | 2B4E | 4.1115 |
| 102 | 8B35 | 4.76813 |
| 103 | 6841 | 4.41251 |
| 104 | 6290 | 4.75626 |
| 105 | 7A62 | 4.43697 |
| 106 | 6550 | 4.23136 |
| 107 | 11D8 | 4.49253 |
| 108 | 0C67 | 4.14239 |
| 109 | 6741 | 4.90459 |
| 110 | F128 | 4.7665 |
| 111 | 9167 | 4.61706 |
| 112 | B2C1 | 4.80371 |
| 113 | EDB3 | 4.27782 |
| 114 | 4A74 | 4.58645 |
| 115 | 1085 | 4.17758 |
| 116 | 1BD8 | 4.4536 |
| 117 | 64E8 | 4.18647 |
| 118 | 7538 | 5.1831 |
| 119 | FB16 | 4.33093 |
| 120 | C5FB | 4.43481 |
| 121 | 5C8C | 4.34469 |
| 122 | EB32 | 4.3743 |
| 123 | 1531 | 4.46991 |
| 124 | 792F | 4.39589 |
| 125 | 8461 | 4.42202 |
| 126 | B8D0 | 4.53339. |

13. An apparatus for transmitting a pilot symbol from a base station (BS) to a subscriber station (SS) in a communication system, the apparatus comprising:

a transmitter for transmitting a first set of sub-carriers being mapped to a first sequence based on an identifier of the base station in a frequency domain of the pilot symbol, and transmitting a second set of sub-carriers being mapped to a second sequence for reducing a PAPR (Peak to Average Power Ratio) of the pilot symbol together with the transmission of the first set of sub-carriers in the frequency domain;

wherein the pilot symbol including the first set of sub-carriers and the second set of sub-carriers is defined by $$P_{ID_{cell},n}[k] =$$

$$\begin{cases} 1 - 2q_{ID_{cell}}[m], & k = N_t m - \frac{N_{used}}{2} + n, m = 0, 1, \cdots, \frac{N_{used}}{N_t} - 1 \\ 0, & \text{otherwise} \end{cases},$$

$$ID_{cell} \in \{0, 1, \ldots, 126\}, n = 0, 1, \ldots N_t,$$

$$k \in \left\{ -\frac{N_{FFT}}{2}, -\frac{N_{FFT}}{2} + 1, \ldots, \frac{N_{FFT}}{2} - 1 \right\}$$

where $P_{ID_{cell}}[k]$ denotes the pilot symbol, $ID_{cell}$ denotes a base station identifier, n denotes a transmit antenna identifier, m denotes a running index of sequence $q_{ID_{cell},S}$, k denotes a sub-carrier index, $N_{used}$ denotes a number of sub-carriers in which null data is not inserted, and $q_{ID_{cell}}[m]$ denotes the sequences.

14. The apparatus as claimed in claim 13, further comprising:

a selector for generating the first sequence and the second sequence by using a predetermined Walsh Hadamard matrix, each row of which includes Walsh codes, the selector selecting a specific row of the Walsh Hadamard matrix corresponding to an identifier of a specific base station and repeating the selected row a predetermined number of times;

a repeater for repeating a predetermined number of times a Walsh code corresponding to a sector identifier from among Walsh codes set in advance;

a plurality of interleavers for interleaving each row of the Walsh Hadamard matrix according to a predetermined interleaving scheme; and a plurality of adders for performing exclusive OR (XOR) on each of the interleaved rows of the Walsh Hadamard matrix and the repeated Walsh codes.

15. The apparatus as claimed in claim 13, wherein the transmitter comprises:

an Inverse Fast Fourier Transform (IFFT) unit for inserting null data into sub-carriers corresponding to DC components and intersubcarrier interference eliminating components from among N sub-carriers, inserting elements of the pilot symbol into M sub-carriers other than the sub-carriers into which the null data is inserted from among the N sub-carriers, and performing IFFT on a signal including the pilot symbol elements and the M sub-carriers; and a Radio Frequency (RF) processor for RF-processing and transmitting the IFFT-processed signal.

16. The apparatus as claimed in claim 13, wherein the second sequence for reducing a PAPR of the pilot symbol is determined in advance and corresponds to an identifier of a specific base station.

17. The apparatus as claimed in claim 14, wherein, when the communication system includes only one sector for identifying cells, the Walsh codes are all 1 Walsh codes, all of which have a value of 1.

18. The apparatus as claimed in claim 17, wherein the sequences have values defined by $$q_{ID_{cell}}[m] = \begin{cases} R\left(8 * \left\lfloor \frac{m}{9} \right\rfloor + m \bmod 9\right) = 0, 1, \cdots, 7 \\ T\left(\left\lfloor \frac{m}{9} \right\rfloor\right), \text{ where } m \bmod 9 = 8 \end{cases} \quad m = 0, 1, \cdots, \frac{N_{used}}{N_t} - 1.$$

19. The apparatus as claimed in claim 18, wherein when a number $N_t$ of the transmit antennas is two and a number $N_{FFT}$ of Inverse Fast Fourier Transform (IFFT) operation points used in the communication system is 2048, $$R\left(8 * \left\lfloor \frac{m}{9} \right\rfloor + m \bmod 9\right)$$

has a value defined by $$R(r) = H_{128}\left(ID_{cell} + 1, \prod_{\lfloor \frac{r}{128} \rfloor}(r \bmod 128)\right),$$

$$r = 8 * \left\lfloor \frac{m}{9} \right\rfloor + m \bmod 9 = 0, 1, \cdots, 767, \text{ and said } T\left(\left\lfloor \frac{m}{9} \right\rfloor\right)$$

and $q_{ID_{cell}}[m]$ have values defined by hexadecimal numbers as shown in

| ID cell | sequence | papr |
|---|---|---|
| 0 | E5F121DCFF4A0E63825399D3 | 5.92384 |
| 1 | D10BA3F1A15DDF9C4D819B45 | 6.28771 |
| 2 | 13310AB0491064CE7516898C | 5.88237 |
| 3 | E53C10EB0B1E830D7C2302A2 | 5.72241 |
| 4 | 37DBDBACCEDC976D1DE87D53 | 6.54265 |
| 5 | E43B8C8299E5B2B49798FA28 | 6.23106 |
| 6 | 52A78E348A46E8E84CF29D7B | 6.96087 |
| 7 | CA6B366D37E54A7EDF32A688 | 6.23321 |
| 8 | 3852A3F8B0E1E7FC41301F17 | 6.35304 |
| 9 | 271E4591888CBCD44B32B809 | 5.88167 |
| 10 | 1CB9181F0A47346785BC9464 | 6.5208 |
| 11 | 786E7023033922819D70233B | 6.16551 |
| 12 | D7E0A495CFE8CEC3D2AF4B5D | 5.99014 |
| 13 | 360ECD45D330B876A8F13462 | 6.43524 |
| 14 | C63BDDD2D536FF2416B7A424 | 6.01736 |
| 15 | 10A8B5DAB83CE78B3FCFC31D | 6.19619 |
| 16 | 6152A33C894DC0B62EEA0DDA | 6.13798 |
| 17 | 757A237D70ABD7AB1FFB04F0 | 5.95019 |
| 18 | BC0D0BEA01E586B664401CFC | 6.2348 |
| 19 | 8A5CD82D82B19593F8266E7E | 5.67582 |
| 20 | F44201B0903E55006BDFD5B0 | 6.78315 |
| 21 | 5F252E0EC94C7965A2B347F3 | 6.37986 |
| 22 | 6E376986A947B180015A0A9A | 6.24373 |
| 23 | 3669CAF711FC2129743CFFBA | 6.1472 |
| 24 | C1D8E53D16322CB3B1386B0E | 5.87095 |
| 25 | 9E1F780C45570E3A475F5A77 | 6.11801 |
| 26 | 32F36D066051FAE51512A8F3 | 6.27711 |
| 27 | 464AD0462512248F26313BC4 | 6.50894 |
| 28 | 03F93CDFCA5B9D3262FD2D25 | 6.12574 |
| 29 | 694CAFC989888FC1F358CA8F | 5.86597 |
| 30 | 8C9F1D8E186EAFEDF0D6F4DD | 6.17035 |
| 31 | C4E95F3E65B40D938946B132 | 5.84552 |
| 32 | 5891E3188FA53AE34576A803 | 5.85053 |
| 33 | 409FF8A9E7FCDA58D4A5241B | 6.10709 |
| 34 | 3C70E4E442FA01B79EE09FA5 | 6.20979 |
| 35 | 36817EE5B08B5B4B9CE88CBE | 5.77008 |
| 36 | BA78FAA5BDCC40837F5205DA | 6.31919 |
| 37 | A490E570CE08172BD82A3633 | 5.73775 |
| 38 | 8433E275E271D4EC11019463 | 5.78564 |
| 39 | F83B07F42EFAE5F1EA281A78 | 5.68333 |
| 40 | B9B93373373FFCB301EFCD77 | 5.79877 |
| 41 | 22B5A5AAC8B3756C6C4ADFE6 | 6.27794 |
| 42 | C6DFADA3233FF4EE17DE5E17 | 5.87103 |
| 43 | 70D09DC4F9121828C70B6064 | 5.76809 |
| 44 | F01F5956C24E2156253809D8 | 6.64621 |
| 45 | 8E157642C21545D6AFC4C9EE | 5.77721 |
| 46 | 391D93EF8012E5D2F8E2C299 | 6.87607 |
| 47 | EC1D207A7BA6C4852C105E34 | 6.09394 |
| 48 | 55858594CBAC6A7760D72623 | 6.0547 |
| 49 | FBB76DDCC08E8B0A89E8D35B | 6.30027 |
| 50 | 6394D6CFC5269D0B8DFCE4D6 | 5.71258 |
| 51 | F92EDE555781CC62F5C3FA42 | 6.26962 |
| 52 | E66B7E6E901C802D1725C31B | 6.98039 |
| 53 | 0BA101B2F3F78E672EFC0CC7 | 6.25099 |
| 54 | 26E1EC3E787F6092D1634683 | 6.54994 |
| 55 | 4767A25488E79F75E2F45FA1 | 6.25162 |
| 56 | 1A2FC69DC4DCAD0399DAF857 | 6.06972 |
| 57 | 53F2BFC63878B6C2C10C8A2C | 5.70754 |
| 58 | C20824E0B5348061E2A4C1CE | 6.05831 |
| 59 | 8F1B88288316B59939D490A9 | 6.002 |
| 60 | 3203E66C6406767186F8955A | 6.79504 |
| 61 | B335E583FD89A0A410876B81 | 6.17206 |
| 62 | C11D537E5E2992361F2CC44B | 6.06154 |
| 63 | F1E074FEB2CF55427C573C6F | 5.80776 |
| 64 | BC8C283A7CA014EC79837DD7 | 5.82436 |
| 65 | DF29647F465044A0BC7D2720 | 6.28397 |
| 66 | F29CCF3995F08458FA0F8908 | 5.89065 |
| 67 | 28F5D1FD67E98528DB28BB5D | 6.08206 |
| 68 | DC5908BB6B8E1B84ADF881A8 | 6.01325 |
| 69 | 0AF44605329EE32ACF75481B | 5.84218 |
| 70 | C7CEF13FD6FE89346FB543B2 | 6.33524 |
| 71 | 5D2B9D0E4306F96A65BAF4EB | 6.34218 |
| 72 | 0E2D2473C890413D9A9D8DB1 | 6.05022 |
| 73 | 7C082A7E84B366733C6E19D1 | 5.9351 |
| 74 | 85C50A024C78CC1B3AEF4C94 | 5.84302 |
| 75 | 298A3E89079EF4C27CC921A9 | 6.13354 |
| 76 | 825D06F901CE94D8168D8A46 | 6.00828 |
| 77 | 73DCC20AFF8C5837F539EE22 | 6.27564 |
| 78 | 553DD23CB093EFD7C544F013 | 5.88433 |
| 79 | 5EE648A514E40CF0E7ECE2A1 | 5.95859 |
| 80 | F7B98C7D1DD5CE51B6B678A3 | 6.54896 |
| 81 | 9B840FF5F78473E2F75B8E2D | 5.87521 |
| 82 | 8C99E9A614E8AC8C74566752 | 6.03187 |
| 83 | B7EC60A09ACD2CABB53DEDE9 | 5.95608 |
| 84 | 2900FBF0CC91DA813CDBEAD0 | 5.87135 |
| 85 | 949EF4015122026200DF05F1 | 6.11214 |
| 86 | F3AE5B267C36BF3877E4AC49 | 5.87287 |
| 87 | A4E43FBE54A0280D65419C99 | 6.0007 |
| 88 | F116946F21EF61D108AC2F42 | 6.94574 |
| 89 | 5B82DE3F0ADB20D788A045A6 | 6.13544 |
| 90 | AC639F8BDB63A8C4E4746E65 | 6.25857 |
| 91 | 70C588D838AB0FC61F8EABDA | 5.85846 |
| 92 | D6A8AD537E8258E745C1C476 | 5.82355 |
| 93 | 8A4F652DF088D93FC0073FD8 | 6.00051 |
| 94 | 450F92DF140D63380103F31B | 6.48422 |
| 95 | EAAF05F63641E7AFED3A5A79 | 5.90759 |
| 96 | 5F501203D217CF94BC44A6C1 | 6.5396 |
| 97 | 71F6C952D988BC8847E0BA88 | 6.09041 |
| 98 | BF472D6610532AE50CDF829A | 6.28286 |
| 99 | D15D9E8AECFE8C296D5802D6 | 6.22803 |
| 100 | D5AD5575149C76589FF8784A | 6.07452 |
| 101 | 7868B4788F33D2EA66C86BE2 | 5.83685 |
| 102 | B722E30271A97725EA79020A | 5.97044 |
| 103 | 30209E7F80F14A76FCB45DBF | 6.06914 |
| 104 | 6FA8FDC42599BDFDCEEFD828 | 5.99957 |
| 105 | 9CAF25C12BA260391958223B | 5.91873 |
| 106 | CD82CBA6EA27C514AA8F40A0 | 5.72081 |
| 107 | 96852F4F3B879A23F97D3DFA | 6.24847 |
| 108 | 236F33011BD7E277C5BC9561 | 5.84184 |
| 109 | 9B74FD2CA98D58E7B8EDD5DB | 6.1246 |
| 110 | 2DC51FEED52392D7174435E8 | 5.80747 |
| 111 | 8708EE1A78F79E3E14D30DD7 | 6.23013 |
| 112 | FCCD639AD5BA5B1451CBD600 | 5.96117 |
| 113 | 652492280DC624A59D2A3F82 | 6.32939 |
| 114 | B8D0EC8813E8453214C74501 | 5.99404 |
| 115 | 2AC9F5941B28ED1CF89F6F0A | 5.96885 |
| 116 | 64DB26CD230FABD4BA1A8412 | 6.58194 |
| 117 | C3E2EF9EDB75E639EDC84DEA | 6.07393 |
| 118 | 4BE5A9ADCB4B4C4758F4CEBD | 5.98986 |
| 119 | 3C72C151C36EA2757082442D | 6.02742 |
| 120 | B482C15B86D52FC1106E2E60 | 5.91514 |
| 121 | F26820407553EDB43C57123C | 6.07394 |
| 122 | 1C045E9D66325157825D6967 | 6.10105 |
| 123 | 0E0F6D035E1AC7A1D76161A7 | 6.7399 |
| 124 | C1C20BF875BE9E94D1CAE3BA | 5.82982 |
| 125 | 527261E102F3FC3ABCE2C13C | 5.96992 |
| 126 | 8AFE184CD76A2756E5394350 | 6.76565. |

20. The apparatus as claimed in claim 18, when a number $N_t$ of the transmit antennas is two and a number $N_{FFT}$ of IFFT operation points used in the communication system is 1024, $$R\left(8*\left\lfloor\frac{m}{9}\right\rfloor + m \bmod 9\right)$$

has a value defined by $$R(r) = H_{128}\left(ID_{cell} + 1, \prod_{\lfloor\frac{r}{128}\rfloor}(r \bmod 128)\right),$$

$$r = 8*\left\lfloor\frac{m}{9}\right\rfloor + m \bmod 9 = 0, 1, \cdots, 383, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | C9A1F9FB33E2 | 5.73908 |
| 1 | C615462A8D6E | 5.69178 |
| 2 | D8400C1E2B47 | 5.67259 |
| 3 | DBCF1478431C | 5.91286 |
| 4 | CC93B30C0EB9 | 5.55863 |
| 5 | C6F3D332B053 | 5.3082 |
| 6 | 9BA4E419EBB5 | 5.5186 |
| 7 | 48FD85CD7E76 | 6.11686 |
| 8 | E992B4493831 | 5.69693 |
| 9 | 4E1401A862B5 | 5.92235 |
| 10 | 9D3239BF5543 | 5.50286 |
| 11 | 2B8584BFB3D8 | 5.19875 |
| 12 | AB42706F96A0 | 5.44334 |
| 13 | 9DB123495FB7 | 5.63328 |
| 14 | A6EFBCB2865D | 6.0094 |
| 15 | 709300E57360 | 5.73209 |
| 16 | 6E2122FC796F | 5.82368 |
| 17 | 7F01F8B4454F | 5.47779 |
| 18 | CDF8525E2FF7 | 5.33406 |
| 19 | 0AC1FA2585A5 | 6.24242 |
| 20 | 46843DFB1135 | 5.65053 |
| 21 | 8B411A6D7235 | 5.524 |
| 22 | 096A3287FE74 | 5.65888 |
| 23 | E26CD654FF1A | 5.89291 |
| 24 | D955EFF989FE | 5.90035 |
| 25 | 882566402741 | 5.62867 |
| 26 | 9FCD0AB3FCF8 | 5.79711 |
| 27 | 8E477A39DA36 | 5.45249 |
| 28 | 83740061371F | 5.42528 |
| 29 | 179FBF270668 | 5.59438 |
| 30 | 0B4738E24AE1 | 6.26907 |
| 31 | 9BD23A217294 | 5.83321 |
| 32 | E783A99153C7 | 5.57411 |
| 33 | 60690386D94B | 5.56542 |
| 34 | EEB11CF6A279 | 5.61602 |
| 35 | 17737FC0364B | 5.46925 |
| 36 | DBA832CB29FF | 5.46318 |
| 37 | 841030AA2B58 | 5.66141 |
| 38 | 573AE8A1189A | 6.49919 |
| 39 | 26EF1E523190 | 5.45727 |
| 40 | 45F27228B846 | 6.37869 |
| 41 | D26C39A8D803 | 5.63232 |
| 42 | 4514BB4432A6 | 5.74245 |
| 43 | 13CBBBDD1888 | 5.25927 |
| 44 | 34B0D91482A7 | 5.43386 |
| 45 | 0DB3ECE942B0 | 5.40054 |
| 46 | A4D876BF7C4E | 5.45618 |
| 47 | 7D492A0F5B39 | 6.40321 |
| 48 | C82DA6102B09 | 5.31582 |
| 49 | F68C09C7D629 | 5.1445 |
| 50 | 4D6C3B62D026 | 6.44183 |
| 51 | EBD13D02E539 | 5.35096 |
| 52 | 760432EDBC5B | 5.42816 |
| 53 | 022040211B53 | 5.58372 |
| 54 | 2663067DE01D | 5.50621 |
| 55 | C0776A8DD057 | 5.29609 |
| 56 | 96117C9722E1 | 5.61786 |
| 57 | 204C31E521C4 | 5.27659 |
| 58 | C8C12F23551B | 5.70925 |
| 59 | 1217E2F687C1 | 5.51497 |
| 60 | DBF86CB15B3B | 5.57367 |
| 61 | BCC4EC437886 | 5.94074 |
| 62 | AA2734F33EF9 | 5.71983 |
| 63 | CBA739A84A4D | 5.96463 |
| 64 | E12166CA6DF5 | 5.64715 |
| 65 | DE42128CD418 | 5.16399 |
| 66 | F90F21A0B95F | 5.52101 |
| 67 | DCC08885C1D0 | 5.34739 |
| 68 | 152AFEFAA90D | 5.34108 |
| 69 | CB30CE0D8CD2 | 5.89277 |
| 70 | 849C1C0DA6A3 | 5.64765 |
| 71 | B8177804D737 | 5.78193 |
| 72 | 693BE40CEE81 | 5.6998 |
| 73 | 632921AF950C | 6.29239 |
| 74 | C4D296ABB9B0 | 5.55821 |
| 75 | 08DCE8EE0E46 | 5.61434 |
| 76 | 616A6B8637F3 | 5.29314 |
| 77 | DB69C2C67E5F | 5.67251 |
| 78 | B7922C4D47E0 | 5.54227 |
| 79 | 5A4273474A62 | 5.41366 |
| 80 | 50082E465126 | 5.57391 |
| 81 | 2E3844099ABD | 5.27701 |
| 82 | F8EFB7F0CE2F | 5.76264 |
| 83 | 64B7E857C964 | 5.89799 |
| 84 | 5B4DDAF2A8D1 | 6.02566 |
| 85 | B639EE82C328 | 5.71509 |
| 86 | 6414C0DB128C | 6.26365 |
| 87 | 08FEAB4846B9 | 5.5487 |
| 88 | 7E160C4BA0F0 | 5.7677 |
| 89 | 5CCA9AF7C373 | 5.61368 |
| 90 | 21B3DF421DE7 | 5.43398 |
| 91 | 9323DD2F2771 | 5.2348 |
| 92 | A26015CF1514 | 5.78478 |
| 93 | 8220CF898D60 | 5.43634 |
| 94 | 8CCEC410F8A6 | 5.33904 |
| 95 | 4FFDECD6D0E0 | 5.50659 |
| 96 | 42D052099826 | 5.68271 |
| 97 | 8785DFDA586A | 5.2863 |
| 98 | 68DDF31B930F | 5.65759 |
| 99 | F0539BCDAACB | 5.6598 |
| 100 | 372C0613FE2C | 5.21517 |
| 101 | 37402B2A80A9 | 6.29655 |
| 102 | 523AE3212125 | 5.41681 |
| 103 | 02EDF46F9694 | 5.47569 |
| 104 | E64CC083190E | 5.71759 |
| 105 | 65DE3871D0D1 | 5.80455 |
| 106 | 7808E3E5FE8E | 5.88159 |
| 107 | 070004E13E81 | 5.79589 |
| 108 | 1CE29934CF8D | 5.33859 |
| 109 | 52B8A394BDBC | 5.9872 |
| 110 | 1A13C7DB3016 | 5.31546 |
| 111 | CE75430244B7 | 5.40294 |
| 112 | DD89BD52F023 | 5.81172 |
| 113 | 6B98276F9841 | 5.59191 |
| 114 | 6610C6E6E48A | 5.56389 |
| 115 | D753E680DA0C | 5.15097 |
| 116 | 2C4F3846B73B | 5.61595 |
| 117 | 2CF0C114CDE6 | 5.32662 |
| 118 | 402321DA1EE8 | 5.54017 |
| 119 | 9B1C5FA285FF | 5.46826 |
| 120 | 89CCD4198A39 | 5.81874 |
| 121 | 8CCC9E1070AA | 5.47071 |
| 122 | A6F8618DABA3 | 6.12696 |
| 123 | 068DC6397B4C | 5.86346 |
| 124 | 860C87D27677 | 5.84626 |
| 125 | B28A7B2A0082 | 6.26524 |
| 126 | 1F2FB417DDEB | 6.103. |

21. The apparatus as claimed in claim 18, when a number $N_t$ of the transmit antennas is two and a number $N_{FFT}$ of IFFT operation points used in the communication system is 512, $$R\left(8*\left\lfloor\frac{m}{9}\right\rfloor + m \bmod 9\right)$$

has a value defined by $$R(r) = H_{128}\left(ID_{cell} + 1, \prod_{\left\lfloor\frac{r}{128}\right\rfloor}(r \bmod 128)\right),$$

$r = 8*\left\lfloor\frac{m}{9}\right\rfloor + m \bmod 9 = 0, 1, \cdots, 191$, and said $T\left(\left\lfloor\frac{m}{9}\right\rfloor\right)$ and $q_{ID_{cell}}[m]$ have values defined by hexadecimal numbers as shown in

| ID cell | sequence | papr |
|---|---|---|
| 0 | C88B5B | 4.67601 |
| 1 | 4B943B | 5.01945 |
| 2 | 26A2CA | 4.9099 |
| 3 | ABF43A | 4.9298 |
| 4 | F653DD | 5.58288 |
| 5 | 686FDB | 5.08845 |
| 6 | 0D2D4F | 5.49959 |
| 7 | E4BEB2 | 5.03402 |
| 8 | C68129 | 5.41883 |
| 9 | 6C86BB | 5.41345 |
| 10 | 0211D9 | 5.25745 |
| 11 | 4A0178 | 4.60192 |
| 12 | 71E762 | 5.20474 |
| 13 | 3EBA79 | 5.1286 |
| 14 | 8CF2B6 | 4.94086 |
| 15 | F052BB | 4.73214 |
| 16 | 36BF3C | 5.22147 |
| 17 | 56684C | 5.74529 |
| 18 | 654D89 | 5.24514 |
| 19 | 2781F3 | 4.89117 |
| 20 | 46876A | 4.62728 |
| 21 | CE53D0 | 4.94685 |
| 22 | 523974 | 4.87706 |
| 23 | 4A0453 | 5.02621 |
| 24 | 47F9ED | 5.91721 |
| 25 | BB2C96 | 4.83723 |
| 26 | 48B142 | 5.21914 |
| 27 | FFDA6B | 5.52578 |
| 28 | 8F8DC4 | 4.95493 |
| 29 | 1A1037 | 5.06145 |
| 30 | 50F345 | 5.39428 |
| 31 | 9C2ABE | 5.15445 |
| 32 | 97191F | 4.88407 |
| 33 | 61FCD0 | 5.82153 |
| 34 | 6F8969 | 6.25241 |
| 35 | 156F56 | 5.42931 |
| 36 | BC8D17 | 5.08773 |
| 37 | F3092A | 5.05832 |
| 38 | A41DBD | 4.75378 |
| 39 | 6EA1E4 | 4.83662 |
| 40 | 6A29F7 | 5.19888 |
| 41 | 462826 | 4.79626 |
| 42 | 5FB555 | 4.97374 |
| 43 | F3D2C6 | 4.93286 |
| 44 | 0BFE87 | 5.03341 |
| 45 | 92AA64 | 4.93443 |
| 46 | A5D580 | 5.18021 |
| 47 | 6D6DFD | 4.94058 |
| 48 | 6A578D | 5.58274 |
| 49 | 967EE4 | 5.18235 |
| 50 | CE4755 | 6.35302 |
| 51 | 2D6ECE | 5.92368 |
| 52 | 6BA1CF | 6.12984 |
| 53 | 019E02 | 6.09087 |
| 54 | A06B8B | 4.90168 |
| 55 | 9CBA18 | 5.48837 |
| 56 | 05FD60 | 5.16162 |
| 57 | FC2322 | 4.95813 |
| 58 | F0898A | 5.74311 |
| 59 | F22469 | 5.32756 |
| 60 | 57673A | 6.33084 |
| 61 | 1A38DB | 5.56632 |
| 62 | A69433 | 4.90576 |
| 63 | 9B80BB | 4.82736 |
| 64 | 6B75F8 | 4.66086 |
| 65 | DF32CD | 5.28631 |
| 66 | D1F692 | 4.86675 |
| 67 | E6FCC8 | 5.65351 |
| 68 | 08DF3D | 4.79648 |
| 69 | 39CFC0 | 4.95539 |
| 70 | EC8BAD | 5.95318 |
| 71 | 16B9AC | 5.12127 |
| 72 | 6E6D24 | 5.88171 |
| 73 | B2027C | 5.22276 |
| 74 | E05272 | 5.72503 |
| 75 | 859C89 | 5.65769 |
| 76 | 6624DD | 4.98579 |
| 77 | F2D404 | 5.27575 |
| 78 | 8B81D9 | 5.26581 |
| 79 | 5C69D7 | 4.97194 |
| 80 | 645838 | 5.86814 |
| 81 | 8DEFA5 | 4.94176 |
| 82 | 22059A | 5.76969 |
| 83 | 70A052 | 5.26498 |
| 84 | 50E6D6 | 5.65313 |
| 85 | B286FB | 5.2203 |
| 86 | 36016D | 5.00459 |
| 87 | 98D31F | 4.85287 |
| 88 | 6A87B3 | 4.80097 |
| 89 | 958B99 | 5.40979 |
| 90 | 8AB689 | 4.89558 |
| 91 | 570A5C | 4.75712 |
| 92 | 47A9A6 | 5.42678 |
| 93 | 4B2F30 | 5.47629 |
| 94 | 0D6033 | 5.36666 |
| 95 | 3F7DAA | 4.73588 |
| 96 | E64518 | 5.68267 |
| 97 | F94B7D | 4.92173 |
| 98 | 78D213 | 5.38737 |
| 99 | 9EDE1D | 5.05499 |
| 100 | 8E3B36 | 5.76876 |
| 101 | 74AF80 | 5.10266 |
| 102 | CC8769 | 4.89204 |
| 103 | 265829 | 5.3906 |
| 104 | 7CF001 | 5.44668 |
| 105 | B5D0CE | 5.14106 |
| 106 | 43277F | 5.24521 |
| 107 | 015C21 | 4.93279 |
| 108 | A4AB8B | 5.01596 |
| 109 | B3A938 | 5.15091 |
| 110 | 3333D3 | 4.78207 |
| 111 | AFA03D | 5.52105 |
| 112 | 88F995 | 5.11364 |
| 113 | E1668B | 5.77986 |
| 114 | 660486 | 5.54529 |
| 115 | 950A62 | 5.40358 |
| 116 | 8C5ADE | 4.8725 |
| 117 | E5A8B8 | 4.92944 |
| 118 | B829A5 | 6.05407 |
| 119 | F307EB | 5.82622 |
| 120 | B17886 | 5.21061 |
| 121 | D84D1D | 4.76129 |
| 122 | EF6206 | 5.37892 |
| 123 | 4DBF2A | 5.23858 |
| 124 | 99AE0A | 5.42723 |
| 125 | B72333 | 5.34308 |
| 126 | 39157D | 5.3781. |

22. The apparatus as claimed in claim 18, when a number $N_t$ of the transmit antennas is three and a number $N_{FFT}$ of IFFT operation points used in the communication system is 2048, $$R\left(8*\left\lfloor \frac{m}{9} \right\rfloor + m \bmod 9\right)$$

has a value defined by $$R(r) = H_{128}\left(ID_{cell} + 1, \prod_{\left\lfloor \frac{r}{128} \right\rfloor}(r \bmod 128)\right),$$

$$r = 8*\left\lfloor \frac{m}{9} \right\rfloor + m \bmod 9 = 0, 1, \cdots, 511, \text{ and said } T\left(\left\lfloor \frac{m}{9} \right\rfloor\right)$$

and $q_{ID_{cell}}[m]$ have values defined by hexadecimal numbers as shown in

| ID cell | sequence | papr |
|---|---|---|
| 0 | EBB5219015A2CF69 | 5.60481 |
| 1 | E7577012119C2F4F | 5.8025 |
| 2 | 94641A95D3892C4C | 5.39292 |
| 3 | 5605C4FD0295FA2D | 5.70729 |
| 4 | 888E813B80653270 | 6.10319 |
| 5 | 0B89E336263C9B47 | 5.67799 |
| 6 | D02AEC72AA4281DE | 5.95384 |
| 7 | 840A86AB95735147 | 6.34571 |
| 8 | 70DDEEADB853EFD3 | 6.15491 |
| 9 | 2A30262668215D10 | 5.36612 |
| 10 | 3946313945569C2D | 5.64591 |
| 11 | F3A1D436C3335470 | 5.41957 |
| 12 | 06F12B55575C91BC | 6.05684 |
| 13 | 5D1F19936F14DCAD | 5.84532 |
| 14 | 04071D77D7F9A845 | 5.61247 |
| 15 | 497BB95882E4EEAB | 5.6825 |
| 16 | 6412AB106D4D9A28 | 5.92933 |
| 17 | 7DF8E9AFE6C144FB | 5.60962 |
| 18 | 57E378362038C702 | 6.34889 |
| 19 | 3062CAC92903466F | 5.58868 |
| 20 | 0830B23AD7B527D0 | 5.59669 |
| 21 | 27D31A5FF122C9AF | 5.68495 |
| 22 | 3F8D7282F8A55AA0 | 5.89226 |
| 23 | 0577DCD47B2A9880 | 5.69177 |
| 24 | 494535D2183E1926 | 5.7183 |
| 25 | DD67204C7744C1BE | 5.63368 |
| 26 | 8B25DD9FD8299E13 | 5.84895 |
| 27 | BC975163654F3B50 | 5.75655 |
| 28 | 93514684AE5B2963 | 5.55524 |
| 29 | 609EE16E059C8767 | 6.46135 |
| 30 | 1085286A62ABABBB | 6.03684 |
| 31 | E8461C82A2EDE3C2 | 6.03297 |
| 32 | F10C200C0A9E51A3 | 5.72795 |
| 33 | 4C34030B53AB1008 | 5.95601 |
| 34 | E0D676AC906B414C | 5.84918 |
| 35 | 33EFF510D0879101 | 6.29841 |
| 36 | 0AAA2E53DFD976A1 | 5.69201 |
| 37 | AE20E9552F8ACBB9 | 6.11009 |
| 38 | 091A43A3363B0B54 | 5.5762 |
| 39 | 1F3F86733DB3B67F | 5.34036 |
| 40 | EDDD4EC6D2ED0CA2 | 5.74128 |
| 41 | 2D68F8549B535245 | 6.00089 |
| 42 | E | 5.51124 |
| 43 | 33D3A9D1BB823ECF | 5.61324 |
| 44 | 36F8E824FB016379 | 5.53523 |
| 45 | 02AFFAEFB723B2A4 | 5.6231 |
| 46 | 801426AEF9A6A5B9 | 5.78793 |
| 47 | 35DBBBFE4BD3BAFD | 5.80191 |
| 48 | B81F330CB835F8D5 | 5.83396 |
| 49 | ABB0820EB58B1C1F | 5.61285 |
| 50 | 3A6BA5A0FA06E5F2 | 6.11278 |
| 51 | 42EF0C2E4EB95EC4 | 6.02193 |
| 52 | 85D4C32BEA88C3EE | 5.48754 |
| 53 | 5AA332E1BF1BCAC9 | 5.64628 |
| 54 | 16E626D3EC6652FB | 5.71122 |
| 55 | CBE6AA0BCE5FAA02 | 5.57369 |
| 56 | B65B0A53D4E9992A | 5.65488 |
| 57 | 00DAB2CCA5D49E63 | 5.57148 |
| 58 | 85748563C4F0A429 | 5.6702 |
| 59 | 98BA0BF6BBBD3361 | 5.84405 |
| 60 | 8F797CAB40B4D574 | 6.05648 |
| 61 | AECECD569D866D16 | 6.04214 |
| 62 | E74C6A661AABFBF9 | 5.67473 |
| 63 | AFBF1FF4E46B7EF3 | 5.79021 |
| 64 | E8BC2F963DC3B2B2 | 5.75122 |
| 65 | FF647D9DCB1C197B | 5.6339 |
| 66 | E13FDE868A0B285A | 5.68188 |
| 67 | FDB2D14DAD31C90C | 5.71447 |
| 68 | 88FDEEE45D696402 | 5.38298 |
| 69 | CBF0781E4924FF3C | 5.62064 |
| 70 | CC89609F74991315 | 5.88678 |
| 71 | B577961BE45EA101 | 6.06286 |
| 72 | 05AB8E2E7E815CDA | 5.79215 |
| 73 | 776AB333EBD0D162 | 6.00548 |
| 74 | 910E866EDC218A13 | 5.96018 |
| 75 | 495C54826C00A631 | 5.74533 |
| 76 | 014D2CBF069404A3 | 5.49484 |
| 77 | 07C190874A47EE57 | 5.62467 |
| 78 | 995EEF2F3F93BFB7 | 5.68453 |
| 79 | 7DC995D53F521A15 | 5.85155 |
| 80 | 2A0042A7ADEDE1FF | 5.90403 |
| 81 | 7EE84B4717C738B6 | 5.28346 |
| 82 | F8052186C6213917 | 5.93926 |
| 83 | 935FE55981908464 | 6.02626 |
| 84 | 69694DB3D2430639 | 6.14314 |
| 85 | 03C3974B6E111058 | 6.10257 |
| 86 | E1959F9D35447BAC | 5.64685 |
| 87 | 933549D2096A322F | 5.89711 |
| 88 | F13CEADB80EED2AD | 6.30465 |
| 89 | 7B98C279EB0A4646 | 6.06922 |
| 90 | 39A9BAE248C76E99 | 5.62153 |
| 91 | C23060852F7114C0 | 5.67005 |
| 92 | 80CC9CEE7A780885 | 5.53147 |
| 93 | C714F7AF79A08A7E | 5.76285 |
| 94 | 84C665021AEFA304 | 4.78511 |
| 95 | 04D180B450A1AC42 | 5.4789 |
| 96 | 7F037D18D5E976C2 | 5.73751 |
| 97 | F9B1FE82309652AC | 5.86339 |
| 98 | 7E6678BC9E8741B9 | 6.23575 |
| 99 | F93C8F1B7E2ACF4E | 5.90959 |
| 100 | 558A22F54AD95EDD | 5.69264 |
| 101 | FB63DFF5745D862D | 5.87696 |
| 102 | 525BE5F24FBE4B35 | 5.75721 |
| 103 | 107FD75A05526625 | 5.65658 |
| 104 | B4CAF64A0A876CE9 | 5.8741 |
| 105 | 013830891D01203F | 5.65109 |
| 106 | 2AABE5C3E581F43E | 5.5524 |
| 107 | 07B814E82987B246 | 5.96707 |
| 108 | 0D585FA19DA3EF6F | 5.70668 |
| 109 | 11A8416C59B13AC7 | 5.89308 |
| 110 | 3AA7C3E1D8173A06 | 5.68576 |
| 111 | E52CFF8D410728B1 | 5.74131 |
| 112 | FF4FBAC747F1B6A1 | 5.75276 |
| 113 | 939EE73168ED4C82 | 5.677 |
| 114 | F2D9CA26BBD7E0B4 | 5.84899 |
| 115 | 1017CD88943EB8CB | 5.58448 |
| 116 | 1048528B06C62235 | 5.68438 |
| 117 | 05C2D808853DE26D | 5.51423 |
| 118 | EC83A9206C61798A | 5.99338 |
| 119 | D8C59BA2C56F312A | 5.6595 |
| 120 | B11A7330D4688023 | 5.81244 |
| 121 | BE74B49A67943688 | 5.63205 |
| 122 | FA432B05366B8852 | 5.76478 |
| 123 | 81BDFB717AEFA474 | 6.03504 |
| 124 | D9E20071558716DA | 5.72503 |
| 125 | BD2ED0EB96F3FCD5 | 5.96824 |
| 126 | C3D51B62C949FCCE | 5.63674. |

23. The apparatus as claimed in claim 18, when a number $N_t$ of the transmit antennas is three and a number $N_{FFT}$ of IFFT operation points used in the communication system is 1024, $$R\left(8*\left\lfloor \frac{m}{9} \right\rfloor + m \bmod 9\right)$$

has a value defined by $$R(r) = H_{128}\left(ID_{cell} + 1, \prod_{\lfloor \frac{r}{128} \rfloor}(r \bmod 128)\right),$$

$$r = 8*\left\lfloor \frac{m}{9} \right\rfloor + m \bmod 9 = 0, 1, \cdots, 255, \text{ and said } T\left(\left\lfloor \frac{m}{9} \right\rfloor\right)$$

and $q_{ID_{cell}}[m]$ have values defined by hexadecimal numbers as shown in

| ID cell | sequence | papr |
|---|---|---|
| 0 | CB8FEAC7 | 5.15583 |
| 1 | 06F43328 | 5.62342 |
| 2 | AFED6295 | 6.22365 |
| 3 | 3E322540 | 5.26289 |
| 4 | D2593855 | 5.19138 |
| 5 | FA1F55C8 | 5.05749 |
| 6 | 0D610CCC | 5.57522 |
| 7 | 38373635 | 5.01025 |
| 8 | C7B4744C | 5.01551 |
| 9 | 6C90FCBB | 5.20449 |
| 10 | 8122195F | 5.04695 |
| 11 | 0AA54C3F | 4.66825 |
| 12 | 94520024 | 4.84099 |
| 13 | 281008C9 | 5.29972 |
| 14 | 1C4B2890 | 5.25349 |
| 15 | 905AEC6F | 4.84371 |
| 16 | BD30B2CD | 5.44488 |
| 17 | 69E8C548 | 5.37924 |
| 18 | E6CA997C | 4.68891 |
| 19 | 26A6D0C0 | 4.93526 |
| 20 | 628666E5 | 4.4603 |
| 21 | EE5304A7 | 4.97386 |
| 22 | 48CB3622 | 5.08221 |
| 23 | DFA0D85E | 5.00963 |
| 24 | 0B906505 | 5.36358 |
| 25 | 392C146F | 4.93658 |
| 26 | 6AB8723D | 5.64086 |
| 27 | D2034CC0 | 5.28929 |
| 28 | 9BD1CBA9 | 5.17126 |
| 29 | B4D7CB69 | 5.56246 |
| 30 | A9ED8CD3 | 5.289 |
| 31 | 7F0397C9 | 5.49132 |
| 32 | 1782D4F5 | 4.90867 |
| 33 | 41C19746 | 5.29604 |
| 34 | 6F63CFD4 | 6.46788 |
| 35 | C7D92076 | 5.21648 |
| 36 | 3A995F69 | 5.28823 |
| 37 | BD19FAC6 | 5.25253 |
| 38 | 345AEECD | 5.28582 |
| 39 | 2F2F9452 | 4.68278 |
| 40 | 2D186366 | 5.15683 |
| 41 | 342FF0D6 | 5.12173 |
| 42 | 449E81E3 | 4.86028 |
| 43 | 85D9863D | 4.80846 |
| 44 | 32B7E693 | 4.66558 |
| 45 | 3F09AA6E | 5.26735 |
| 46 | 8087F514 | 5.12159 |
| 47 | 7CA91C83 | 5.28859 |
| 48 | 2EE7B95F | 5.27919 |
| 49 | 72D518D7 | 5.17632 |
| 50 | B22A330D | 6.8988 |
| 51 | 2A84826E | 5.28768 |
| 52 | 6A786C7F | 5.83993 |
| 53 | 04020217 | 6.1875 |
| 54 | 64E34E15 | 5.03925 |
| 55 | E2CA18D3 | 5.30496 |
| 56 | 37AC5222 | 5.2167 |
| 57 | 7011A0E9 | 4.86805 |
| 58 | 90841BE9 | 5.32789 |
| 59 | B2C87A9D | 6.12947 |
| 60 | F56D3C21 | 6.3528 |
| 61 | 9DC9D0A2 | 5.47964 |
| 62 | B2853B2F | 5.22007 |
| 63 | BBC475D3 | 5.53568 |
| 64 | AE4A4E9B | 5.59729 |
| 65 | 9933A60C | 5.25657 |
| 66 | F1978F10 | 4.7959 |
| 67 | 6C1DCD04 | 5.10028 |
| 68 | 2515AE3B | 5.04345 |
| 69 | 0874401E | 4.67421 |
| 70 | AC11ED65 | 5.9294 |
| 71 | 96211791 | 5.1407 |
| 72 | 69AFE10C | 5.64556 |
| 73 | B3D51D76 | 5.29334 |
| 74 | 8113FF9E | 5.09747 |
| 75 | 1D9EFBDD | 5.18707 |
| 76 | 234549EE | 4.78454 |
| 77 | 927475FD | 5.39462 |
| 78 | B1404944 | 4.95295 |
| 79 | 552815A4 | 6.2202 |
| 80 | 470610E6 | 5.62302 |
| 81 | 7EEF9D4B | 4.88997 |
| 82 | 68645A2C | 6.07151 |
| 83 | 4435E7A5 | 5.63064 |
| 84 | C8E58BB3 | 6.80605 |
| 85 | 948EFBB2 | 5.57596 |
| 86 | C1917FF7 | 5.48329 |
| 87 | 6C9AE67E | 4.93469 |
| 88 | 44BFEAC7 | 5.54454 |
| 89 | 565B8F5E | 5.89093 |
| 90 | A8F39A23 | 4.67016 |
| 91 | 269FE877 | 4.88909 |
| 92 | 13EAF0DF | 4.91822 |
| 93 | 624FDBA7 | 4.997 |
| 94 | 9CF725BA | 5.13808 |
| 95 | D0FDA9AC | 5.03832 |
| 96 | F8806BAD | 5.15283 |
| 97 | AD29F883 | 4.95856 |
| 98 | CCB14BB9 | 4.83304 |
| 99 | FE9E4FBA | 5.31628 |
| 100 | 1A345FA7 | 5.13454 |
| 101 | E12EF826 | 5.34722 |
| 102 | DC6A6A85 | 5.07414 |
| 103 | 2E7DDFA4 | 5.20743 |
| 104 | 6D79E1F4 | 5.22863 |
| 105 | 4FDCB0E0 | 5.22455 |
| 106 | 53076335 | 5.35733 |
| 107 | 025C0A04 | 5.74473 |
| 108 | 24190046 | 4.48846 |
| 109 | 733AE2B4 | 5.30588 |
| 110 | 29A991FE | 4.82382 |
| 111 | D5E8E325 | 5.23798 |
| 112 | F94B8091 | 4.77719 |
| 113 | 09EB2797 | 5.51662 |
| 114 | 538A66AA | 5.86963 |
| 115 | D49EFACF | 4.88564 |
| 116 | 2E5E8F59 | 5.24587 |
| 117 | D2250855 | 5.11869 |
| 118 | 50031D89 | 5.26554 |
| 119 | D3FC03A0 | 5.03861 |
| 120 | 9148DD11 | 5.15572 |
| 121 | FC0DD67A | 5.1763 |
| 122 | 83620135 | 4.73865 |
| 123 | 9B9DD357 | 5.48933 |
| 124 | BFCBF0BE | 5.34988 |
| 125 | 371AB31A | 5.35378 |
| 126 | 38101882 | 5.49554. |

24. The apparatus as claimed in claim 18, when a number $N_t$ of the transmit antennas is three and a number $N_{FFT}$ of IFFT operation points used in the communication system is 512, $$R\left(8*\left\lfloor\frac{m}{9}\right\rfloor + m \bmod 9\right)$$

has a value defined by $$R(r) = H_{128}\left(ID_{cell} + 1, \prod_{\lfloor\frac{r}{128}\rfloor}(r \bmod 128)\right),$$

$$r = 8*\left\lfloor\frac{m}{9}\right\rfloor + m \bmod 9 = 0, 1, \cdots, 127, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | 2197 | 4.19373 |
| 1 | 0D7A | 4.52301 |
| 2 | AF7B | 4.60134 |
| 3 | 8D7D | 4.43697 |
| 4 | 5659 | 4.45478 |
| 5 | 786B | 4.44368 |
| 6 | 58E5 | 4.71563 |
| 7 | B43C | 4.95923 |
| 8 | E01B | 4.62147 |
| 9 | AFBE | 4.86292 |
| 10 | 5B33 | 4.48154 |
| 11 | 6326 | 4.65913 |
| 12 | B0FE | 4.47246 |
| 13 | 7D50 | 4.57845 |
| 14 | 1EF6 | 4.17626 |
| 15 | 8264 | 4.64049 |
| 16 | 33D9 | 4.55088 |
| 17 | 6C9F | 4.52818 |
| 18 | A76F | 4.39514 |
| 19 | 7A2A | 5.06253 |
| 20 | 0488 | 4.70612 |
| 21 | C25A | 4.70319 |
| 22 | 5779 | 4.44569 |
| 23 | 5F30 | 4.76144 |
| 24 | 47D5 | 4.72732 |
| 25 | 89AF | 4.66002 |
| 26 | E2A7 | 4.37136 |
| 27 | F14E | 4.40459 |
| 28 | A963 | 4.44538 |
| 29 | 17B6 | 3.73691 |
| 30 | 20BD | 4.62356 |
| 31 | 9F2B | 4.70725 |
| 32 | A71A | 5.22983 |
| 33 | FCDD | 5.40854 |
| 34 | F309 | 4.48828 |
| 35 | 2260 | 4.97653 |
| 36 | 985D | 4.3215 |
| 37 | BF8D | 4.80015 |
| 38 | 6345 | 4.47419 |
| 39 | EE35 | 4.72718 |
| 40 | C2C8 | 4.33645 |
| 41 | 8DCA | 4.72911 |
| 42 | 65EB | 4.67972 |
| 43 | 5BD6 | 4.45284 |
| 44 | 3657 | 4.20409 |
| 45 | 8A40 | 4.61712 |
| 46 | F79D | 4.56916 |
| 47 | 346D | 4.60012 |
| 48 | 6015 | 4.76798 |
| 49 | 9696 | 6.17153 |
| 50 | EAE1 | 4.52968 |
| 51 | 162E | 4.36476 |
| 52 | 4A4B | 5.8336 |
| 53 | 0493 | 4.53168 |
| 54 | ADA1 | 4.63721 |
| 55 | C51E | 4.59395 |
| 56 | 8B63 | 5.42257 |
| 57 | 5508 | 4.3453 |
| 58 | 8887 | 4.54333 |
| 59 | FE8D | 3.99562 |
| 60 | 9F63 | 4.19506 |
| 61 | 00BA | 4.50001 |
| 62 | E7D1 | 4.41194 |
| 63 | 43B9 | 4.23605 |
| 64 | CB61 | 4.69086 |
| 65 | 72DD | 4.38892 |
| 66 | C7A7 | 4.69706 |
| 67 | 7F9D | 5.03396 |
| 68 | 2AED | 4.30871 |
| 69 | E134 | 4.65157 |
| 70 | AD8D | 5.89058 |
| 71 | 5065 | 4.48793 |
| 72 | 3AA7 | 4.3173 |
| 73 | F642 | 4.75911 |
| 74 | C521 | 4.71632 |
| 75 | 2D84 | 4.87128 |
| 76 | A335 | 4.33797 |
| 77 | FC46 | 4.83393 |
| 78 | 0907 | 4.70575 |
| 79 | D71A | 4.6364 |
| 80 | C174 | 5.21763 |
| 81 | 2583 | 4.36862 |
| 82 | F65F | 4.64336 |
| 83 | 7CA0 | 4.89679 |
| 84 | EDA5 | 4.86511 |
| 85 | 9445 | 3.88229 |
| 86 | 4860 | 4.76487 |
| 87 | E905 | 4.24911 |
| 88 | 5966 | 5.02129 |
| 89 | FCA6 | 4.52957 |
| 90 | 1465 | 4.22799 |
| 91 | 0572 | 4.58851 |
| 92 | 23EB | 4.65141 |
| 93 | 9B0B | 3.93818 |
| 94 | 467C | 4.71579 |
| 95 | 5BC9 | 4.39535 |
| 96 | AECA | 4.6301 |
| 97 | AE75 | 4.54999 |
| 98 | E589 | 4.65198 |
| 99 | 72A0 | 5.45701 |
| 100 | B70A | 4.59467 |
| 101 | 2B4E | 4.1115 |
| 102 | 8B35 | 4.76813 |
| 103 | 6841 | 4.41251 |
| 104 | 6290 | 4.75626 |
| 105 | 7A62 | 4.43697 |
| 106 | 6550 | 4.23136 |
| 107 | 11D8 | 4.49253 |
| 108 | 0C67 | 4.14239 |
| 109 | 6741 | 4.90459 |
| 110 | F128 | 4.7665 |
| 111 | 9167 | 4.61706 |
| 112 | B2C1 | 4.80371 |
| 113 | EDB3 | 4.27782 |
| 114 | 4A74 | 4.58645 |
| 115 | 1085 | 4.17758 |
| 116 | 1BD8 | 4.4536 |
| 117 | 64E8 | 4.18647 |
| 118 | 7538 | 5.1831 |
| 119 | FB16 | 4.33093 |
| 120 | C5FB | 4.43481 |
| 121 | 5C8C | 4.34469 |
| 122 | EB32 | 4.3743 |
| 123 | 1531 | 4.46991 |
| 124 | 792F | 4.39589 |
| 125 | 8461 | 4.42202 |
| 126 | B8D0 | 4.53339. |

25. A method for generating a pilot symbol for synch acquisition and channel estimation in a communication system, the method comprising the steps of:
generating a first sequence to be mapped to first sub-carriers for identifying a base station; and
generating a second sequence to be mapped to second sub-carriers for reducing a PAPR (Peak to Average Power Ratio) of the pilot symbol;
wherein the first sequence is defined by $$R(r) = H_{128}\left(ID_{cell}, \prod_{\lfloor \frac{r}{128} \rfloor}(r \bmod 128)\right);$$

$$r = 8\left\lfloor \frac{m}{9} \right\rfloor + m \bmod 9 = 0, 1, \cdots, N_r - 1,$$

where $H_{128}$ denotes a $128^{th}$ order Walsh Hadamard matrix and $\Pi_i(\bullet)$ denotes interleaving of a column of the $128^{th}$ order Walsh Hadamard matrix $H_{128}$.

26. The method as claimed in claim 25, further comprises the steps of:
mapping the first sequence and the second sequence to corresponding sub-carriers; and
performing IFFT on the mapped sub-carriers and transmitting the IFFT-processed sub-carriers.

27. The method as claimed in claim 25, wherein the $\Pi_i(\bullet)$ has values as shown in

| | |
|---|---|
| $\Pi_0(l)$ | 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 0 |
| $\Pi_1(l)$ | 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 0 |
| $\Pi_2(l)$ | 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 0 |
| $\Pi_3(l)$ | 69, 99, 112, 56, 28, 14, 7, 66, 33, 81, 105, 117, 123, 124, 62, 31, 78, 39, 82, 41, 85, 107, 116, 58, 29, 79, 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 0 |
| $\Pi_4(l)$ | 102, 51, 88, 44, 22, 11, 68, 34, 17, 73, 101, 115, 120, 60, 30, 15, 70, 35, 80, 40, 20, 10, 5, 67, 96, 48, 24, 12, 6, 3, 64, 32, 16, 8, 4, 2, 1, 65, 97, 113, 121, 125, 127, 126, 63, 94, 47, 86, 43, 84, 42, 21, 75, 100, 50, 25, 77, 103, 114, 57, 93, 111, 118, 59, 92, 46, 23, 74, 37, 83, 104, 52, 26, 13, 71, 98, 49, 89, 109, 119, 122, 61, 95, 110, 55, 90, 45, 87, 106, 53, 91, 108, 54, 27, 76, 38, 19, 72, 36, 18, 9, 69, 99, 112, 56, 28, 14, 7, 66, 33, 81, 105, 117, 123, 124, 62, 31, 78, 39, 82, 41, 85, 107, 116, 58, 29, 79, 0 |

, in which l has values from 0 to 127.

28. The method as claimed in claim 25, wherein the first sequence for identifying the base station is generated by using a Walsh Hadamard matrix, each row of which includes Walsh codes, a specific row of the Walsh Hadamard matrix corresponds to an identifier of a specific base station and is interleaved according to a predetermined interleaving scheme, an interleaved signal is mapped to predetermined sub-carriers to form the first sub-carriers, when the first sub-carriers are transmitted.

29. The method as claimed in claim 28, wherein the Walsh codes are all 1 Walsh codes all of which have a value of 1 in a communication system in which sector identification is unnecessary.

30. The method as claimed in claim 25, wherein the pilot symbol including the first sub-carriers and the second sub-carriers is defined by $$P_{ID_{cell},n}[k] = \begin{cases} 1 - 2q_{ID_{cell}}[m], & k = N_t m - \frac{N_{used}}{2} + n, m = 0, 1, \cdots, \frac{N_{used}}{N_t} - 1 \\ 0, & \text{otherwise} \end{cases}$$

$$ID_{cell} \in \{0, 1, \ldots, 126\}, n = 0, 1, \ldots N_t,$$

$$k \in \left\{-\frac{N_{FFT}}{2}, -\frac{N_{FFT}}{2}+1, \ldots, \frac{N_{FFT}}{2}-1\right\},$$

where $P_{ID_{cell},n}[k]$ denotes the pilot symbol, $ID_{cell}$ denotes a base station identifier, n denotes a transmit antenna identifier, k denotes a sub-carrier index, and $N_{used}$ denotes a number of sub-carriers in which null data is not inserted.

31. The method as claimed in claim 30, wherein said $q_{ID_{cell}}[m]$ has a value defined by $$q_{ID_{cell}}[m] = \begin{cases} R\left(8*\left\lfloor\frac{m}{9}\right\rfloor + m \bmod 9\right), & \text{where } m \bmod 9 = 0, 1, \cdots, 7 \\ T\left(\left\lfloor\frac{m}{9}\right\rfloor\right), & \text{where } m \bmod 9 = 8 \end{cases}$$

$$m = 0, 1, \cdots, \frac{N_{used}}{N_t} - 1.$$

32. The method as claimed in claim 31, when a number $N_t$ of the transmit antennas is two and a number $N_{FFT}$ of Inverse Fast Fourier Transform (IFFT) operation points used in the communication system is 2048, $$R\left(8*\left\lfloor\frac{m}{9}\right\rfloor + m\bmod 9\right)$$

has a value defined by $$R(r) = H_{128}\left(ID_{cell}+1, \prod_{\lfloor\frac{r}{128}\rfloor}(r\bmod 128)\right),$$

$$r = 8*\left\lfloor\frac{m}{9}\right\rfloor + m\bmod 9 = 0, 1, \cdots, 767, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | E5F121DCFF4A0E63825399D3 | 5.92384 |
| 1 | D10BA3F1A15DDF9C4D819B45 | 6.28771 |
| 2 | 13310AB0491064CE7516898C | 5.88237 |
| 3 | E53C10EB0B1E830D7C2302A2 | 5.72241 |
| 4 | 37DBDBACCEDC976D1DE87D53 | 6.54265 |
| 5 | E43B8AC8299E5B2B49798FA28 | 6.23106 |
| 6 | 52A78E348A46E8E84CF29D7B | 6.96087 |
| 7 | CA6B366D37E54A7EDF32A688 | 6.23321 |
| 8 | 3852A3F8B0E1E7FC41301F17 | 6.35304 |
| 9 | 271E4591888CBCD44B32B809 | 5.88167 |
| 10 | 1CB9181F0A47346785BC9464 | 6.5208 |
| 11 | 786E7023033922819D70233B | 6.16551 |
| 12 | D7E0A495CFE8CEC3D2AF4B5D | 5.99014 |
| 13 | 360ECD45D330B876A8F13462 | 6.43524 |
| 14 | C63BDDD2D536FF2416B7A424 | 6.01736 |
| 15 | 10A8B5DAB83CE78B3FCFC31D | 6.19619 |
| 16 | 6152A33C894DC0B62EEA0DDA | 6.13798 |
| 17 | 757A237D70ABD7AB1FFB04F0 | 5.95019 |
| 18 | BC0D0BEA01E586B664401CFC | 6.2348 |
| 19 | 8A5CD82D82B19593F8266E7E | 5.67582 |
| 20 | F44201B0903E55006BDFD5B0 | 6.78315 |
| 21 | 5F252E0EC94C7965A2B347F3 | 6.37986 |
| 22 | 6E376986A947B180015A0A9A | 6.24373 |
| 23 | 3669CAF711FC2129743CFFBA | 6.1472 |
| 24 | C1D8E53D16322CB3B1386B0E | 5.87095 |
| 25 | 9E1F780C45570E3A475F5A77 | 6.11801 |
| 26 | 32F36D066051FAE51512A8F3 | 6.27711 |
| 27 | 464AD0462512248F26313BC4 | 6.50894 |
| 28 | 03F93CDFCA5B9D3262FD2D25 | 6.12574 |
| 29 | 694CAFC989888FC1F358CA8F | 5.86597 |
| 30 | 8C9F1D8E186EAFEDF0D6F4DD | 6.17035 |
| 31 | C4E95F3E65B40D938946B132 | 5.84552 |
| 32 | 5891E3188FA53AE34576A803 | 5.85053 |
| 33 | 409FF8A9E7FCDA58D4A5241B | 6.10709 |
| 34 | 3C70E4E442FA01B79EE09FA5 | 6.20979 |
| 35 | 36817EE5B08B5B4B9CE88CBE | 5.77008 |
| 36 | BA78FAA5BDCC40837F5205DA | 6.31919 |
| 37 | A490E570CE08172BD82A3633 | 5.73775 |
| 38 | 8433E275E271D4EC11019463 | 5.78564 |
| 39 | F83B07F42EFAE5F1EA281A78 | 5.68333 |
| 40 | B9B93373373FFCB301EFCD77 | 5.79877 |
| 41 | 22B5A5AAC8B3756C6C4ADFE6 | 6.27794 |
| 42 | C6DFADA3233FF4EE17DE5E17 | 5.87103 |
| 43 | 70D09DC4F9121828C70B6064 | 5.76809 |
| 44 | F01F5956C24E2156253809D8 | 6.64621 |
| 45 | 8E157642C21545D6AFC4C9EE | 5.77721 |
| 46 | 391D93EF8012E5D2F8E2C299 | 6.87607 |
| 47 | EC1D207A7BA6C4852C105E34 | 6.09394 |
| 48 | 55858594CBAC6A7760D72623 | 6.0547 |
| 49 | FBB76DDCC08E8B0A89E8D35B | 6.30027 |
| 50 | 6394D6CFC5269D0B8DFCE4D6 | 5.71258 |
| 51 | F92EDE555781CC62F5C3FA42 | 6.26962 |
| 52 | E66B7E6E901C802D1725C31B | 6.98039 |
| 53 | 0BA101B2F3F78E672EFC0CC7 | 6.25099 |
| 54 | 26E1EC3E787F6092D1634683 | 6.54994 |
| 55 | 4767A25488E79F75E2F45FA1 | 6.25162 |
| 56 | 1A2FC69DC4DCAD0399DAF857 | 6.06972 |
| 57 | 53F2BFC63878B6C2C10C8A2C | 5.70754 |
| 58 | C20824E0B5348061E2A4C1CE | 6.05831 |
| 59 | 8F1B88288316B59939D490A9 | 6.002 |
| 60 | 3203E66C6406767186F8955A | 6.79504 |
| 61 | B335E583FD89A0A410876B81 | 6.17206 |
| 62 | C11D537E5E2992361F2CC44B | 6.06154 |
| 63 | F1E074FEB2CF55427C573C6F | 5.80776 |
| 64 | BC8C283A7CA014EC79837DD7 | 5.82436 |
| 65 | DF29647F465044A0BC7D2720 | 6.28397 |
| 66 | F29CCF3995F08458FA0F8908 | 5.89065 |
| 67 | 28F5D1FD67E98528DB28BB5D | 6.08206 |
| 68 | DC5908BB6B8E1B84ADF881A8 | 6.01325 |
| 69 | 0AF44605329EE32ACF75481B | 5.84218 |
| 70 | C7CEF13FD6FE89346FB543B2 | 6.33524 |
| 71 | 5D2B9D0E4306F96A65BAF4EB | 6.34218 |
| 72 | 0E2D2473C890413D9A9D8DB1 | 6.05022 |
| 73 | 7C082A7E84B366733C6E19D1 | 5.9351 |
| 74 | 85C50A024C78CC1B3AEF4C94 | 5.84302 |
| 75 | 298A3E89079EF4C27CC921A9 | 6.13354 |
| 76 | 825D06F901CE94D8168D8A46 | 6.00828 |
| 77 | 73DCC20AFF8C5837F539EE22 | 6.27564 |
| 78 | 553DD23CB093EFD7C544F013 | 5.88433 |
| 79 | 5EE648A514E40CF0E7ECE2A1 | 5.95859 |
| 80 | F7B98C7D1DD5CE51B6B678A3 | 6.54896 |
| 81 | 9B840FF5F78473E2F75B8E2D | 5.87521 |
| 82 | 8C99E9A614E8AC8C74566752 | 6.03187 |
| 83 | B7EC60A09ACD2CABB53DEDE9 | 5.95608 |
| 84 | 2900FBF0CC91DA813CDBEAD0 | 5.87135 |
| 85 | 949EF4015122026200DF05F1 | 6.11214 |
| 86 | F3AE5B267C36BF3B877E4AC49 | 5.87287 |
| 87 | A4E43FBE54A0280D65419C99 | 6.0007 |
| 88 | F116946F21EF61D108AC2F42 | 6.94574 |
| 89 | 5B82DE3F0ADB20D788A045A6 | 6.13544 |
| 90 | AC639F8BDB63A8C4E4746E65 | 6.25857 |
| 91 | 70C588D838AB0FC61F8EABDA | 5.85846 |
| 92 | D6A8AD537E8258E745C1C476 | 5.82355 |
| 93 | 8A4F652DF088D93FC0073FD8 | 6.00051 |
| 94 | 450F92DF140D63380103F31B | 6.48422 |
| 95 | EAAF05F63641E7AFED3A5A79 | 5.90759 |
| 96 | 5F501203D217CF94BC44A6C1 | 6.5396 |
| 97 | 71F6C952D988BC8847E0BA88 | 6.09041 |
| 98 | BF472B6610532AE50CDF829A | 6.28286 |
| 99 | D15D9E8AECFE8C296D5802D6 | 6.22803 |
| 100 | D5AD5575149C76589FF8784A | 6.07452 |
| 101 | 7868B4788F33D2EA66C86BE2 | 5.83685 |
| 102 | B722E30271A97725EA79020A | 5.97044 |
| 103 | 30209E7F80F14A76FCB45DBF | 6.06914 |
| 104 | 6FA8FDC42599BDFDCEEFD828 | 5.99957 |
| 105 | 9CAF25C12BA260391958223B | 5.91873 |
| 106 | CD82CBA6EA27C514AA8F40A0 | 5.72081 |
| 107 | 96852F4F3B879A23F97D3DFA | 6.24847 |
| 108 | 236F33011BD7E277C5BC9561 | 5.84184 |
| 109 | 9B74FD2CA98D58E7B8EDD5DB | 6.1246 |
| 110 | 2DC51FEED52392D7174435E8 | 5.80747 |
| 111 | 8708EE1A78F79E3E14D30DD7 | 6.23013 |
| 112 | FCCD639AD5BA5B1451CBD600 | 5.96117 |
| 113 | 652492280DC624A59D2A3F82 | 6.32939 |
| 114 | B8D0EC8813E8453214C74501 | 5.99404 |
| 115 | 2AC9F5941B28ED1CF89F6F0A | 5.96865 |
| 116 | 64DB26CD230FABD4BA1A8412 | 6.58194 |
| 117 | C3E2EF9EDB75E639EDC84DEA | 6.07393 |
| 118 | 4BE5A9ADCB4B4C4758F4CEBD | 5.98986 |
| 119 | 3C72C151C36EA2757082442D | 6.02742 |
| 120 | B482C15B86D52FC1106E2E60 | 5.91514 |
| 121 | F26820407553EDB43C57123C | 6.07394 |
| 122 | 1C045E9D66325157825D6967 | 6.10105 |
| 123 | 0E0F6D035E1AC7A1D76161A7 | 6.7399 |
| 124 | C1C20BF875BE9E94D1CAE3BA | 5.82982 |
| 125 | 527261E102F3FC3ABCE2C13C | 5.96992 |
| 126 | 8AFE184CD76A2756E5394350 | 6.76565. |

33. The method as claimed in claim 32, when a number $N_t$ of the transmit antennas is two and a number $N_{FFT}$ of IFFT operation points used in the communication system is 1024, $$R\left(8*\left\lfloor\frac{m}{9}\right\rfloor + m \bmod 9\right)$$

has a value defined by $$R(r) = H_{128}\left(ID_{cell}+1, \prod_{\lfloor\frac{r}{128}\rfloor}(r \bmod 128)\right),$$

$$r = 8*\left\lfloor\frac{m}{9}\right\rfloor + m \bmod 9 = 0, 1, \cdots, 383, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | C9A1F9FB33E2 | 5.73908 |
| 1 | C615462A8D6E | 5.69178 |
| 2 | D8400C1E2B47 | 5.67259 |
| 3 | DBCF1478431C | 5.91286 |
| 4 | CC93B30C0EB9 | 5.55863 |
| 5 | C6F3D332B053 | 5.3082 |
| 6 | 9BA4E419EBB5 | 5.5186 |
| 7 | 48FD85CD7E76 | 6.11686 |
| 8 | E992B4493831 | 5.69693 |
| 9 | 4E1401A862B5 | 5.92235 |
| 10 | 9D3239BF5543 | 5.50286 |
| 11 | 2B8584BFB3D8 | 5.19875 |
| 12 | AB42706F96A0 | 5.44334 |
| 13 | 9DB123495FB7 | 5.63328 |
| 14 | A6EFBCB2865D | 6.0094 |
| 15 | 709300E57360 | 5.73209 |
| 16 | 6E2122FC796F | 5.82368 |
| 17 | 7F01F8B4454F | 5.47779 |
| 18 | CDF8525E2FF7 | 5.33406 |
| 19 | 0AC1FA2585A5 | 6.24242 |
| 20 | 46843DFB1135 | 5.65053 |
| 21 | 8B411A6D7235 | 5.524 |
| 22 | 096A3287FE74 | 5.65888 |
| 23 | E26CD654FF1A | 5.89291 |
| 24 | D955EFF989FE | 5.90035 |
| 25 | 882566402741 | 5.62867 |
| 26 | 9FCD0AB3FCF8 | 5.79711 |
| 27 | 8E477A39DA36 | 5.45249 |
| 28 | 83740061371F | 5.42528 |
| 29 | 179FBF270668 | 5.59438 |
| 30 | 0B4738E24AE1 | 6.26907 |
| 31 | 9BD23A217294 | 5.83321 |
| 32 | E783A99153C7 | 5.57411 |
| 33 | 60690386D94B | 5.56542 |
| 34 | EEB11CF6A279 | 5.61602 |
| 35 | 17737FC0364B | 5.46925 |
| 36 | DBA832CB29FF | 5.46318 |
| 37 | 841030AA2B58 | 5.66141 |
| 38 | 573AE8A1189A | 6.49919 |
| 39 | 26EF1E523190 | 5.45727 |
| 40 | 45F27228B846 | 6.37869 |
| 41 | D26C39A8D803 | 5.63232 |
| 42 | 4514BB4432A6 | 5.74245 |
| 43 | 13CBBBDD1888 | 5.25927 |
| 44 | 34B0D91482A7 | 5.43386 |
| 45 | 0DB3ECE942B0 | 5.40054 |
| 46 | A4D8768F7C4E | 5.45618 |
| 47 | 7D492A0F5B39 | 6.40321 |
| 48 | C82DA6102B09 | 5.31582 |
| 49 | F68C09C7D629 | 5.1445 |
| 50 | 4D6C3B62D026 | 6.44183 |
| 51 | EBD13D02E539 | 5.35096 |
| 52 | 760432EDBC5B | 5.42816 |
| 53 | 022040211B53 | 5.58372 |
| 54 | 2663067DE01D | 5.50621 |
| 55 | C0776A8DD057 | 5.29609 |
| 56 | 96117C9722E1 | 5.61786 |
| 57 | 204C31E521C4 | 5.27659 |
| 58 | C8C12F23551B | 5.70925 |
| 59 | 1217E2F687C1 | 5.51497 |
| 60 | DBF86CB15B3B | 5.57367 |
| 61 | BCC4EC437886 | 5.94074 |
| 62 | AA2734F33EF9 | 5.71983 |
| 63 | CBA739A84A4D | 5.96463 |
| 64 | E12166CA6DF5 | 5.64715 |
| 65 | DE42128CD418 | 5.16399 |
| 66 | F90F21A0B95F | 5.52101 |
| 67 | DCC08885C1D0 | 5.34739 |
| 68 | 152AFEFAA90D | 5.34108 |
| 69 | CB30CE0D8CD2 | 5.89277 |
| 70 | 849C1C0DA6A3 | 5.64765 |
| 71 | B8177804D737 | 5.78193 |
| 72 | 693BE40CEE81 | 5.6998 |
| 73 | 632921AF950C | 6.29239 |
| 74 | C4D296ABB9B0 | 5.55821 |
| 75 | 08DCE8EE0E46 | 5.61434 |
| 76 | 616A6B8637F3 | 5.29314 |
| 77 | DB69C2C67E5F | 5.67251 |
| 78 | B7922C4D47E0 | 5.54227 |
| 79 | 5A4273474A62 | 5.41366 |
| 80 | 50082E465126 | 5.57391 |
| 81 | 2E3844099ABD | 5.27701 |
| 82 | F8EFB7F0CE2F | 5.76264 |
| 83 | 64B7E857C964 | 5.89799 |
| 84 | 5B4DDAF2A8D1 | 6.02566 |
| 85 | B639EE82C328 | 5.71509 |
| 86 | 6414C0DB128C | 6.26365 |
| 87 | 08FEAB4846B9 | 5.5487 |
| 88 | 7E160C4BA0F0 | 5.7677 |
| 89 | 5CCA9AF7C373 | 5.61368 |
| 90 | 21B3DF421DE7 | 5.43398 |
| 91 | 9323DD2F2771 | 5.2348 |
| 92 | A26015CF1514 | 5.78478 |
| 93 | 8220CF898D60 | 5.43634 |
| 94 | 8CCEC410F8A6 | 5.33904 |
| 95 | 4FFDECD6D0E0 | 5.50659 |
| 96 | 42D052099826 | 5.68271 |
| 97 | 8785DFDA586A | 5.2863 |
| 98 | 68DDF31B930F | 5.65759 |
| 99 | F0539BCDAACB | 5.6598 |
| 100 | 372C0613FE2C | 5.21517 |
| 101 | 37402B2A80A9 | 6.29655 |
| 102 | 523AE3212125 | 5.41681 |
| 103 | 02EDF46F9694 | 5.47569 |
| 104 | E64CC083190E | 5.71759 |
| 105 | 65DE3871D0D1 | 5.80455 |
| 106 | 7808E3E5FE8E | 5.88159 |
| 107 | 070004E13E81 | 5.79589 |
| 108 | 1CE29934CF8D | 5.33859 |
| 109 | 52B8A394BDBC | 5.9872 |
| 110 | 1A13C7DB3016 | 5.31546 |
| 111 | CE75430244B7 | 5.40294 |
| 112 | DD89BD52F023 | 5.81172 |
| 113 | 6B98276F9841 | 5.59191 |
| 114 | 6610C6E6E48A | 5.56389 |
| 115 | D753E680DA0C | 5.15097 |
| 116 | 2C4F3846B73B | 5.61595 |
| 117 | 2CF0C114CDE6 | 5.32662 |
| 118 | 402321DA1EE8 | 5.54017 |
| 119 | 9B1C5FA285FF | 5.46826 |
| 120 | 89CCD4198A39 | 5.81874 |
| 121 | 8CCC9E1070AA | 5.47071 |
| 122 | A6F8618DABA3 | 6.12696 |
| 123 | 068DC6397B4C | 5.86346 |
| 124 | 860C87D27677 | 5.84626 |
| 125 | B28A7B2A0082 | 6.26524 |
| 126 | 1F2FB417DDEB | 6.103. |

34. The method as claimed in claim 31, when a number $N_t$ of the transmit antennas is two and a number $N_{FFT}$ of IFFT operation points used in the communication system is 512, $$R\left(8*\left\lfloor\frac{m}{9}\right\rfloor + m \bmod 9\right)$$

has a value defined by $$R(r) = H_{128}\left(ID_{cell} + 1, \prod_{\left\lfloor\frac{r}{128}\right\rfloor}(r \bmod 128)\right),$$

$r = 8*\left\lfloor\frac{m}{9}\right\rfloor + m \bmod 9 = 0, 1, \cdots, 191$, and said $T\left(\left\lfloor\frac{m}{9}\right\rfloor\right)$ and $q_{ID_{cell}}[m]$ have values defined by hexadecimal numbers as shown in

| ID cell | sequence | papr |
|---|---|---|
| 0 | C88B5B | 4.67601 |
| 1 | 4B943B | 5.01945 |
| 2 | 26A2CA | 4.9099 |
| 3 | ABF43A | 4.9298 |
| 4 | F653DD | 5.58288 |
| 5 | 686FDB | 5.08845 |
| 6 | 0D2D4F | 5.49959 |
| 7 | E4BEB2 | 5.03402 |
| 8 | C68129 | 5.41883 |
| 9 | 6C86BB | 5.41345 |
| 10 | 0211D9 | 5.25745 |
| 11 | 4A0178 | 4.60192 |
| 12 | 71E762 | 5.20474 |
| 13 | 3EBA79 | 5.1286 |
| 14 | 8CF2B6 | 4.94086 |
| 15 | F052BB | 4.73214 |
| 16 | 36BF3C | 5.22147 |
| 17 | 56684C | 5.74529 |
| 18 | 654D89 | 5.24514 |
| 19 | 2781F3 | 4.89117 |
| 20 | 46876A | 4.62728 |
| 21 | CE53D0 | 4.94685 |
| 22 | 523974 | 4.87706 |
| 23 | 4A0453 | 5.02621 |
| 24 | 47F9ED | 5.91721 |
| 25 | BB2C96 | 4.83723 |
| 26 | 48B142 | 5.21914 |
| 27 | FFDA6B | 5.52578 |
| 28 | 8F8DC4 | 4.95493 |
| 29 | 1A1037 | 5.06145 |
| 30 | 50F345 | 5.39428 |
| 31 | 9C2ABE | 5.15445 |
| 32 | 97191F | 4.88407 |
| 33 | 61FCD0 | 5.82153 |
| 34 | 6F8969 | 6.25241 |
| 35 | 156F56 | 5.42931 |
| 36 | BC8D17 | 5.08773 |
| 37 | F3092A | 5.05832 |
| 38 | A41DBD | 4.75378 |
| 39 | 6EA1E4 | 4.83662 |
| 40 | 6A29F7 | 5.19888 |
| 41 | 462826 | 4.79626 |
| 42 | 5FB555 | 4.97374 |
| 43 | F3D2C6 | 4.93286 |
| 44 | 0BFE87 | 5.03341 |
| 45 | 92AA64 | 4.93443 |
| 46 | A5D580 | 5.18021 |
| 47 | 6D6DFD | 4.94058 |
| 48 | 6A578D | 5.58274 |
| 49 | 967EE4 | 5.18235 |
| 50 | CE4755 | 6.35302 |
| 51 | 2D6ECE | 5.92368 |
| 52 | 6BA1CF | 6.12984 |
| 53 | 019E02 | 6.09087 |
| 54 | A06B8B | 4.90168 |
| 55 | 9CBA18 | 5.48837 |
| 56 | 05FD60 | 5.16162 |
| 57 | FC2322 | 4.95813 |
| 58 | F0898A | 5.74311 |
| 59 | F22469 | 5.32756 |
| 60 | 57673A | 6.33084 |
| 61 | 1A38DB | 5.56632 |
| 62 | A69433 | 4.90576 |
| 63 | 9B80BB | 4.82736 |
| 64 | 6B75F8 | 4.66086 |
| 65 | DF32CD | 5.28631 |
| 66 | D1F692 | 4.86675 |
| 67 | E6FCC8 | 5.65351 |
| 68 | 08DF3D | 4.79648 |
| 69 | 39CFC0 | 4.95539 |
| 70 | EC8BAD | 5.95318 |
| 71 | 16B9AC | 5.12127 |
| 72 | 6E6D24 | 5.88171 |
| 73 | B2027C | 5.22276 |
| 74 | E05272 | 5.72503 |
| 75 | 859C89 | 5.65769 |
| 76 | 6624DD | 4.98579 |
| 77 | F2D404 | 5.27575 |
| 78 | 8B81D9 | 5.26581 |
| 79 | 5C69D7 | 4.97194 |
| 80 | 645838 | 5.86814 |
| 81 | 8DEFA5 | 4.94176 |
| 82 | 22059A | 5.76969 |
| 83 | 70A052 | 5.26498 |
| 84 | 50E6D6 | 5.65313 |
| 85 | B286FB | 5.2203 |
| 86 | 36016D | 5.00459 |
| 87 | 98D31F | 4.85287 |
| 88 | 6A87B3 | 4.80097 |
| 89 | 958B99 | 5.40979 |
| 90 | 8AB689 | 4.89558 |
| 91 | 570A5C | 4.75712 |
| 92 | 47A9A6 | 5.42678 |
| 93 | 4B2F30 | 5.47629 |
| 94 | 0D6033 | 5.36666 |
| 95 | 3F7DAA | 4.73588 |
| 96 | E64518 | 5.68267 |
| 97 | F94B7D | 4.92173 |
| 98 | 78D213 | 5.38737 |
| 99 | 9EDE1D | 5.05499 |
| 100 | 8E3B36 | 5.76876 |
| 101 | 74AF80 | 5.10266 |
| 102 | CC8769 | 4.89204 |
| 103 | 265829 | 5.3906 |
| 104 | 7CF001 | 5.44668 |
| 105 | B5D0CE | 5.14106 |
| 106 | 43277F | 5.24521 |
| 107 | 015C21 | 4.93279 |
| 108 | A4AB8B | 5.01596 |
| 109 | B3A938 | 5.15091 |
| 110 | 3333D3 | 4.78207 |
| 111 | AFA03D | 5.52105 |
| 112 | 88F995 | 5.11364 |
| 113 | E1668B | 5.77986 |
| 114 | 660486 | 5.54529 |
| 115 | 950A62 | 5.40358 |
| 116 | 8C5ADE | 4.8725 |
| 117 | E5A8B8 | 4.92944 |
| 118 | B829A5 | 6.05407 |
| 119 | F307EB | 5.82622 |
| 120 | B17886 | 5.21061 |
| 121 | D84D1D | 4.76129 |
| 122 | EF6206 | 5.37892 |
| 123 | 4DBF2A | 5.23858 |
| 124 | 99AE0A | 5.42723 |
| 125 | B72333 | 5.34308 |
| 126 | 39157D | 5.3781. |

35. The method as claimed in claim 31, when a number $N_t$ of the transmit antennas is three and a number $N_{FFT}$ of IFFT operation points used in the communication system is 2048, $$R\left(8*\left\lfloor\frac{m}{9}\right\rfloor + m \bmod 9\right)$$

has a value defined by $$R(r) = H_{128}\left(ID_{cell}+1, \prod_{\lfloor\frac{r}{128}\rfloor}(r \bmod 128)\right),$$

$$r = 8*\left\lfloor\frac{m}{9}\right\rfloor + m \bmod 9 = 0, 1, \cdots, 511, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | EBB5219015A2CF69 | 5.60481 |
| 1 | E7577012119C2F4F | 5.8025 |
| 2 | 94641A95D3892C4C | 5.39292 |
| 3 | 5605C4FD0295FA2D | 5.70729 |
| 4 | 888E813B80653270 | 6.10319 |
| 5 | 0B89E336263C9B47 | 5.67799 |
| 6 | D02AEC72AA4281DE | 5.95384 |
| 7 | 840A86AB95735147 | 6.34571 |
| 8 | 70DDEEADB853EFD3 | 6.15491 |
| 9 | 2A30262668215D10 | 5.36612 |
| 10 | 3946313945569C2D | 5.64591 |
| 11 | F3A1D436C3335470 | 5.41957 |
| 12 | 06F12B55575C91BC | 6.05684 |
| 13 | 5D1F19936F14DCAD | 5.84532 |
| 14 | 04071D77D7F9A845 | 5.61247 |
| 15 | 497BB95882E4EEAB | 5.6825 |
| 16 | 6412AB106D4D9A28 | 5.92933 |
| 17 | 7DF8E9AFE6C144FB | 5.60962 |
| 18 | 57E378362038C702 | 6.34889 |
| 19 | 3062CAC92903466F | 5.58868 |
| 20 | 0830B23AD7B527D0 | 5.59669 |
| 21 | 27D31A5FF122C9AF | 5.68495 |
| 22 | 3F8D7282F8A55AA0 | 5.89226 |
| 23 | 0577DCD47B2A9880 | 5.69177 |
| 24 | 494535D2183E1926 | 5.7183 |
| 25 | DD67204C7744C1BE | 5.63368 |
| 26 | 8B25DD9FD8299E13 | 5.84895 |
| 27 | BC975163654F3B50 | 5.75655 |
| 28 | 93514684AE5B2963 | 5.55524 |
| 29 | 609EE16E059C8767 | 6.46135 |
| 30 | 1085286A62ABABBB | 6.03684 |
| 31 | E8461C82A2EDE3C2 | 6.03297 |
| 32 | F10C200C0A9E51A3 | 5.72795 |
| 33 | 4C34030B53AB1008 | 5.95601 |
| 34 | E0D676AC906B414C | 5.84918 |
| 35 | 33EFF510D0879101 | 6.29841 |
| 36 | 0AAA2E53DFD976A1 | 5.69201 |
| 37 | AE20E9552F8ACBB9 | 6.11009 |
| 38 | 091A43A3363B0B54 | 5.5762 |
| 39 | 1F3F86733DB3B67F | 5.34036 |
| 40 | EDDD4EC6D2ED0CA2 | 5.74128 |
| 41 | 2D68F8549B535245 | 6.00089 |
| 42 | E | 5.51124 |
| 43 | 33D3A9D1BB823ECF | 5.61324 |
| 44 | 36F8E824FB016379 | 5.53523 |
| 45 | 02AFFAEFB723B2A4 | 5.6231 |
| 46 | 801426AEF9A6A5B9 | 5.78793 |
| 47 | 35DBBBFE4BD3BAFD | 5.80191 |
| 48 | B81F330CB835F8D5 | 5.83396 |
| 49 | ABB0820EB58B1C1F | 5.61285 |
| 50 | 3A6BA5A0FA06E5F2 | 6.11278 |
| 51 | 42EF0C2E4EB95EC4 | 6.02193 |
| 52 | 85D4C32BEA88C3EE | 5.48754 |
| 53 | 5AA332E1BF1BCAC9 | 5.64628 |
| 54 | 16E626D3EC6652FB | 5.71122 |
| 55 | CBE6AA0BCE5FAA02 | 5.57369 |
| 56 | B65B0A53D4E9992A | 5.65488 |
| 57 | 00DAB2CCA5D49E63 | 5.57148 |
| 58 | 85748563C4F0A429 | 5.6702 |
| 59 | 98BA0BF6BBBD3361 | 5.84405 |
| 60 | 8F797CAB40B4D574 | 6.05648 |
| 61 | AECECD569D866D16 | 6.04214 |
| 62 | E74C6A661AABFBF9 | 5.67473 |
| 63 | AFBF1FF4E46B7EF3 | 5.79021 |
| 64 | E8BC2F963DC3B2B2 | 5.75122 |
| 65 | FF647D9DCB1C197B | 5.6339 |
| 66 | E13FDE868A0B285A | 5.68188 |
| 67 | FDB2D14DAD31C90C | 5.71447 |
| 68 | 88FDEEE45D696402 | 5.38298 |
| 69 | CBF0781E4924FF3C | 5.62064 |
| 70 | CC89609F74991315 | 5.88678 |
| 71 | B577961BE45EA101 | 6.06286 |
| 72 | 05AB8E2E7E815CDA | 5.79215 |
| 73 | 776AB333EBD0D162 | 6.00548 |
| 74 | 910E866EDC218A13 | 5.96018 |
| 75 | 495C54826C00A631 | 5.74533 |
| 76 | 014D2CBF069404A3 | 5.49484 |
| 77 | 07C190874A47EE57 | 5.62467 |
| 78 | 995EEF2F3F93BFB7 | 5.68453 |
| 79 | 7DC995D53F521A15 | 5.85155 |
| 80 | 2A0042A7ADEDE1FF | 5.90403 |
| 81 | 7EE84B4717C738B6 | 5.28346 |
| 82 | F8052186C6213917 | 5.93926 |
| 83 | 935FE55981908464 | 6.02626 |
| 84 | 69694DB3D2430639 | 6.14314 |
| 85 | 03C3974B6E111058 | 6.10257 |
| 86 | E1959F9D35447BAC | 5.64685 |
| 87 | 933549D2096A322F | 5.89711 |
| 88 | F13CEADB80EED2AD | 6.30465 |
| 89 | 7B98C279EB0A4646 | 6.06922 |
| 90 | 39A9BAE248C76E99 | 5.62153 |
| 91 | C23060852F7114C0 | 5.67005 |
| 92 | 80CC9CEE7A780885 | 5.53147 |
| 93 | C714F7AF79A08A7E | 5.76285 |
| 94 | 84C665021AEFA304 | 5.78511 |
| 95 | 04D180B450A1AC42 | 5.4789 |
| 96 | 7F037D18D5E976C2 | 5.73751 |
| 97 | F9B1FE82309652AC | 5.86339 |
| 98 | 7E6678BC9E8741B9 | 6.23575 |
| 99 | F93C8F1B7E2ACF4E | 5.90959 |
| 100 | 558A22F54AD95EDD | 5.69264 |
| 101 | FB63DFF5745D862D | 5.87696 |
| 102 | 525BE5F24FBE4B35 | 5.75721 |
| 103 | 107FD75A05526625 | 5.65658 |
| 104 | B4CAF64A0A876CE9 | 5.8741 |
| 105 | 013830891D01203F | 5.65109 |
| 106 | 2AABE5C3E581F43E | 5.5524 |
| 107 | 07B814E82987B246 | 5.96707 |
| 108 | 0D585FA19DA3EF6F | 5.70668 |
| 109 | 11A8416C59B13AC7 | 5.89308 |
| 110 | 3AA7C3E1D8173A06 | 5.68576 |
| 111 | E52CFF8D410728B1 | 5.74131 |
| 112 | FF4FBAC747F1B6A1 | 5.75276 |
| 113 | 939EE73168ED4C82 | 5.677 |
| 114 | F2D9CA26BBD7E0B4 | 5.84899 |
| 115 | 1017CD88943EB8CB | 5.58448 |
| 116 | 1048528B06C62235 | 5.68438 |
| 117 | 05C2D808853DE26D | 5.51423 |
| 118 | EC83A9206C61798A | 5.99338 |
| 119 | D8C59BA2C56F312A | 5.6595 |
| 120 | B11A7330D4688023 | 5.81244 |
| 121 | BE74B49A67943688 | 5.63205 |
| 122 | FA432B05366B8852 | 5.76478 |
| 123 | 81BDFB717AEFA474 | 6.03504 |
| 124 | D9E20071558716DA | 5.72503 |
| 125 | BD2ED0EB96F3FCD5 | 5.96824 |
| 126 | C3D51B62C949FCCE | 5.63674. |

36. The method as claimed in claim 31, when a number $N_t$ of the transmit antennas is three and a number $N_{FFT}$ of IFFT operation points used in the communication system is 1024, $$R\left(8*\left\lfloor\frac{m}{9}\right\rfloor + m\ \mathrm{mod}9\right)$$

has a value defined by $$R(r) = H_{128}\left(ID_{cell} + 1, \prod_{\left\lfloor\frac{r}{128}\right\rfloor}(r\ \mathrm{mod}128)\right),$$

$$r = 8*\left\lfloor\frac{m}{9}\right\rfloor + m\ \mathrm{mod}9 = 0, 1, \cdots, 255,\ \text{and said}\ T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | CB8FEAC7 | 5.15583 |
| 1 | 06F43328 | 5.62342 |
| 2 | AFED6295 | 6.22365 |
| 3 | 3E322540 | 5.26289 |
| 4 | D2593855 | 5.19138 |
| 5 | FA1F55C8 | 5.05749 |
| 6 | 0D610CCC | 5.57522 |
| 7 | 38373635 | 5.01025 |
| 8 | C7B4744C | 5.01551 |
| 9 | 6C90FCBB | 5.20449 |
| 10 | 8122195F | 5.04695 |
| 11 | 0AA54C3F | 4.66825 |
| 12 | 94520024 | 4.84099 |
| 13 | 281008C9 | 5.29972 |
| 14 | 1C4B2890 | 5.25349 |
| 15 | 905AEC6F | 4.84371 |
| 16 | BD30B2CD | 5.44488 |
| 17 | 69E8C548 | 5.37924 |
| 18 | E6CA997C | 4.68891 |
| 19 | 26A6D0C0 | 4.93526 |
| 20 | 628666E5 | 4.4603 |
| 21 | EE5304A7 | 4.97386 |
| 22 | 48CB3622 | 5.08221 |
| 23 | DFA0D85E | 5.00963 |
| 24 | 0B906505 | 5.36358 |
| 25 | 392C146F | 4.93658 |
| 26 | 6AB8723D | 5.64086 |
| 27 | D2034CC0 | 5.28929 |
| 28 | 9BD1CBA9 | 5.17126 |
| 29 | B4D7CB69 | 5.56246 |
| 30 | A9ED8CD3 | 5.289 |
| 31 | 7F0397C9 | 5.49132 |
| 32 | 1782D4F5 | 4.90867 |
| 33 | 41C19746 | 5.29604 |
| 34 | 6F63CFD4 | 6.46788 |
| 35 | C7D92076 | 5.21648 |
| 36 | 3A995F69 | 5.28823 |
| 37 | BD19FAC6 | 5.25253 |
| 38 | 345AEECD | 5.28582 |
| 39 | 2F2F9452 | 4.68278 |
| 40 | 2D186366 | 5.15683 |
| 41 | 342FF0D6 | 5.12173 |
| 42 | 449E81E3 | 4.86028 |
| 43 | 85D9863D | 4.80846 |
| 44 | 32B7E693 | 4.66558 |
| 45 | 3F09AA6E | 5.26735 |
| 46 | 8087F514 | 5.12159 |
| 47 | 7CA91C83 | 5.28859 |
| 48 | 2EE7B95F | 5.27919 |
| 49 | 72D518D7 | 5.17632 |
| 50 | B22A330D | 6.8988 |
| 51 | 2A84826E | 5.28768 |
| 52 | 6A786C7F | 5.83993 |

-continued

| ID cell | sequence | papr |
|---|---|---|
| 53 | 04020217 | 6.1875 |
| 54 | 64E34E15 | 5.03925 |
| 55 | E2CA18D3 | 5.30496 |
| 56 | 37AC5222 | 5.2167 |
| 57 | 7011A0E9 | 4.86805 |
| 58 | 90841BE9 | 5.32789 |
| 59 | B2C87A9D | 6.12947 |
| 60 | F56D3C21 | 6.3528 |
| 61 | 9DC9D0A2 | 5.47964 |
| 62 | B2853B2F | 5.22007 |
| 63 | BBC475D3 | 5.53568 |
| 64 | AE4A4E9B | 5.59729 |
| 65 | 9933A60C | 5.25657 |
| 66 | F1978F10 | 4.7959 |
| 67 | 6C1DCD04 | 5.10028 |
| 68 | 2515AE3B | 5.04345 |
| 69 | 0874401E | 4.67421 |
| 70 | AC11ED65 | 5.9294 |
| 71 | 96211791 | 5.1407 |
| 72 | 69AFE10C | 5.64556 |
| 73 | B3D51D76 | 5.29334 |
| 74 | 8113FF9E | 5.09747 |
| 75 | 1D9EFBDD | 5.18707 |
| 76 | 234549EE | 4.78454 |
| 77 | 927475FD | 5.39462 |
| 78 | B1404944 | 4.95295 |
| 79 | 552815A4 | 6.2202 |
| 80 | 470610E6 | 5.62302 |
| 81 | 7EEF9D4B | 4.88997 |
| 82 | 68645A2C | 6.07151 |
| 83 | 4435E7A5 | 5.63064 |
| 84 | C8E58BB3 | 6.80605 |
| 85 | 948EFBB2 | 5.57596 |
| 86 | C1917FF7 | 5.48329 |
| 87 | 6C9AE67E | 4.93469 |
| 88 | 44BFEAC7 | 5.54454 |
| 89 | 565B8F5E | 5.89093 |
| 90 | A8F39A23 | 4.67016 |
| 91 | 269FE877 | 4.88909 |
| 92 | 13EAF0DF | 4.91822 |
| 93 | 624FDBA7 | 4.997 |
| 94 | 9CF725BA | 5.13808 |
| 95 | D0FDA9AC | 5.03832 |
| 96 | F8806BAD | 5.15283 |
| 97 | AD29F883 | 4.95856 |
| 98 | CCB14BB9 | 4.83304 |
| 99 | FE9E4FBA | 5.31628 |
| 100 | 1A345FA7 | 5.13454 |
| 101 | E12EF826 | 5.34722 |
| 102 | DC6A6A85 | 5.07414 |
| 103 | 2E7DDFA4 | 5.20743 |
| 104 | 6D79E1F4 | 5.22863 |
| 105 | 4FDCB0E0 | 5.22455 |
| 106 | 53076335 | 5.35733 |
| 107 | 025C0A04 | 5.74473 |
| 108 | 24190046 | 4.48846 |
| 109 | 733AE2B4 | 5.30588 |
| 110 | 29A991FE | 4.82382 |
| 111 | D5E8E325 | 5.23798 |
| 112 | F94B8091 | 4.77719 |
| 113 | 09EB2797 | 5.51662 |
| 114 | 538A66AA | 5.86963 |
| 115 | D49EFACF | 4.88564 |
| 116 | 2E5E8F59 | 5.24587 |
| 117 | D2250855 | 5.11869 |
| 118 | 50031D89 | 5.26554 |
| 119 | D3FC03A0 | 5.03861 |
| 120 | 9148DD11 | 5.15572 |
| 121 | FC0DD67A | 5.1763 |
| 122 | B3620135 | 4.73865 |
| 123 | 9B9DD357 | 5.48933 |
| 124 | BFCBF0BE | 5.34988 |
| 125 | 371AB31A | 5.35378 |
| 126 | 38101882 | 5.49554. |

37. The method as claimed in claim 31, when a number $N_t$ of the transmit antennas is three and a number $N_{FFT}$ of IFFT operation points used in the communication system is 512, $$R\left(8*\left\lfloor\frac{m}{9}\right\rfloor + m \bmod 9\right)$$

has a value defined by $$R(r) = H_{128}\left(ID_{cell} + 1, \prod_{\left\lfloor\frac{r}{128}\right\rfloor}(r \bmod 128)\right),$$

$$r = 8*\left\lfloor\frac{m}{9}\right\rfloor + m \bmod 9 = 0, 1, \cdots, 127, \text{ and said } T\left(\left\lfloor\frac{m}{9}\right\rfloor\right)$$

and $q_{ID_{cell}}[m]$ have values defined by hexadecimal numbers as shown in

| ID cell | sequence | papr |
|---|---|---|
| 0 | 2197 | 4.19373 |
| 1 | 0D7A | 4.52301 |
| 2 | AF7B | 4.60134 |
| 3 | 8D7D | 4.43697 |
| 4 | 5659 | 4.45478 |
| 5 | 786B | 4.44368 |
| 6 | 58E5 | 4.71563 |
| 7 | B43C | 4.95923 |
| 8 | E01B | 4.62147 |
| 9 | AFBE | 4.86292 |
| 10 | 5B33 | 4.48154 |
| 11 | 6326 | 4.65913 |
| 12 | B0FE | 4.47246 |
| 13 | 7D50 | 4.57845 |
| 14 | 1EF6 | 4.17626 |
| 15 | 8264 | 4.64049 |
| 16 | 33D9 | 4.55088 |
| 17 | 6C9F | 4.52818 |
| 18 | A76F | 4.39514 |
| 19 | 7A2A | 5.06253 |
| 20 | 0488 | 4.70612 |
| 21 | C25A | 4.70319 |
| 22 | 5779 | 4.44569 |
| 23 | 5F30 | 4.76144 |
| 24 | 47D5 | 4.72732 |
| 25 | 89AF | 4.66002 |
| 26 | E2A7 | 4.37136 |
| 27 | F14E | 4.40459 |
| 28 | A963 | 4.44538 |
| 29 | 17B6 | 3.73691 |
| 30 | 20BD | 4.62356 |
| 31 | 9F2B | 4.70725 |
| 32 | A71A | 5.22983 |
| 33 | FCDD | 5.40854 |
| 34 | F309 | 4.48828 |
| 35 | 2260 | 4.97653 |
| 36 | 985D | 4.3215 |
| 37 | BF8D | 4.80015 |
| 38 | 6345 | 4.47419 |
| 39 | EE35 | 4.72718 |
| 40 | C2C8 | 4.33645 |
| 41 | 8DCA | 4.72911 |
| 42 | 65EB | 4.67972 |
| 43 | 5BD6 | 4.45284 |
| 44 | 3657 | 4.20409 |
| 45 | 8A40 | 4.61712 |
| 46 | F79D | 4.56916 |
| 47 | 346D | 4.60012 |
| 48 | 6015 | 4.76798 |
| 49 | 9696 | 6.17153 |
| 50 | EAE1 | 4.52968 |
| 51 | 162E | 4.36476 |
| 52 | 4A4B | 5.8336 |
| 53 | 0493 | 4.53168 |
| 54 | ADA1 | 4.63721 |
| 55 | C51E | 4.59395 |
| 56 | 8B63 | 5.42257 |
| 57 | 5508 | 4.3453 |
| 58 | 8887 | 4.54333 |
| 59 | FE8D | 3.99562 |
| 60 | 9F63 | 4.19506 |
| 61 | 00BA | 4.50001 |
| 62 | E7D1 | 4.41194 |
| 63 | 43B9 | 4.23605 |
| 64 | CB61 | 4.69086 |
| 65 | 72DD | 4.38892 |
| 66 | C7A7 | 4.69706 |
| 67 | 7F9D | 5.03396 |
| 68 | 2AED | 4.30871 |
| 69 | E134 | 4.65157 |
| 70 | AD8D | 5.89058 |
| 71 | 5065 | 4.48793 |
| 72 | 3AA7 | 4.3173 |
| 73 | F642 | 4.75911 |
| 74 | C521 | 4.71632 |
| 75 | 2D84 | 4.87128 |
| 76 | A335 | 4.33797 |
| 77 | FC46 | 4.83393 |
| 78 | 0907 | 4.70575 |
| 79 | D71A | 4.6364 |
| 80 | C174 | 5.21763 |
| 81 | 2583 | 4.36862 |
| 82 | F65F | 4.64336 |
| 83 | 7CA0 | 4.89679 |
| 84 | EDA5 | 4.86511 |
| 85 | 9445 | 3.88229 |
| 86 | 4860 | 4.76487 |
| 87 | E905 | 4.24911 |
| 88 | 5966 | 5.02129 |
| 89 | FCA6 | 4.52957 |
| 90 | 1465 | 4.22799 |
| 91 | 0572 | 4.58851 |
| 92 | 23EB | 4.65141 |
| 93 | 9B0B | 3.93818 |
| 94 | 467C | 4.71579 |
| 95 | 5BC9 | 4.39535 |
| 96 | AECA | 4.6301 |
| 97 | AF75 | 4.54999 |
| 98 | E589 | 4.65198 |
| 99 | 72A0 | 5.45701 |
| 100 | B70A | 4.59467 |
| 101 | 2B4E | 4.1115 |
| 102 | 8B35 | 4.76813 |
| 103 | 6841 | 4.41251 |
| 104 | 6290 | 4.75626 |
| 105 | 7A62 | 4.43697 |
| 106 | 6550 | 4.23136 |
| 107 | 11D8 | 4.49253 |
| 108 | 0C67 | 4.14239 |
| 109 | 6741 | 4.90459 |
| 110 | F128 | 4.7665 |
| 111 | 9167 | 4.61706 |
| 112 | B2C1 | 4.80371 |
| 113 | EDB3 | 4.27782 |
| 114 | 4A74 | 4.58645 |
| 115 | 1085 | 4.17758 |
| 116 | 1BD8 | 4.4536 |
| 117 | 64E8 | 4.18647 |
| 118 | 7538 | 5.1831 |
| 119 | FB16 | 4.33093 |
| 120 | C5FB | 4.43481 |
| 121 | 5C8C | 4.34469 |
| 122 | EB32 | 4.3743 |
| 123 | 1531 | 4.46991 |
| 124 | 792F | 4.39589 |
| 125 | 8461 | 4.42202 |
| 126 | B8D0 | 4.53339. |

* * * * *